(12) United States Patent
Pendergast et al.

(10) Patent No.: US 9,437,247 B2
(45) Date of Patent: Sep. 6, 2016

(54) PREVIEW DISPLAY FOR MULTI-CAMERA MEDIA CLIPS

(75) Inventors: Colleen Pendergast, Livermore, CA (US); Brian Meaney, Livermore, CA (US); Mark Alan Eaton, II, Campbell, CA (US); Shaun M. Poole, Palo Alto, CA (US); Mike Stern, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 735 days.

(21) Appl. No.: 13/361,931

(22) Filed: Jan. 30, 2012

(65) Prior Publication Data
US 2013/0124998 A1   May 16, 2013

Related U.S. Application Data

(60) Provisional application No. 61/559,710, filed on Nov. 14, 2011.

(51) Int. Cl.
*G11B 27/28* (2006.01)
*G11B 27/031* (2006.01)
*G11B 27/10* (2006.01)
*G11B 27/34* (2006.01)
(Continued)

(52) U.S. Cl.
CPC ............ *G11B 27/28* (2013.01); *G11B 27/031* (2013.01); *G11B 27/034* (2013.01); *G11B 27/10* (2013.01); *G11B 27/34* (2013.01); *H04N 5/262* (2013.01); *H04N 7/17336* (2013.01); *H04N 21/21805* (2013.01); *H04N 21/2743* (2013.01); *H04N 21/47205* (2013.01); *H04N 21/8549* (2013.01)

(58) Field of Classification Search
CPC ..... G11B 27/034; G11B 27/34; G11B 27/28; G11B 27/031; G11B 27/10
USPC .......................................................... 715/723
See application file for complete search history.

(56) References Cited

U.S. PATENT DOCUMENTS

| | | | |
|---|---|---|---|
| 5,307,456 A | 4/1994 | MacKay | |
| 5,442,744 A | 8/1995 | Piech et al. | |

(Continued)

FOREIGN PATENT DOCUMENTS

| | | |
|---|---|---|
| CA | 2145812 | 9/1996 |
| EP | 0702832 | 3/1996 |

(Continued)

OTHER PUBLICATIONS

U.S. Appl. No. 11/107,330, filed Apr. 16, 2005, Johnson, Gary.

(Continued)

*Primary Examiner* — Jennifer To
*Assistant Examiner* — Ashley Fortino
(74) *Attorney, Agent, or Firm* — Adeli LLP

(57) ABSTRACT

Some embodiments provide a graphical user interface (GUI) of a media-editing application. The GUI includes a composite display area for displaying a set of media clips that define a composite presentation. The set of media clips includes a particular media clip which includes several different groups of ordered clips that are selectable for use in the composite presentation. The GUI includes a preview display area for simultaneously displaying video images from several of the different groups corresponding to a time in the composite presentation. The displayed video images in the preview display area are selectable to determine which of the groups is for use in the composite presentation.

22 Claims, 59 Drawing Sheets

(51) Int. Cl.
  *H04N 5/262* (2006.01)
  *H04N 7/173* (2011.01)
  *H04N 21/218* (2011.01)
  *H04N 21/2743* (2011.01)
  *H04N 21/8549* (2011.01)
  *G11B 27/034* (2006.01)
  *H04N 21/472* (2011.01)

(56) References Cited

U.S. PATENT DOCUMENTS

| | | | |
|---|---|---|---|
| 5,572,261 A | 11/1996 | Cooper | |
| 5,659,539 A | 8/1997 | Porter et al. | |
| 5,659,792 A | 8/1997 | Walmsley | |
| 5,659,793 A | 8/1997 | Escobar et al. | |
| 5,664,216 A | 9/1997 | Blumenau | |
| 5,682,326 A | 10/1997 | Klingler et al. | |
| 5,732,184 A | 3/1998 | Chao et al. | |
| 5,826,102 A | 10/1998 | Escobar et al. | |
| 5,861,889 A | 1/1999 | Wallace et al. | |
| 5,933,141 A | 8/1999 | Smith | |
| 6,144,375 A | 11/2000 | Jain et al. | |
| 6,154,600 A | 11/2000 | Newman et al. | |
| 6,154,601 A | 11/2000 | Yaegashi et al. | |
| 6,161,115 A | 12/2000 | Ohanian | |
| 6,188,396 B1 | 2/2001 | Boezeman et al. | |
| 6,243,096 B1 | 6/2001 | Takanashi | |
| 6,324,335 B1 | 11/2001 | Kanda | |
| 6,400,378 B1 | 6/2002 | Snook | |
| 6,414,686 B1 | 7/2002 | Protheroe et al. | |
| 6,539,163 B1* | 3/2003 | Sheasby et al. | 386/283 |
| 6,546,188 B1 | 4/2003 | Ishii et al. | |
| 6,628,303 B1 | 9/2003 | Foreman et al. | |
| 6,650,826 B1 | 11/2003 | Hatta | |
| 6,714,216 B2 | 3/2004 | Abe | |
| 7,313,755 B2 | 12/2007 | Rahman et al. | |
| 7,325,199 B1 | 1/2008 | Reid | |
| 7,411,590 B1 | 8/2008 | Boyd et al. | |
| 7,623,755 B2 | 11/2009 | Kuspa | |
| 7,823,056 B1* | 10/2010 | Davey et al. | 715/202 |
| 8,359,537 B2 | 1/2013 | Lyons et al. | |
| 8,522,144 B2 | 8/2013 | Lyons et al. | |
| 8,533,598 B2 | 9/2013 | Meaney et al. | |
| 8,612,858 B2 | 12/2013 | Meaney et al. | |
| 2001/0036356 A1 | 11/2001 | Weaver et al. | |
| 2002/0023103 A1 | 2/2002 | Gagne | |
| 2002/0140719 A1 | 10/2002 | Amir et al. | |
| 2002/0154140 A1 | 10/2002 | Tazaki | |
| 2002/0156805 A1 | 10/2002 | Schriever et al. | |
| 2002/0177967 A1 | 11/2002 | Fuchs et al. | |
| 2003/0002715 A1 | 1/2003 | Kowald | |
| 2003/0016254 A1 | 1/2003 | Abe | |
| 2004/0201609 A1 | 10/2004 | Obrador | |
| 2004/0268224 A1 | 12/2004 | Balkus et al. | |
| 2005/0042591 A1 | 2/2005 | Bloom et al. | |
| 2005/0273321 A1 | 12/2005 | Choi | |
| 2006/0008247 A1 | 1/2006 | Minami et al. | |
| 2006/0036971 A1 | 2/2006 | Mendel et al. | |
| 2006/0156374 A1 | 7/2006 | Hu et al. | |
| 2006/0236245 A1 | 10/2006 | Agarwal et al. | |
| 2007/0174790 A1* | 7/2007 | Jing et al. | 715/838 |
| 2007/0189708 A1 | 8/2007 | Lerman et al. | |
| 2007/0250777 A1 | 10/2007 | Chen et al. | |
| 2008/0044155 A1* | 2/2008 | Kuspa | 386/52 |
| 2008/0072166 A1 | 3/2008 | Reddy | |
| 2009/0006475 A1 | 1/2009 | Udezue et al. | |
| 2009/0087161 A1 | 4/2009 | Roberts et al. | |
| 2009/0231459 A1 | 9/2009 | Wayne et al. | |
| 2010/0077289 A1 | 3/2010 | Das et al. | |
| 2010/0107080 A1 | 4/2010 | Bentley et al. | |
| 2010/0107126 A1 | 4/2010 | Lin et al. | |
| 2010/0158471 A1 | 6/2010 | Ogikubo | |
| 2010/0183280 A1 | 7/2010 | Beauregard et al. | |
| 2010/0278504 A1 | 11/2010 | Lyons et al. | |
| 2010/0281375 A1* | 11/2010 | Pendergast et al. | 715/723 |
| 2010/0281377 A1 | 11/2010 | Meaney et al. | |
| 2010/0281382 A1 | 11/2010 | Meaney et al. | |
| 2010/0281386 A1 | 11/2010 | Lyons et al. | |
| 2010/0305729 A1 | 12/2010 | Glitsch et al. | |
| 2011/0013084 A1 | 1/2011 | Black | |
| 2011/0032353 A1 | 2/2011 | Vallone et al. | |
| 2011/0072037 A1 | 3/2011 | Lotzer | |
| 2011/0083087 A1* | 4/2011 | Sanders et al. | 715/756 |
| 2012/0198317 A1 | 8/2012 | Eppolito et al. | |
| 2012/0209889 A1 | 8/2012 | Agnoli et al. | |
| 2013/0121668 A1 | 5/2013 | Meaney et al. | |
| 2013/0124992 A1 | 5/2013 | Lyons et al. | |
| 2013/0124999 A1 | 5/2013 | Agnoli et al. | |
| 2013/0125000 A1 | 5/2013 | Fleischhauer et al. | |
| 2014/0033041 A1 | 1/2014 | Lyons et al. | |
| 2014/0101552 A1 | 4/2014 | Meaney et al. | |

FOREIGN PATENT DOCUMENTS

| | | |
|---|---|---|
| FR | 2887106 | 12/2006 |
| WO | WO 2008/151416 | 12/2008 |
| WO | WO 2010/106586 | 9/2010 |
| WO | PCT/US2012/058138 | 9/2012 |
| WO | WO 2013/074207 | 5/2013 |

OTHER PUBLICATIONS

International Search Report and Written Opinion for PCT/US2012/058138, Jan. 8, 2013 (mailing date), Apple Inc.

Author Unknown, "Adobe Director 11: User Guide," Month Unknown, 2008, 498 pages, Adobe Systems Incorporated, San Jose, California, USA.

Author Unknown, "Apple Announces Final Cut Pro 4," NAB, Apr. 6, 2003, 3 pages, Apple Inc., Las Vegas, NV, USA.

Author Unknown, "Using Adobe Flash CS4 Professional," Updated Mar. 5, 2009, 474 pages, Adobe Systems Incorporated, San Jose, California, USA.

Author Unknown, "Editing Stereoscopic 3D Video in Vegas Pro 9", Apr. 2, 2010, pp. 1-6, Sony Creative Software Inc., Madison, Wisconsin, USA.

Author Unknown, "iMovie '08 Getting Started," Month Unknown, 2008, pp. 1-50, Apple Inc., USA.

Author Unknown, "Using Adobe Premiere Elements 8 Editor," last updated Aug. 12, 2010, 313 pages, Adobe Systems Incorporated, San Jose, California, USA.

Author Unknown, "Adobe Premiere Pro CS3: User Guide," Apr. 1, 2008, 455 pages, Adobe Systems Incorporated, San Jose, California, USA.

Brenneis, Lisa, "Final Cut Pro 3 for Macintosh: Visual QuickPro Guide," Apr. 2002, 288 pages, Peachpit Press, Berkeley, California, USA.

Casares, Juan, et al., "Simplifying Video Editing Using Metadata," Proceedings of Designing Interactive Systems (DIS 2002), Jun. 2002, 10 pages, London, Great Britain.

Kennedy, Lyndon, et al., "Less Talk, More Rock: Automated Organization of Community-Contributed Collections of Concert Videos," Proceedings of the 18th International Conference on World Wide Web, Apr. 20-24, 2009, 10 pages, Madrid, Spain.

Long, A. Chris, et al., "Video Editing Using Lenses and Semantic Zooming," Month Unknown, 2002, pp. 1-9, Human Computer Interaction Institute, Carnegie Mellon University, Pittsburgh, Pennsylvania, USA.

Myers, Brad A., et al., "A Multi-View Intelligent Editor for Digital Video Libraries," The First ACM+IEEE Joint Conference on Digital Libraries (JCDL'01), Jun. 24-28, 2001, 10 pages, Roanoke, Virginia, USA.

Shrestha, Prarthana, et al., "Synchronization of Multi-Camera Video Recordings Based on Audio," Proceedings of the 15th International Conference on Multimedia, Sep. 23-28, 2007, pp. 545-548, Augsburg, Bavaria, Germany.

(56) References Cited

OTHER PUBLICATIONS

Wang, Yijin, et al., "*My Videos*—A System for Home Video Management," Proceedings of the 10th ACM International Conference on Multimedia, Dec. 1-6, 2002, pp. 412-413, Juan-les-Pins, France.

Portions of prosecution history of U.S. Appl. No. 13/361,934, filed Dec. 19, 2013, Fleischhauer, Michael, et al.

Updated portions of prosecution history of U.S. Appl. No. 13/361,934, Mar. 19, 2014, Fleischhauer, Michael, et al.

Portions of prosecution history of U.S. Appl. No. 13/361,932, May 22, 2014, Agnoli, Giovanni, et al.

Portions of prosecution history of U.S. Appl. No. 13/361,930, Mar. 14, 2014, Meaney, Brian, et al.

International Preliminary Report on Patentability for PCT/US2012/058138, May 30, 2014 (mailing date), Apple Inc.

Updated portions of prosecution history of U.S. Appl. No. 13/361,934, Aug. 22, 2014, Fleischhauer, Michael, et al.

Updated portions of prosecution history of U.S. Appl. No. 13/361,932, Aug. 4, 2014, Agnoli, Giovanni, et al.

Updated portions of prosecution history of U.S. Appl. No. 13/361,930, Jun. 16, 2014, Meaney, Brian, et al.

Portions of prosecution history of European Patent Application EP15199415, Mar. 2, 2016, Apple Inc., Portions of prosecution history of commonly owned European Patent Application EP15199415, a counterpart foreign application (7 pages).

\* cited by examiner

PREVIEW DISPLAY FOR MULTI-CAMERA MEDIA CLIPS

CLAIM OF BENEFIT TO PRIOR APPLICATIONS

This application claims the benefit of U.S. Provisional Application 61/559,710, entitled "Multi-Camera Media Clips", filed Nov. 14, 2011. U.S. Application 61/559,710 is incorporated herein by reference.

BACKGROUND

Digital graphic design, image editing, audio editing, and video editing applications (i.e., media-editing applications) provide graphical designers, media artists, movie and television directors, and other users with the necessary tools to create a variety of media content. Examples of such applications include Final Cut Pro® and iMovie®, both sold by Apple, Inc. These applications give users the ability to edit, combine, transition, overlay, and piece together different media content in a variety of manners to create a resulting media project. The resulting media project specifies a particular sequenced composition of any number of text, audio, image, and/or video content elements that is used to create a media presentation.

Various media editing applications facilitate such composition through electronic means. Specifically, a computer or other electronic device with a processor and computer readable storage medium executes the media editing application. In so doing, the computer generates a graphical interface whereby designers digitally manipulate graphical representations of the media content to produce a desired result.

In some cases, a director, editor, etc. may film a single scene from multiple different angles using multiple different cameras. Manually editing numerous media clips into a timeline, trying to figure out how the clips should be aligned and trimmed, and where to switch between the different cameras can be a difficult and time-intensive process. Furthermore, if the editor has gone through this process in multiple locations in a timeline or in multiple different media projects, the editor will be hesitant to make any changes, as this will require making the same correction in multiple places.

BRIEF SUMMARY

Some embodiments of the invention provide a media-editing application that allows a user to create a multi-camera media clip that includes several media clips captured by multiple different media capture devices (e.g., several cameras recording a scene simultaneously from different angles). When a user specifies for the media-editing application to create a multi-camera media clip using a particular set of media clips, the application uses metadata of the media clips to automatically assign the media clips in the set to different groups (e.g., one group for each different camera), order and space out the clips in each group (e.g., in time order with gaps between the clips), and synchronize the clips across the groups (e.g., align the capture times of the clips in a first group with the capture times of the clips in a second group). When a user adds such a multi-camera clip to a composite presentation, the media-editing application creates a new clip instance in the presentation that refers to the already-created multi-camera clip such that modifications to the multi-camera clip will affect the clip instance in the composite presentation. The media-editing application provides various user interface tools for editing the multi-camera clip as well as the instance of the clip in the composite presentation.

In some embodiments, a user specifies several different media clips (e.g., video clips, audio clips, still images, etc.) from which to generate a multi-camera clip. The media-editing application automatically sorts the specified media clips into groups (sometimes referred to herein as "angles" or "camera angles"). Some embodiments use metadata of the media clips, such as user-entered angle or camera names or automatically-generated camera information, to sort the media clips into the groups (e.g., creating a group for each camera used to capture the different media clips). With the clips sorted, the application automatically generates an ordered sequence of the clips for each of the different groups. In some embodiments, the application utilizes clip metadata to perform this ordering (e.g., timing data generated by the capture device used to capture the media clips), so long as the metadata fits particular criteria indicating that it matches a correct ordering. In addition to ordering the clips, the media-editing application spaces the clips within the sequence, inserting gaps for time when the capture device was not capturing media (e.g., the time when a camera was shut off in between shots).

After generating the sequences for each of the groups, the media-editing application synchronizes the sequences across the different groups. That is, the application aligns the sequences such that content captured by a first capture device at a particular time is aligned with content captured by a second capture device at the same time. Some embodiments use the same timing metadata used for sequencing one or more of the groups to synchronize the different groups. When information indicating a time at which a clip was captured by a first device has the same format as corresponding information from a second device (e.g., timecode data or time of day information), the application uses this information to align the clips so long as the timing information meets certain criteria indicating that the information should be compared between devices. In some embodiments, after performing this preliminary synchronization of the groups using clip metadata, the media-editing application fine tunes the synchronization using audio data captured by multiple devices. That is, the application identifies similar audio captured by multiple devices (e.g., microphones of different cameras) and aligns this audio. Because the audio and video from a particular camera are tied to each other, this has the effect of also aligning the video from the different devices.

When creating a multi-camera media clip from several different media clips, the media-editing application of some embodiments generates a reference data structure for the multi-camera media clip. This reference data structure, in some embodiments, stores information about each of the groups to which clips are assigned. The application stores the reference data structure as a series of nested clip structures, with each group stored in a separate clip structure within the reference clip structure. The clip structure for a particular group then stores an ordered set of clip structures for the clips assigned to the group, using gap structures to indicate the spacing between the clips in some embodiments. In addition, the reference clip structure stores information to indicate the synchronization between the different groups.

The media-editing application provides a graphical user interface (GUI) with an editing display area for editing the reference multi-camera media clip. In some embodiments, this editing display area is a composite display area also used for creating and editing a composite media presentation (also called a "media project" or "composite media project") as a sequence of media clips (e.g., as a sequence of clips arranged along a timeline). Within this editing display area, a user can name the groups of clips in the multi-camera media clip, add or delete groups, add or remove clips from the groups, move the individual media clips within a sequence (e.g., to perform additional alignment of the groups), change the order of the groups within the multi-camera clip, apply effects (e.g., transforms, pixel modifications, etc.) to individual clips or groups of clips in the multi-camera clip, etc. In some embodiments, the composite display area is a trackless display area for editing composite presentations, while providing the appearance of tracks for the different groups of a multi-camera clip.

As mentioned, the composite display area of some embodiments is used to create media projects as sequences of media clips arranged by a user. The user of the media-editing application can add a multi-camera media clip to a media project. The media-editing application then adds to its definition of the media project a clip instance of the multi-camera clip that refers to the reference clip. The clip instance indicates one of the ordered groups of the multi-camera clip as an active group (in some embodiments, the instance indicates both an active audio group and an active video group). When rendering the composite presentation for a location (e.g., time) in the composite display area occupied by the multi-camera clip instance, the media-editing application retrieves source content that corresponds to the clips of the active group.

In some embodiments, the clip instance inherits properties of the reference multi-camera clip, as well as properties of the active group for the clip instance. The clip instance also can have properties of its own applied. For example, the multi-camera clip reference of some embodiments will have its own format and frame rate, which are inherited by the clip instance. The active group will have its sequence in the clip reference, and a user may have applied effects to the clips in the active group. A user can then apply additional effects to the active group in the clip instance, which will not affect other instances (even those with the same active group). Furthermore, the user may place retiming effects, markers, or keywords on the clip instance that stay with the clip instance regardless of which group is active for the instance. While these reference clips are described for multi-camera media clips, some embodiments also include reference clips for individual media clips or compound media clips. When the media-editing application renders a clip instance, the application first applies properties (e.g., effects) of the reference clip and then applies properties of the clip instance.

When added to a composite presentation, a multi-camera media clip instance can be edited much like other media clips in the presentation. However, in some embodiments the media-editing application provides additional or different editing functionalities for such multi-camera media clips. For example, the media-editing application of some embodiments provides multiple different ways for a user to modify which group is active for a clip instance in a composite presentation. The user may select the clip instance to produce a drop-down menu of the different groups or a display area that allows the user to cycle through video or images from the different groups.

In addition, some embodiments provide a multi-camera clip viewer (or "angle viewer") in the GUI. The multi-camera clip viewer allows a user to simultaneously view content (e.g., video images) from multiple different groups of a single multi-camera media clip. The user can use the viewer to switch the active group of a clip instance or to break a clip instance into two separate instances with different active groups. Some embodiments provide GUI items that allow the user to determine whether selecting a particular group in the viewer will switch (or split and switch) audio, video, or both audio and video for a clip instance to the particular selected group. In some embodiments, the GUI items have different colors (or other indicators, such as patterns, symbols, etc.) for different types of content (e.g., for audio, video, or both) and these colors are reflected in highlights surrounding the active group's content (e.g., video images being played back) in the viewer, as well as in banks of groups shown in the viewer. When there are more groups in a multi-camera clip than there are available displays in the viewer, some embodiments display selectable banks of groups that a user can select in order to rotate through different sets of the groups.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details, examples and embodiments are set forth for purpose of explanation. However, one of ordinary skill in the art will realize that the invention is not limited to the embodiments set forth and that the invention may be practiced without some of the specific details and examples discussed. In other instances, well-known structures and devices are shown in block diagram form in order not to obscure the description of the invention with unnecessary detail.

Some embodiments of the invention provide a media-editing application that allows a user to create a multi-camera media clip that includes several media clips captured by multiple different media capture devices (e.g., several cameras recording a scene simultaneously from different angles). When a user specifies for the media-editing application to create a multi-camera media clip using a particular set of media clips, the application uses metadata of the media clips to automatically assign the media clips in the set to different groups (e.g., one group for each different camera), order and space out the clips in each group (e.g., in time order with gaps between the clips), and synchronize the clips across the groups (e.g., align the capture times of the clips in a first group with the capture times of the clips in a second group). When a user adds such a multi-camera clip to a composite presentation, the media-editing application creates a new clip instance in the presentation that refers to the already-created multi-camera clip such that modifications to the multi-camera clip will affect the clip instance in the composite presentation. The media-editing application provides various user interface tools for editing the multi-camera clip as well as the instance of the clip in the composite presentation.

A media clip, in some embodiments, is a data structure representing a piece of source media (e.g., the video contained in a video file, the audio contained in an audio file or video file, a still image, etc.). The media-editing application provides graphical representations of these clips to the user, who uses the clips to create a composite media presentation (also referred to as a media project) by editing the clips together in a composite display area. A multi-camera media clip of some embodiments is a specific type of media clip that amalgamates media clips from multiple different capture devices and aligns these media clips within the clip structure.

Figure 1:
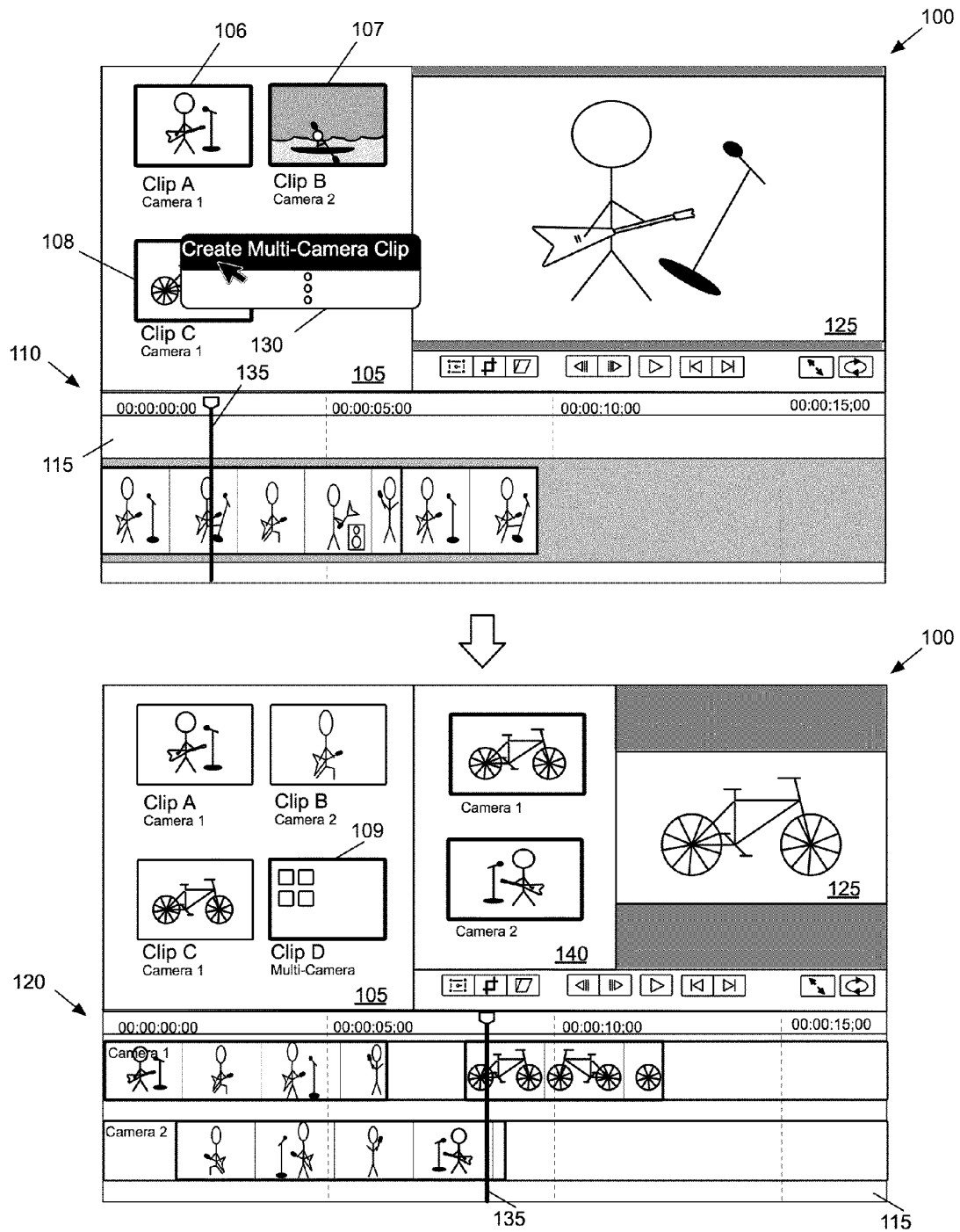
FIG. 1 illustrates a graphical user interface ("GUI") of a media-editing application with the ability to create and use multi-camera media clips.

For some embodiments of the invention, FIG. 1 illustrates a graphical user interface ("GUI") 100 of a media-editing application with the ability to create and use multi-camera media clips. Specifically, this figure illustrates the GUI 100 at two stages 110 and 120. The GUI 100 includes a media library 105, a project display area 115, and a preview display area 125. The media library 105 displays representations of a set of media clips available to the user for creating a media project. The media clips may be displayed different in different embodiments. For instance, the media clips 106-108 in the media library 105 display one thumbnail image from the video that they represent, and display both the clip name and camera metadata below the thumbnail. Other embodiments may display the clip names. The media clips 106 and 108 ("Clip A" and "Clip C" respectively) are both from "Camera 1" while media clip 107 ("Clip B") is from "Camera 2". This camera name metadata may be automatically generated from the source video (e.g., at time of import into the media-editing application) or may be user-entered.

The project display area 115 (also referred to as a composite display area) provides a visual representation of a media project being created by the user of the media-editing application. Specifically, it displays one or more media clip representations along a timeline that represent the media clips added to the media project. In some embodiments, as shown here, the representations for the video clips in the timeline display one or more images from each video clip. The user can select clips in the media library 105 and add the clips to the project being created in the project display area 115.

The preview display area 125 displays preview images from media clips in the media library 105 or the project in the project display area 115. Both video clips and the media project represent sequences of images, and the media-editing application plays these images in the preview display area according to user input. In some embodiments, the user views the media project by moving a playhead 135 over the project in the timeline. In stage 110 of FIG. 1, the playhead 135 is at approximately the 2.5 second mark of the project, and the application displays an image corresponding to this time in the project in the preview display area 125.

As shown in stage 110, the user has selected all three of the clips 106-108 in the media library 105 and has activated a menu 130 that includes a "Create Multi-Camera Clip" option. While this operation is shown as a selection operation being performed by a cursor, one of ordinary skill in the art will recognize that similar operations may be performed by using touchscreen operations, and furthermore that additional operations (e.g., dragging and dropping items, using a hotkey, etc.) may be performed in the GUI of some embodiments in order to achieve this same result. In fact, this application shows many such operations as being performed in a particular manner (e.g., with a cursor), and one of ordinary skill will recognize that these operations may be performed in a variety of different ways through a variety of different input devices in various different embodiments.

In some embodiments, this initiates a multi-camera clip creation process using the selected clips. The media-editing application automatically sorts the specified media clips into groups (sometimes referred to herein as "angles" or "camera angles"). Some embodiments use metadata of the clips, such as user-entered angle or camera names, or automatically-generated camera information, to sort the media clips into the different groups (e.g., creating a group for each camera used to capture the different media clips). In this case, the three selected clips 96-108 include metadata indicating that they are from either "Camera 1" or "Camera 2". The media-editing application utilizes this metadata to sort the clips into two groups (one for each of the cameras).

With the clips sorted into groups, the application automatically generates an ordered sequence of the clips for each of the different groups. Some embodiments utilize clip metadata to perform this ordering (e.g., timing data generated by the capture device used to capture the media clips), so long as the metadata fits particular criteria indicating that it matches a correct ordering. In addition to ordering the clips, the media-editing application spaces the clips within the sequence, inserting gaps for times when the capture device was not capturing media (e.g., the time when a camera was shut off in between shots). In the example shown in FIG. 1, the application examines metadata of media clips 106 and 108 to determine the order in which the clips were captured and the time between the end of the first clip and the start of the second.

After generating the sequences for each of the groups, the media-editing application synchronizes the sequences across the different groups. That is, the application aligns the sequences such that content captured by a first capture device at a particular time is aligned with content captured by a second capture device at the same time. Some embodiments use the same timing metadata used for sequencing one or more of the groups to synchronize the different groups. When information indicating a time at which a clip was captured by a first device has the same format as corresponding information from a second device (e.g., timecode data or time of day information), and the timing information meets certain criteria that indicate that the information should be compared between devices, then the application uses this information to align the clips. In some embodiments, after performing this preliminary synchronization of the groups using clip metadata, the media-editing application verifies that the groups are synchronized properly and fine tunes the synchronization using audio data captured by multiple devices. That is, the application identifies similar audio captured by multiple devices (e.g., microphones of different cameras) and aligns this audio. Because the audio and video from a particular camera are tied to each other, this has the effect of also aligning the video from the different devices. The media-editing application whose GUI is shown in FIG. 1 automatically synchronizes the timing of clip 107 (the clip from "Camera 2") with that of clips 106 and 108 (the clips from "Camera 1").

Stage 120 of FIG. 1 illustrates the GUI 100 after the media-editing application has created a multi-camera media clip represented by clip representation 109. In addition to displaying the selected clip representation 109 in the media library 105, the GUI 100 includes additional features of some embodiments for interacting with the multi-camera media clip. Specifically, the GUI 100 displays the multi-camera media clip for editing in the composite display area 115, and displays a multi-camera clip viewer (or "angle viewer") 140.

The multi-camera media clip editing display in the composite display area 115 displays the two groups of media clips in multi-camera clip 109. These two groups are labeled as "Camera 1" and "Camera 2" and show the clips of each group laid out along a single timeline. While in some embodiments the composite display area is a trackless display area for editing composite presentations, the application provides the appearance of separate tracks for each of the groups in the multi-camera media clip. The first group includes "Clip A" and "Clip C"—as shown, "Clip A" is approximately six seconds long (running from a time of zero seconds to a time of six seconds), while "Clip C" is a bit shorter (running from approximately 8.5 seconds to 12.5 seconds). "Clip B", assigned to the "Camera 2" group, is slightly longer than either of the other two clips, and runs from approximately 1.5 seconds to nine seconds in the timeline. The clips of the second group do not start at time zero because the media-editing application has automatically aligned the clips of the two groups with each other using timing metadata stored with the source video as well as the audio of the clips, as described above.

Within this editing display area, a user can name the groups of clips in the multi-camera media clip, add or delete groups, add or remove clips from the groups, move the individual media clips within a sequence (e.g., to perform additional alignment of the groups), change the order of the groups within the multi-camera clip, apply effects (e.g., transforms, pixel modifications, etc.) to individual clips or groups of clips in the multi-camera clip, etc.

The multi-camera clip viewer 140 allows a user to simultaneously view content (e.g., video images) from multiple different groups of a single multi-camera media clip. When the tracks for the different groups are shown in the composite display area, the viewer shows preview images for each of the groups corresponding to a location of the playhead 135 in some embodiments. The preview display area 125 displays preview images for one of the groups. In some embodiments, a particular group is selected (e.g., by a user) for playback in the preview display area. However, when a user moves a cursor (or similar location indicator) over a particular clip in the composite display area, the application displays images from the particular clip in the preview display area rather than from the selected group at the same time. In this case, "Camera 1" is the selected group, and thus the media-editing application displays the video image from this group corresponding to the time of the playhead 135 in the preview display area 125. In addition, the viewer provides functionalities when editing a multi-camera clip in a composite presentation, which will be described below by reference to FIG. 2.

When creating a multi-camera media clip from several different media clips (e.g., the multi-camera media clip 109), the media-editing application of some embodiments generates a reference data structure for the multi-camera media clip. This reference data structure, in some embodiments, stores information about each of the groups to which clips are assigned. The application stores the reference data structure as a series of nested clip structures, with each group stored in a separate clip structure within the reference clip structure. The clip structure for a particular group then stores an ordered set of clip structures for the clips assigned to the group, using gap structures to indicate the spacing between the clips in some embodiments. In addition, the reference clip structure stores information to indicate the synchronization between the different groups.

With a multi-camera media clip created, a user can add a multi-camera media clip to a media project. The media-editing application then adds to the media project a clip instance of the multi-camera clip that refers to the reference clip. The clip instance indicates one of the ordered groups of the multi-camera clip as an active group (in some embodiments, the instance indicates both an active audio group and an active video group). When rendering the composite presentation for a location (e.g., time) in the composite display area occupied by the multi-camera clip instance, the media-editing application retrieves source content that corresponds to the clips of the active group.

In some embodiments, the clip instance inherits properties of the reference multi-camera clip, as well as properties of the active group for the clip instance. The clip instance also can have properties of its own applied. For example, the multi-camera clip reference of some embodiments will have its own format and frame rate, which are inherited by the clip instance. The active group will have its sequence in the clip reference, and the clips in the active group may have effects applied. A user can then apply additional effects to the active group in the clip instance, which will not affect other instances (even those with the same active group). Furthermore, the user may place retiming effects, markers, or keywords on the clip instance that stay with the clip instance regardless of which group is active for the instance. While these reference clips are described for multi-camera media clips, some embodiments also include reference clips for individual media clips or compound media clips. When the media-editing application renders a clip instance, the application first applies properties (e.g., effects) of the reference clip and then applies properties of the clip instance.

Figure 2:
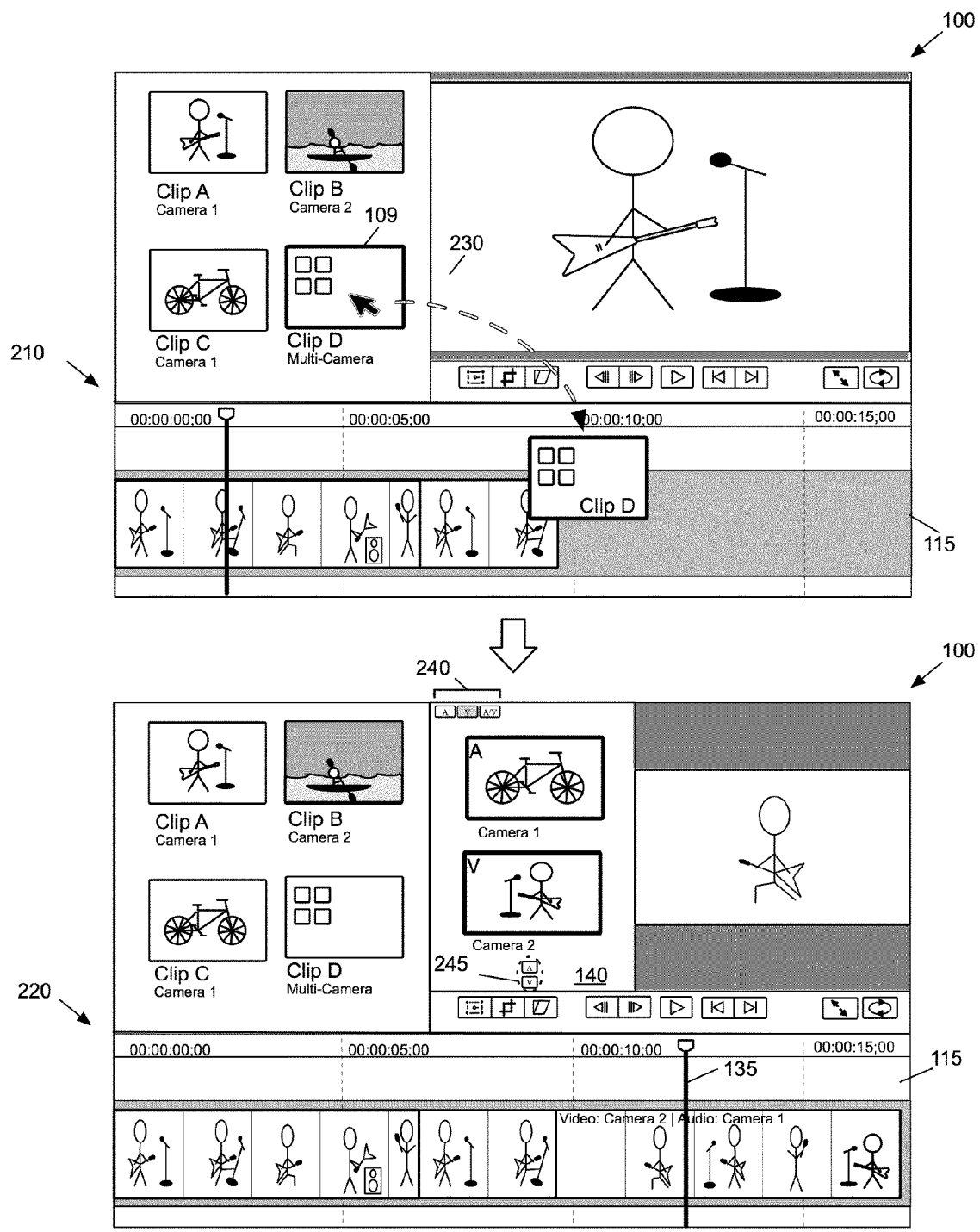
FIG. 2 illustrates a user adding an instance of the multi-camera clip to the composite presentation being created in the composite display area of FIG. 1.

FIG. 2 illustrates a user adding an instance of the multi-camera clip 109 to the composite presentation being created in the composite display area 115 over two stages 210 and 220. In the first stage, the user has selected the clip 109 and dragged this clip into the composite display area 115. By performing this drag-and-drop operation, the user edits an instance of the multi-camera clip 109 into the presentation. In some embodiments, the user adds a clip to a timeline through user interface buttons, hotkeys, selecting a menu option, etc., rather than through a drag-and-drop operation.

The second stage 220 illustrates that the composite presentation now includes an instance of the multi-camera clip. In addition, the clip representation shown in the composite display area 115 includes information indicating the active video and audio groups for the clip instance. In this case, the active video group is Camera 2 and the active audio group is Camera 1. As is the case in this example, in some embodiments the clip instances can have different active groups for video and audio. In this case, the application renders the presentation using clips from one group for the audio and clips from a different group for the video.

When added to a composite presentation, a multi-camera media clip instance can be edited much like other media clips in the presentation. However, in some embodiments the media-editing application provides additional or different editing functionalities for such multi-camera media clips. For example, the media-editing application of some embodiments provides multiple different ways for a user to switch which group is active for a clip instance in a composite presentation. The user may select the clip instance to produce a drop-down menu of the different groups or a display area that allows the user to cycle through video or images from the different groups.

The GUI 100 also includes the multi-camera clip viewer 140, which displays images for multiple different groups in a multi-camera clip corresponding to a particular time in the clip. When the playhead 135 is located over a particular time in a multi-camera clip instance in the composite display area 115, the video images shown in the viewer 140 correspond to the images at that particular time of the multi-camera clip. As indicated above, the multi-camera viewer 140 may be used for editing multi-camera clip instances in the composite display area.

For instance, the user can use the viewer to switch the active group of a clip instance or to break a clip instance into two separate instances with different active groups. The GUI items 240 allow the user to determine whether selecting a particular group in the viewer will switch (or split and switch) the active audio and/or video group for a clip instance to the particular selected group. In some embodiments, the GUI items have different colors (or other indicators, such as patterns, symbols, etc.) for different types of content (e.g., for audio, video, or both) and these colors are reflected in highlights surrounding the active group's content (e.g., video images being played back) in the viewer, as well as in banks of groups shown in the viewer. In this case, the buttons indicate A, V, and A/V, and these symbols ("A" and "V") are illustrated in the group previews shown in the viewer as well as in the bank 245. When there are more groups in a multi-camera clip than there are available displays in the viewer, some embodiments display selectable banks of groups. A user can select one of the banks in order to rotate through different sets of the groups. In this case, as there are only two groups, there is no need for a user to switch between different sets.

FIGS. 1 and 2 illustrate examples of the creation and use of multi-camera clips in the media-editing application of some embodiments. Several more detailed embodiments are described below. Section I describes the graphical user interface of a media-editing application of some embodiments. Section II describes the data structures used by the media-editing application of some embodiments. Next, Section III describes the creation of multi-camera media clips. Section IV then describes editing multi-camera reference clips, while Section V describes editing multi-camera clip instances in a media project. Section VI describes how the media-editing application of some embodiments renders multi-camera media clips. Section VII then describes the software architecture of the media-editing application of some embodiments. Finally, Section VIII describes an electronic system with which some embodiments of the invention are implemented.

I. Media-Editing Application Graphical User Interface

Figure 3:
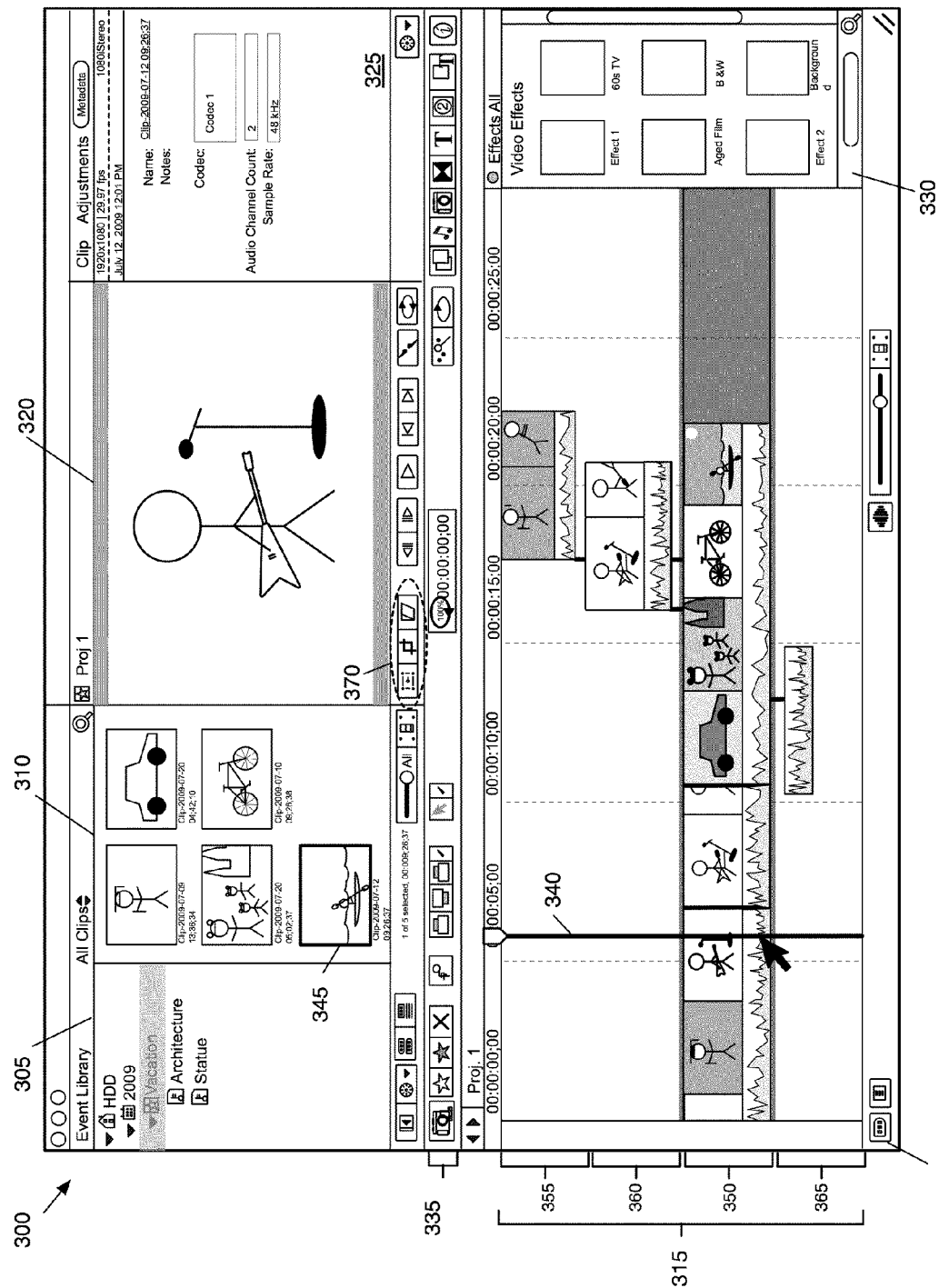
FIG. 3 illustrates a GUI of a media-editing application of some embodiments.

The above figures illustrated a simplified graphical user interface ("GUI") for a media-editing application. FIG. 3 illustrates a GUI 300 of a media-editing application of some embodiments with additional features as compared to those described above. One of ordinary skill will recognize that the graphical user interface 300 is only one of many possible GUIs for such a media-editing application. In fact, the GUI 300 includes several display areas which may be adjusted in size, opened or closed, replaced with other display areas (e.g., an angle viewer as shown in FIGS. 1 and 2), etc. The GUI 300 includes a clip library 305, a clip browser 310, a timeline 315, a preview display area 320, an inspector display area 325, an additional media display area 330, and a toolbar 335.

The clip library 305 includes a set of folders through which a user accesses media clips that have been imported into the media-editing application. In some embodiments, the user can import media files into the application, at which time media clips are created for the imported files. These files may be imported from a camera, an external drive (e.g., an external hard drive, a flash memory drive, a network drive, etc.), or a drive internal to the device on which the media-editing application operates. The creation of clip data structures upon import will be described in further detail below in Section II.

Some embodiments organize the media clips in the clip library 305 according to the device (e.g., physical storage device such as an internal or external hard drive, virtual storage device such as a hard drive partition, etc.) on which the imported media files represented by the clips are stored. Some embodiments also enable the user to organize the media clips based on the date the media represented by the clips was created (e.g., recorded by a camera). As shown, the clip library 305 includes media clips from 2009 that are stored on the hard disk (in this case, the boot disk of the device on which the media-editing application runs).

Within a storage device and/or date, users may group the media clips into "events", or organized folders of media clips. For instance, a user might give the events descriptive names that indicate what media is stored in the event (e.g., the "Vacation" event shown in clip library 305 might include video footage from a vacation). In some embodiments, the media files corresponding to these clips are stored in a file storage structure that mirrors the folders shown in the clip library.

Within the clip library, some embodiments enable a user to perform various clip management actions. These clip management actions may include moving clips between events, creating new events, merging two events together, duplicating events (which, in some embodiments, creates a duplicate copy of the media to which the clips in the event correspond), deleting events, etc. In addition, some embodiments allow a user to create sub-folders of an event. These sub-folders may include media clips filtered based on tags (e.g., keyword tags). For instance, in the vacation event, all media clips showing statues are tagged by the user with a "statue" keyword, and underneath the "Vacation" folder is a keyword item for this tag.

The clip browser 310 allows the user to view clips from a selected folder (e.g., an event) of the clip library 305. As shown in this example, the event folder "Vacation" is selected in the clip library 305, and the clips belonging to that event are displayed in the clip browser 310. In some embodiments, the user can create multi-camera clips in the clip browser 310 by selecting several clips in the browser and then selecting a multi-camera clip creation option. This creation process will be described in detail below in Section III.

Some embodiments display the clips as thumbnail filmstrips, as shown in this example. By moving a cursor (or a finger on a touchscreen) over one of the thumbnails (e.g., with a mouse, a touchpad, a touchscreen, etc.), the user can skim through the clip. That is, when the user places the cursor at a particular horizontal location within the thumbnail filmstrip, the media-editing application associates that horizontal location with a time in the associated media file, and displays the image from the media file for that time. Furthermore, the user can command the application to play back the media file in the thumbnail filmstrip in some embodiments.

In addition, the thumbnails for the clips in the browser display an audio waveform underneath the clip that represents the audio of the media file. In some embodiments, as a user skims through or plays back the thumbnail filmstrip, the audio plays as well.

Many of the features of the clip browser are user-modifiable. For instance, in some embodiments, the user can modify one or more of the displayed thumbnail size, the percentage of the thumbnail occupied by the audio waveform, whether audio plays back when the user skims through the media files, etc. In addition, some embodiments enable the user to view the clips in the clip browser in a list view instead of the filmstrip view. In this view, the clips are presented as a list (e.g., with clip name, duration, etc.). Some embodiments also display a selected clip from the list in a filmstrip view in the browser (e.g., above the list) so that the user can skim through or playback the selected clip.

The timeline 315 (also called a composite display area or project display area) provides a visual representation of a media project being created by the user of the media-editing application. Specifically, it displays one or more geometric shapes that represent one or more media clips that are part of the composite presentation. The timeline 315 of some embodiments includes a primary lane 350 (also called a "spine", "primary compositing lane", or "central compositing lane") as well as one or more secondary lanes 355-365 (also called "anchor lanes"). The spine 350 represents a primary sequence of media which, in some embodiments, does not have any gaps. The clips in the anchor lanes are anchored to a particular position along the spine (or along a different anchor lane). Anchor lanes may be used for compositing (e.g., combining pixels of one image with pixels of a different image, as done in green-screening), B-roll cuts (i.e., cutting away from the primary video to a different video whose clip is in the anchor lane), audio clips, or other composite presentation techniques.

The user can add media clips from the clip browser 310 into the timeline 315 in order to add the clip to a project represented in the timeline. Within the timeline, the user can perform further edits to the media clips (e.g., move the clips around, split the clips, trim the clips, apply effects to the clips, etc.). As described above, when a multi-camera clip is added to the timeline, this clip in the timeline refers to the reference clip in the clip browser. Some embodiments implement such reference clips for other clips in addition to the multi-camera clips (e.g., for compound clips, individual clips, etc.).

The length (i.e., horizontal expanse) of a clip in the timeline is a function of the length of media represented by the clip. As the timeline is broken into increments of time, a media clip occupies a particular length of time in the timeline. As shown, in some embodiments the clips within the timeline are shown as a series of images. The number of images displayed for a clip varies depending on the length of the clip in the timeline, as well as the size of the clips (as the aspect ratio of each image will stay constant).

As with the clips in the clip browser, the user can skim through the timeline or play back the timeline (either a portion of the timeline or the entire timeline). In some embodiments, the playback (or skimming) is not shown in the timeline clips, but rather in the preview display area 320.

The preview display area 320 (also referred to as a "viewer") displays images from media files that the user is skimming through, playing back, or editing. These images may be from a project in the timeline 315 or from a media clip in the clip browser 310. In this example, the user has been skimming through the project in the timeline 315, and therefore the application displays an image corresponding to the time of the playhead 340 in the preview display area 320. As shown, some embodiments display the images as large as possible within the display area while maintaining the aspect ratio of the image.

The preview display area 320 also includes video editing and playback tools in some embodiments. Selectable items are included for rewinding, fast forwarding, playing/pausing, etc. In addition, some embodiments include a set of tools 370 for editing the size and shape of images (e.g., video images) that have been added to a media project. In this example, these tools 370 include a transform tool, a crop tool, and a distortion tool. When the transform selectable item is selected, a user can modify the height and width of the source images within the output images. When the crop selectable item is selected, the user can select the portion of the source images that are displayed in the output images. When the distortion tool is selected, the user can distort the shape of the source images in the output images.

The inspector display area 325 displays detailed properties about a selected item and allows a user to modify some or all of those properties. The selected item might be a clip, a composite presentation, an effect, etc. In this case, the clip 345 in the clip browser 310 is selected, and thus the inspector displays information about this media clip. This information includes the clip name, file format, resolution (1920×1080), frame rate (29.97 fps), date created, audio information, etc. for the selected clip. In some embodiments, different information is displayed depending on the type of item selected (e.g., video clip, audio clip, still image, multi-camera clip, media project, etc.). Some embodiments may include different tabs in the inspector (e.g., video, audio, and info tabs).

The additional media display area 330 displays various types of additional media, such as video effects, transitions, still images, titles, audio effects, standard audio clips, etc. In some embodiments, the set of effects is represented by a set of selectable GUI items, with each selectable GUI item representing a particular effect. In some embodiments, each selectable GUI item also includes a thumbnail image with the particular effect applied. The display area 330 is currently displaying video effects that a user can apply to a clip.

The toolbar 335 includes various selectable items for editing a project, modifying what the application displays in one or more display areas, etc. The right side of the toolbar includes various selectable items for modifying the type of media displayed in the additional media display area 330. The illustrated toolbar 335 includes items for video effects (currently selected), visual transitions between media clips, photos, titles, generators and backgrounds, etc. In addition, the toolbar 335 includes an inspector selectable item that toggles the display of the inspector display area 325 as well as items for applying retiming operations to a clip, adjusting color, and other functions.

The left side of the toolbar 335 includes selectable items for media management and editing. Selectable items are provided for adding clips from the clip browser 310 to the timeline 315. In some embodiments, different selectable items may be used to add a clip to the end of the spine, add a clip at a selected point in the spine (e.g., the location of a playhead), add an anchored clip at the selected point, perform various trim operations on the media clips in the timeline, etc. The media management tools of some embodiments allow a user to mark selected clips as favorites and add keyword tags to clips in the clip browser, among other options.

In some embodiments, the timeline 315 can be toggled with other display areas. In some embodiments, a timeline specific to editing a selected multi-camera reference clip is displayed in this display area. Although the timeline 315 is a trackless display area with a primary lane and several anchor lanes, some embodiments display the multi-camera reference clip as a set of tracks, with one track for each group (or angle) of the reference clip.

In addition, the GUI 300 also includes a project library toggle item 375 which, when selected, replaces the timeline 315 with a project library in the GUI. The project library of some embodiments displays a list of current projects that a user can select and edit. In some embodiments, selecting one of the projects in the project library causes the timeline 315 to replace the project library with a representation of the selected project. In addition, some embodiments allow users to create a new media project through the project library.

Figure 4:
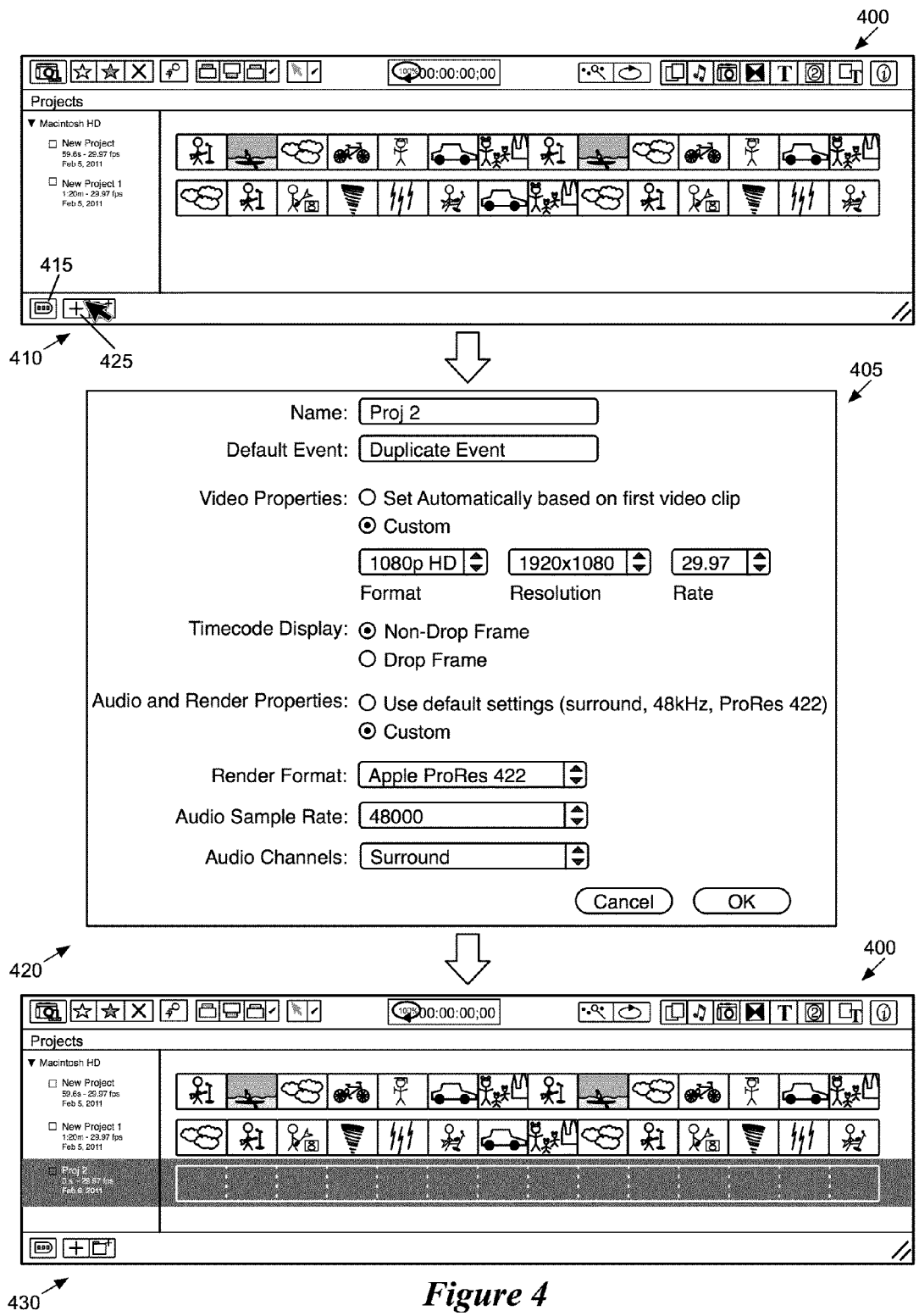
FIG. 4 illustrates the creation of a new project in the GUI of a media-editing application of some embodiments.

FIG. 4 illustrates the creation of a new project in the GUI of a media-editing application of some embodiments using the project library 400 in three stages 410-430. Specifically, the stages illustrate the opening of a project creation dialog box 405 and the user of that dialog box to create the new project.

The first stage 410 illustrates the project library 400, which as mentioned may occupy the same portion of the media-editing application GUI as the timeline 315. The GUI includes a project library/timeline toggle item 415 (similar to the toggle item 375 shown in FIG. 3) that allows a user to toggle between the timeline and the project library in this section of the GUI, as well as a new project GUI item 425 the selection of which begins the process for creating a new project. Some embodiments provide these options as different types of selectable items, as menu selections, as hotkey selections, or a combination thereof.

The project library 400 displays a list of projects on its left side. In this case, there are two projects that have been previously created. With the name of the project, the library 400 also displays information about the project. In this case, the information includes the date the project was created, the length of the project, and the frame rate of the project. Other embodiments may display other information, such as the last time the project was edited, the output format, output resolution, etc. For each project, the library displays a filmstrip as a set of images for the project. In some embodiments, these images represent frames from the composite presentation that are evenly spaced throughout the project. As shown at stage 410, the user has placed a cursor over the new project user interface item 425 and selected this item in order to create a new project.

The second stage 420 illustrates a dialog box 405 that appears when the user selects the new project item 425. This dialog box allows the user to enter information about a new project. The user can enter a name for the project (in this case, "Proj 2"), select a default event for the project, and set video properties, render properties, and audio properties. The default event, in some embodiments, is the event to which the project automatically imports a media file when a user edits the media file into the project from a source other than an event. For instance, a user might drag and drop a video or audio file (e.g., from their desktop or other folder) into the timeline for a project. Doing so, in some embodiments, will cause the application to automatically import the file as an asset of the default event.

As shown, the user can also either select to use the video properties of the first clip added to the project as the video properties for the project, or select custom properties for the project. In the case shown in FIG. 4, the user has chosen to set custom properties. The format field lets the user choose a format (e.g., 1080p, 1080i, 720p, various standard definition formats, etc.) for the project. The options presented in the resolution and rate fields are dependent on the selected format in some embodiments, so as to ensure settings that match up with a regularly-used video format. For the selected 1080p HD, for example, the resolution options are 1920×1080, 1440×1080, and 1280×1080, while the frame rates are 23.98, 24, 25, 29.97, 30, 50, 59.94, and 60 frames per second. Other formats are more restrictive: for instance, if the user selects NTSC SD, then only frame rates of 23.98 and 29.97 frames per second are available as options. The user may instead choose to set the properties for the media project automatically based on the first video clip added to the project.

The audio and render properties include a render format (in this case, the user has chosen Apple ProRes 422, though other options are available). The render format, in some embodiments, is the encoding format used for cache files that are prepared to simplify playback (i.e., prepared ahead of time and used during playback). The audio properties include an audio sample rate, and the choice between surround and stereo for audio channels. The user can also select to use default settings (in this case, the options currently selected). Some embodiments provide an option to use settings from the most recently created or edited project.

The third stage 430 illustrates the result of the user selecting the OK item in the dialog box 405 in order to create the new project "Proj 2" with the properties shown in the dialog box. The project library now shows a third project, the newly created "Proj 2". At this point, the user has not yet added any media clips to the project, so its filmstrip is blank. With the new project created, the user can add media clips to the project, and the media-editing application of some embodiments will apply the spatial and temporal conform effects to these clips as necessary.

II. Media-Editing Application Data Structures

The above section describes various items in the user interface of the media-editing application of some embodiments, including events, media clips, and projects. Events contain media clips, which can be added to projects. In some embodiments, the media-editing application creates and stores various data structures to represent these different items. The following section describes data structures for defining media clips and projects according to some embodiments; one of ordinary skill will recognize that various different data structures for media clips, media projects, etc. may be used in different embodiments of the media-editing application.

Some embodiments create an initial set of data structures for each media file upon import of the file into the media-editing application. When a set of media files are imported together, the media-editing application of some embodiments generates media clips and prompts the user as to whether to add the clips to an existing event or create a new event for the clips. The import process of some embodiments is described in further detail in the U.S. patent application Ser. No. 13/111,912, filed May 19, 2011, now issued as U.S. Pat. No. 8,954,477, and entitled "Data Structures for a Media-Editing Application", which is incorporated herein by reference.

For each imported media file, the application creates a series of data structures. In some embodiments, the application creates an asset data structure for each file in the event to which the files are added. The asset stores a reference to the file and any additional files created upon import (e.g., transcoded versions of the media file, analysis data about the media file, etc.). The application also creates a component clip data structure that stores a reference to the asset and the event containing the asset. When the imported file contains both audio and video data, some embodiments create component clips for the video and the audio, each of which refer to the same asset. When this is the case, the application creates another clip data structure that contains the component clips.

Figure 5:
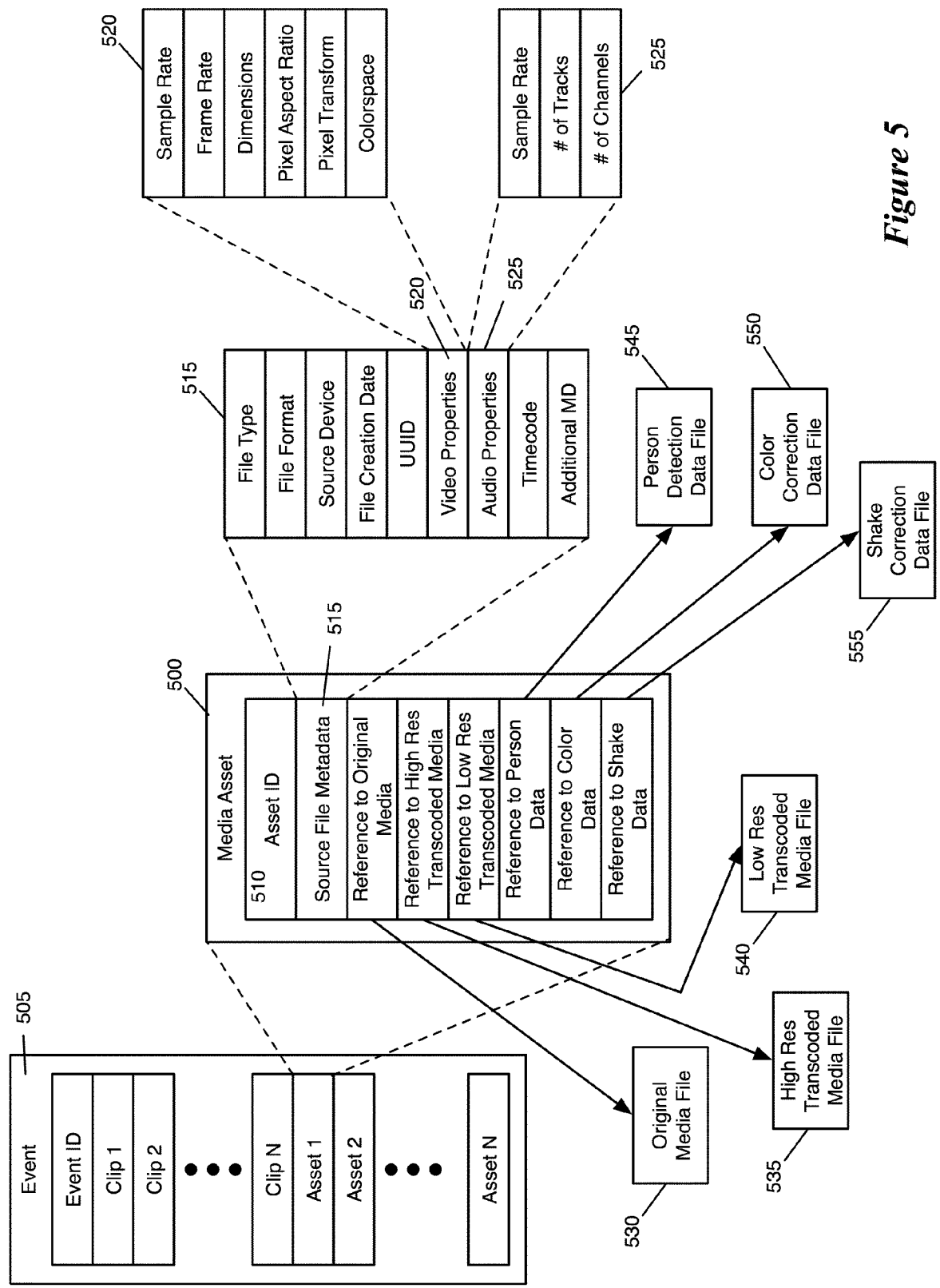
FIG. 5 conceptually illustrates an asset data structure for a media asset, as well as an event data structure for an event that contains the media asset.

FIG. 5 conceptually illustrates an asset data structure for a media asset 500, as well as an event data structure 505 for an event that contains the media asset. In this example, the media file referenced by the asset is a video file with audio channels (e.g., a ".mov" file). The event data structure 505 includes an event ID, a list of assets, and a list of clips. The event data structure may include additional fields in some embodiments, such as the event name, event date (which may be derived from asset information), etc. The event data structure 505 may be a CoreData (SQLite) database file that includes the assets and clips as objects defined with the file, an XML file that includes the assets and clips as objects defined with the file, etc.

The media asset 500 includes an asset ID 510, source file metadata 515, and references to various files. These files include an original imported media file 530, any transcoded versions of the media file (e.g., a high resolution version 535 and a low resolution version 540), and any analysis data about the media file (e.g., a person detection data file 545 that identifies images in the source video with people in them, a color correction file 550 that stores automatic color balancing data, a shake correction file 555 that identifies and corrects camera shake in the video, audio correction files, etc.).

The metadata is information about the source file and its stored media in some embodiments. As shown, the source file metadata 515 includes the file type (e.g., audio, video, movie, still image, etc.), the file format (e.g., ".mov", ".avi", etc.), the source device (i.e., the device that created the media, such as the particular type of camera on which a movie file was captured), the file creation date (e.g., the date a video was captured), a UUID (a unique identifier generated by a media creation device such as a camera), a set of video properties 520, a set of audio properties 525, timecode, and additional metadata. Different types (or manufacturers) of cameras create different UUIDs differently. These may be hashes of various data in some embodiments, such as a camera ID, record time (e.g., the time a user of the camera started recording), the duration of the recording, etc., so long as all UUIDs are unique. In addition, different devices generate timecode differently. Some cameras use a running timecode in which each recorded video starts one frame after the previous video left off, while other cameras use a timecode that parallels actual time (i.e., leaves gaps between timecodes to reflect the time the camera was off). Still other cameras reset the timecode to zero for each recorded video.

The video properties 520 of some embodiments include such properties as a sample rate, a frame rate, the dimensions (or resolution) of the image (i.e., the number of pixels horizontally and number of rows of pixels), the pixel aspect ratio (i.e., the shape of the pixels, which may be square (HD video) or rectangular (e.g., NTSC 4:3 video has a ratio of 10:11)), a pixel transform (described in detail in U.S. patent application Ser. No. 13/111,912, incorporated by reference above), and the colorspace in which pixel values of the image are defined (e.g., ITU-R BT.709 for HD, ITU-R BT.601 for SD, etc.).

The audio properties 525 of some embodiments include a sample rate (i.e., the number of audio samples per second, often 48 kHz), the number of audio tracks stored in the underlying media file, and the number of audio channels stored in the underlying media file. In some embodiments, the asset may additionally store override data that modifies one or more of the video or audio properties. For instance, a user might enter that a media file actually has a frame rate of 24 frames per second, even though the file's metadata, stored in the asset, indicates that the video's frame rate is 23.98 frames per second. When presented to the user, or used within the application, the override will be used and the media file will be treated as having a frame rate of 24 fps.

Figure 6:
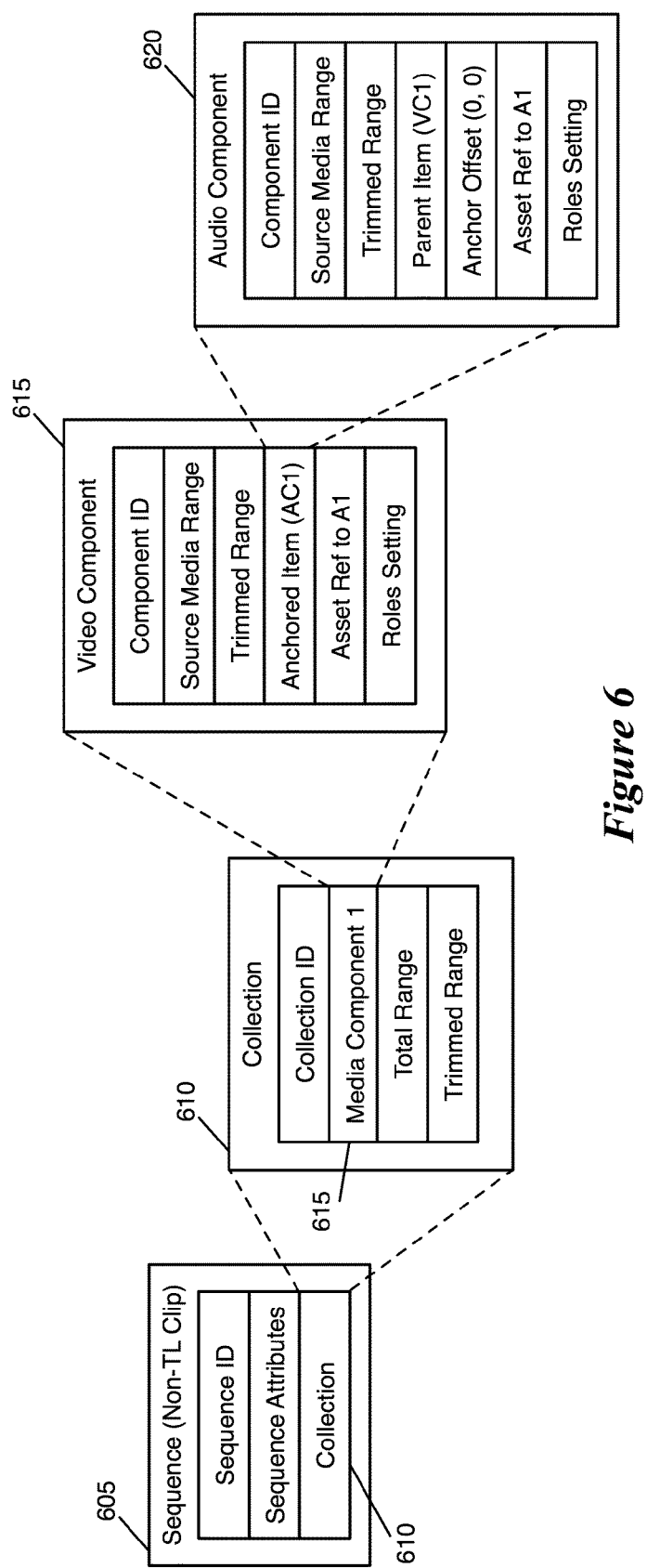
FIG. 6 conceptually illustrates a nested sequence of clip objects created by the media-editing application of some embodiments for an imported media file.

As stated, when the media-editing application imports a media file, some embodiments create a nested set of data structures. FIG. 6 conceptually illustrates a nested sequence of clip objects created by the media-editing application of some embodiments for an imported media file. In some embodiments, each of the clip objects shown in this figure is a member of the same class, though the objects may be of different sub-classes. The media file the clip structure of which is illustrated in FIG. 6 is a movie file that stores both audio and video information.

The figure illustrates a sequence 605, a collection 610, and two components 615 and 620. As mentioned, in some embodiments the sequence 605, collection 610 and components 615 and 620 are sub-classes of clip objects (or anchored objects). Some embodiments create a sequence (which may be another clip object or a different class of object) within the event object for each media file imported into the event. The sequence 605 stores a sequence ID, a set of sequence attributes, and the collection object 610. The sequence ID is a unique identifier for the sequence object. The sequence attributes, in some embodiments, include the resolution, frame rate, and other video and audio properties for the sequence. For event clips, these attributes are generally based on the underlying media (i.e., the information stored in the asset that is linked to through the collection and component clips).

The collection object 610 is an ordered array of clip objects. In the case of a clip imported into an event, as is the case with the object 610, the collection stores one or more component clips in the array. Often, the collection stores the video component clip in the array, as shown here; any additional components (generally one or more audio components) are then anchored to that video component. In addition, the collection object 610 stores a collection ID, a total range, and a trimmed range. The collection ID is a unique identifier for the collection object. The total range of a clip object indicates the maximum range for the object based on the objects it contains, while the trimmed range indicates the actual range of the object in its parent object according to user edits. In some embodiments, the collection object stores a value for the total range because the total range is a variable assigned to all types of clip objects, but this range is not actually used by the application. Instead, the application dynamically calculates the total range based on the objects contained by the collection (as opposed to updating the range value every time a clip is added to the collection). Some embodiments, on the other hand, do update the total range in the collection object. The array of the collection object 610 contains the media component 615. Collection objects, in some embodiments, can contain both component clip objects and additional collections in their arrays.

In the above paragraph and elsewhere in this document, a first object (e.g., the collection object 610) is described as containing a second object (e.g., a media component 615 in the array of collection object 610). In some embodiments, a first object contains a second object by storing a reference to the object (e.g., a pointer). This reference is stored as a strong pointer in some embodiments.

The media components shown include a video component 615 and an audio component 620. Each of the components stores a component ID, a source media range (i.e., total range), a trimmed range, an asset reference (that refers to an asset such as the asset 500 and the event containing the asset), and a roles setting. The roles setting is a setting for a clip and is stored on the video and audio components (i.e., at the component level). Some embodiments provide a set of roles options (e.g., music, dialogue, and effects for audio components; video and titles for video components) as well as allowing the user to input custom roles options (e.g., French, English, etc.). The user can then export a composite presentation that excludes clips with certain roles (e.g., removing all of the French audio).

For a component clip that refers to a media asset, the total range is the duration of the source media. The trimmed range is the range selected by a user through various user edits (e.g., trim edits) and indicates both the start time within the total range and the duration, in some embodiments. The trimmed range is generally a subset of the total range (i.e., does not include time outside the total range). However, in some embodiments, the application may use a range extender to extend the trimmed range past the total range (e.g., when needed for part of a transition, or if aligned audio runs slightly longer than video). Some embodiments will generate video images using, e.g., the first and last images of the video file, to fill in the needed extra range. When a clip is initially imported into the application, the total range and trimmed range will generally be equal as the user will not have edited the clip at all yet.

The video component 615 includes an anchored item set that contains the audio component 620. As described above by reference to the timeline 315 in the user interface 300 of FIG. 3, clips can be anchored to other clips in some embodiments. When a particular clip is moved in the timeline, any clips anchored to the particular clip are moved along with it. Each clip can have numerous anchored clips, and can be anchored to a single clip. In the case of a media clip with audio and video components, some embodiments anchor the audio component to the video component. Thus the video component object 615 contains the audio component in its set of anchored items (and could include numerous such items if there were additional audio components), while the audio component object 620 includes a parent item reference to the video component to which it is anchored. In addition, the child (anchored) object stores an anchor offset that indicates two values. The first value is the position in the parent object to which the child object is anchored, and the second value is the offset of the anchor within the child object. In the case of an imported media file, the audio and video components will start at the same time, and thus both anchor offset values are zero. However, this can be modified if, for example, there is a slight offset in the recordings of the two components and the user has to adjust the audio relative to the video.

The above FIGS. 5 and 6 illustrate the data structures for an object imported into an event in the media-editing application. When media clips are added to a media project, nested within compound clips, etc., the data structures created by the media-editing application may be more complicated.

Figure 7:
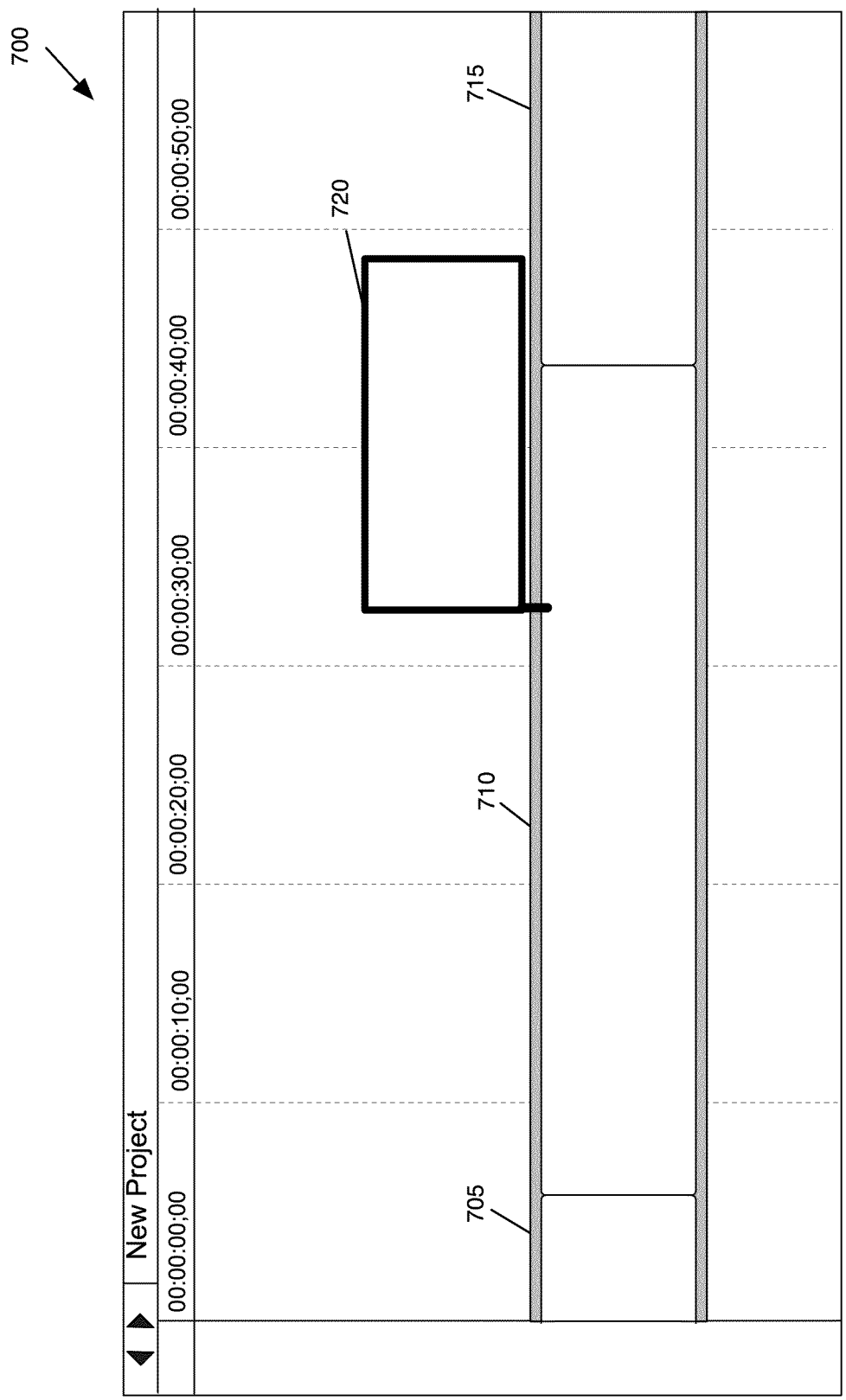
FIG. 7 illustrates a timeline with a project title "New Project" that includes four clips.

FIG. 7 illustrates a timeline 700 with a project title "New Project" that includes four clips 705-720. The clips 705-715 are in the primary compositing lane of the project's sequence, while the clip 720 is anchored to clip 710 at approximately 26 seconds into clip 710. The clip 710 is a compound clip that itself includes two clips.

Figure 8:
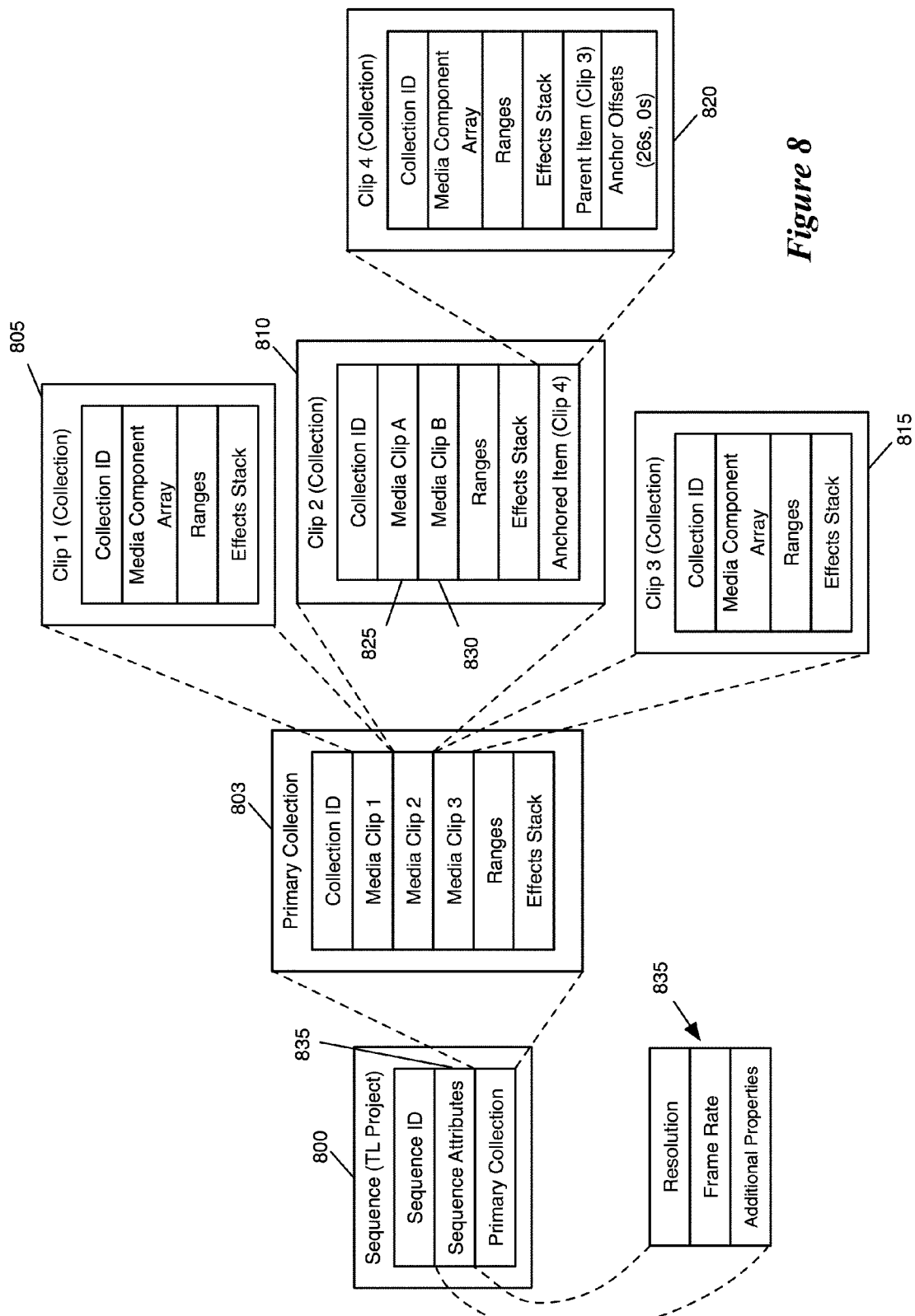
FIG. 8 conceptually illustrates a subset of the data structures for the project illustrated in FIG. 7.

FIG. 8 conceptually illustrates a subset of the data structures for the project illustrated in FIG. 7. In some embodiments, the data structures of FIG. 8 are all contained within a project data structure that contains a single sequence 800. In some embodiments, the project data structure for a project in the timeline is a sub-class of the same class that includes event data structures. While the event data structures can contain multiple sequences (i.e., one sequence for each clip in the event), the project data structure only contains a single sequence.

The sequence 800 includes a primary collection data structure 803, which itself stores an array containing three collections 805-815 that correspond to the clips 705-715 in the timeline 700. In addition, the fourth clip 720 is contained within the collection 810 as an anchored item of the collection. For simplicity, the component objects are not shown in this figure. The sequence 800 includes a sequence ID, sequence attributes 835, and a primary collection 803. These sequence attributes 835 include the video properties set for the project, such as the resolution, frame rate, and other additional properties (e.g., format, render properties, audio properties, etc.). As shown in the previous Section I, in some embodiments a user sets these properties when creating the project.

The primary collection 803 includes a collection ID, ranges (i.e., the total and trimmed ranges described above), an effects stack (which, in some embodiments, represents a video effects stack and an audio effects stack), and the array of media clips. In some embodiments, the array is ordered based on the location in the timeline and only includes media clips in the primary lane of the collection. The media-editing application assumes that there is no gap between these items, and thus no timing data is needed between the items. As shown, each of these clips is represented as a collection. When a clip stored in an event (e.g., the clip shown in FIG. 6) is added to a project in a timeline, some embodiments remove the sequence container data structure (e.g., structure 605) and copy the rest of the structure (i.e., the collection and its components) into the timeline collection. The effects stack stores a set of effects applied to the media clip. These effects may include automatically applied rate and spatial conform effects, user-initiated transform, crop, and distortion effects, user-applied pixel-manipulation effects (i.e., effects that modify pixel values of the images of the clip according to different algorithms, etc.).

The clips 805, 815, and 820 are individual clips that have been added to the timeline from the clip browser, and thus do not themselves include collections. Similar to the collection 610, these objects include an ID, ranges, an effects stack, and an array of media components (e.g., a video component with one or more audio components anchored to the video component).

The clip 810 is a compound clip that includes multiple clips in its array, in addition to the collection ID, ranges, and effects stack. Specifically, the clip 810 includes two media clips 825 and 830. Within the compound clip, the clips are both in the primary lane of the collection, and thus one follows the next. These clip objects are not shown in this figure, but each of the clips is similar to the clip 805 in that the clips each include an array of media components. In addition, the clip object 810 includes a set of anchored items (in this case only the one item, clip 820). Some embodiments include a set of anchored items for each collection, which are empty for the other objects shown in FIG. 8. The anchor offset stored in clip 820 indicates that it is anchored 26 seconds into the clip 810, and that the anchor is at the start of the clip 820. These times refer to the trimmed ranges of the clips in some embodiments.

Figure 9:
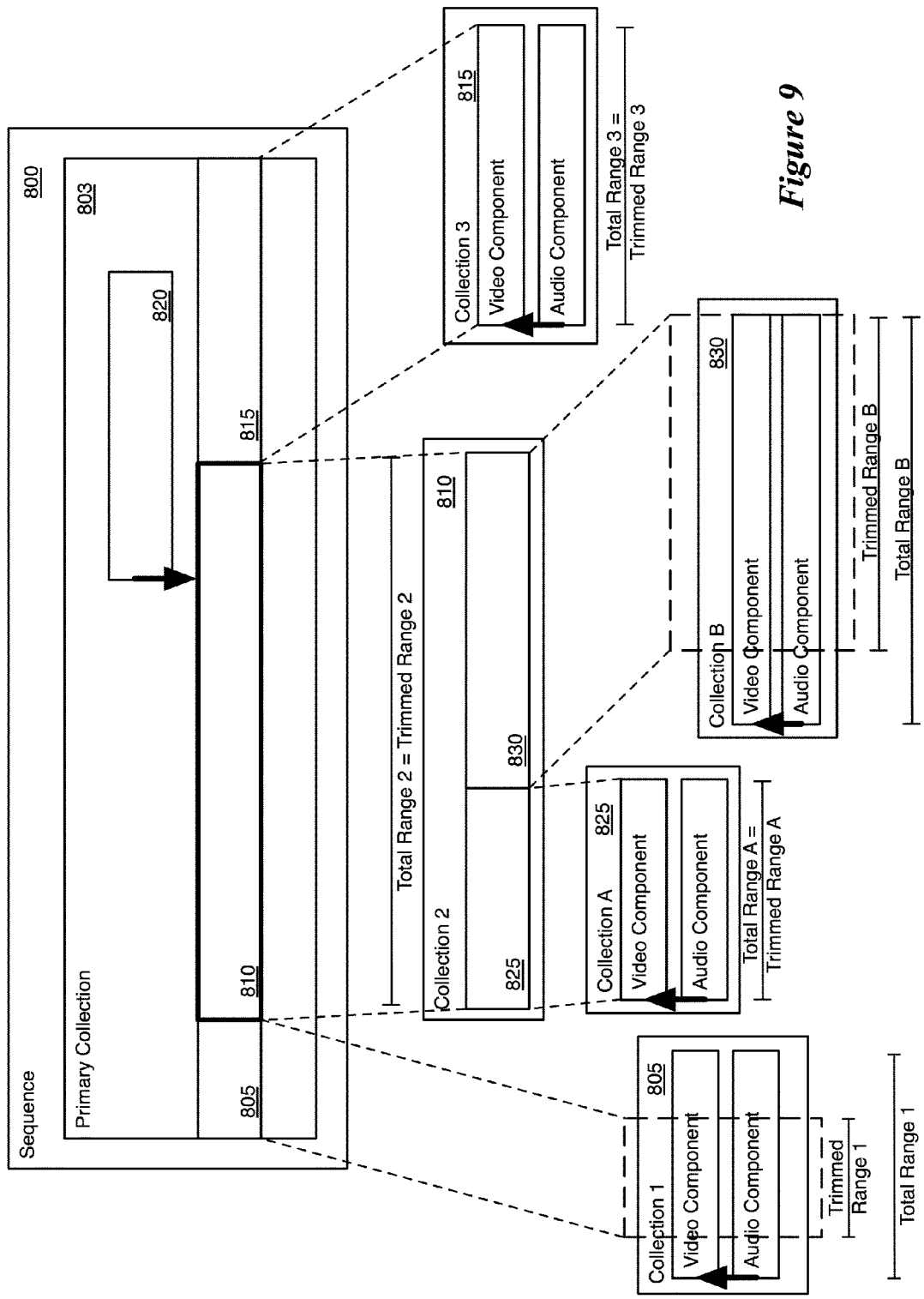
FIG. 9 conceptually illustrates the objects of FIG. 8 nested in a conceptual timeline.

FIG. 9 conceptually illustrates the objects 800-830 nested in a conceptual timeline. As shown, the collection objects 825 and 830 are nested inside the collection 810, which is nested inside the primary collection object 803 along with the other collection objects 805, 815, and 820. The sequence's primary collection object 803 is itself nested inside the sequence object 800.

The figure illustrates the anchoring relationships between the various clips as well as the durations (ranges) of the clips. The lowest level collections 805, 815, 825, and 830 each have an audio component anchored to a video component. While not shown, collection 820 could also have the same video/audio setup, or could be just a video component (or just an audio component). While each of the objects shown has a single audio component, one of ordinary skill will recognize that some embodiments will have multiple audio components (e.g., if a camera records several audio tracks as separate files and imports the files with a video file as part of a single clip).

The figure also illustrates the anchoring of clip 820 to clip 810. In some cases, multiple clips will be anchored to the same primary lane clip, and the multiple anchored clips may overlap in time. In this case, multiple secondary lanes may be used. Some embodiments assign lane numbers to each clip object that indicates the clip object's lane within a collection.

All of the primary lane objects are assigned a lane number of zero in some embodiments, with lanes above the primary lane getting increasing numbers and lanes below the primary lane getting decreasing (negative) numbers. For instance, a separate audio clip might be anchored to a clip in the primary lane and displayed below the primary lane. In this case, within the primary collection 803, the anchored clip 820 has a lane number of 1. The lane numbers indicate compositing order for video in some embodiments. Whereas two audio files can be combined fairly easily (mixed), images from two video files cannot be displayed at the same time. Thus, some embodiments composite higher lane number clips on top of lower lane number clips. If no compositing effect is defined between two clips at the same time, then the clip in the higher lane will be displayed. However, various compositing modes and effects may be used to combine the pictures (e.g., compositing modes such as subtract, darken, multiply, etc. that combine pixel information of two images, as well as effects such as scaling the top image to get a picture-in-picture, applying a color mask to the top image, etc.).

The items in a lower-level nested collection will also have lane numbers that refer to their lane order within that collection. For example, the collection object 810 has two clips 825 and 830, that each has a lane number of zero.

However, this collection object could have anchored clips in multiple lanes. For the purpose of compositing at time of rendering, the items within the collection 810 would be composited initially according to the ordering within the collection, then the output of that would be composited within the primary collection according to the ordering of the primary collection. Similarly, for each of the lowest-level collections (e.g., collection 805), the video components are all assigned to lane zero and the audio components are assigned to lane −1.

FIG. 9 also illustrates the ranges (e.g., durations) of the various clip objects. For the lowest level collections and their components (e.g., collections 805, 815, 825, 830, and 820), the total range is the full length of the media to which the components refer, whereas the trimmed range is a subset of this range based on user edits (e.g., trim edits). In this case, collections 815 and 825 are not trimmed at all, whereas collection 805 is trimmed on both sides and the start of collection 830 is trimmed.

For collection 810, the total range is the sum of the trimmed ranges of its primary lane clips, which in this case are collections 825 and 830. Thus, the variable Total Range 2=Trimmed Range A+Trimmed Range B. In this case, the collection 810 is not separately trimmed, such that its trimmed range equals its total range. This means that, although there is more media within clip 830, while editing the primary collection 803 the media-editing application will not allow a user to increase the duration of clip 810 beyond that of Total Range 2. However, a user could open up the clip 810 in the timeline and apply trim edits to either of clip 825 and 830. Modifications to the trimmed range of these clips will affect the total range of the clip 810. In addition, within the primary collection 803, a user can modify the trimmed range of clip 810 to shorten the clip. Trimming from the beginning would result in less of the media of collection 825 being used in the component presentation, while trimming from the end would result in less of the media of collection 830 being used in the composite presentation.

The above figures illustrated various properties of certain types of clip objects. One of ordinary skill in the art will recognize that some embodiments may use additional different subclasses of clip objects. For instance, some embodiments store reference clips in the event data structures. Rather than copying these clips when a user adds the clip to a media project, the media-editing application creates a clip instance in the collection for the media project. This clip instance is similar to a collection clip, but does not contain clips of its own. Instead, the clip instance refers to the reference clip in the event. Any edits to the reference clip are then reflected in all instances of the clip in the media project (or other media projects). The reference clips will be described below in detail for multi-camera clips, but some embodiments include reference clips for additional types of clips (e.g., individual video clips, compound clips, etc.).

Furthermore, some embodiments store generators (effects that create their own video images rather than modifying existing video images), transitions between clips, audition stacks (sets of clips that can be swapped out for each other), markers, and keywords as clip objects. The above-described data structures (e.g., the clip objects, asset objects, event objects, project objects, etc.) are used by some embodiments of the media-editing application for displaying information in the GUI of the application and rendering a project, as well as for determining whether to apply a spatial or temporal conform effect to a clip.

III. Multi-Camera Clip Creation

The previous sections described the user interface of a media-editing application of some embodiments as well as the data structures used by the application to store information about certain media clips, media projects, etc. Such a media-editing application may have the capability to generate and use multi-camera media clips, and may include features specific to such clips.

As described above, some embodiments generate multi-camera media clips that include several media clips captured by multiple different media capture devices. The media-editing application automatically generates these multi-camera clips from the individual media clips using metadata stored with the media clips. In some embodiments, the generation process uses either a default multi-camera clip generation algorithm or adapts the algorithm based on preference settings input by a user.

Figure 10:
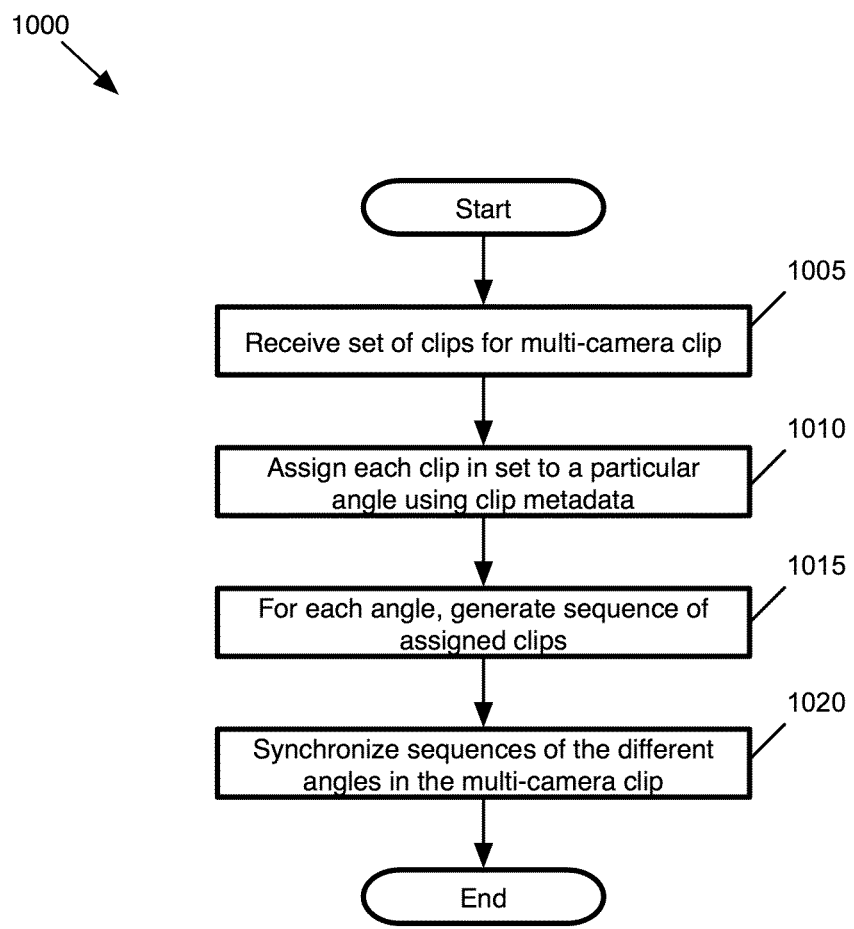
FIG. 10 conceptually illustrates a process of some embodiments for generating a multi-camera media clip from a set of media clips.

FIG. 10 conceptually illustrates a process 1000 of some embodiments for generating a multi-camera media clip from a set of media clips. The process 1000 is performed by the media-editing application of some embodiments in response to user input indicating a set of clips from which to generate the multi-camera clip. This process will be described by reference to FIG. 11, which illustrates user input for creating such a multi-camera media clip over five stages 1110-1150.

As shown, the process 1000 begins by receiving (at 1005) a set of clips for a multi-camera clip. In some embodiments, these clips may be any clips stored in an event (e.g., video clips, still images, audio clips, etc.), including compound clips or previously-generated multi-camera clips. Some embodiments require all of the clips to be stored in the same event, while other embodiments allow a user to combine clips from multiple events into a single multi-camera clip. Some embodiments restrict the type of clips used to generate a multi-camera clip to prevent the use of compound clips or multi-camera clips, which may themselves have content captured by multiple different devices.

Figure 11:
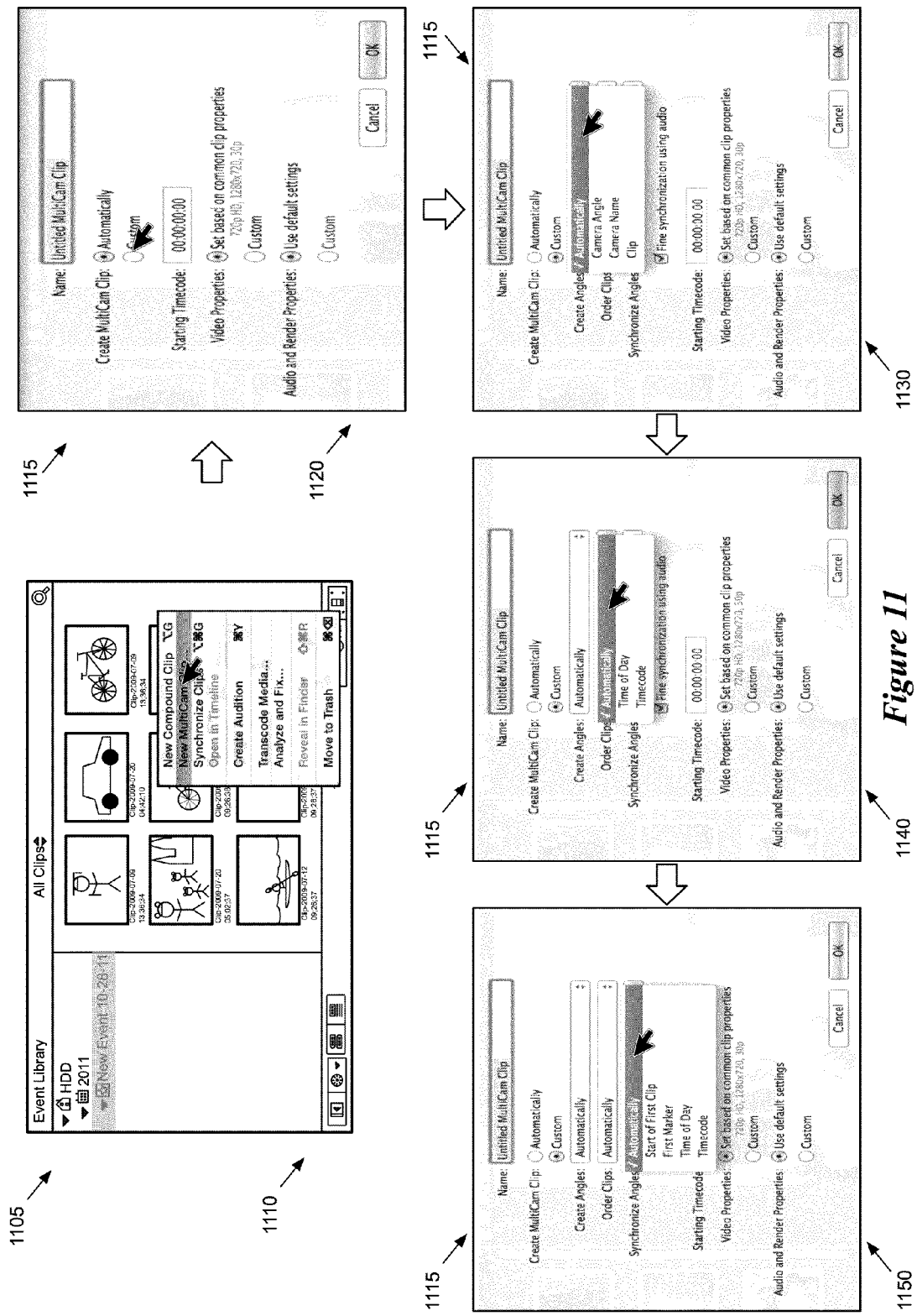
FIG. 11 illustrates user input for creating a multi-camera media clip.

The first stage 1110 of FIG. 11 illustrates a clip browser 1105 showing several media clips. The user has selected these clips and opened a drop-down (e.g., via a right-click, two-finger tap, or other such selection input). As shown, the user has located a cursor over the menu option for "New MultiCam Clip". As a result of selecting this menu option, the second stage 1120 illustrates a dialog box 1115 that provides the user with several options for the multi-camera clip. The user can title the clip, input a starting timecode, set video properties, and set audio and render properties. The video properties, in some embodiments, includes the format (e.g., 720p HD), the dimensions (e.g., 1280×720), and the frame rate (e.g., 30p). The user can either set these properties based on common clip properties (e.g., the properties most common among the selected clips, the properties of a particular clip, etc.) or provide custom settings (e.g., as shown in FIG. 4 for a new project).

The dialog box 1115 also allows the user to choose whether the application will use its default settings to create the multi-camera clip or whether the application should prefer certain metadata for assigning the selected clips to angles, ordering the clips within the angles, and synchronizing the angles. In addition, the dialog box provides an option for determining whether the application should perform a second level of synchronization using audio data. As shown in stage 1120, the user is selecting the custom option in order to view these various choices.

Returning to FIG. 10, the process 1000 next assigns (at 1010) each of the clips in the set to a particular angle using clip metadata. This operation will be described in detail below by reference to FIG. 12. The angles, in some embodiments, are groups of clips the content of which was captured by the same device. For instance, a director might shoot a scene with four cameras simultaneously in order to capture four different angles of the scene (e.g., straight on, close up, overhead, etc.).

As shown at stage 1130 of FIG. 11, in some embodiments the metadata used includes the camera angle (e.g., user-provided metadata for the clip) and/or camera name (e.g., information automatically generated by the media-editing application for the clip upon import of the clip's content). In addition, the application allows the user to choose to have each clip placed in its own angle.

Next, the process generates (at 1015) a sequence of the assigned clips for each angle. That is, the process determines an order for the clips in the angle (e.g., using time of day or timecode metadata), then spaces these clips out over time according to this metadata. This operation will be described in detail below by reference to FIG. 14. As shown at stage 1140 of FIG. 11, in some embodiments the metadata used may include the timecode and the time of day (or creation date, as described above in Section II) of the clips. Various different algorithms may be used by different embodiments to translate this metadata into a sequenced angle.

The process 1000 then synchronizes (at 1020) the sequences of the different angles in the multi-camera clip. The synchronization operation aims to have content that was simultaneously recorded be aligned in time within the multi-angle clip. Thus, an overhead shot and a close-up shot of the same action should ideally be lined up in the clip such that at a particular time within the clip the video images for each angle show the same time in the action. As shown at the fifth stage 1150 of FIG. 11, the application can use time of day or timecode metadata for synchronization, as well as lining up the start of the first clip in each angle or the first marker in the clips of the angles. As with the sequencing, various different algorithms may be used by different embodiments to translate the timing metadata into aligned angles. In addition to synchronizing by metadata, some embodiments perform a second level of synchronization using audio data. These embodiments compare audio portions of clips located near to each other in time (after the initial metadata synchronization) from different angles to identify matching audio, then align the clips further using any matching audio. The synchronization operations will be described in detail below by reference to FIGS. 16 and 18.

A. Assigning Clips to Angles

Figure 12:
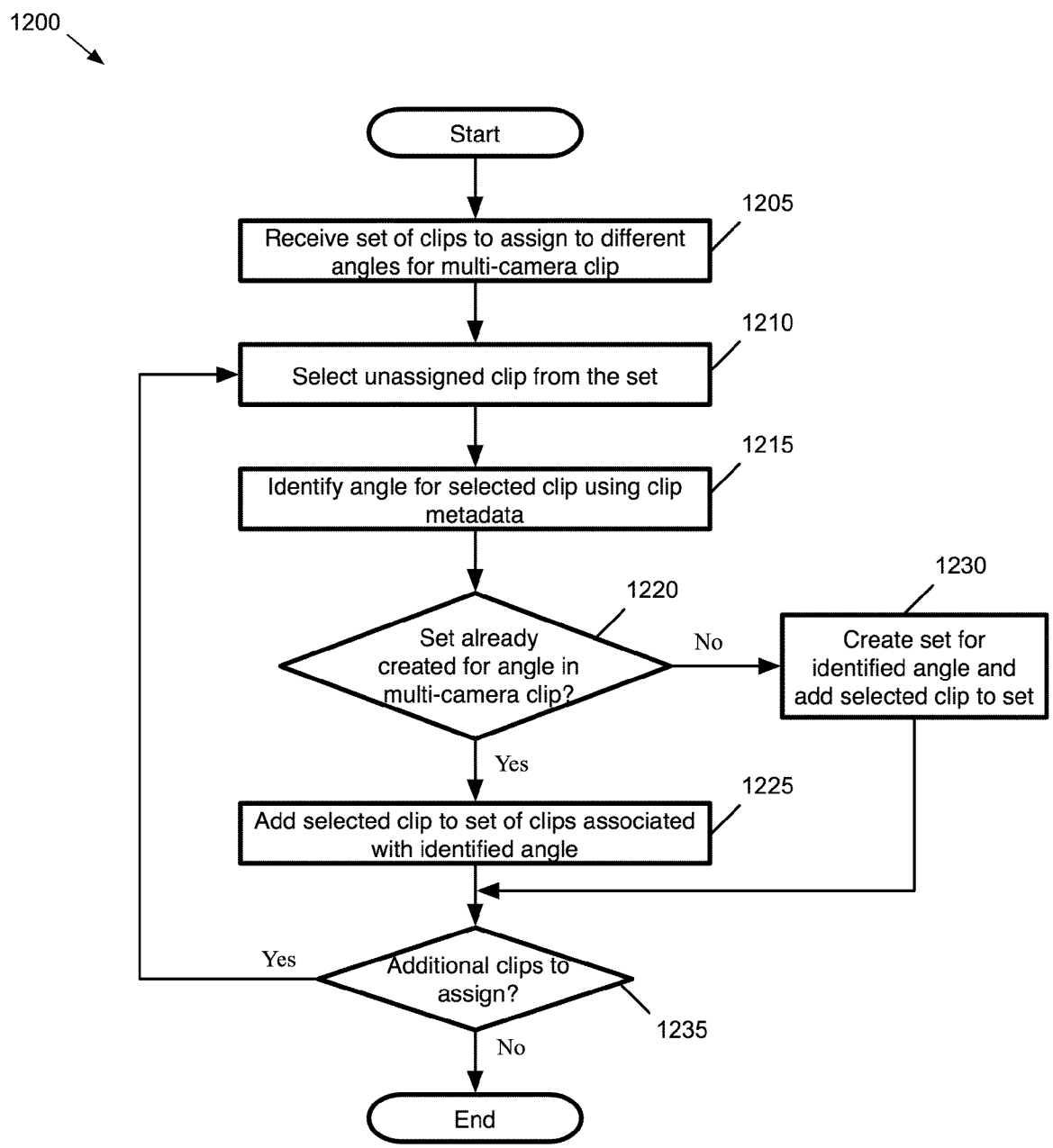
FIG. 12 conceptually illustrates a process for assigning clips to different angles of a multi-camera media clip.

As stated, when a user selects several clips from which to generate a multi-camera media clip, the media-editing application first assigns the several clips to one or more angles based on camera metadata. FIG. 12 conceptually illustrates a process 1200 for such assignment of clips to different angles of a multi-camera media clip. The process 1200 will be described by reference to FIG. 13, which conceptually illustrates the assignment of a set of nine clips 1305-1345 to three different angles for a multi-camera media clip.

The process 1200 begins by receiving (at 1205) a set of clips to assign to different angles for a multi-camera media clip. These may be a set of clips selected by a user, and the content of the clips may have been captured by several different devices or a single device. In some embodiments, the media clips might be video clips, audio clips, still images, or other content. For example, a set of media clips could include video (with accompanying audio) taken by one or two different cameras, still images taken by yet another different camera, as well as audio-only clips recorded by a microphone separate from any of the cameras.

Figure 13:
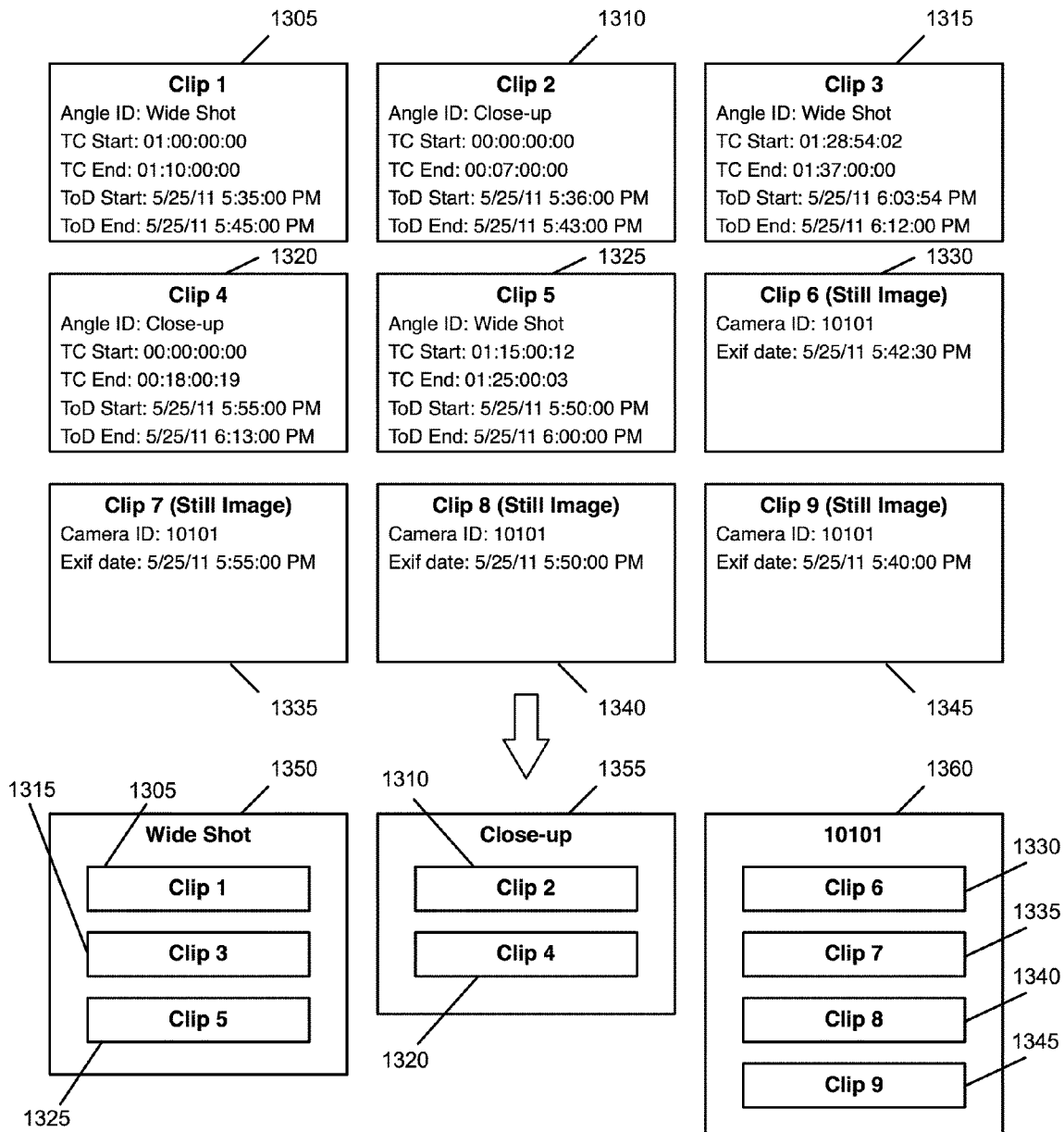
FIG. 13 conceptually illustrates the assignment of a set of nine clips to three different angles for a multi-camera media clip.

The clips, in some cases, will store metadata about their represented content. This metadata may include information about the device that captured the content and when the content was captured (in addition to other data, such as the video or audio properties). FIG. 13 conceptually illustrates nine clips 1305-1345 with their metadata. These clips include five video clips 1305-1325 and four still images 1330-1345. The video clips include angle IDs ("Wide Shot" and "Close-up"), which are user-entered metadata. In some embodiments, a user can select a media clip (e.g., in the clip browser) and enter an angle ID (or camera ID) for the clip through the inspector display area. In addition, the video clips include starting and ending timecode information and start time of day information. The still images include a camera ID ("10101") and Exif (Exchangeable image file format) date, which is data indicating the date and time an image was captured.

Returning to FIG. 12, the process 1200 selects (at 1210) an unassigned clip from the set of received media clips. Some embodiments select the clips in the order they are stored in their event, in alphabetical order by clip name, in some other order, or in a random order. Initially, of course, all of the clips are unassigned.

The process then identifies (at 1215) an angle for the selected clip using clip metadata. In some embodiments, the media-editing application may use a variety of different metadata to identify the angle for a particular clip. In the absence of a preference input by a user, some embodiments prefer a user-entered angle ID, then a user-entered camera name (specified at time of import in some embodiments), then a camera ID automatically generated at time of import among data stored with the clip data structure, then look to other metadata stored with the source file if none of the previous data is available (e.g., a manufacturer ID or device name). If none of this metadata is available, then the application assigns the clip to its own angle. In the case of the clips shown in FIG. 13, the video clips 1305-1325 each have an angle ID, while the still images 1330-1345 each have a camera ID. In this case, the video clip angle IDs are user-entered information, whereas the camera ID for the still images is automatically-generated data.

The process then determines (at 1220) whether a set has already been created for the angle in the multi-camera clip. In some embodiments, the process checks each available piece of metadata for the clip to determine whether the clip could be assigned to an existing angle. For instance, if a first clip has a camera ID but no angle ID and a second clip has an angle ID as well as the same camera ID as the first clip, then the application will assign the second clip based on its camera ID rather than only examining the angle ID and assigning the second clip to a new angle because no angle yet exists for that angle ID. On the other hand, some embodiments will always use the first piece of information for which the clip has a value. Thus, in the case just mentioned, such embodiments would assign the second clip to a new angle based on its angle ID. If the clip does not have any sort of angle identification metadata, then the clip will be assigned to its own angle.

When a set has already been created for the angle, the process adds (at 1225) the selected clip to the set of clips associated with the identified angle. On the other hand, when there is no set yet created for the angle, the process creates (at 1230) a set for the identified angle and adds the selected clip to the set. In some embodiments, the media-editing application temporarily stores these sets of clips in volatile memory (e.g., RAM) while performing additional operations of the multi-camera clip creation process (i.e., ordering and synchronization). In some such embodiments, media-editing application data structures are not actually created for the sets of clips until the sets are ordered, at which point the application generates the angles of the multi-camera clip in a data structure for the multi-camera clip. The structure of such a multi-camera clip is described in detail below.

The process 1200 then determines (at 1235) whether additional clips remain to be assigned to the different angles. When additional clips remain, the process returns to 1210 to select another unassigned clip for assignment to an angle. Once all of the clips have been assigned, the process 1200 ends.

In addition to illustrating the different clips with their respective metadata, FIG. 13 also illustrates the assignment of the clips to three different angles. Assuming the clips 1305-1345 are assigned in order from "Clip 1" to "Clip 9", the media-editing application first selects clip 1305, creates an angle "Wide Shot" 1350, and assigns the clip 1305 to this angle 1350. Next, the application assigns the clip 1310 to a new angle "Close-up" 1355 based on this clip's angle ID. For the third clip 1315, no new angle is needed, as this clip also has the angle ID "Wide Shot" and is thus assigned to the already-existing angle 1350. The video clips are assigned to these two angles 1350 and 1355 as shown, and then the application gets to the still images.

The application identifies the camera ID as "10101" for the clip 1330, determines that this is the only metadata for this clip useful for angle assignment and creates a new angle 1360 with this name. In some embodiments, camera IDs, camera names, or even clip names may be used to name angles, while other embodiments create generic angle names such as "Angle 3" when no angle ID metadata exists for the clips assigned to that angle. As shown, the four still image clips 1330-1345 all have the same camera ID, and thus the application assigns these four clips to the angle 1360.

As mentioned, in some embodiments, these angles exist in volatile memory at this point in the clip creation process. Other embodiments create a multi-camera clip structure (described below by reference to FIG. 20) during the angle assignment process and create angles within this clip structure as the angles are created by process 1200 (or a similar angle assignment process).

B. Angle Sequencing

Figure 14:
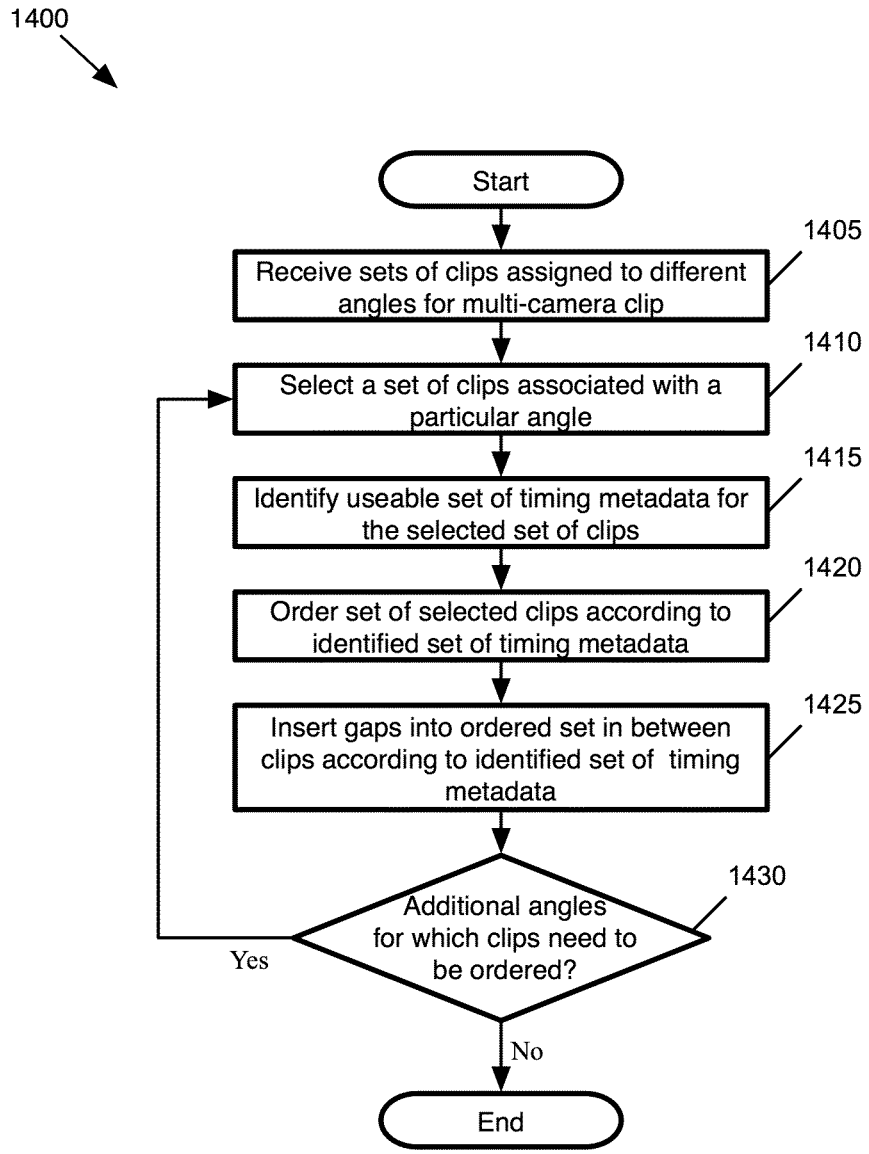
FIG. 14 conceptually illustrates a process of some embodiments for generating a sequence of ordered clips for the various angles of a multi-camera media clip.

After assigning clips selected for a multi-camera clip to different groups (angles) of the multi-camera clip, the media-editing application of some embodiments orders and sequences the clips within the groups. FIG. 14 conceptually illustrates a process 1400 of some embodiments for generating a sequence of ordered clips for the various angles of a multi-camera media clip. The process 1400 will be described by reference to FIG. 15, which illustrates the sequencing of the clips 1305-1345 from FIG. 13.

The process 1400 begins by receiving (at 1405) sets of clips assigned to different angles for a multi-camera clip. In some embodiments, these clips have been assigned to the angles by the media-editing application using the process 1200 or a similar process. These may be clips that have an extended duration (e.g., video and audio clips) or may only have an instantaneous time (e.g., still images, which consist of a single frame).

As shown in FIG. 13, the media clips may store timing metadata about the source video to which they refer. For instance, the video clips 1305-1325 include both timecode ("TC") information and time of day ("ToD") information. For example, the metadata for Clip 1 1305 indicates that the timecode starts at 01:00:00:00 (given in hours:minutes:seconds:frames) and ends at 01:10:00:00, for a duration of exactly ten minutes. The time of day information indicates that filming for this clip started at 5:35 PM on May 25, 2011. In some embodiments, as shown, cameras will record time of day down to the nearest second. However, time of day information will generally not take into account frames, whereas timecode stores information at the frame level (i.e., fractions of a second) and is thus more precise. Furthermore, this example shows only a starting time of day. Many cameras only record starting or ending times, but not both. To record the duration of the clip, the camera records starting and ending timecode information (duration could also be determined based on the frame rate and number of frames). Thus, the media-editing application would use the time of day to identify start times for the clips and timecode to derive the duration.

The process 1400 next selects (at 1410) a set of clips associated with a particular angle. As described above, in some embodiments the information associating the clips with the different angles is stored in volatile memory at this point, in which case the application retrieves this information from the memory in order to evaluate the clips. The process may evaluate the angles in a particular order such as the order in which they were created, or a random order. Some embodiments might also evaluate the angles in parallel, performing operations 1415-1425 at the same time for multiple angles.

The process identifies (at 1415) a useable set of timing metadata for the selected set of clips. For video (or audio) clips, some embodiments first identify whether the clips in the selected angle can be sequenced using timecode. In order to do so, different embodiments of the media-editing application apply different criteria to the timecode of the media clips. For instance, the first test the application applies in some embodiments is whether the timecode of any of the clips overlaps. In the case of the angle 1355 ("Close-up") of FIG. 13, these clips both start at a timecode of 00:00:00:00, so the timecode does not provide any useful ordering information. If there is no overlap, then the application determines whether the total span of the timecode of all of the clips is greater than a threshold duration (e.g., one hour, one day, three days, etc.). For example, if the clips are 100 hours apart in timecode, then they will probably not form a useful multi-camera clip sequence with this information.

In addition, some embodiments will not use timecode if all of the clips start one frame after the end of another clip in the set (or, in some embodiments, within a second of the end of the previous clip). This is generally indicative of a camera that uses continuous timecode but which does not roll through timecode when not recording, and thus will not correspond to actual time (common with digital tape-based recording). However, in this case, the media-editing application of some embodiments will use the ordering (i.e., that a first clip should come before a second clip) from the timecode, as this will most likely be reliable. For spacing the clips when this is the case, the application will attempt to use time of day information.

If the timecode information cannot be used, the application will attempt to use the time of day information. The time of day, as mentioned, is not as precise as timecode because it does not generally record time at the frame level. In the case of the clips in angle 1355 ("Close-up"), the timecode information starts at 0 for both clips, so the application would use the time of day information for ordering and spacing purposes (while using the timecode to determine duration). The clip 1310 starts at 5:36:00 PM and has a duration of exactly seven minutes, while the clip 1320 starts at 5:55:00 PM and has a duration of eighteen minutes and nineteen frames, so no overlap exists in the time of day information. Some embodiments apply a threshold duration test to the time of day as well, mandating that the duration from the start of the first clip to the end of the last clip not span more than a threshold duration (e.g., one hour, one day, three days, etc.). For instance, a clip might be marked as having been filmed in 1990 while another clip is from 2011, but it is unlikely the user would actually want a multi-camera clip with a length of 21 years.

If neither the timecode nor the time of day is determined suitable, the application will nevertheless attempt to at least use the information to put the clips in order, even if the information may not work for properly spacing the clips along a timeline. In the example in which a first clip has a 1990 date while a second clip is from 2011, the application would order the first clip before the second clip. If no time of day information is available at all, then the application places clips in order based on any other metadata that can be found, such as date of import of the source files represented by the clips.

For still images, which do not have a duration (or, more accurately, have a duration of one frame), some embodiments initially look at the Exif data (data generated by the camera according to a standardized format for recording image metadata) to find a date and time when the image was captured. When this information is not available, the application will look to the creation date (which might be the date of import of the image files) to order the still image clips. In general, the metadata for still images keeps time at the level of seconds, and thus multiple still images captured by a single camera one after another might have metadata indicating that they were taken at the same time.

With the metadata identified, the process orders (at 1420) the set of media clips according to the identified set of timing metadata. As described, the media clips may be ordered based on timecode, time of day information, or other information that the application can identify from the clips and utilize for ordering. In some embodiments, the media clips are stored in the array of an anchored collection within a multi-camera media clip structure, as described below by reference to FIG. 20.

In addition, so long as the timing information for the clips of the selected angle passes the criteria indicative of its accuracy, the process inserts (at 1425) gaps into the ordered set in between the media clips according to the identified set of timing metadata. When none of the timing information passes this criteria, some embodiments do not insert any gap clips in the sequence and just leave the clips in order one after another.

However, when the available information is likely to indicate the spacing of the clips, the media-editing application spaces the clips out along a timeline and inserts gaps between the clips. If a first clip ends at the five minute mark and a second clip begins at the six minute mark, then the application inserts a one minute gap between the two clips. Due to the nature of the data structures used to store the multi-camera clips, in some embodiments these gaps are stored as separate clip structures within the array of the anchored collection that represents the angle.

Figure 15:
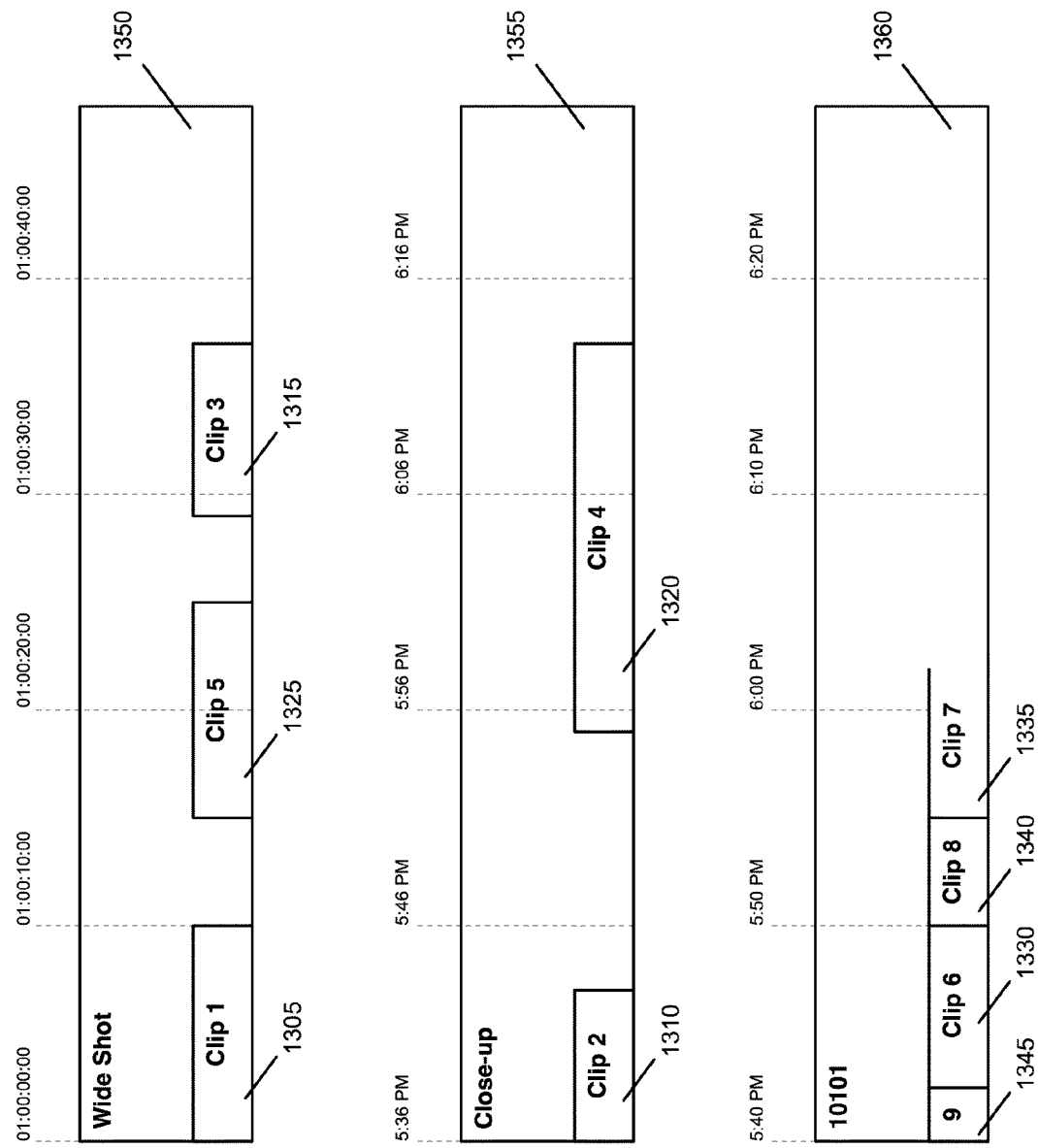
FIG. 15 illustrates the sequencing of the clips from FIG. 13.

FIG. 15 illustrates the ordered angles 1350-1360. The angles 1350 and 1355 contain video clips. To order the three clips 1305, 1315, and 1325 within their angle 1350, the media-editing application of some embodiments uses the timecode (as this information is not overlapping and is contained within a forty minute duration). As shown, the angle 1350 starts at a timecode of 01:00:00:00 with clip 1305. After ten minutes, this clip ends and a gap clip begins, until the 01:15:00:12 mark when the clip 1325 begins for just under ten minutes. Another gap clip begins at the twenty-five minute mark, until the clip 1315 begins at a timecode of 01:28:54:02. This clip lasts approximately eight minutes, for a total length of thirty-seven minutes.

The "Close-up" angle 1355 only contains two clips 1310 and 1320. However, for these clips, timecode does not provide useful information because the camera that captured the clips starts each captured video at a timecode of 00:00:00:00. However, the time of day information does provide useful timing metadata. As shown, the first clip 1310 starts at 5:36:00 PM, and the timecode indicates that it has a duration of seven minutes. Next in the array for the angle is a large gap clip, which lasts until the second clip 1320 begins at 5:55:00 PM. The duration of the clip 1320 is eighteen minutes and nineteen frames (e.g., 19/24 of a second if the frame rate is 24 fps). Thus, the total length of the angle 1355 is thirty-seven minutes and nineteen frames.

The angles 1350 and 1350 only include video clips, which can have extended durations. For still images, which have a duration of a single frame, some embodiments fill up the gaps between images by extending the duration of the still images until the start time for the next clip in the ordered sequence. When multiple still images have the same start time (e.g., because they were taken with a rapid-shoot camera that can capture multiple images per second), some embodiments identify the next start time in the ordered set of clips (after that shared by the images with the same time) and space out the images within the allotted time. As an example, if eight images have a time of 1:00:00 PM and the next image has a time of 1:00:01 PM, then the eight images will be evenly spread across the one second of 1:00:00 PM in the timeline (e.g., each will have a duration of 3 frames at 24 fps). In some embodiments, in order to determine the order of the images with the same start time, the media-editing application looks at the file names of the images, which are often automatically named in a number order by the camera (e.g., "IMG_0035", "IMG_0036", etc.).

As shown in FIG. 13, the Exif dates for the still image clips are 5:40:00 PM for clip 1345, 5:42:30 PM for clip 1330, 5:50:00 PM for clip 1340, and 5:55:00 PM for clip 1335, all on May 25, 2011. These times are all within a threshold duration (so long as the threshold duration is longer than 15 minutes), and thus the Exif times pass the criteria for use in ordering the clips and identifying start points for the clips in the timeline.

FIG. 15 illustrates these four clips 1330-1345 along a timeline for the angle "10101" 1360. In this case, the timeline begins at 5:40 PM, the time of the first image clip 1345. This clip has a duration of two minutes and thirty seconds, until the next image clip 1330 begins at 5:42:30 PM. Next, at 5:50 PM, the clip 1340 begins. This clip ends at 5:55 PM, where the last clip 1335 begins. In some embodiments, as shown, this clip is left with an open-ended duration until after synchronization of the angles. The still image clip, after synchronization, will have a duration that extends until the end of the multi-camera clip, which will depend on the lengths and synchronization of the angles 1350 and 1355. Instead of extending the still image clips to the start time of the next clip, some embodiments assign a fixed duration to the clips (e.g., one minute), which can be shortened automatically if another clip begins before that duration is up.

Returning to FIG. 14, after inserting gap clips into the current angle in order to generate the sequencing for the angle, the process 1400 determines (at 1430) whether any additional angles remain that need to be sequenced. Once the process has ordered and sequenced all of the angles, the process 1400 ends. When additional angles remain, the process returns to 1410 to select the next angle and determine a sequence for the angle.

As mentioned, in some embodiments the media-editing application stores these angles, or ordered sequences of clips, as collection clip structures within a multi-camera media clip structure. In some embodiments, this multi-camera clip structure is a collection that includes a gap element to which each of the angle collection structures is anchored. The media-editing application of some embodiments generates the sequence for each of the angles separately, then synchronizes the sequences once they are all generated.

C. Initial Synchronization

Figure 16:
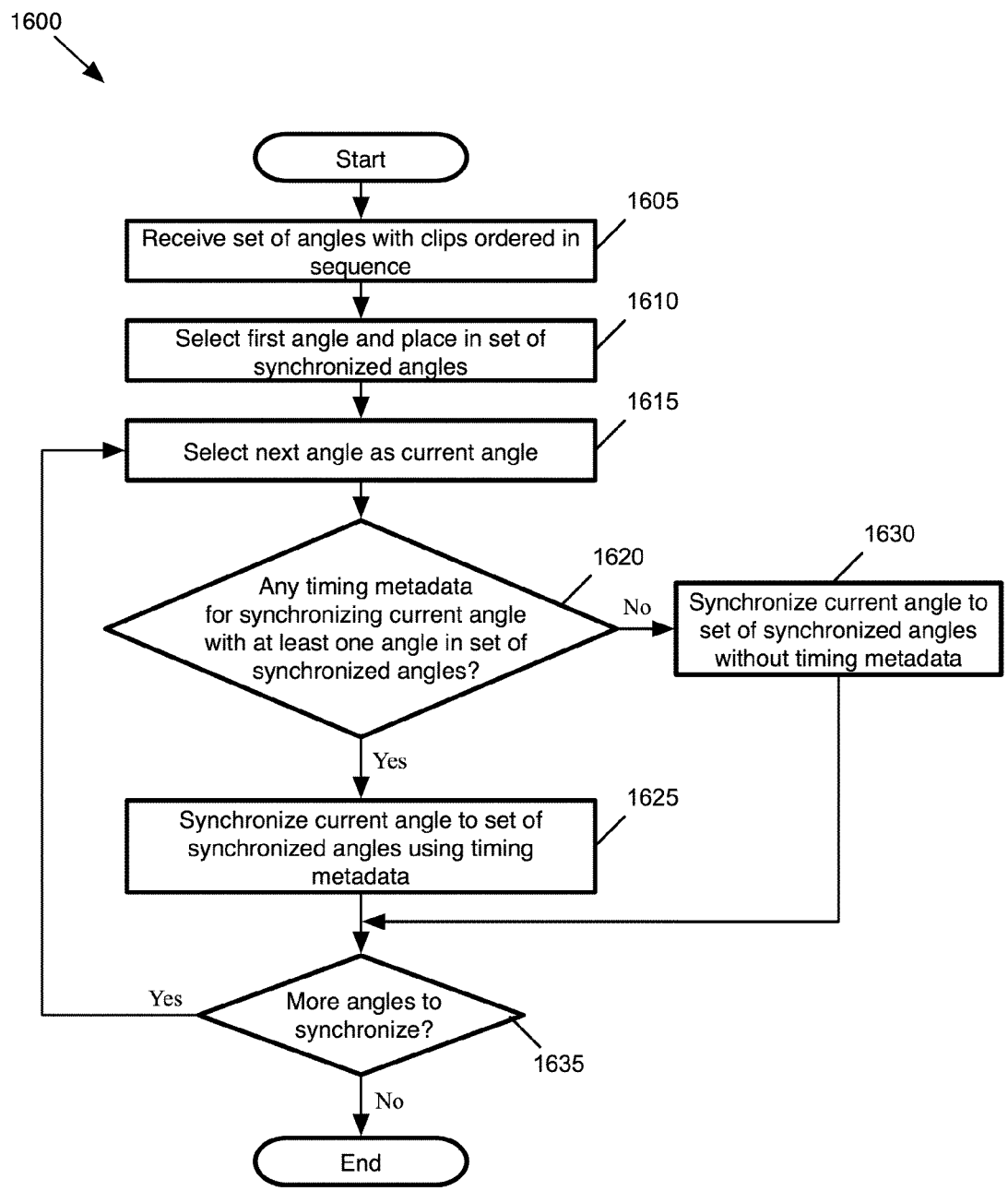
FIG. 16 conceptually illustrates a process of some embodiments for performing the initial synchronization of a multi-camera media clip utilizing timing metadata.

After assigning the media clips for a multi-camera media clip to angles and then generating a sequence for each of the angles, the media-editing application of some embodiments synchronizes the angles. In some embodiments, this involves two separate operations: an initial synchronization using timing metadata (e.g., the data used to order and sequence the angles individually) and a fine tuning of the synchronization using audio data. FIG. 16 conceptually illustrates a process 1600 of some embodiments for performing the initial synchronization utilizing the timing metadata. The process 1600 will be described by reference to FIG. 17, which illustrates the alignment of the sequences 1350-1360 from FIG. 15 using the metadata for clips 1305-1345 shown in FIG. 13.

The process 1600 begins by receiving (at 1605) a set of angles with the clips in each angle ordered in a sequence. As stated above, some embodiments store each of these angles as an anchored collection clip structure within a multi-camera clip structure (which is itself a collection structure). In some embodiments, the sequences have been generated by the process 1400 or a similar process. The angles might all be sequenced according to the same type of metadata (e.g., timecode) or be sequenced using different types of metadata (e.g., as in FIG. 15 with one angle sequenced using timecode, another with time of day information, and a third with Exif dates). In addition, in some cases at least one of the angles will have the clips in order, but not spread out (e.g., because the only available timing information for the clips was not deemed reliable enough to space out the clips).

Next, the process 1600 selects (at 1610) a first one of the angles and places the selected angle in a set of synchronized angles. The set of synchronized angles, in some embodiments, is the set of angles that have been evaluated and had their start times in the multi-camera clip adjusted for alignment with the other angles. In some embodiments, in order to align a first angle with a second angle, the media-editing application inserts a gap clip at the start of the sequence for whichever of the first and second angles starts later. Because at this stage the process 1600 has not yet evaluated any of the angles, there are no angles with which to synchronize the first angle, and thus the process sets the first clip in this first selected angle as starting at time zero of the multi-camera media clip. That is, the first selected angle does not have a gap clip inserted at its start at this point.

The process then selects (at 1615) one of the unevaluated angles as a current angle. If there is only one angle in the multi-camera clip, then no synchronization is necessary, of course. The media-editing application selects these angles in the order in which they are stored in the multi-camera clip collection data structure in some embodiments. For instance, in the example shown in FIG. 15, the media-editing application might first select the "Wide Shot" angle 1350 and set this as its initial synchronized angle, then subsequently select the "Close-up" angle 1355 to align this angle to the "Wide Shot" angle. In some embodiments, the different angles are each stored as an anchored collection in the multi-camera collection data structure, and each has a lane number to indicate order. Some embodiments select the angles starting from the highest or lowest lane number.

Next, the process 1600 determines (at 1620) whether any timing metadata of the clips is useful to synchronize the current angle with at least one of the angles in the set of synchronized angles. In some embodiments, this timing metadata may be either the timecode or the time of day (creation date), as with the angle sequencing process. Some embodiments first determine whether the timecode is useful for synchronization because timecode has a higher precision than time of day (as timecode uses increments of frames, whereas time of day only uses full second increments). However, with the exception of professional setups, multiple different cameras will not usually have their timecodes synchronized. Professional setups may run multiple cameras attached (e.g., wirelessly, via a wired connection) to a single timecode synchronizer. However, for many users, the timecode of a first camera is not related to the timecode of a second camera.

In order to determine whether two angles can be synchronized using timecode data, some embodiments first determine whether timecode was used to order both the angles. If timecode was not useful for ordering an angle (e.g., because the timecode of clips within the angle overlap), then the application will not use the timecode data for synchronizing the angle. For example, the timecode data for the "Close-up" angle 1355 was not useful for sequencing the clips of that angle, and thus will not be used for synchronizing angle 1355 with the "Wide Shot" angle 1350. When both of the angles were sequenced using timecode data, then the application compares the timecodes for one of the angles with the timecodes for the other angle. Some embodiments require that the timecodes of the first angle at least partially overlap with the timecodes of the second angle in order to use the timecode data, while other embodiments require that the total time spanned by the timecodes not be greater than a threshold duration (e.g., one hour, twenty-four hours, seventy-two hours, etc.). That is, if the timecodes of a first angle run from 01:00:00:00 to 03:00:00:00, while the timecodes of a second angle run from 22:00:00:00 to 26:00:00:00, this would be over a twenty-four hour threshold in some embodiments. Other embodiments compare the gap between the two sets of timecodes (nineteen hours in the above example) rather than the overall time spanned to the threshold duration.

Some embodiments compare the timecode data of the currently selected angle to each angle already synchronized to determine whether the currently selected angle can be synchronized with any of the other angles. For instance, the first two angles might be synchronized using time of day information, but the third angle could synchronize to one of the first two angles using timecode information. When the current angle can be synchronized to a particular other angle using timecode data, the process uses this timecode data. However, when the current angle cannot be synchronized to any of the angles using timecode data, then the media-editing application of some embodiments will attempt to use time of day information.

Some embodiments apply similar constraints on the use of time of day information as described above for timecode data, such as requiring that the span of the current angle at least partially overlaps or is within a threshold duration of another angle to which it is compared. If a user has set all of his different cameras to the correct time, then the time of day data will often be overlapping (at least in the case of simultaneous filming of a scene by the multiple cameras), and thus useful. For instance, although the timecode information of the example "Close-up" angle 1355 is not useful, the time of day information for its clips 1310 and 1320 (running from 5:36 PM to 6:13 PM) overlaps with the time of day information for the clips 1305, 1325, and 1315 of the "Wide Shot" angle 1350 (running from 5:35 PM to 6:12 PM). As in the previous section, the timecode information is still useful to determine the duration of the clips (and thus the duration of the angle).

Still images, as described above, are ordered using their Exif data, or creation date information when the Exif data is unavailable. The media-editing application compares the timestamps of these types of data with the time of day information of the video or audio clips in other angles in a similar manner to that described above (i.e., determining whether the timespan of the first angle overlaps or is close to that of another angle). In addition, some embodiments may include still images and video/audio clips in the same angle (e.g., when a digital camera is used to both take still images and shoot video). In this case, the Exif dates may be considered along with the video's time of day information as the same sort of metadata for both ordering and synchronization purposes.

When the timing metadata (either the timecode or the time of day information) is useful to synchronize the currently selected angle with at least one of the other angles, then the process synchronizes (at 1625) the current angle to the set of synchronized angles using the timing metadata. Thus, for example, if two angles that have already been synchronized using their timecode, but the currently selected angle only includes time of day information which overlaps with time of day information for one of the other two angles, then the application will attempt to synchronize the current angle to the angle with overlapping time of day information using that angle's time of day information rather than its timecode. If a first angle has time of day information, a second angle has both time of day information and timecode information, and a third angle only has timecode information, in some embodiments the application is enabled to synchronize these three angles together by synchronizing both the first and third angle to the second angle.

In some embodiments, synchronizing an angle to a set of angles involves inserting (or adjusting) a gap clip at the start of one or more of the angles, unless the currently selected angle starts at exactly the same time as the earliest angle in the set. When the current angle starts at an earlier time than any of the already synchronized angles, then the application inserts a gap at the start of the other angles with a length equal to the offset of the current angle. If one of these angles already has a gap clip, then the application extends this gap by the length of the offset. When the current angle starts after at least one of the other angles, the application inserts a gap at the start of the currently selected angle with a length equal to the offset.

Figure 17:
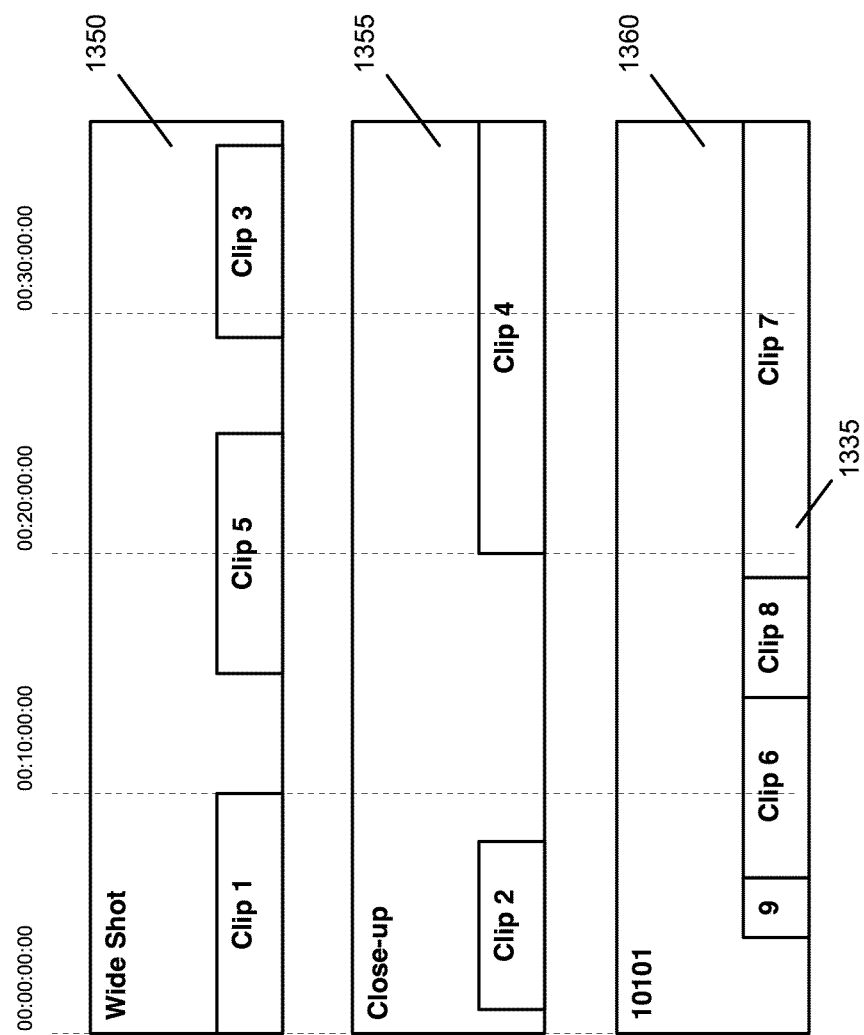
FIG. 17 illustrates the alignment of the sequences from FIG. 15 using the metadata for clips shown in FIG. 13.

As FIG. 17 illustrates, when synchronizing the "Close-up" angle 1355 to the "Wide Shot" angle 1350, the application inserts a one minute gap at the start of the "Close-up" angle 1355 because it starts at 5:36 (compared to 5:35 for the "Wide Shot" angle 1350). The third angle "10101" 1360 starts at 5:40, so the application inserts a five minute gap at the start of this angle. In addition, the application extends out the duration of the still image clip 1335 for eighteen minutes (from 5:50 to 6:13 PM). Some embodiments do not extend a still image clip that is the last clip in an angle all the way to the end of the media clip, but instead place a maximum length on the still image (e.g., one minute, five minutes, etc.).

On the other hand, when the process 1600 cannot find timing metadata with which to accurately synchronize a currently selected angle, the process synchronizes (at 1630) the angle to the set of synchronized angles without using timing metadata. In some embodiments, the application starts the first clip of the angle at the same time as the first clip of the angle with the earliest start time. In some embodiments, this is accomplished by simply not inserting a gap clip at the start of the collection representing the angle. So long as the anchor offset of the angle collections is kept at zero, then any angles that do not start with a gap clip will have the earliest start time in the multi-camera media clip.

As shown at stage 1150 of FIG. 11, some embodiments allow a user to choose that the media-editing application synchronizes all of the angles at the start of the first clip of each angle. When a user selects this option, rather than looking at timing metadata for synchronizing, the application orders the different angles using the timing metadata (or as specified by the user), then simply aligns the angles so that they each start at the same time. In some embodiments, this alignment is simply performed by not inserting gap clips at the start of any of the angles, because the angles are all anchored to a gap clip with the same anchor offset (0, 0), as described below by reference to FIG. 20.

In addition, the application allows a user to choose to synchronize the angles via a first marker in each angle. Users can set markers on clips, which in some embodiments are stored as clip data structures with a one-frame duration, anchored to the marked clip at a particular time in the clip. With this option selected, the application will identify the first marker in each ordered angle, then insert gap clips at the start of the angles as necessary so that these markers are aligned. This allows users to identify a particular frame in one clip from each of several cameras, and mark this frame for alignment with other such frames. This may be especially useful when a user films a scene from multiple different angles and can identify a specific frame as representing the exact same time in the different angles.

Returning to FIG. 16, after synchronizing the current angle, the process 1600 determines (at 1635) whether additional angles remain to be synchronized. When all of the angles have been synchronized, the process ends. Otherwise, the process returns to 1615 to select the next angle and synchronize this angle with the other previously synchronized angles.

The process 1600 is one conceptual example of a process of some embodiments for synchronizing angles using timing metadata (or other criteria if the timing metadata do not provide adequate information). Other embodiments use different variations of the synchronization process that may vary somewhat from process 1600. For instance, some embodiments initially attempt to synchronize all of the angles at once using timecode information. The process determines whether all of the timecodes of the various angles overlap with each other to some extent (i.e., whether there are any gaps in the overall timecode, treating each angle as a continuous block) or whether all of the timecodes fit within a particular time range (e.g., a day), depending on the criteria used by the application (this criteria may be a default setting or a user-determined setting, in some embodiments). When the timecode data fits the required criteria, the application aligns all of the data using these timecode. In some embodiments, when there are only one or two outlier angles, the application synchronizes the other angles using their timecode and then aligns the outlier angles with the start of the first clip of the earliest angle.

Some embodiments instead try to use time of day information for all of the angles when the timecode for at least one of the angles does not pass the criteria for synchronization. The application then applies similar criteria to the time of day information for the angles (determining whether all of the angles overlap or whether all of the angles are within a threshold duration). If all of the angles can be aligned with the time of day information, then the media-editing application uses this time of day information to synchronize the angles. If the time of day information cannot be used for all of the angles, then different embodiments may apply different options.

For example, some embodiments use whichever metadata passes the usefulness criteria for the greatest number of angles to synchronize those angles, then attempts to synchronize the other angles to any of the synchronized angles using time of day information. Any angles without useful timing metadata will start at the beginning of the multi-angle clip. As will be described in Section IV, some embodiments allow the user to re-align the angles manually after the application automatically creates the multi-camera clip.

D. Fine-Tuning Synchronization

In addition to synchronizing the angles of a multi-camera media clip based on timing metadata of the individual clips, some embodiments fine tune this alignment using audio comparisons between clips in different angles. In some embodiments, the media-editing application compares clips from different angles that overlap in time in order to identify clips that have the same (or similar) audio or same (or similar) sections of audio. The application can then determine an offset between the audio of the two clips and re-align one of the clips to compensate for the offset. A process of some embodiments for analyzing audio in order to synchronize clips is described in detail in the U.S. patent application Ser. No. 13/019,986, now issued as U.S. Pat. No. 8,621,355, entitled "Automatic Synchronization of Media Clips", filed Feb. 2, 2011, which is incorporated herein by reference. Rather than comparing entire clips, which may be a processing-intensive procedure, some embodiments assume that the initial synchronization will be accurate to within a particular threshold (e.g., five seconds, one minute, two minutes, etc.) and only compare audio of one clip to audio of other clips within that threshold in the timeline of the multi-camera media clip.

Figure 18:
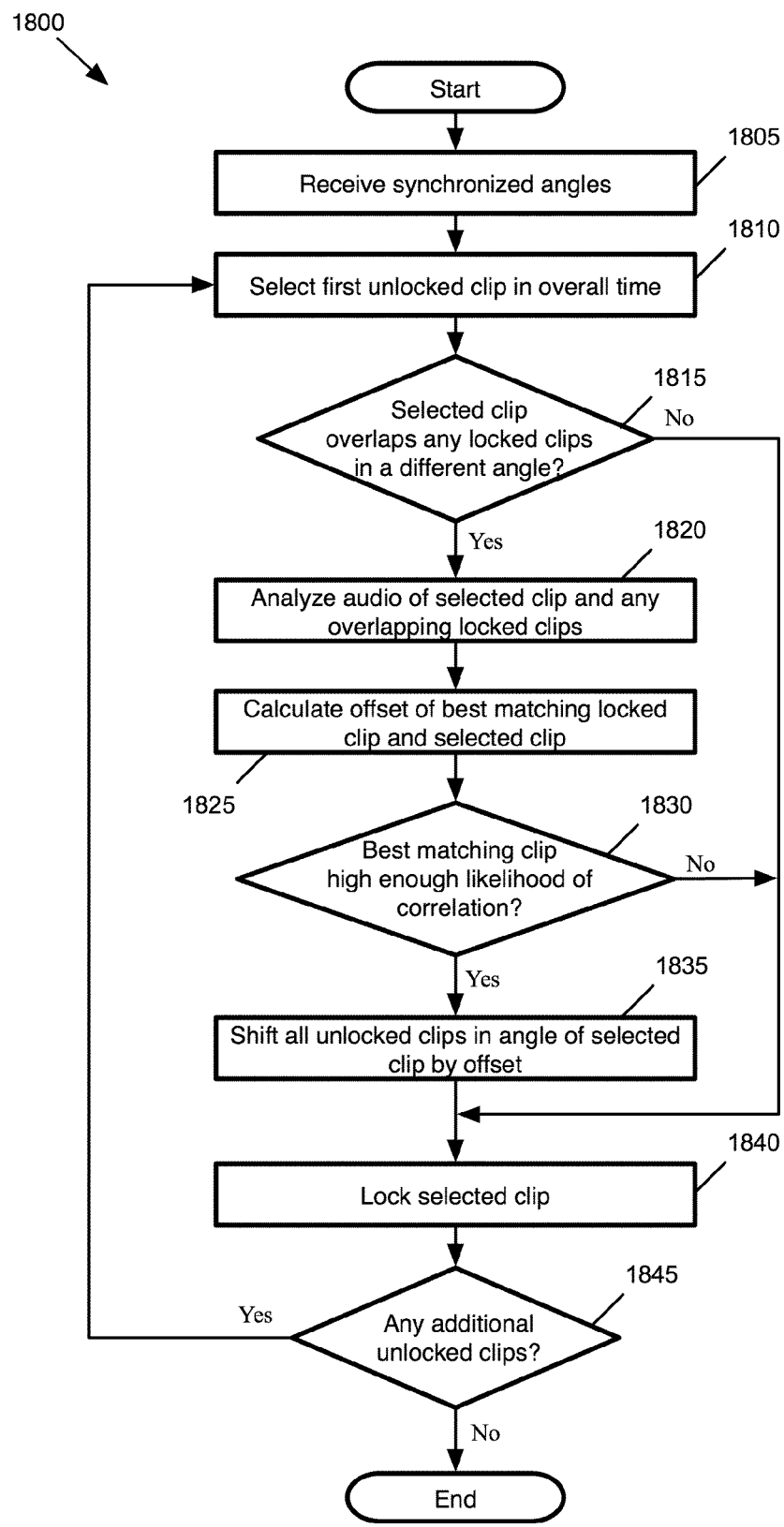
FIG. 18 conceptually illustrates a process of some embodiments for synchronizing media clips across a set of angles within a multi-camera media clip.

FIG. 18 conceptually illustrates a process 1800 of some embodiments for synchronizing media clips across a set of angles within a multi-camera media clip. The process 1800 will be described by reference to FIG. 19, which illustrates the fine-tuned audio synchronization of the angles 1350-1360 over four stages 1910-1940.

The process 1800 begins by receiving (at 1805) a set of synchronized angles of a multi-camera media clip. In some embodiments, the angles (groups of media clips) have already been synchronized based on timing metadata of their media clips using the process 1600 or a similar alignment process. As described above, some embodiments store these angles as collection clip structures within a multi-camera clip structure, which itself is a collection clip structure. The clips might all be video clips with accompanying audio (e.g., clips with a video component to which an audio component is anchored, as described above in Section II), or include a number of audio clips with no video component, video clips with no audio component, and still image clips (which generally lack an audio component). In the example shown in FIG. 19, only the first two angles 1350 and 1355 contain clips with audio data, and thus only these clips will be adjusted by the audio synchronization.

The process selects (at 1810) the first unlocked clip in the overall timeline of the multi-camera media clip. In some embodiments, the process selects clips starting at the beginning of the timeline and moving towards the end of the timeline, locking the clips into place one at a time. In this context, to say that a clip is locked means that the process 1800 has evaluated the clip and will no longer move the clip along the overall timeline of the multi-angle media clip. Once a clip is locked, other clips may be shifted along the timeline to align their audio with that of the locked clip.

The process determines (at 1815) whether the selected clip overlaps any locked clips in a different angle (i.e., an angle other than that to which the selected clip belongs). That is, the application identifies whether the span of the currently selected clip in the overall timeline of the multi-camera media clip overlaps the span of any clip that has been flagged as locked. In some embodiments, in order to save processing, the media-editing application only compares the audio of clips that overlap, rather than comparing each clip's audio to the audio of all other clips in different angles. When the selected clip does not overlap any locked clips, the process locks (at 1840) the selected clip. Because there are no locked clips when the first clip is selected, the application automatically locks this first clip into place.

Figure 19:
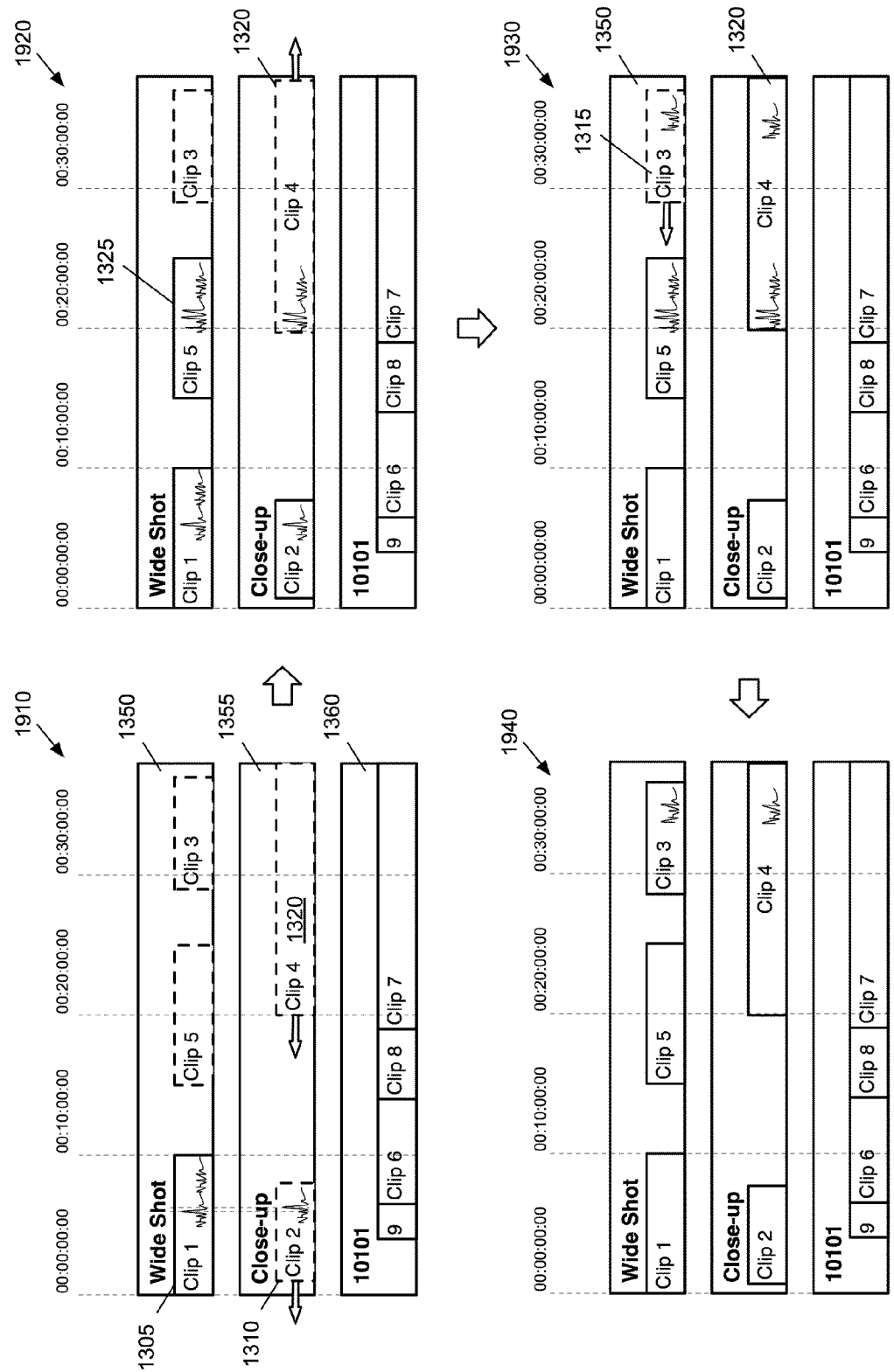
FIG. 19 illustrates the audio synchronization of the angles from FIG. 17.

The first stage 1910 of FIG. 19 illustrates that initially the first clip 1305 is locked. In this figure, the locked clips are illustrated with solid lines while clips that have not yet been locked are drawn with dashed lines. As such, the other four video clips (with accompanying audio) are drawn with dashed lines at the first stage 1910. The clips of angle 1360 are shown as locked because they are not candidates for audio synchronization, as they represent still images without accompanying audio.

When the selected clip overlaps at least one locked clip in a different angle, the process analyzes (at 1820) audio of the selected clip and all of the overlapping locked clips. In some cases, this will be many clips (when there are numerous angles), some of which will have already been aligned with each other by previous iterations of this process. Referring again to FIG. 19, the next clip selected is the clip 1310, which overlaps the locked clip 1305. As shown, both of these clips include audio components, which can be compared with each other.

The media-editing application of some embodiments uses a process described in detail in U.S. patent application Ser. No. 13/019,986, incorporated by reference above, to compare the audio of two clips. In short, the algorithm of some embodiments compares two audio clips using cross correlation or phase correlation to produce a correlation function that indicates the likelihood of a match for all possible time offsets of the two clips. The peak value of this correlation function thus indicates the most likely alignment of the two audio signals.

Rather than using the extensive processing resources needed to calculate such a correlation function for the entire duration of each pair of audio clips, some embodiments generate the function up to a maximum offset (e.g., two minutes). By performing the initial synchronization using the timing data, the media-editing application increases the likelihood that the audio will already be close to being synchronized, with the errors in alignment being due to not having clocks or timecode perfectly aligned across different devices (due to human error in device setup, clock drift, etc.).

In addition to comparing the audio of two overlapping clips, some embodiments also compare previously-generated waveform data for the two clips. In some embodiments, the media-editing application automatically generates audio waveform data for each clip containing audio information. The application uses this generated data to display audio waveforms for the clips (e.g., in the clip browser or the composite display area). When this waveform data is available, the application compares the waveform of the two clips for similarities. In many cases, this comparison can be performed significantly more quickly than comparing audio data. Thus, some embodiments use a combination of the audio waveform data and the audio data to determine the correlation of the different time offsets. For instance, some embodiments initially use the audio waveform information to approximate a peak correlation offset for two clips, then further fine-tune the offset with the audio data.

As an example, some embodiments generate waveform data points for every 500 (or 100, 1000, etc.) audio samples. Thus, the offset from the waveform data can be treated as precise to within 500 samples (if the audio sample rate is 48 kHz, then this is 1/96 seconds, or 1/4 frame for 24 fps video). The application then uses a small range of audio offsets (e.g., five seconds, ten seconds, etc.) around the identified offset to more precisely identify a peak offset for the two clips.

After comparing the audio (and/or waveform data) of the selected clip to each of the overlapping locked clips, the process calculates (at 1825) the offset of the best matching locked clip and the selected clip. As stated, in some embodiments each of the comparisons generates a peak offset correlation value that indicates (i) the offset of the two clips producing the best correlation and (ii) the likelihood that this peak correlation is indicative of a match. Some embodiments identify the offset between the selected clip and any of the overlapping clips that produces the highest likelihood of a match (e.g., 20%, 75%, 90%, etc.).

The process then determines (at 1830) whether this best matched clip has a high enough likelihood of correlation to be used for synchronization. Some embodiments use a minimum threshold correlation value to prevent the media-editing application from shifting clips off of the initial synchronization when there is a low probability of the audio indicating a match. For instance, some embodiments require at least a 50% likelihood of correlation, or even a 70% likelihood, in order to shift the audio, though other embodiments do not require as high a likelihood of correlation.

As mentioned, some embodiments generate the correlation values up to a maximum offset. Some embodiments initially use a first maximum offset (e.g., 10 seconds) and determine whether the peak offset has a high enough correlation. When the correlation at this offset is not above the threshold, the process expands the range and calculates correlation values up to a second, larger maximum offset (e.g., 2 minutes). If the peak correlation value is still not above the threshold likelihood, the process expands the range to the entirety of the two clips. At this point, if the peak offset does not have a high enough correlation, then the process assumes that there is no match.

In addition to determining whether the peak offset has a high enough correlation, some embodiments identify multiple peaks (e.g., 10-20 peaks within the sampled range). The application then compares the highest peak to the other peaks to ensure that the maximum correlation found is more than a second threshold value higher than the other peaks. That is, the application determines whether the peak offset is significantly more likely of an alignment than other offsets in the range. If the difference is not large enough (i.e., does not exceed the second threshold value), then the process does not consider the offset to be a match.

When even the best matching clip does not exceed the threshold correlation value, the process locks (at 1840) the currently selected clip without re-aligning the clip. However, when the best matching clip has a high enough likelihood of correlation, the process shifts (at 1835) all unlocked clips in the angle of the currently selected clip by the peak offset time. Thus, any previously locked clips in the angle (which may have already been synchronized to other locked clips) are not shifted, but the application of some embodiments implements a presumption that other unlocked clips should be shifted by the same offset (e.g., in case the clock for the device that captured the clips in that angle was off by a consistent duration).

In order to shift the unlocked clips, some embodiments adjust the duration of the gap clip that precedes the selected clip (shortening the duration of the gap clip in order to move the selected clip earlier in the timeline, and lengthening the duration in order to move the selected clip later in the duration). Some embodiments may shift a locked clip in the specific instance in which a likely match is found for a selected clip with an offset that would move the selected clip so that it overlaps an earlier clip in the angle. When the correlation value for the selected clip that would move the clip into the overlapping position is greater than the highest correlation value for the locked clip, some embodiments will "release" the locked clip and move it earlier in time as needed to allow for the alignment of the selected clip (e.g., by removing the gap between the selected clip and the locked clip, then shortening the gap before the locked clip).

In some cases, the media-editing application requires that the video be shifted in discrete amounts equal to the duration of a single frame (e.g., $\frac{1}{24}$ or $\frac{1}{30}$ of a second). However, audio recordings are typically sampled in much smaller increments (e.g., $\frac{1}{48,000}$ of a second). In some embodiments, the application determines the offset at the level of the audio sample boundaries, then shifts the video to the nearest frame boundary. For the audio, some embodiments slightly offset the shifted audio by less than the increment of a video frame so that the audio of the shifted clip more closely aligns with the audio that it matches.

The first stage 1910 of FIG. 19 illustrates that the audio of the currently selected clip 1310 is slightly offset from the audio of the locked clip 1305. As indicated by the arrows, the media-editing application moves both the clip 1310 and the clip 1320 earlier in the timeline of the multi-camera media clip, the result of which is shown in stage 1920. In order to perform this shift, the application modifies the duration of the gap clip that precedes the clip 1310 in the angle 1355.

After shifting the clips, the process 1800 locks (at 1840) the selected clip. In some embodiments, as stated, this involves setting a flag (e.g., in volatile memory) that the clip is locked and should no longer be moved while performing the audio synchronization. The process then determines (at 1845) whether any additional unlocked clips remain to be evaluated. When additional clips remain, the process returns to 1810 to select the next unlocked clip in the multi-camera media clip. Once all of the clips have been aligned, the process 1800 ends.

The second stage 1920 of FIG. 19 illustrates that the media-editing application has also locked the clip 1325 without moving it. This clip is the next clip selected after aligning clip 1310, but does not overlap any locked clips in other angles. As such, the application locks this clip and moves on to evaluating the next clip 1320. The second stage 1920 illustrates that the audio of clip 1320 is slightly offset from that of the clip 1325. As such, the application shifts the clip 1320 slightly later in the timeline (by increasing the duration of the gap clip between clip 1310 and clip 1320, in some embodiments).

The third stage 1930 illustrates that the application has moved the clip 1320 slightly later in the multi-camera clip timeline and locked the clip 1320. In addition, the figure illustrates that the audio of the clip 1315, in the first angle 1350, is slightly offset from that of the now-locked clip 1320. As such, the application moves the clip 1315 earlier in the timeline of the multi-camera media clip (by decreasing the duration of the gap clip between clip 1325 and clip 1315).

The fourth stage 1910 illustrates the timeline of the three angles of the multi-camera media clip after the audio synchronization process. One of ordinary skill in the art will recognize that in many cases, multi-camera media clips will have more than two tracks with audio clips and more than two or three clips per track. In such a clip, the synchronization will propagate through the multi-camera clip (e.g., as shown in stages 1920-1940 for clips 1325, 1320, and 1315) as each individual clip is aligned within the overall multi-camera clip timeline.

E. Data Structure for Multi-Camera Reference Clip

Figure 20:
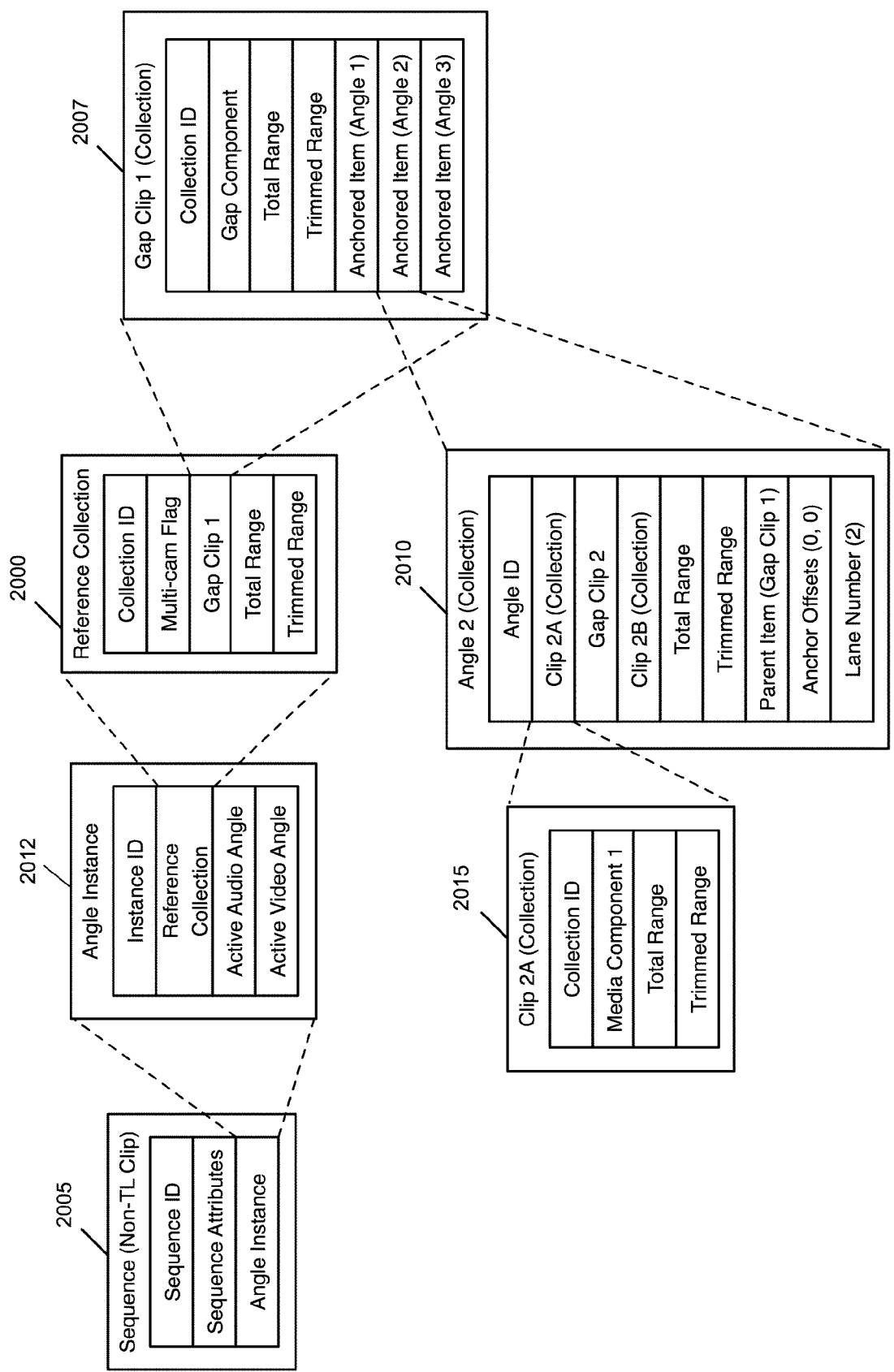
FIG. 20 conceptually illustrates a subset of the data structures of a multi-camera media clip created in an event of the media-editing application of some embodiments.

The above sub-sections referred to the multi-camera media clip data structure created by the media-editing application. For some embodiments, FIG. 20 conceptually illustrates a subset of the data structures contained by a multi-camera media clip created in an event of the media-editing application. As mentioned above, in some embodiments the application stores a reference multi-camera clip in an event data structure of the application, then defines instance clips in one or more media projects that refer to the reference clip and inherit properties from the reference clip. The reference multi-camera media clip 2000 illustrated in FIG. 20 is an example of such a reference clip. In some embodiments, reference clips are only used for multi-camera media clips. However, other embodiments enable reference clips (and correspondingly, clip instances that refer to the reference clips) for any compound clip or even for all types of clips. As such, one of ordinary skill in the art will recognize that the properties of reference clips described herein for multi-camera media clips may also be applicable to other types of clips.

As shown, the nested sequence of clip objects that defines the multi-camera media clip is similar in structure to the objects illustrated in FIG. 6. The figure illustrates a sequence 2005, an angle instance 2012, a reference collection 2000 (the multi-camera media clip), a gap clip 2007 contained by the reference collection 2000, one of the angle collections 2010 of the multi-camera media clip, and one of the clips 2015 of the angle collection 2010. In some embodiments, each of the clip objects shown in this figure is a member of the same class, though the objects may be of different sub-classes. The set of data structures shown in FIG. 20 might be the output of the multi-camera clip creation process described by reference to FIG. 10.

As indicated in Section II, some embodiments create a sequence within the event object for each media file in the event. This includes not only clips imported into the event, but also compound clips or multi-camera clips created in the event. The sequence 2005 is an example of such a sequence for an event clip. The sequence 2005, like sequence 605 of FIG. 6, stores a sequence ID, a set of sequence attributes, and the angle instance object 2012. The sequence attributes, in some embodiments, include the resolution, frame rate, and other video and audio properties for the sequence. As shown in FIG. 11, some embodiments provide the user with the option of customizing these sequence attributes for a multi-camera clip or inheriting them from the media clips used to generate the multi-camera media clip.

The angle instance 2012 is an object that contains (or wraps) the reference collection 2000. In addition, the angle instance 2012 indicates an active video angle and active audio angle that are used when the multi-camera clip is added to a sequence in the timeline. These active angles can be selected by a user of the media-editing application in some embodiments (e.g., through the angle viewer or the inspector). The angle instance data structure, as used in timeline sequences, will be described in further detail below.

The reference collection 2000, as stated, can be thought of as the multi-camera clip object. One of ordinary skill in the art will recognize that this is only one of many possible ways to implement such a clip object. The reference collection object 2000 is a collection object similar to collection objects 610 of FIG. 6 or 810 of FIG. 8 (a compound clip object), and similarly includes a collection ID. To indicate that the collection is a multi-camera clip, the object includes a multi-camera flag. This indicates to the media-editing application to display a multi-camera indicator over the clip, as well as to provide the functionality associated with multi-camera clips (described in the sections below). The reference collection 2000 includes a single gap clip 2007 in its array, with no content.

The gap clip 2007 includes a collection ID, a gap component with no content, and a total and trimmed range. In some embodiments, the gap clip is a component or a generator rather than a collection. Regardless of how the gap clip is implemented, it does not refer to any actual media, but instead produces a solid black output. In some embodiments, the duration of the gap clip 2007 varies based on the length of the longest angle in the clip.

In some embodiments, the angles are stored as connected storylines, which are collections anchored to the gap clip in the reference collection. In some embodiments, the connected storylines are anchored to the start of the gap clip (i.e., with an offset of 0, 0). As shown, the gap clip 2007 includes three anchored items (Angles 1, 2, and 3).

These anchored items are each themselves collections that store information for one of the angles of the multi-camera media clip. In this case, the multi-camera clip includes three angles. The second of these angles is represented by the collection clip 2010, and the other two would have a similar structure (with different clips in their respective arrays). As shown, the collection clip 2010 includes an angle ID, an ordered array of two content clips separated by a gap clip, total and trimmed ranges, anchoring information to the parent gap clip (Gap Clip 1) with an offset of 0, 0 (as each angle is anchored to the start of the gap clip 2007), and a lane number that indicates the order of the anchored item in the multi-camera media clip (in this case, 2). Some embodiments, however, use non-zero anchor offsets to synchronize angles within a multi-camera clip rather than inserting gap clips at the start of the angles.

The angle ID is a unique ID that identifies the angle. In some embodiments, the angle collection 2010 also stores an angle name, which the user can change. Even when a user changes the angle name, the angle ID stays constant so that the media-editing application does not need to update any clip instances that refer to the angle.

The array includes all of the clips of the angle arranged in time order. In this case, the angle has only two clips (Clip 2A and Clip 2B). Unless the clips are not separated at all in the multi-camera clip timeline (e.g., because the timing metadata was not useful for spacing the clips in the angle), then the application inserts a gap clip between clips in order to space out the clips in the multi-camera timeline. In addition, when the first clip starts at some point after the beginning of the multi-camera clip timeline, some embodiments insert a gap clip as the first clip in the array. In the case of angle 2010, Clip 2A starts at time zero of the overall timeline and thus this clip is the first clip in the array (i.e., there is no gap clip to start the array).

As shown, the clip 2015 (Clip 2A) is a collection clip similar to clip 610, with a single media component in its array (e.g., a video component) and a second component (e.g., an audio component) anchored to the first component (not shown for simplicity). As with clip 610, described in detail above in Section II, these components are themselves clip structures that refer to media asset data structures. In some embodiments, the clips within the array of an angle collection could also be compound clips that contain additional collections. Other embodiments only allow simple collection clips that contain components (such as clip 2015) within multi-camera clips.

IV. Editing Multi-Camera Reference Clips

The above section described the automatic creation of multi-camera media clips from several media clips (either using default settings of a media-editing application or preferences input from a user). Once the media-editing application creates a multi-camera clip, a user may edit the reference multi-camera clip as well as add instances of the multi-camera clip to a media project (both in the primary compositing lane of a project as well as in secondary anchor lanes). These instance clips each have an active audio angle and active video angle, which determine the content of the multi-camera media clip that is actually part of the media project. Users can switch the active angle in a variety of different ways, or blade the clip instance into two clip instances at a particular frame boundary in order to enable seamless switching from one angle to the next.

As stated, in some embodiments the user can manually edit a multi-camera reference clip stored in an event. In some embodiments, the media-editing application provides a display area for manually adjusting the clips within the angles (e.g., aligning clips), adding effects to the clips in the reference clip, renaming, adding, and deleting angles, reordering the angles within the multi-camera clip, etc. This multi-camera clip editing display area is a specific version of the composite display area for multi-camera clips in some embodiments, that does not display the gap clip to which the different angles are anchored, and displays each of the angles as a separate track.

Figure 21:
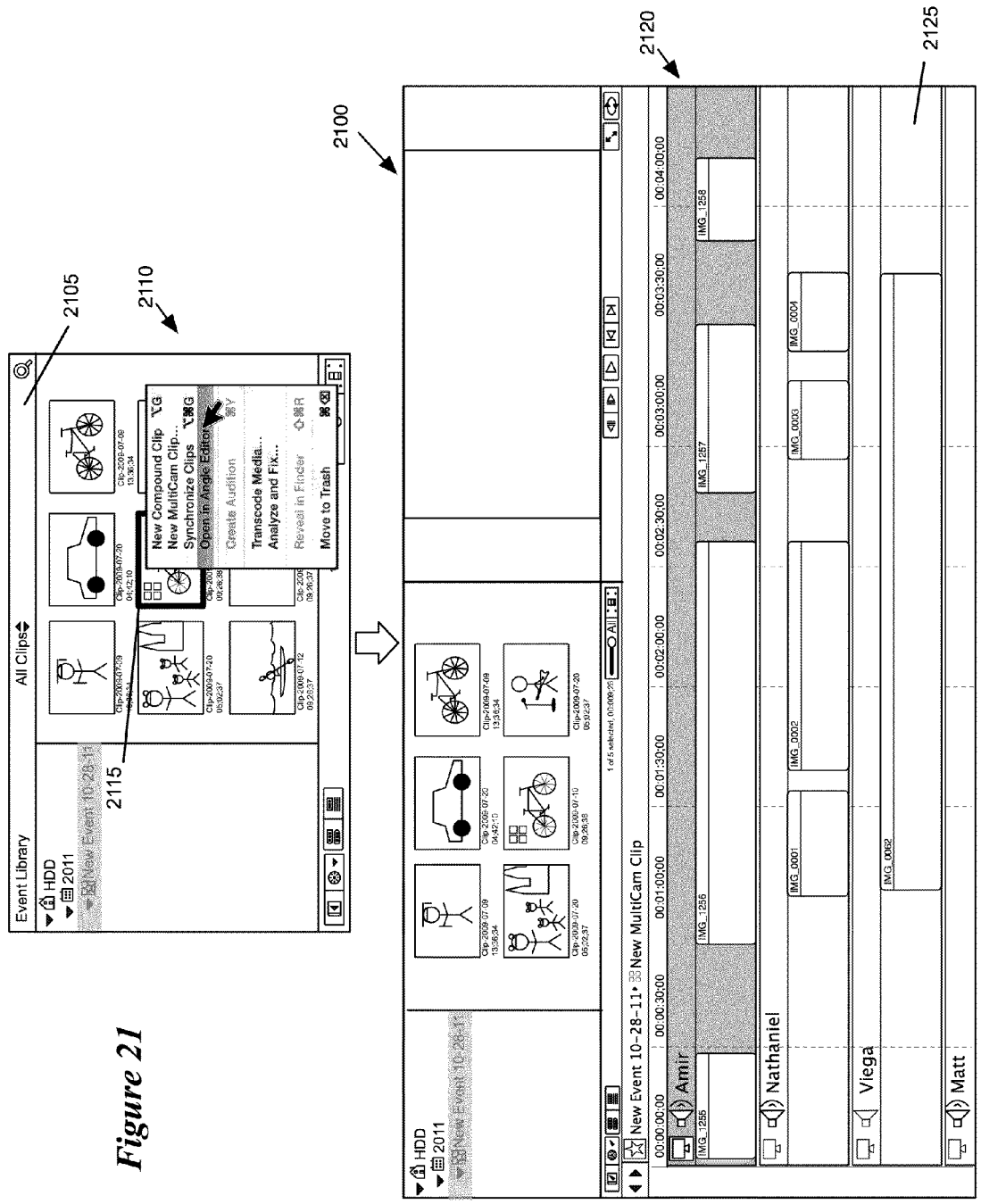
FIG. 21 illustrates the opening of an angle editor display area in a graphical user interface ("GUI") of some embodiments.

FIG. 21 illustrates the opening of such a display area in a graphical user interface ("GUI") 2100 of some embodiments over two stages 2110 and 2120. The first stage 2110 illustrates a clip browser 2105 that includes a multi-camera clip 2115, along with various other clips in the same event. Some embodiments display an indicator over the thumbnail (in this case, four squares) to indicate to the user that the clip is a multi-camera clip. In this stage, the user has selected the multi-camera clip 2115 and activated a drop-down menu for the clip (e.g., through a right-click, two-finger tap, or other user input). As shown, the user is in the process of selecting the option "Open in Angle Editor" for the clip.

The second stage 2120 illustrates the resultant GUI 2100. Many of the display areas in the GUI 2100 were described above in Section I by reference to FIG. 3: the clip library, clip browser 2105, preview display area (not currently displaying any preview images), and inspector display area (not currently displaying any information as no items are selected in the GUI).

In addition, the GUI 2100 includes the multi-camera editing display area 2125. The editing display area 2125 displays the location and name of the selected multi-camera media clip that is open for editing (in this case, the location is "New Event 10-28-11" and the name is "New MultiCam Clip"). This editing display area displays separate tracks for each of the angles in the selected multi-camera media clip. In this case, the angles include at least "Amir", "Nathaniel", "Viega", and "Matt", as these are the angles for which tracks are at least partially shown in the figure. The media-editing application identifies each different angle of the selected multi-camera media clip and creates a track in the editing display area for the angle. As described in the previous sections, some embodiments store the angles as collection clips using the data model for the trackless system described in Section I, but convert the angles for display as tracks in the multi-camera clip editor because each angle can be treated as having a sequence of clips separate (though synchronized with) the clips in the other angles.

Figure 22:
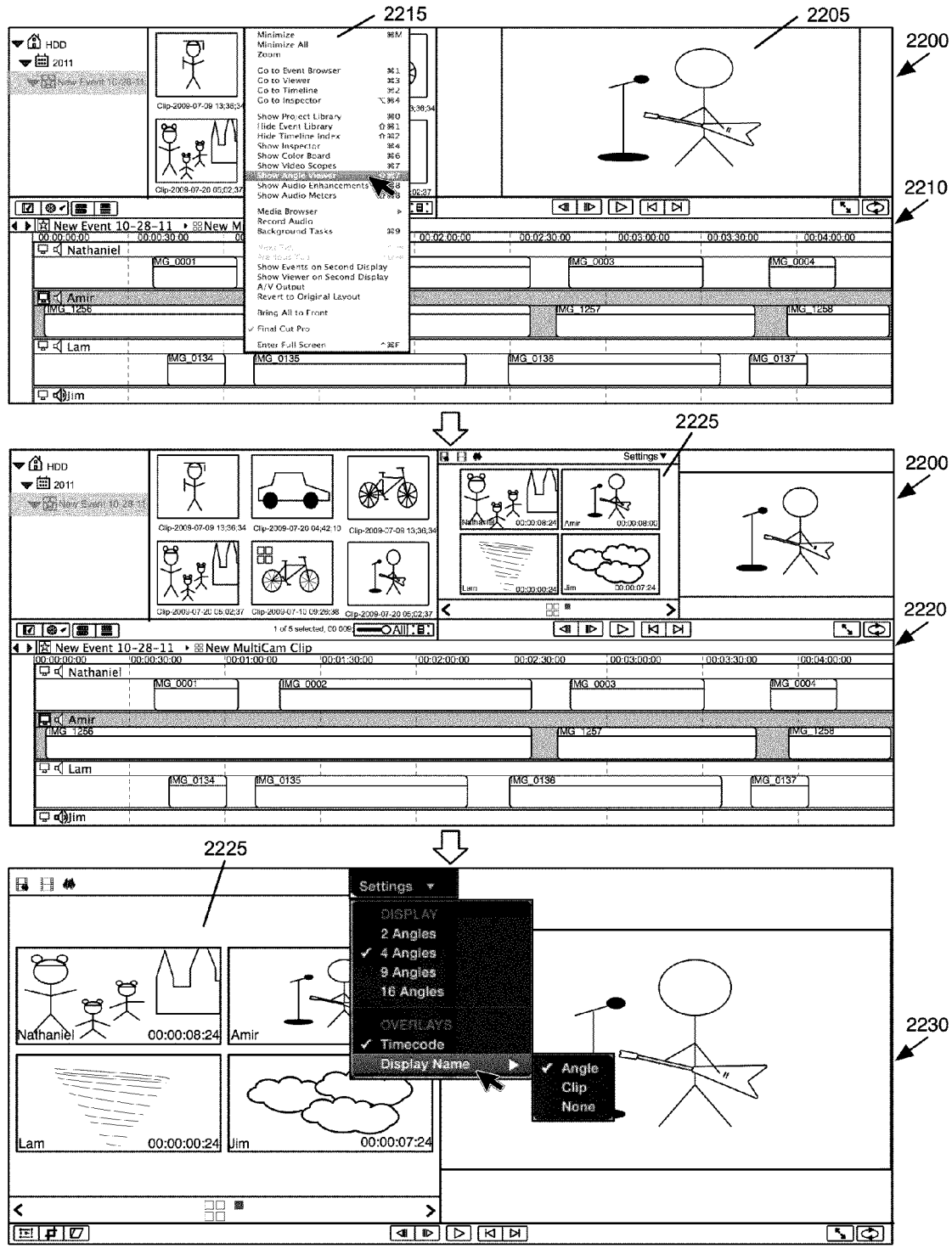
FIG. 22 illustrates a GUI over three stages in which a multi-camera preview display area is opened and options for the display area are accessed.

The following section will describe various features of the multi-camera editing display area, also referred to as an angle editor. Before describing these features, the multi-camera preview display area, also referred to as the angle viewer, will be introduced. FIG. 22 illustrates a GUI 2200 over three stages 2210-2230 in which the multi-camera preview display area is opened and options for the display area are accessed. In the first stage, the GUI 2200 resembles the GUI 2100, including a preview display area 2205. The user has opened a drop-down menu 2215 and is selecting an option of "Show Angle Viewer" from the menu.

The second stage 2220 illustrates the result of this selection in the GUI 2200. The media-editing application decreases the size of the preview display area 2205 and displays the angle viewer 2225 in a portion of the area previously occupied by the main preview display area 2205. In some embodiments, the clip library, clip browser, angle viewer, and preview display area can all be hidden and have their widths varied so as to provide more display room to one or the other of these areas. In addition, one of ordinary skill in the art will recognize that different configurations of the GUI are also possible (e.g., with different display areas in the top or bottom, or the display areas in a different order across the GUI). The angle viewer, as described above by reference to FIGS. 1 and 2, provides preview displays for multiple angles into which the application outputs simultaneous video images from different angles of a multi-camera media clip.

The third stage 2230 illustrates a close-up of the angle viewer 2225 as the user opens a settings menu for the angle viewer. At this stage, the angle viewer displays video images from the first four angles of the multi-angle clip currently open in the angle editor. The four preview windows display an image from a clip in each of four different angles, as well as information about the angles. Within the timeline of the multi-angle clip, these four images come from the same time (e.g., the location of a playhead in the angle editor). The current information for the different angle previews shows the names of the angles displayed in each preview as well as the time of the currently shown image within the individual clip. In some embodiments, this time starts from zero at the beginning of the source video to which the individual clip refers. The settings menu provides various options for the angle viewer 2225. As shown, the user can change the number of preview displays shown in the viewer (in this case, the options are 2, 4, 9, or 16 preview displays). The user can also determine whether or not to display the timecodes, and whether to indicate the angle name, clip name, or not identify the angles at all. One of ordinary skill in the art will recognize that in different embodiments, different combinations of information may be displayed in the angle viewer. With the angle viewer introduced, various functionalities of the angle editor will now be described.

A. Aligning Media Clips

Figure 23:
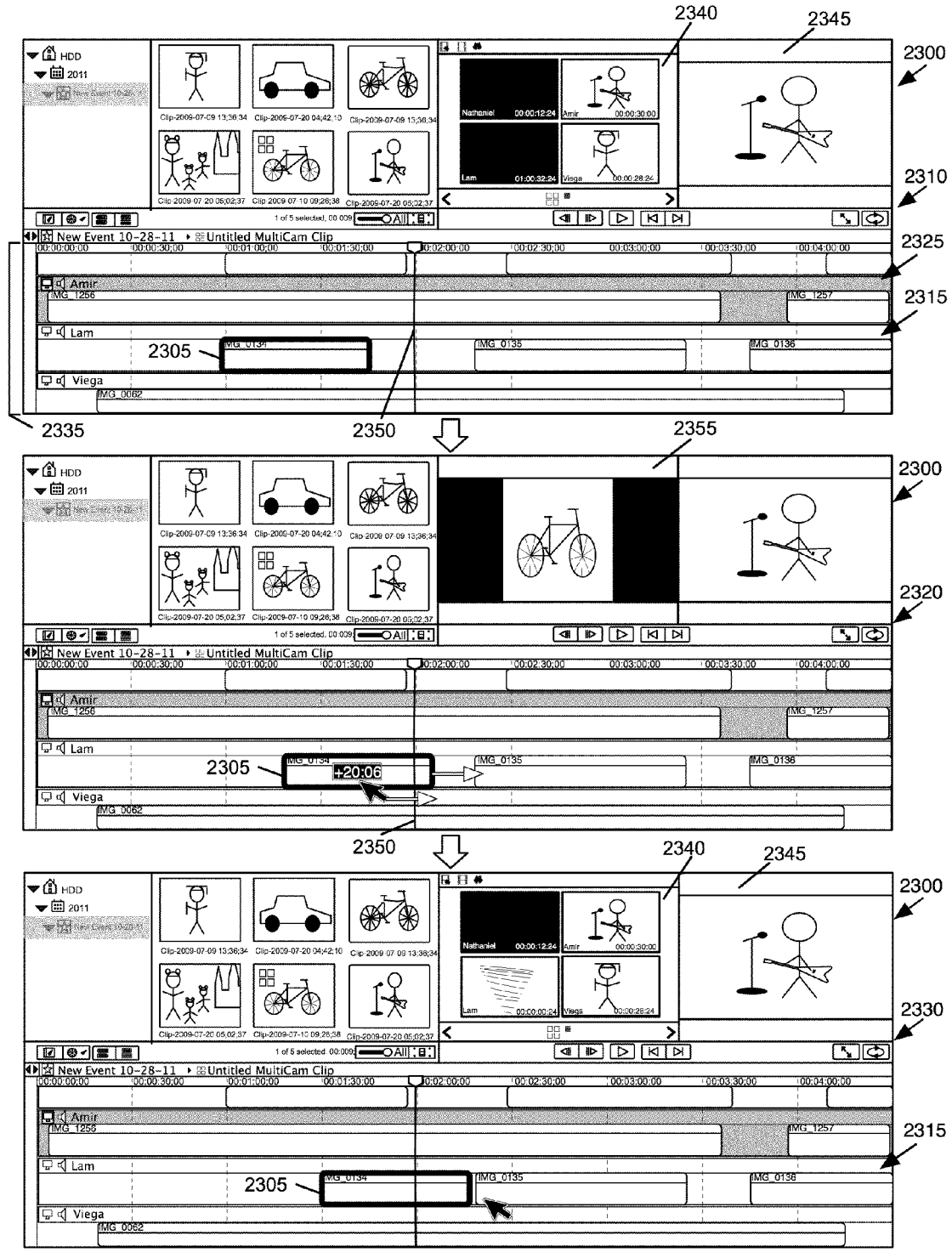
FIG. 23 illustrates the manual alignment of a media clip in a first angle track with a clip in a second angle track by moving the clip along its track.

In some embodiments, users can manually align media clips in the multi-camera clip editing display area as well as use audio synchronization to automatically align media clips in the editing display area. FIG. 23 illustrates the manual alignment of a media clip 2305 in a first angle track 2315 with a clip in a second angle track 2325 by moving the clip 2305 along its track. This figure illustrates this movement over three stages 2310, 2320, and 2330 of a GUI 2300. The GUI 2300 includes, among other GUI items, an angle editor 2335 (which includes the tracks 2315 and 2325, as well as additional tracks), an angle viewer 2340, and a preview display area 2345.

In the first stage 2310, the user has selected the media clip 2305, but has not yet started moving the clip. The angle viewer 2340 currently displays four previews of the first four angles of the multi-camera media clip that is currently open in the angle editor 2335 ("Nathaniel", "Amir", "Lam", "Viega"). As the playhead 2350 is at gaps in the "Nathaniel" and "Lam" angles, the angle viewer shows blank images for these angles. In addition, the preview display area 2345 displays an image from the "Amir" angle that corresponds to a time in the multi-camera media clip over which a playhead 2350 is situated. In the angle editor 2335, the track 2325 (for the "Amir" angle) is currently highlighted as a selected angle, or monitoring angle, and thus the preview display area 2345 displays images from the "Amir" angle. The user can switch the monitoring angle (as described below) in order to determine which angle the media-editing application will display in the preview display area.

As the user moves the media clip 2305 along its track 2315 to the right (later in the multi-camera clip timeline) in the second stage 2320, the media-editing application automatically swaps out the angle viewer 2340 for a second preview display area 2355, which displays images of the selected clip at the location of the playhead 2350. In some embodiments, in order to help a user visually line up images from clips in two different angles, the media-editing application maintains (in the first preview display area) the image from the monitoring angle that corresponds to the playhead location in the timeline. As the user moves the selected clip along its own track over the playhead, the second preview display area skims through the images from the selected clip that correspond to the current time in the clip that is over the static playhead. Thus, a user can select a particular image from a clip in the monitoring angle, then find the image from the selected clip that matches the particular image (i.e., was captured at the same time) and use the playhead to align these images in order to align the clips. As shown, some embodiments display an indicator over the selected clip (the clip being moved) that shows how far the clip has moved from its previous location—in this case, the clip 2305 has been moved twenty seconds and six frames later in the timeline at stage 2320.

The third stage 2330 illustrates the GUI 2300 after the user has finished moving the clip 2305. The media-editing application has replaced the second preview area 2355 with the angle viewer 2340, and now displays an image from the monitoring angle in the preview display area 2345. As shown by this example, in some embodiments the application does not ripple the clips in the angle of the moved clip. That is, when the user moves clip 2305, the other clips in the track 2315 remain stationary. In this way, the application does not remove the alignment of other clips in the angle (which might already be aligned to clips in other angles). Thus, the movement can be thought of as a slide edit of the selected clip, which changes the in and out points of the gap clips on either side of the selected clip. Similarly, if a user modifies the length of a clip in the multi-camera media clip (i.e., trims the clip), the application will treat this as a roll edit rather than a ripple edit, and simply modify the length of the gap clip on the edited boundary of the media clip. If the user wishes to move all of the clips in an angle together, the user can select all of the clips and then move the clips in either direction along the timeline (which increases or decreases the length of the gap clip at the start of the angle. Some embodiments provide a user interface tool for easily selecting all clips in an angle.

In some embodiments, the user can change the monitoring angle within the angle editor, as well as enable or disable audio for the different angles. Some embodiments require only a single monitoring angle, but allow for multiple different angles to have enabled audio. In order to allow for the changes to the monitoring angle and the enabling/disabling of audio, some embodiments provide GUI items for each track in the angle editor.

Figure 24:
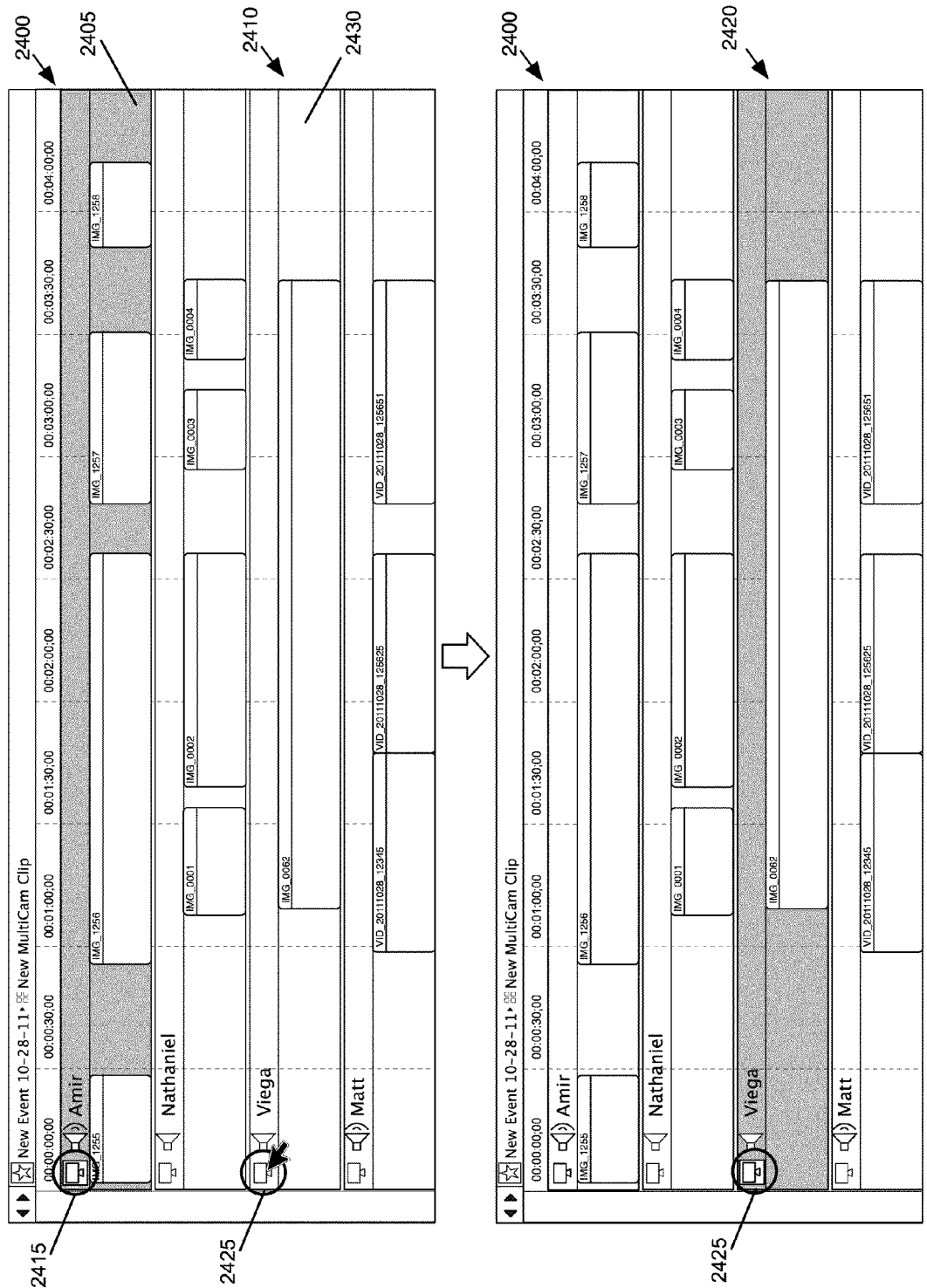
FIG. 24 illustrates a user changing the monitoring angle for a multi-camera media clip according to some embodiments.

FIG. 24 illustrates a user changing the monitoring angle for a multi-camera media clip according to some embodiments. This figure illustrates an angle editor 2400 over two stages 2410 and 2420. In the first stage 2410, the track "Amir" 2405 is highlighted as the monitoring angle. In addition to displaying the track with a different color/shading, the media-editing application highlights a selectable item 2415 in the track. This selectable item 2415 both indicates that the track 2405 is the monitoring angle and would enable the user to select the track 2405 as the monitoring angle when a different track was selected.

At the first stage 2410, the user has placed a cursor over the corresponding selectable item 2425 for the track 2430, and selects this item with the cursor. The second stage 2420 illustrates the result of this selection. The track 2430 for the angle "Viega" is now the monitoring angle, and the application highlights the track as such. Furthermore, the selectable item 2425 is now highlighted, and the application has removed the highlighting from the selectable item 2415 and the track 2405. By changing the monitoring angle, the user determines which angle's images will be displayed in the preview display area (e.g., for aligning clips as shown in FIG. 23).

Figure 25:
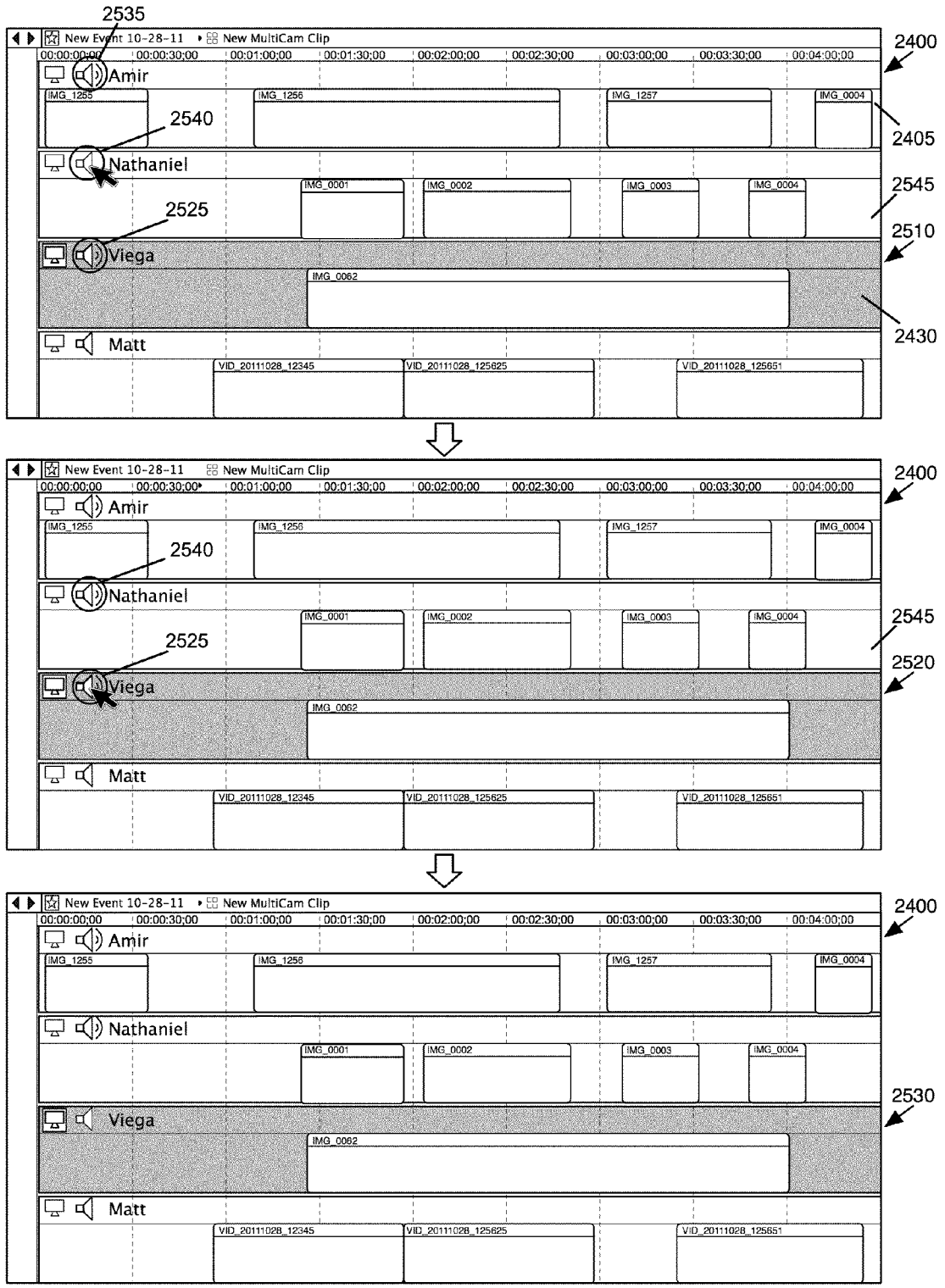
FIG. 25 illustrates a user enabling and disabling the audio for various angles of the multi-camera reference clip.

FIG. 25 illustrates a user enabling and disabling the audio for various angles of the multi-camera reference clip over three stages 2510-2530 showing the angle editor 2400. When a user plays back or skims through a multi-camera clip, some embodiments output the audio of the clip. Whereas only one angle is displayed in the preview display area (the monitoring angle), the media-editing application of some embodiments can combine the audio of the multiple selected signals and output the combined audio.

As with the monitoring angle selectable items (e.g., items 2415 and 2425), each track in the angle editor 2400 has an audio selectable GUI item as well. These audio items enable a user to turn on or off the audio of the different tracks. At the first stage 2510, the monitoring angle "Viega" (track 2430) as well as the angle "Amir" (track 2405) have their audio enabled. The selectable items 2525 and 2535 for these tracks are highlighted, indicating that the audio is enabled.

In this example, the application highlights the selectable items 2525 and 2535 by displaying sound waves coming from the microphone icons). In addition, the user has placed a cursor over the selectable item 2540 for the angle "Nathaniel" (track 2545), and selects this item with the cursor.

The second stage 2520 illustrates the result of this selection, with the selectable item 2540 for track 2545 now highlighted, indicating that the application has now enabled the audio of these angles. In addition, the user has placed the cursor over the selectable item 2525, the audio item for the monitoring angle, and is selecting this item. At the third stage, the item 2525 is no longer highlighted. As this illustrates, the application of some embodiments allows the user to disable the audio of the monitoring angle.

Figure 26:
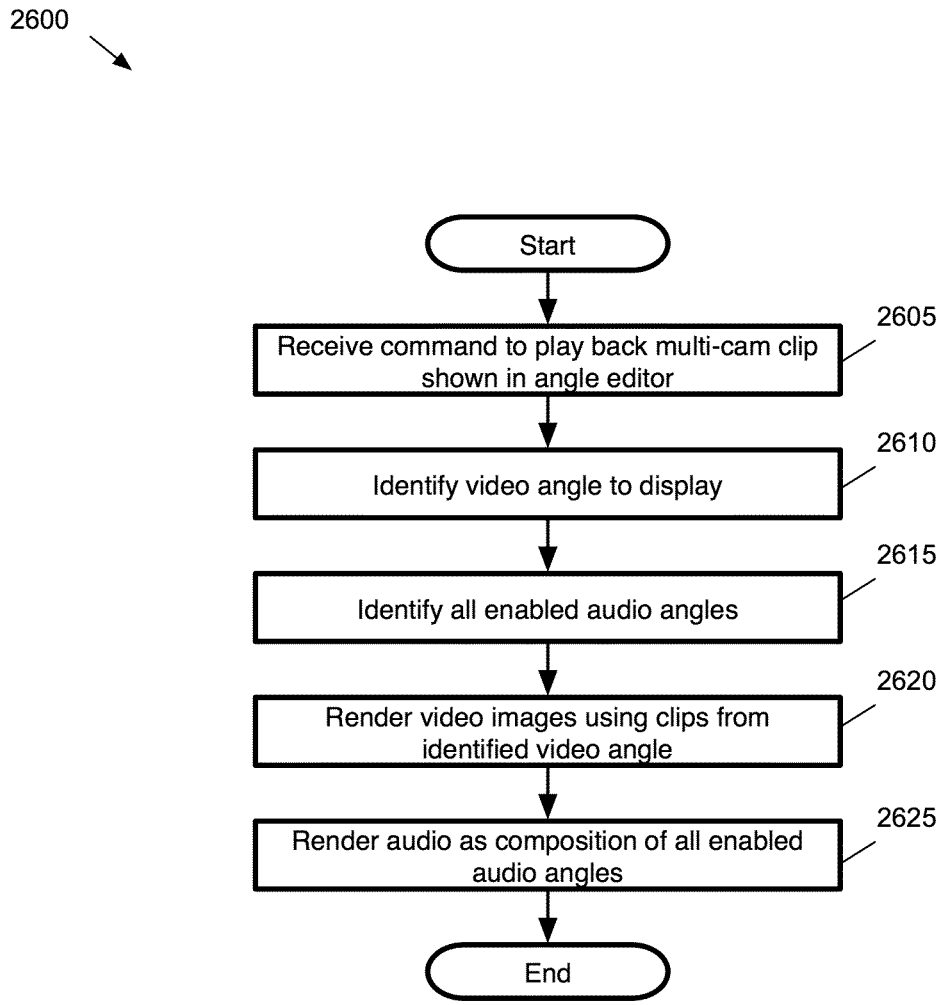
FIG. 26 conceptually illustrates a process of some embodiments for playing back (or skimming) a multi-camera media clip open in the angle editor.

FIG. 26 conceptually illustrates a process 2600 of some embodiments for playing back a multi-camera media clip open in the angle editor. The process begins by receiving (at 2605) a command to play back a multi-camera media clip. In some embodiments, the user can initiate playback through a keystroke (e.g., the space bar), selecting a menu option, selecting a user interface item, etc. When playing back the multi-camera media clip, the playhead moves through the clip's timeline at a constant rate so that the video is played back at real-time speed.

The process identifies (at 2610) a video angle to display in the preview display area. When playing back the multi-camera media clip, the application selects the video monitoring angle. The process also identifies (at 2615) all enabled audio angles. As shown in FIG. 25, multiple angles may be enabled for audio, and these may exclude the monitoring angle.

Next, the process 2600 renders (at 2620) video images in the preview display area using the clips from the identified video angle (i.e., the video monitoring angle). As will be described below in Section VI, rendering these images involves reading the images from a storage, decoding the image (if required), applying effects to the image, and outputting the image. In addition to displaying the image of the identified video angle in the preview display area, some embodiments also display multiple video images for the angle viewer (if the angle viewer is currently displayed in the GUI). The process also renders (at 2625) audio as a composition of all of the enabled audio angles. This may involve using standard audio processing techniques to combine multiple audio signals from the various enabled audio angles. The process 2600 then ends.

The above-described FIG. 26 describes the selection of which angles to render when playing back a multi-camera media clip in the angle editor. In some embodiments, users can play back a particular angle other than the monitoring angle. In this case, the media-editing application of some embodiments switches out the angle viewer for a second preview display area, similar to what is shown in stage 2320 of FIG. 23. The application then plays back the selected angle in the second preview display area while playing the monitoring angle in the primary preview display area. On the other hand, some other embodiments play back the selected angle in the primary preview display while also playing back several angles in the angle viewer (thus swapping out the monitoring angle for the selected angle in the preview display area).

Users can also use the preview display area/angle viewer combination for skimming through an angle or the multi-camera clip. To skim, the user moves a skimming playhead through the multi-camera media clip (e.g., by dragging a finger along a touchscreen, moving the cursor over the clip with a cursor controller, etc.). The skimming playhead, in some embodiments, is separate from a primary editing playhead which remains in place while the user skims through the clip.

When the user skims through the monitoring angle (by moving the cursor through the clips of the monitoring angle), in some embodiments the skimming playhead shrinks down and moves through the track of the monitoring angle. In this case, the angle viewer continues to display the multiple displays for different angles while the preview display area displays images from the monitoring angle. When the user skims through the timeline (by moving the cursor through the timeline ruler), the skimming playhead is displayed over the entire timeline, while again the angle viewer remains to display simultaneous previews of multiple angles while the preview display area displays images from the monitoring angle.

On the other hand, when the user skims through an angle other than the monitoring angle, the application of some embodiments swaps out the angle viewer for a second preview display area that displays the angle through which the user is skimming. In this way, the user can skim through the particular angle to identify a frame that matches that of the monitoring angle shown in the primary preview display area. Similar to the situation illustrated in FIG. 23, the editing playhead remains fixed and thus so does the image from the monitoring angle displayed in the primary preview display area.

When skimming, the application also determines whether audio skimming is turned on. Some embodiments provide a GUI tool that enables users to determine whether to play audio when a user skims through a multi-camera media clip, media project, event clip, etc. When audio skimming is off, the process does not treat any audio as enabled. When either audio skimming is on, or the application is playing back the multi-camera media clip as shown in FIG. 26, the process identifies which of the various angles of the multi-camera media clip have been designated as active.

Changing the video monitoring angle and enabling and disabling audio angles can be used to help with manually aligning media clips within a multi-camera clip. In addition, some embodiments provide functionality for automatic synchronization using audio within the angle editor. For example, if a set of media clips from which the application generates a multi-camera clip does not provide any useful timing metadata, then the clips might be out of order and/or so far out of alignment that the automatic audio synchronization process (e.g., that described above in Section III.d) cannot find any audio matches to use for alignment. In such a case, a user might open the clip in the angle editor and manually align the clips. However, in the absence of specific images that the user can pinpoint as matching between two video angles, achieving perfect alignment may be difficult without audio synchronization.

Figure 27:
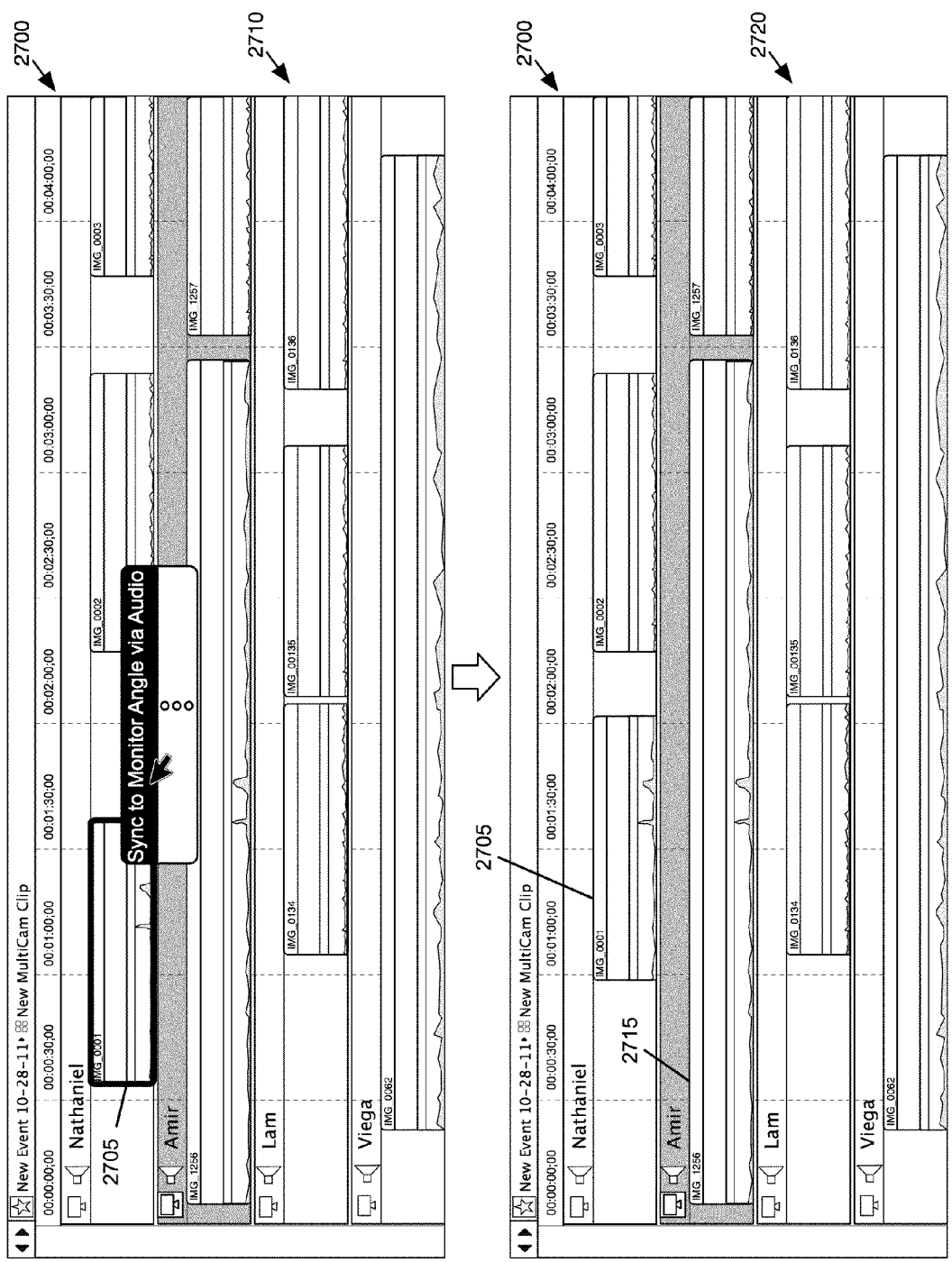
FIG. 27 illustrates the use of a function to automatically synchronize a selected clip to a clip in a different angle in an angle editor.

FIG. 27 illustrates the use of a function to automatically synchronize a selected clip to a clip in a different angle in an angle editor 2700 over two stages 2710 and 2720. In the first stage 2710, the user has selected a media clip 2705 (as indicated by the highlighting around the edges of the media clip), and activated a drop-down menu for the clip that includes the option "Sync to Monitor Angle via Audio". In some embodiments, the user can select a monitoring angle and then synchronize clips in other angles to the monitoring angle using audio synchronization. The second stage 2720 illustrates that the media-editing application has shifted the selected clip 2705 later in the timeline by approximately five seconds in order to align the audio of clip 2705 with the audio of clip 2715. As shown, the peaks in the audio now line up in the timeline.

Some embodiments use similar audio synchronization techniques to those used when initially creating a multi-camera media clip. That is, the media-editing application compares the audio of a selected clip to the audio of a clip (or multiple other clips) in the monitoring angle to identify the likelihood of correlation at various offsets. In some embodiments, the application compares the selected clip to any overlapping clip or clips in the monitoring angle. Some embodiments compare the audio of the selected clip to various offsets within the monitoring angle (e.g., up to two minutes of offset, etc.), or to the entirety of the monitoring angle.

If the peak offset has a high enough correlation value, the application moves the selected clip in the multi-camera clip timeline by this offset value. Some embodiments use a lower threshold for post-creation synchronization on the assumption that the user has more clearly expressed a preference to shift the selected clip in the timeline, and because the user will often select a clip that is very close to correctly aligned and will be using the audio synchronization for fine-tuning.

In addition to providing the option to synchronize a clip to the monitoring angle, some embodiments provide additional options in the angle editor. In various embodiments, users can choose to perform a full audio synchronization of a multi-camera media clip, synchronize a first selected clip to a second selected clip, synchronize a selected clip to the best matching clip in any other angle, etc. Some embodiments allow the user to specify the maximum offset range for the synchronization algorithm (i.e., placing a threshold on how far the media clip may be shifted, which can be used to decrease the processing time for synchronization).

Figure 28:
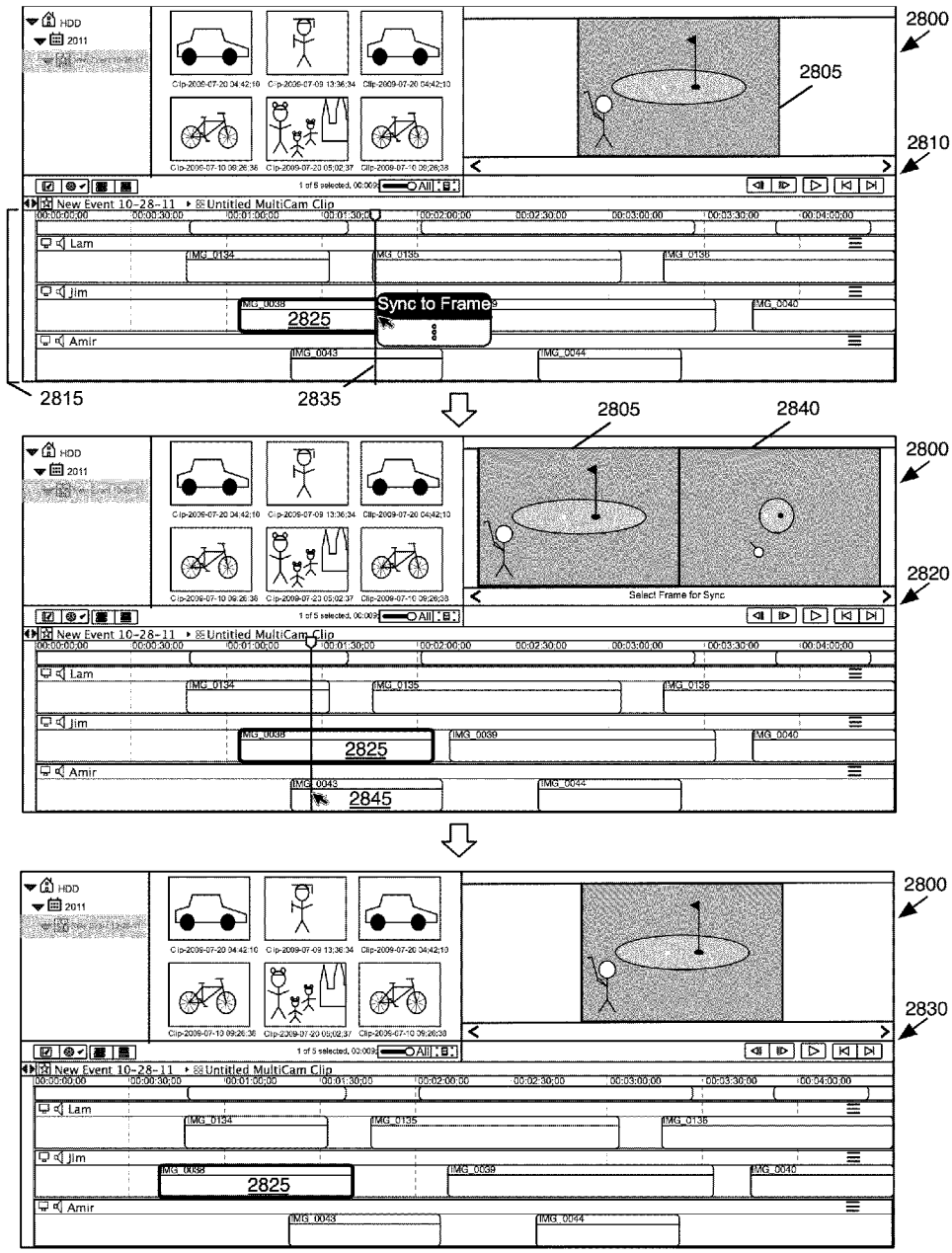
FIG. 28 illustrates the use of a frame matching technique for synchronizing clips in an angle editor.

Furthermore, some embodiments allow the user to identify specific video images from a selected clip in a first angle and a clip in a different angle (either the monitoring angle or another angle). The application moves the selected clip in its angle in order to align the two images, then uses audio techniques to fine-tune the synchronization. FIG. 28 illustrates the use of such a frame matching technique over three stages 2810-2830 of a GUI 2800. As shown at the first stage 2810, the GUI 2800 includes a primary preview display area 2805 and an angle editor 2815. Within the angle editor 2815, the user has selected a particular time (i.e., particular frame, indicated by the location of the playhead 2835) in a selected clip 2825. The user has initiated a menu that includes the option "Sync to Frame".

As shown at stage 2820, the selection of the "Sync to Frame" menu option brings up a secondary preview display 2840 in the GUI 2800. The selected frame from the clip 2825 remains fixed in the primary preview display 2805, while the user can skim through the clips in other angles (angles that do not include the selected clip 2825) in the secondary preview display 2840. When the user finds a frame in a different clip that was recorded at the same time or approximately the same time as the selected frame, the user then selects this frame for synchronization (e.g., by clicking or tapping the location in the clip representation). In the figure, the user selects a particular frame in the clip 2845 at the second stage 2820.

Stage 2830 illustrates the result of this selection. The clip 2825 has been automatically moved approximately 20 seconds earlier in its track. In some embodiments, the application initially moves the selected clip so that the selected frames are exactly matched up, then analyzes audio data of the two clips within a predetermined range (e.g., 5 seconds, 10 seconds, etc.) around the two matched frames in order to more precisely align the selected clip.

Some embodiments include variations on the process shown in FIG. 28. For example, a user might initially select a clip and the "Sync to Frame" option (or a variation thereof), then be allowed to skim through the selected clip in order to find the first frame for alignment. After selecting a frame within the selected clip, the user would then be presented with the opportunity to skim through the other clips in other angles to identify a second frame (e.g., as shown in stage 2820).

B. Modifying Multi-Camera Clip Properties

In addition to the adjustment of clips along the timeline of a multi-camera media clip, in some embodiments the application enables the user to utilize the angle editor to modify clip properties such as the number of angles, the names of the angles, the order of the angles, etc. Some embodiments automatically reflect these properties in the angle viewer as soon as the user modifies the property in the angle editor.

Figure 29:
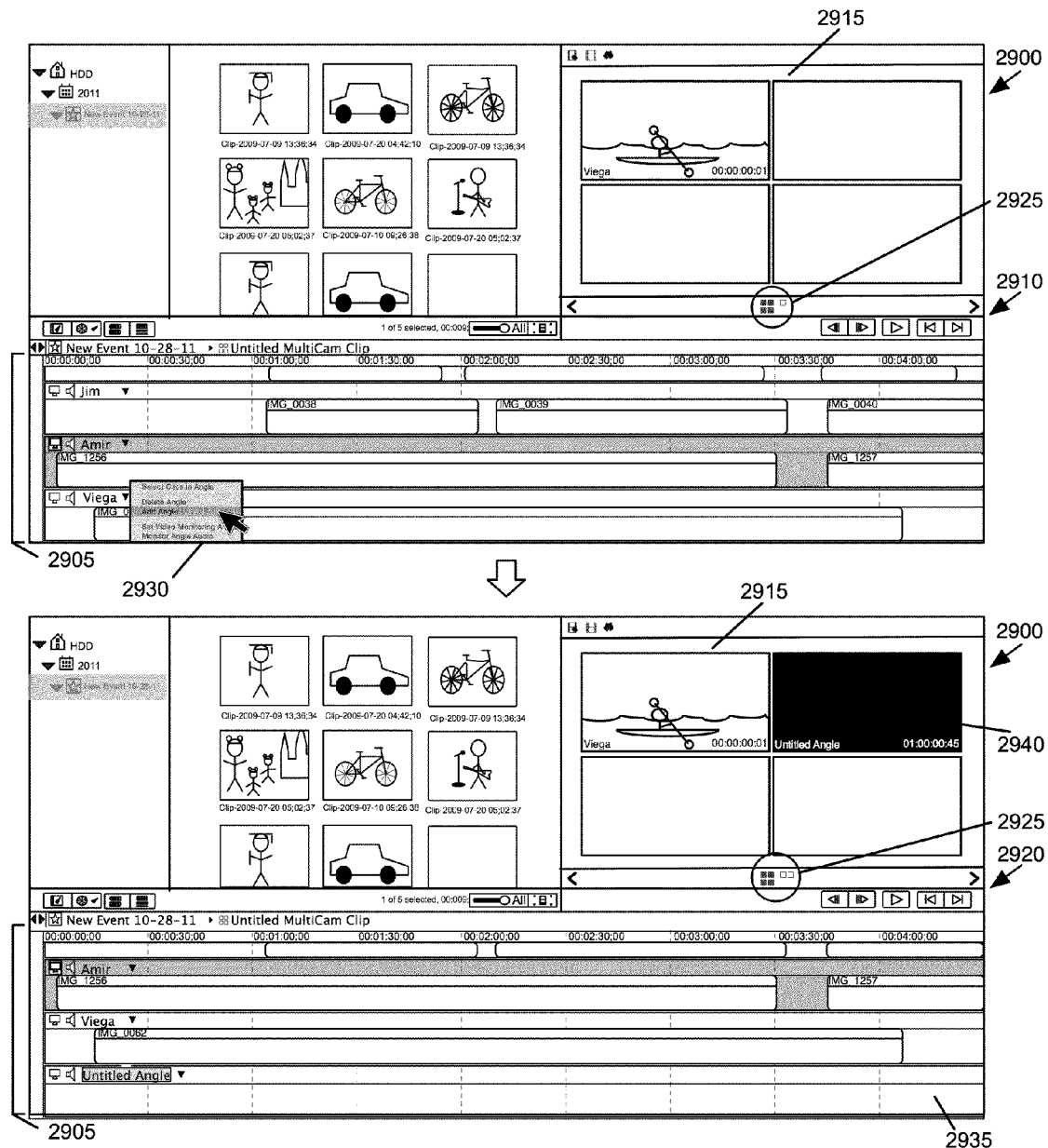
FIG. 29 illustrates a user adding an angle to a multi-camera media clip in a GUI.

FIG. 29 illustrates a user adding an angle to a multi-camera media clip in a GUI 2900 over two stages 2910 and 2920. The GUI 2900 includes both an angle editor 2905 and an angle viewer 2915. One of ordinary skill in the art will recognize that some embodiments will additionally include a preview display area, but this is not shown in this figure for simplicity. At the first stage 2910, the multi-camera media clip open in the angle editor 2905 includes five angles. The angle viewer 2915 is set to display four angles at a time, but currently only has one angle in the top left corner. Because there are more than four angles, the media-editing application divides the angles into sets (of up to four angles), and the user can choose between these sets by selecting the angle banks 2925 at the bottom of the angle viewer 2915. In this case, the user has selected the bank with a single display rather than the bank with four displays.

In addition, at the first stage, the user has initiated a drop-down menu 2930 for the multi-camera clip, and is in the process of selecting the "Add Angle" option from the menu. In some embodiments, the user can access this drop-down menu via a selectable item displayed in the header for each of the angles. One of ordinary skill in the art will recognize that some or all of the options in the drop-down menu 2930 may be accessed through other user interface constructs, such as keystrokes, option-specific UI items, other menus, etc.

The second stage 2920 illustrates the result of this menu selection. At this stage, the application has added a new angle to the multi-camera media clip (directly after the angle from which the drop-down menu was initiated). In some embodiments, this involves adding an anchored collection to the multi-camera reference clip collection that represents the multi-camera media clip (i.e., another collection such as the collection 2010 of FIG. 20). In some embodiments, the application assigns the new anchored collection the lane number of the angle from which the menu was accessed, and increments the lane numbers of all of the higher-numbered angles. As a result, the GUI 2900 now displays (i) a new track 2935 for the angle in the angle editor 2905, (ii) a new display area 2940 for the angle in the angle viewer 2915, and (iii) an additional square in the selected set of angles in the banks 2925. The new angle is automatically given a name (e.g., "Untitled Angle", "Angle δ", etc.).

After adding an angle, users can manually add clips to the angle by dragging the clips from the clip browser. In some embodiments, a user can select a set of clips in the event browser and drag them into the track for the new angle. Either automatically or in response to user prompting, the media-editing application uses processes described in Section III (or variations thereof) to order and align the newly added clips in the multi-camera clip. That is, the application first sequences the clips within the angle using timing metadata of the clips, then aligns the sequence with the other angles using timing metadata followed by audio synchronization.

Figure 30:
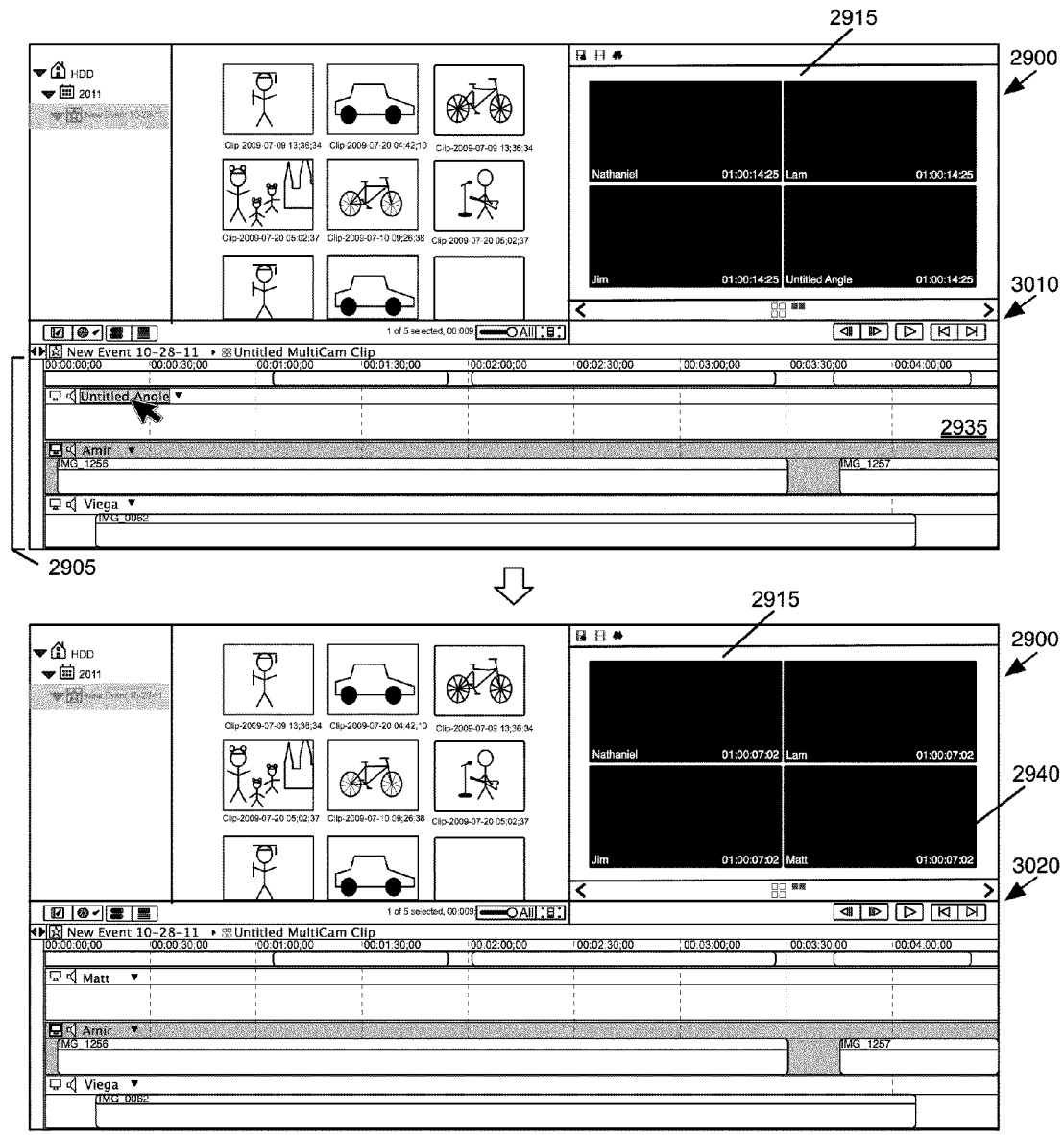
FIG. 30 illustrates a user renaming an angle of a multi-camera media clip in the GUI of FIG. 29.

FIG. 30 illustrates a user renaming an angle of a multi-camera media clip in the GUI 2900 over two stages 3010 and 3020. As shown in the first stage 3010, the user has selected and highlighted the name of the track 2935 in the angle editor 2905, "Untitled Angle". In some embodiments, selecting the name (e.g., with a click, double-click, tap, double-tap, etc.) in the angle editor causes the name to become a modifiable text box. At this point, the user can type in a new name for the angle.

The second stage 3020 illustrates the GUI 2900 after the user has renamed the angle represented by the track 2935 with the name "Matt". In some embodiments, the media-editing application modifies the angle name in the collection data structure for the angle, while keeping the unique angle ID constant. Thus, data structures that refer to the angle do not need to be updated but instead continue to refer to the same unique angle ID. With the angle name modified, items that refer to that angle ID will now retrieve different information for the angle name. As a result, the preview display 2940 in the angle viewer 2915 now reads "Matt" rather than "Untitled Angle".

Figure 31:
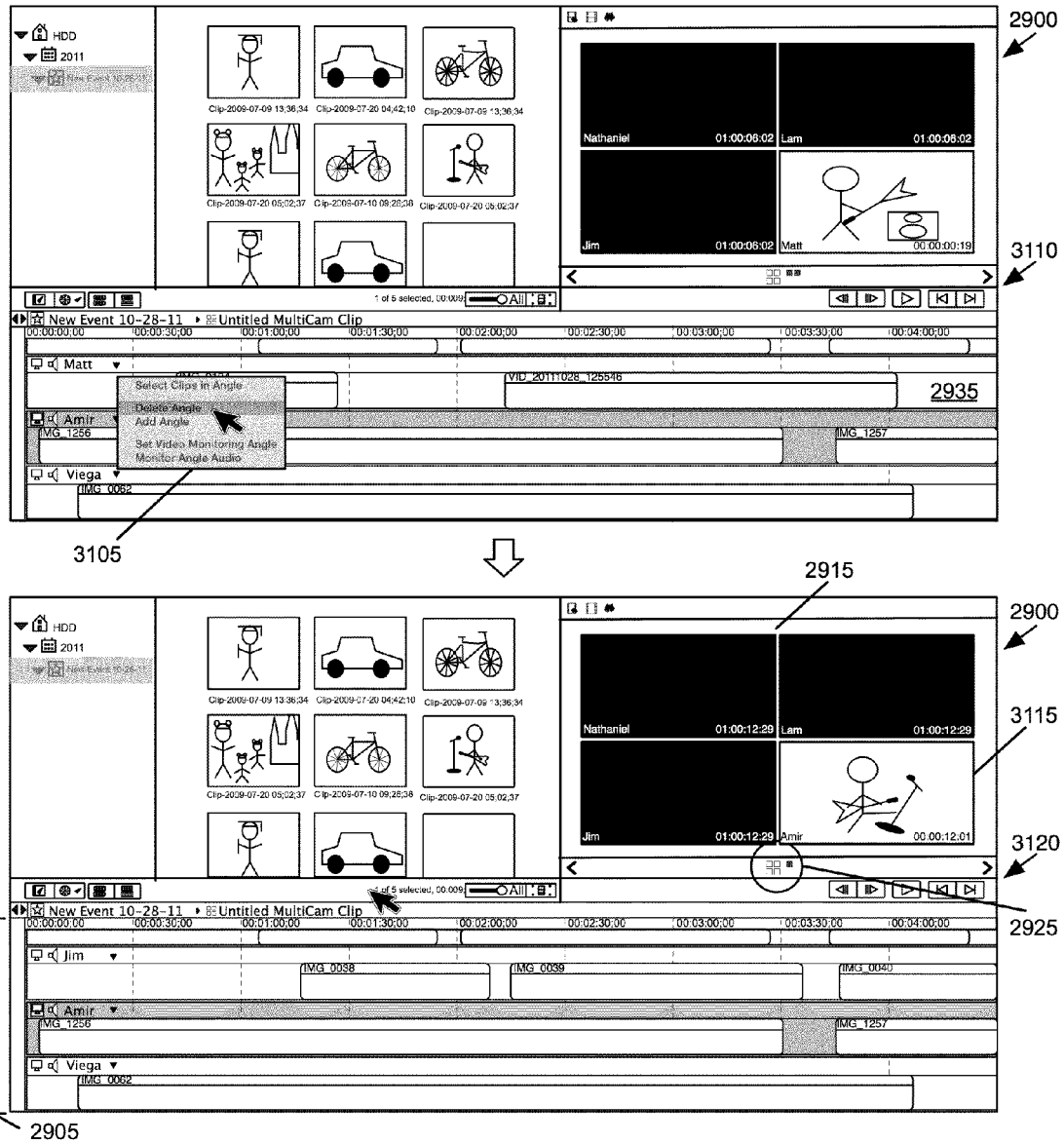
FIG. 31 illustrates a user deleting an angle of a multi-camera media clip in the GUI of FIG. 29.

FIG. 31 illustrates a user deleting an angle from a multi-camera media clip in the GUI 2900 over two stages 3110 and 3120. As shown in the first stage 3110, the user has initiated a drop-down menu 3105 (similar to the menu 2930) through the track header for the track 2935 (the track for the angle "Matt"). Within this menu, the user is in the process of selecting the "Delete Angle" option.

The second stage 3120 illustrates the result of this menu selection. At this stage, the application has removed the angle "Matt" from the multi-camera media clip. In some embodiments, this involves removing the anchored collection with the matching angle ID from the multi-camera reference clip collection that represents the multi-camera media clip (i.e., a collection such as the collection 2010 of FIG. 20). As a result, the GUI 2900 now displays (i) one fewer tracks in the angle editor 2905, (ii) a different set of preview displays in the angle viewer 2915 as the display 3115 for the angle "Amir" has moved into the first set of four displays, and (iii) one fewer square in the banks 2925. In some embodiments, when the user deletes an angle, the application removes the anchored collection for that angle from the multi-camera media clip structure, and decrements the lane numbers of any higher-numbered angles in the multi-camera media clip.

Figure 32:
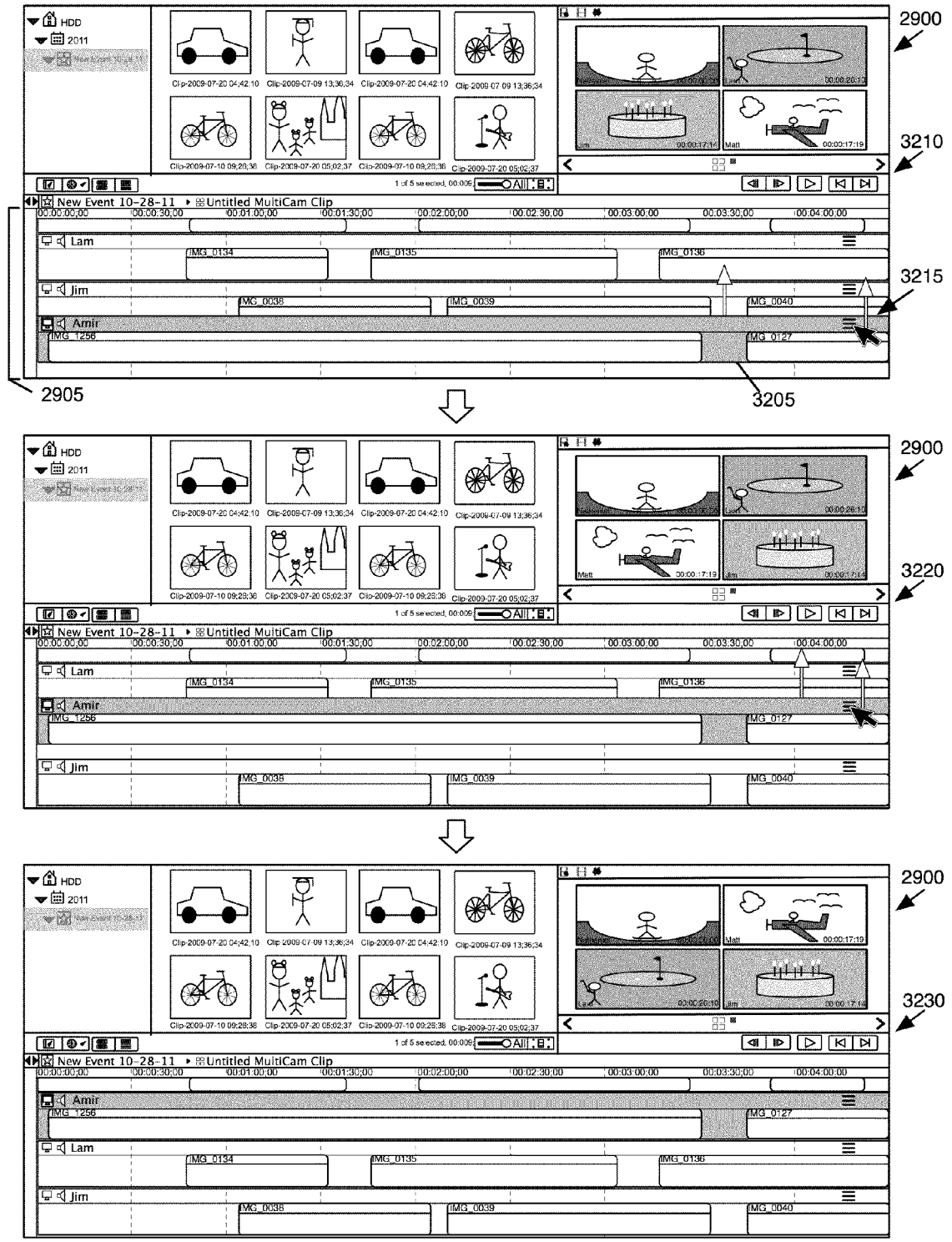
FIG. 32 illustrates a user reordering the angles of a multi-camera media clip in the GUI of FIG. 29.

FIG. 32 illustrates a user reordering the angles of a multi-camera media clip in the GUI 2900 over three stages 3210-3230. The first stage 3210 illustrates that a user has selected the track 3205 and begun moving the track upward. In some embodiments, the tracks in the angle editor 2905 have handles with which a user can select the track for reordering. In this case, the handles are located on the right side of the track header. At this point the selected track 3205 for the angle "Amir" is below the track 3215 for the angle "Jim".

The second stage 3220 illustrates the GUI 2900 while the user continues to move the track 3205 upwards in the angle editor 2905. As shown, once the user has moved a selected track past another track in the editor, some embodiments automatically slide the other track into the spot previously occupied by the selected track. In this case, the track 3215 is now below the selected track 3205, although the user has not released the track 3205 yet. In performing this, some embodiments automatically update the multi-camera media clip data structure to reflect this reordering, by modifying the lane numbers of the two angles that have swapped places.

As a result of the reordering, the application modifies the order of the preview displays in the angle viewer 2915. In stage 3210, the viewer for the angle "Jim" is the third display (bottom left) while the viewer for the angle "Amir" is the fourth display (bottom right). At the second stage 3220, the viewer for these two angles have switched places, mirroring the change in the angle editor.

The third stage 3230 illustrates the GUI 2900 after the user has released the track 3205 in the second slot of the angle editor 2905. As a result, the preview display for the angle "Amir" in the angle viewer 2915 is now in the second (top right) position, and the application has again updated the multi-camera media clip data structure to reflect this change in ordering (e.g., by modifying the lane numbers of the angles).

C. Additional Editing in the Angle Editor

Figure 33:
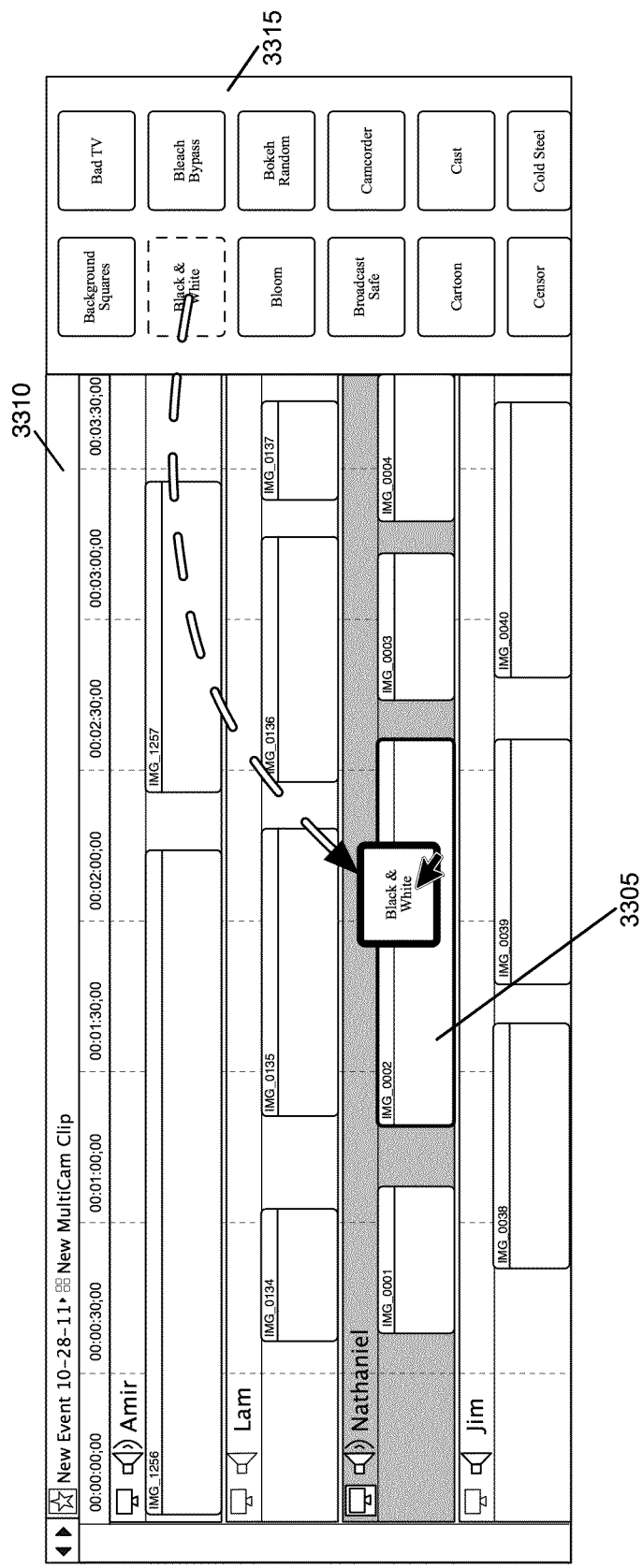
FIG. 33 illustrates applying a black and white effect from an effects display area to a clip in an angle editor.

The above sub-sections described editing operations to align the media clips from different angles of a multi-camera media clip as well as operations that modify the angle data of the multi-camera media clip. In addition, some embodiments enable other editing operations within the angle editor. For instance, users can apply various effects to clips in the angle editor. FIG. 33 illustrates the application of a black and white effect from an effects display area 3315 to a clip 3305 in an angle editor 3310. This effect applies a function to the color values of the affected clip. In addition, users can apply transform, crop, distortion, etc. effects to the clips that affect the shape or size of the displayed images for the clip. In some embodiments, these effects are applied through on-screen controls in the preview display area or by modifying effect variables in the inspector.

Some embodiments allow a user to apply effects to entire angles instead of single clips. Users can select all of the clips of the angle and then select an effect from the effects display area 3315, and the application will apply this effect to all of the clips. Similarly, in some such embodiments, defining a transform (or crop, or distort) effect through the on-screen controls of the preview display area will apply the transform to all clips in the selected angle. Other embodiments, however, only apply effects to a single clip at a time.

V. Editing a Media Project with Multi-Camera Clips

The previous section described the editing of a multi-camera reference clip in the angle editor. The multi-camera clips can also be added to a media project, much like a standard media clip. However, unlike in the case of a standard media clip, some embodiments create a clip instance in the data structure of the media project, which refers back to the reference clip stored in the event. Each clip instance includes active video and audio angles that indicate which angle's video and audio should be used in the media project for the duration of the clip instance. In such embodiments, the data structures for the multi-camera clip instances differ from those of the timeline clips shown in FIG. 8.

Once added to the media project, the user can perform various operations on the clip instances. The user can swap out the active video and/or audio angles for a clip, split a clip into two clip instances with different angles for each of the instances, apply effects to specific angles of the clip instances, as well as other editing operations.

A. Adding a Multi-Camera Clip Instance to a Media Project

Figure 34:
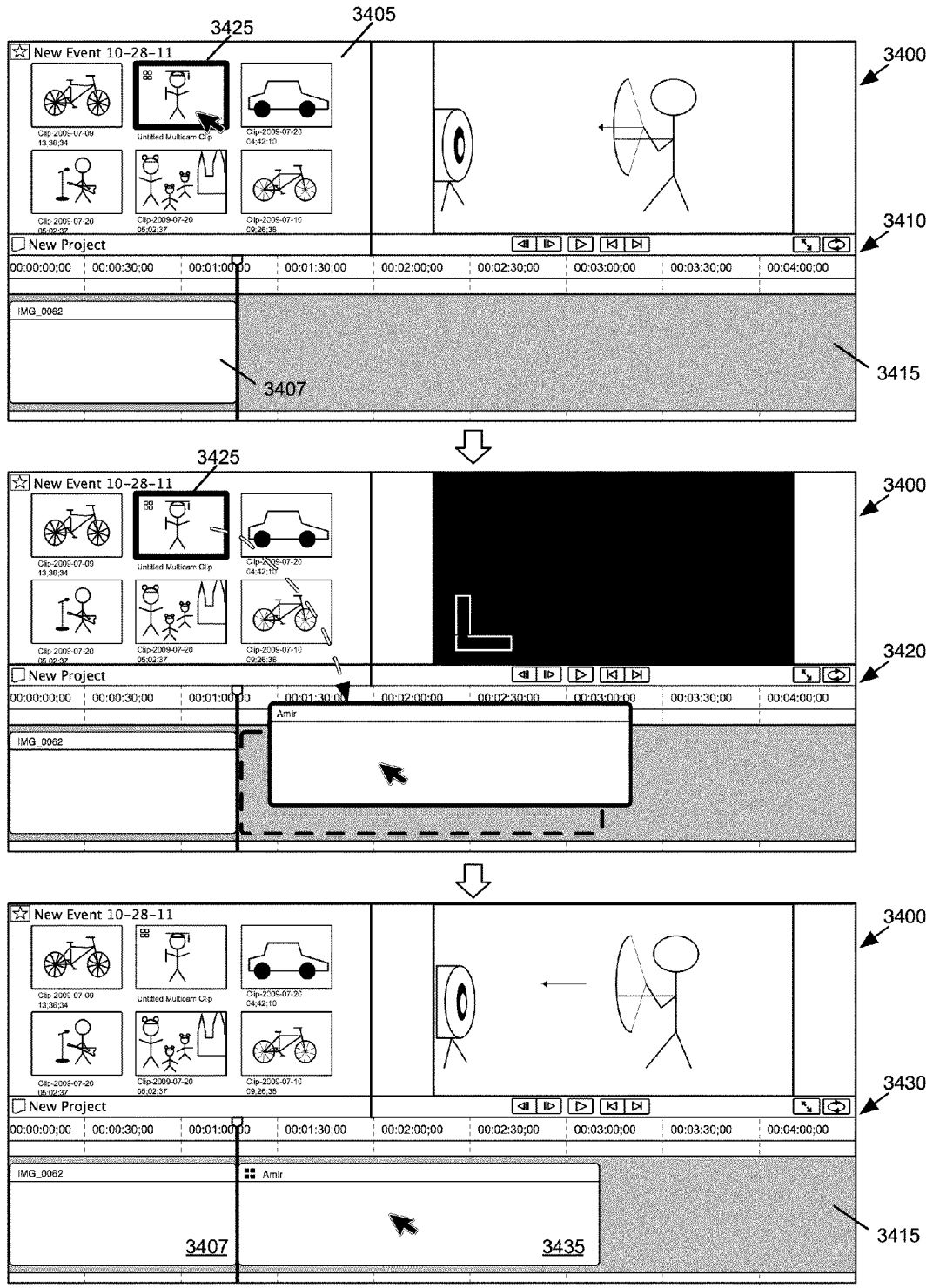
FIG. 34 illustrates a user adding a multi-camera media clip to a media project.

FIG. 34 illustrates the addition of a multi-camera media clip to a media project over three stages 3410-3430 of a GUI 3400. The GUI 3400 includes a clip browser 3405 and a composite display area 3415, among other display areas. The composite display area is currently displaying the timeline for a media project ("New Project") with one video clip 3407, which is a typical video clip of the sort described in Section II (i.e., a collection with a video component and anchored audio component that both refer to the same asset). Within the clip browser 3405 are various clips in the event "New Event 10-28-11", including a multi-camera reference clip 3425.

The first stage 3410 illustrates that a user has selected the multi-camera reference clip 3425. In the second stage 3420, the user drags this selected clip 3425 and drops the clip into the composite display area 3415. The third stage 3430 illustrates the result of this action, with a multi-camera clip instance 3435 now part of the media project in the composite display area 3415. The representation for the clip instance 3435 has an appearance similar to that of the video clip 3407, but also includes a multi-camera clip indicator (four squares, similar to that displayed on the multi-camera reference clips in the clip browser) as well as an angle name rather than a clip name. In this case, the active video and audio angle of the clip instance 3435 is "Amir", which means that when the application plays back, renders, exports, etc. the media project, it sources the output for that portion from the assets referred to by the clips in the "Amir" angle.

To choose the active angle for a newly added clip instance, different embodiments make different determinations. Some embodiments copy the angle instance data structure from the event (e.g., angle instance 2012) and use the active video and audio angles set for this structure. These active video and audio angles may be modified by the user through the inspector display area, in some embodiments.

Figure 35:
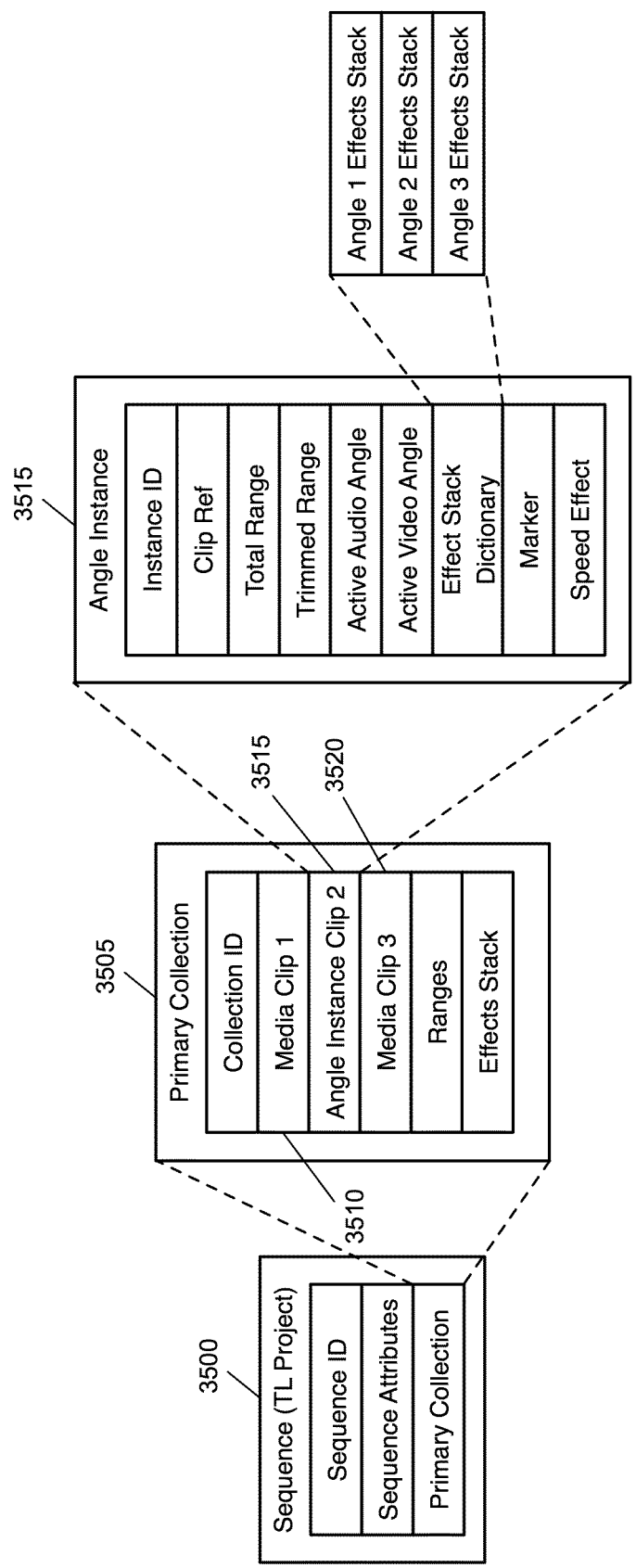
FIG. 35 conceptually illustrates a subset of the data structures that define a media project that includes a multi-camera clip instance.

As stated, the clip 3435 in the composite display area 3415 is a clip instance, which refers to a multi-camera reference clip structure (e.g., that shown in FIG. 20). FIG. 35 conceptually illustrates a subset of the data structures that define a media project that includes a multi-camera clip instance 3515. As with the project shown in FIG. 6, in some embodiments the data structures of FIG. 35 are all contained within a project data structure that contains a single sequence 3500.

The sequence 3500 includes a primary collection data structure 3505, which includes an array containing three clips 3510-3520. The first and third clips 3510 and 3520 are collection clips similar to clips 805-815 of FIG. 8—either individual or compound clips that contain component clips which in turn refer to media assets.

The angle instance clip 3515, on the other hand, does not contain any nested clips. The instance 3515 instead contains an instance ID, a clip reference, total and trimmed ranges, active audio and video angles, an effect stack dictionary, a marker, and speed effects. The clip reference refers to a multi-camera reference clip stored in an event (e.g., reference clip 2000 of FIG. 20). In some embodiments, the clip reference contains both an event ID and the collection ID, while in other embodiments the reference just contains the collection ID. The angle instance 3515, is the same type of data structure as angle instance 2012, shown in FIG. 20. However, the angle instance 3515 in a timeline sequence only stores a reference (e.g., a pointer) to the reference collection (e.g., reference collection 2000), whereas the angle instance 2012 in an event sequence contains the reference collection. Some embodiments, when a user adds a clip instance to a timeline as shown in FIG. 34, copy the angle instance data structure from the event to the timeline sequence, substituting a reference to the reference collection as opposed to having the new instance actually contain the reference collection.

The total range, in some embodiments, is the total length of the multi-camera reference clip to which the instance refers, and is inherited based on the current state of the multi-camera reference clip. The total length of the reference clip, in some embodiments, is the duration of the longest angle in the reference clip, including any gap clips. The primary gap clip in the reference clip (the gap clip off of which the other clips are anchored) receives this duration in some embodiments, and thus determines the duration of the reference clip. When a user modifies the length of the multi-camera clip (e.g., using the angle editor), the media-editing application updates the total range of the instance 3515. In some embodiments, the application updates this information whenever a particular clip instance is accessed, in that the total range of a clip instance is a dynamic variable that the application populates when needed according to the present state of the reference clip. The trimmed range, like that of other clips, can be modified by a user within the composite display area by standard trim operations. When a user blades a clip instance into two such instances, this will also result in a change to the trimmed range. When a user modifies the length of the multi-camera reference clip, some embodiments do not modify the trimmed range of the instances, although the rendered contents of those instance may change as a result of the edits.

The active video angle and active audio angle are variables stored by the angle instance. In some embodiments, when a user adds an angle instance to a timeline, these variables are set based on the active angles stored by the angle instance in the event. As will be described in detail in the next subsection, users can swap out the audio or video angles of a clip instance using a variety of operations. The application allows the active video angle to be different from the active audio angle. For example, if a particular clip's video is not suitable and the user instead chooses to use a sequence of still images captured at the same time, the audio of the clip may still be desired for background of the still image sequence. When the media-editing application plays back, skims through, renders for export, etc. the composite presentation, the application uses the collection in the reference clip of the active angle to identify the source media to retrieve.

The effect stack dictionary contains a set of effect stacks: one audio effects stack and one video effects stack for each angle. When rendering the presentation, the media-editing application identifies the active video angle and uses the effects stack corresponding to this active angle. As will be described in Section VI, some embodiments first apply effects contained within the reference clip (which will generally be contained in the effects stack for a particular clip within the reference clip), then subsequently apply the effects stack for the active angle stored in the clip instance. In some embodiments, the intermediate output image (after applying the effects stored in the reference clip) may be cached for use in rendering multiple clip instances.

The marker is a clip structure that is stored as anchored to an angle instance, and does not change when the user switches the active angles. Users can apply both markers and keywords to a clip in the composite display area, and these affect the clip in the same manner whether the clip is a standard collection clip or a multi-camera clip instance. The speed effect is a retiming effect that has been applied to clip 3515. These retiming effects are described in detail in U.S. patent application Ser. No. 13/109,989, filed May 17, 2011, now published as U.S. Patent Publication 2012/0210228, and entitled "Retiming Media Presentations", which is incorporated herein by reference. In some embodiments, retiming effects are not stored with the effects stack and are not stored as relating to a particular angle. When the user switches video angles, the retiming effects remain with the clip instance. Retiming effects modify the length of a video clip (by either slowing down or speeding up the rate at which the video plays). As such, by storing the effect on the clip instance, the media-editing application prevents a change to the active video angle from modifying the length of the clip.

One of ordinary skill in the art will recognize that some embodiments may also use reference clips for clips other than multi-camera media clips. For instance, a user could create a compound clip in an event with specific effects applied, then add multiple instances of the compound clip to a media project and apply different effects to the different instances. If the user then modified the clips within the compound clip reference, these changes would be inherited by the various instances of the compound clip.

FIG. 34, above, illustrates a user adding a multi-camera media clip to a composite display area, and the media-editing application creating a single instance of the multi-camera clip in the media project displayed in the composite display area. In some embodiments, when a user adds a clip to a timeline, the application automatically splits the multi-camera clip into several instances with different active angles. In some embodiments, users can mark clips or portions of the clips within the multi-camera reference clip as favorites, and the media-editing application uses this information to generate the clip instances with different angles.

Figure 36:
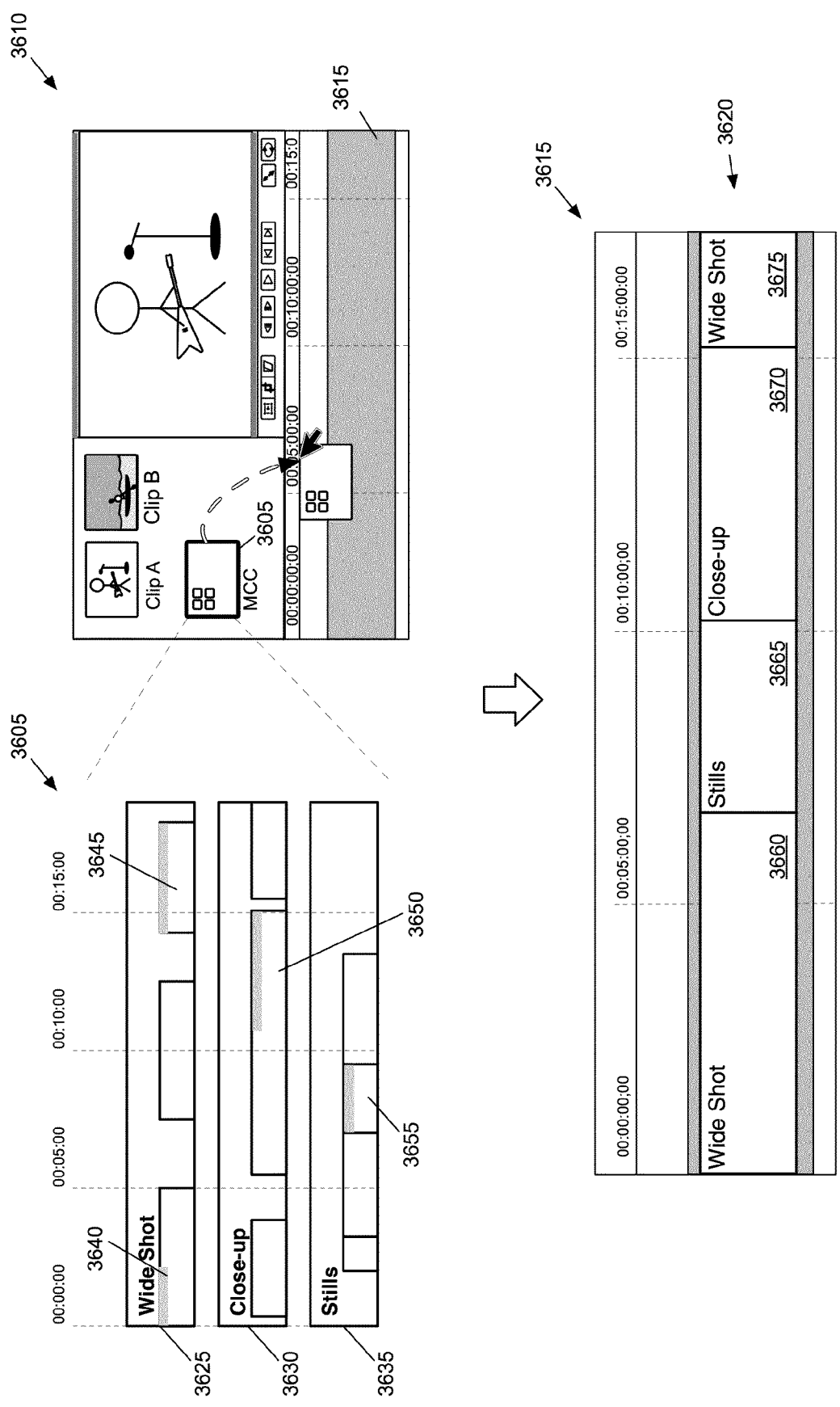
FIG. 36 illustrates an example of a user adding multi-camera clip to a media project.

FIG. 36 illustrates an example of a user adding multi-camera clip 3605 to a media project over two stages 3610 and 3620. The first stage 3610 illustrates the user adding a multi-camera clip 3605 to a composite media project and the second stage 3620 illustrates the resultant timeline for the composite media project. As shown in the first stage 3610, the user has selected the multi-camera reference clip 3605 and dragged it into the previously empty composite display area 3615.

In addition, the first stage 3610 illustrates the timeline for the multi-camera reference media clip 3605. The multi-camera clip 3605 includes three angles 3625-3635. These angles each include a series of media clips, some of which have been marked by the user as favorites. In some embodiments, users can mark clips or segments of clips as favorites within the event browser. In addition, some embodiments allow users to mark clips as favorites within the angle editor or the composite display area. Within the composite display area, users can identify a portion of a media clip that they will likely want to use in a presentation and mark the portion as such. In addition, some embodiments allow users to mark portions as rejected, indicating segments of clips that the user wishes to avoid (e.g., because of a shaky camera, poor audio, etc.). Thus, if a single video clip has a good section as well as an unusable section, then the user may want to keep the clip but mark the unusable section so that it does not end up in the media project.

Within the first angle 3625 of reference clip 3605, the user has marked a portion of media clip 3640 and the entirety of media clip 3645 as favorites (portions marked as favorites are shown with a gray bar in this example). Within the second angle 3630, the user has marked the second half of clip 3650 as a favorite, which partially overlaps in time with clip 3645 from the first angle 3625. In the last angle 3635, the user has marked clip 3655 as a favorite.

The second stage 3620 illustrates the composite display area 3615 after the user has added the multi-camera clip 3605 to the media project. Rather than creating one clip instance as shown in FIG. 34, the media-editing application has automatically created four separate clip instances. The first clip instance 3660 has the angle 3625 as its active angle, because that angle starts with a favorited clip. Some embodiments identify the first favorited clip portion in the timeline of the multi-camera clip and select that angle for the first clip instance.

In some embodiments, the application extends the duration of a clip instance past the end of the favorited portion of an angle until identifying a favorited clip portion in a different angle. In this case, the clip 3655 in angle 3635 is the next clip in the multi-camera clip marked as a favorite. The favorited portion of the clip (which in this case is the start of the clip) begins at approximately the seven minute mark of the multi-camera reference clip timeline. Because, the multi-camera media clip is the first clip in the media project, times in the multi-camera clip timeline correspond to times in the media project timeline. As such, the second clip instance 3665 has the angle 3635 as its active angle, and starts at approximately the seven minute mark of the media project timeline. The favorited portion of this clip ends shortly before the ten minute mark of the multi-camera reference clip timeline, but the next favorited clip segment does not begin until shortly after the ten minute mark.

Thus, the third clip instance 3670 begins just after the ten minute mark with an active angle of 3630. Around a time of fourteen minutes, the multi-camera clip has both clip 3650 in angle 3630 marked as a favorite as well as clip 3645 in angle 3625. Some embodiments, as is the case in this example, do not switch angles until the current angle is no longer marked as a favorite, and thus the switch to angle 3625 with a new clip instance 3675 does not come until after the fifteen minute mark, when the clip 3650 ends.

In some embodiments, choosing to slice the clip instance according to marked favorites is a user option upon adding a multi-camera clip to a media project. That is, the user can either perform a normal add operation that chooses one active angle for the clip instance or choose to perform a different add operation that searches for favorites and divides the clip instance accordingly.

B. Editing Multi-Camera Clip Instances

Once they are added to a media project, users can perform various editing operations with the multi-camera clip instances. As with other clips, users can move the multi-camera clip instances, delete the clip instances, anchor the clip instances to other clips, have other clips anchored to the clip instances, trim the clip instances, split the clip instances in two, etc. Furthermore, users can perform operations specific to multi-camera clips, such as switching the active angles (for both audio and video) and splitting a clip instance in two in order to change a portion of the clip to use a different active angle.

Figure 37:
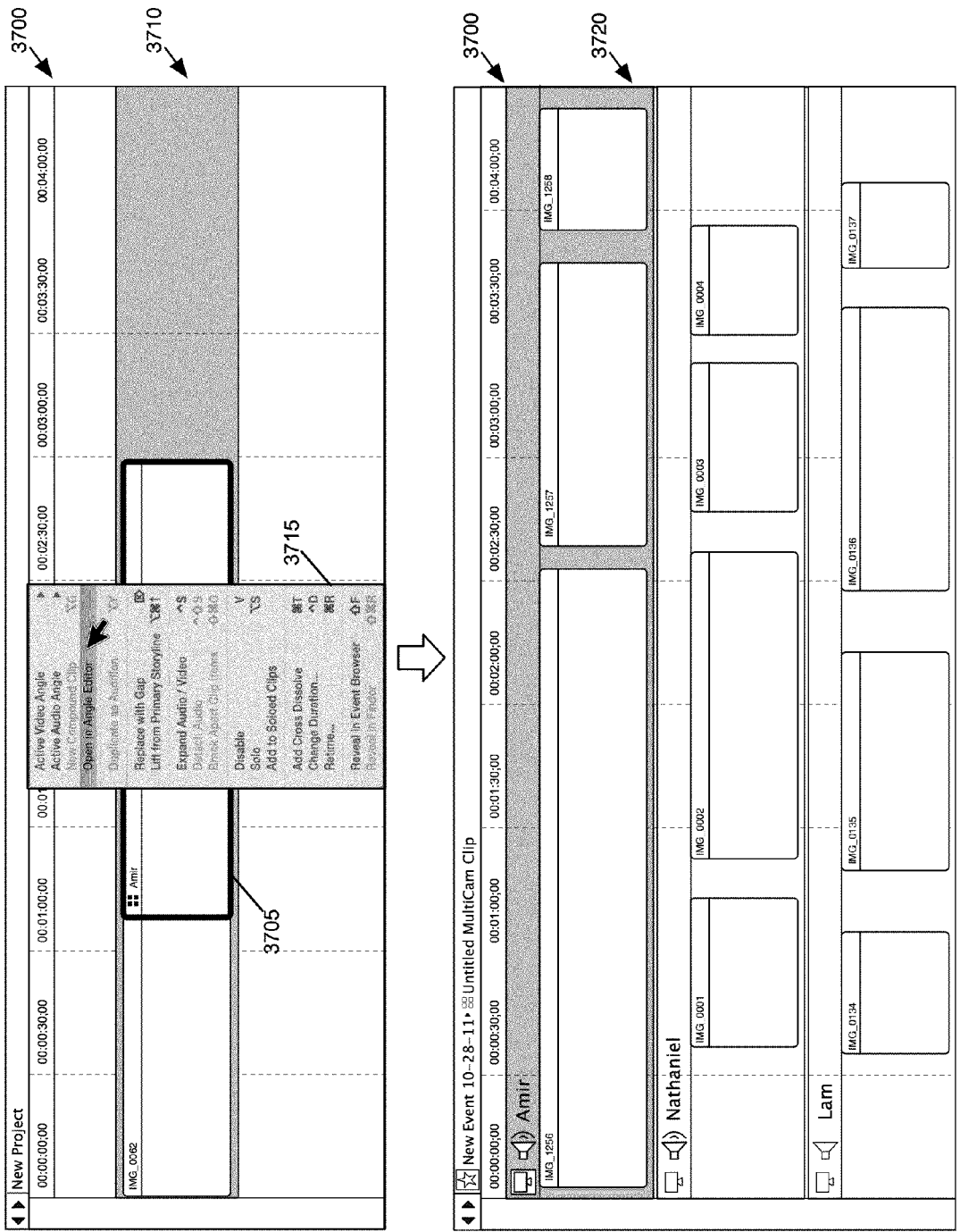
FIG. 37 illustrates a user opening the angle editor for a multi-camera clip in a composite display area.

Users can also use a clip instance to activate the angle editor and edit the multi-camera reference clip to which the clip instance refers. FIG. 37 illustrates a user opening the angle editor for a multi-camera clip over two stages 3710 and 3720 of a composite display area 3700. In the first stage, the composite display area displays a media project entitled "New Project", which includes a multi-camera clip instance 3705. The user has selected the multi-camera clip instance 3705 and activated a menu 3715 for the clip (e.g., by right-clicking, two-finger tapping, etc.) with various selectable options related to the selected clip. The figure shows the user selecting the option "Open in Angle Editor".

The second stage 3720 illustrates the result of this selection. The composite display area 3600 now displays the timeline of the reference clip to which the clip instance 3705 refers. As shown in the top left, rather than displaying "New Project", the display area now displays "Untitled MultiCam Clip" from the event "New Event 10-28-11" to indicate that any edits the user makes will apply to the reference clip stored in the event rather than the clip instance in the media project. In addition, some embodiments highlight the reference clip in the clip browser of the GUI. If the user then makes changes to the reference clip, these changes will also be reflected in the clip instance 3605, as well as any other clip instances in the current or other media projects.

1. Information in the Inspector

When a user selects a media clip in the composite display area, some embodiments display information about the selected clip in an inspector display area (e.g., the display area 325 of FIG. 3). When a multi-camera media clip instance is selected, the inspector of some embodiments displays information about the active angles in the inspector. Furthermore, different tabs of the inspector may display information about the multi-camera reference clip properties, the audio properties of the active audio angle, and the video properties of the active video angle.

Figure 38:
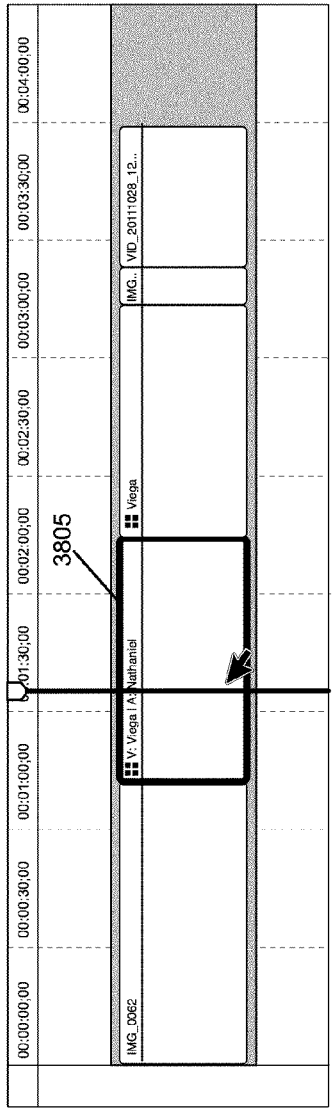
FIGS. 38-41 illustrate a selected clip as well as different tabs of the inspector display area with the clip selected.

FIGS. 38-41 illustrate a selected clip 3805 as well as different tabs of the inspector display area with the clip 3805 selected. FIG. 38 specifically illustrates a composite display area displaying a media project that includes two multi-camera clip instances. The first multi-camera clip instance 3805, which is selected, has an active video angle of "Viega" and an active audio angle of "Nathaniel". The second clip instance, on the other hand, has "Viega" as both its active video and audio angle.

Figure 39:
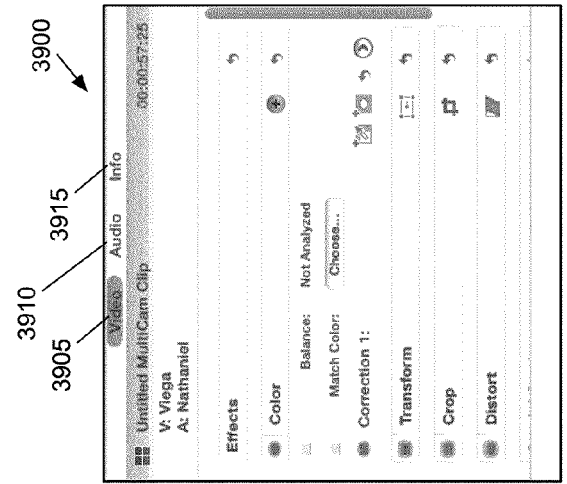

FIG. 39 illustrates the inspector display area 3900 as a result of the selection of the clip 3805. In this figure, the video tab 3905 is selected in the inspector display area, which also has an audio tab 3910 and an info tab 3915. The top section of the inspector indicates that the selected clip is a multi-camera clip by use of a multi-camera indicator (similar to the indicator used for multi-camera reference clips in the clip browser or multi-camera clip instances in the composite display area), as well as indicating the active video and audio angles.

In addition, the inspector displays various video information pertaining to the active video angle of the multi-camera clip instance. Specifically, the inspector displays information about any effects applied to the active angle of the clip instance. In this case, the user has not yet applied any specific effects to the "Viega" video angle. However, if the user had applied a color correction, applied a pixel modification effect, transformed, cropped, or distorted the video, etc., this information would be displayed so long as "Viega" was the active angle. If the user were to switch the active video angle to "Nathaniel", then information about any effects stored in the effect stack for that angle would be displayed in the inspector 3900. The video properties in the inspector 3900 of some embodiments do not show, however, any effects applied to the clips of the angle "Viega" within the multi-camera reference clip. To populate the inspector for a selected multi-camera clip instance, the media-editing application identifies the active video angle and accesses the video effect stack for that angle stored in the data structure for the instance. In order to view and modify the effects on clips in the multi-camera reference clip, the user can select the reference clip in the event.

Figure 40:
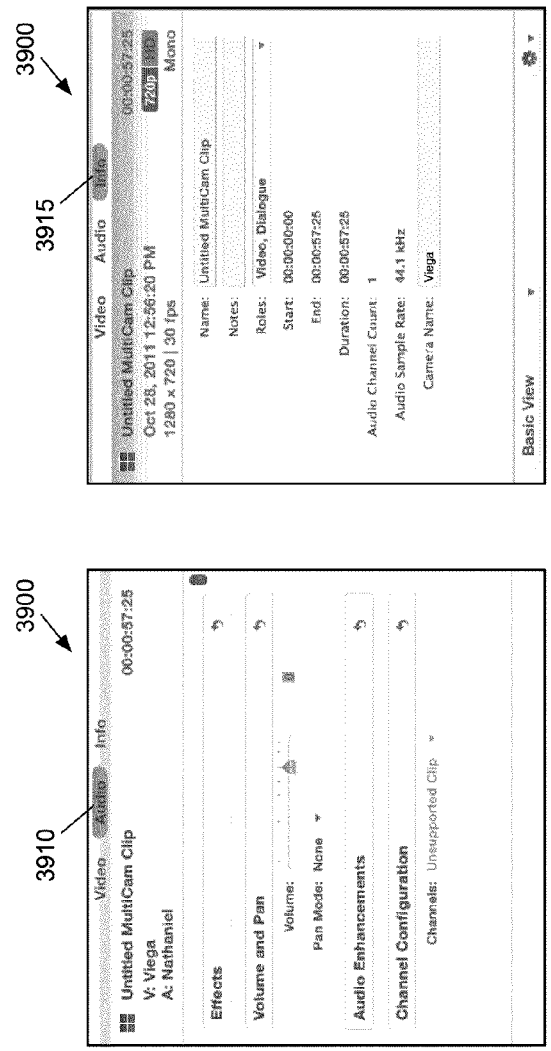

FIG. 40 illustrates the inspector display area 3900 with the audio tab 3910 selected. The top section of the inspector is the same as in FIG. 39 (indicating the active video and audio angles), but the section below that includes information about the audio effects rather than video effects. In this case, the audio effects shown are those stored in the audio effect stack for the angle "Nathaniel", the active audio angle for the selected clip instance. As with the video information, the application identifies the active audio angle and accesses the audio effect stack for that angle stored in the instance data structure.

Figure 41:
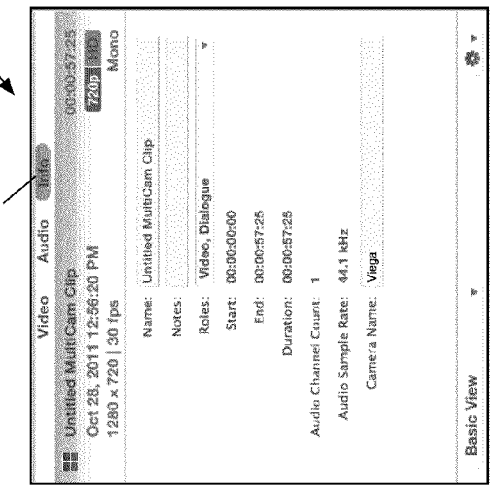

FIG. 41 illustrates the inspector display area 3900 with the info tab 3915 selected. Unlike the previous two figures, in which the inspector displayed information about active angles, the info tab for a multi-camera clip instance displays video and audio properties of the multi-camera reference clip. These include video properties such as the format (720p), dimensions (1280×720), and frame rate (30 fps), and audio properties such as the audio channel count and sample rate. Some of the other information is user-modifiable within the inspector, such as the clip name, roles, and camera name. In some embodiments, modifying this information within the inspector modifies this information for the multi-camera reference clip (in the case of information such as the camera name or clip name) or for the components of either the active angles or all of the clips in the reference clip (e.g., for the roles). In other embodiments, changes to this information only affects the clip instance.

Figure 42:
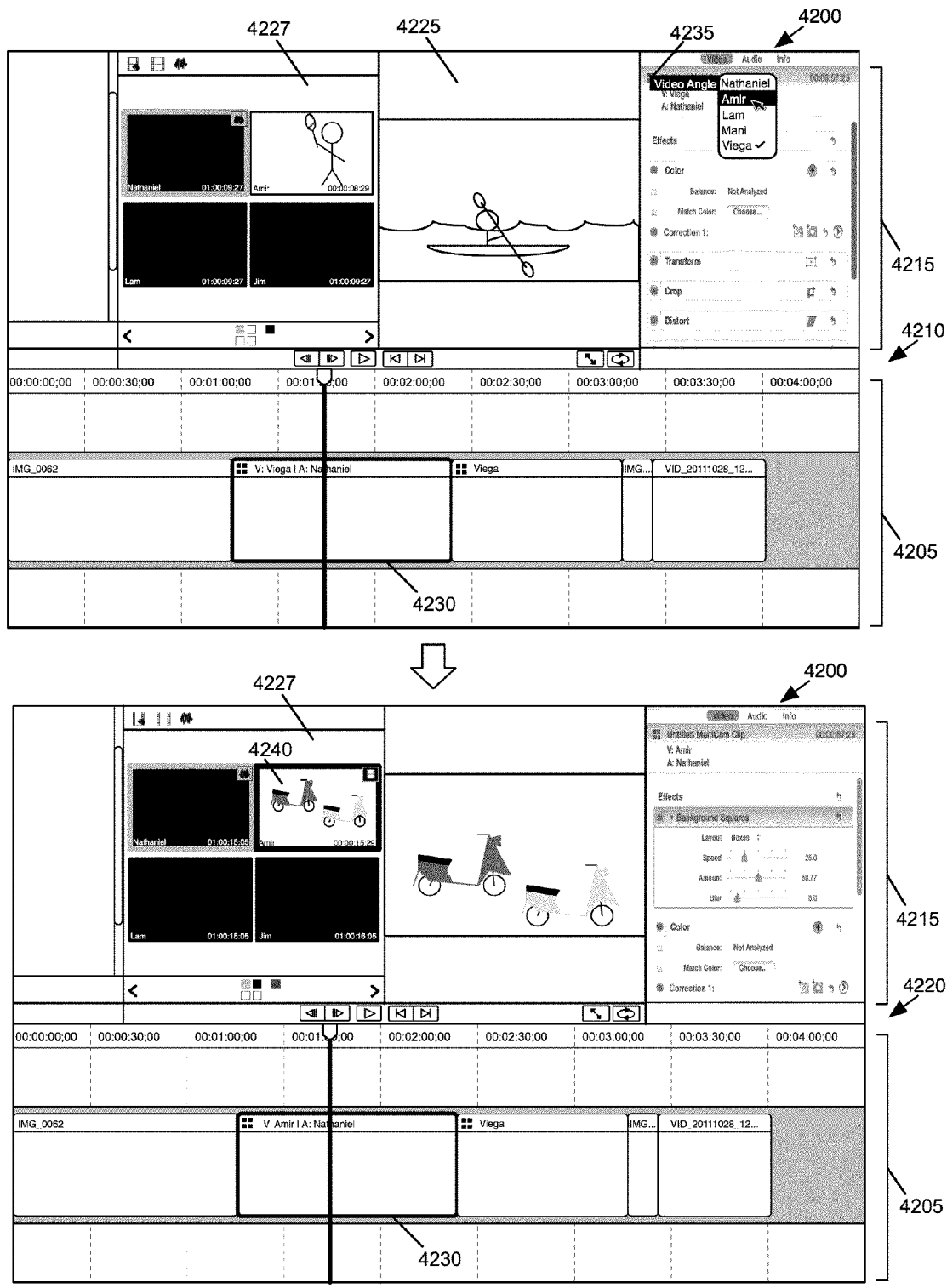
FIG. 42 illustrates a user switching the active video angle for a selected clip instance in the inspector.

In addition to providing information about which angles are active, some embodiments allow a user to switch the active angle through the inspector. FIG. 42 illustrates a user switching the active video angle for a selected clip instance in the inspector over two stages 4210-4220 of a GUI 4200. The GUI 4200 includes, among other display areas, a composite display area 4205, an inspector display area 4215, a preview display area 4225, and an angle viewer 4227.

In the first stage 4210, the user has selected a multi-camera clip instance 4230 in the composite display area 4205. As shown, this clip instance has an active video angle of "Viega" and an active audio angle of "Nathaniel". As a result, the preview display area 4225 displays a video image from a media clip in the angle "Viega". Within the inspector, the user has selected the video angle in order to activate a drop-down menu 4235. This drop-down menu includes selectable menu options for each of the five angles in the multi-camera clip reference. The menu 4235 displays a check next to the currently selected option ("Viega"). The user has placed a cursor over the option "Amir" in order to select this option for the video angle.

The second stage 4220 illustrates the result of the user's selection of the menu option for the "Amir" video angle. The inspector display area 4215 now indicates that the active video angle is "Amir", as does the clip 4230 in the composite display area 4205. The preview display area 4225 now displays a video image from a clip in this angle as well. Within the angle viewer 4227, the application has highlighted the preview display 4240 for the "Amir" angle with a border and a video icon that indicates the active video angle.

2. Using the Angle Viewer for Editing

In addition to using the inspector to switch the active angle for a clip, users of the media-editing application may use the angle viewer to perform certain editing operations on a multi-camera clip instance. The following examples will be described in the context of a viewer with four preview displays and which shows the angle name within the displays, but one of ordinary skill in the art will recognize that other options are available in some embodiments (e.g., different numbers of preview displays and with different information displayed about the angles, as shown in FIG. 22).

Figure 43:
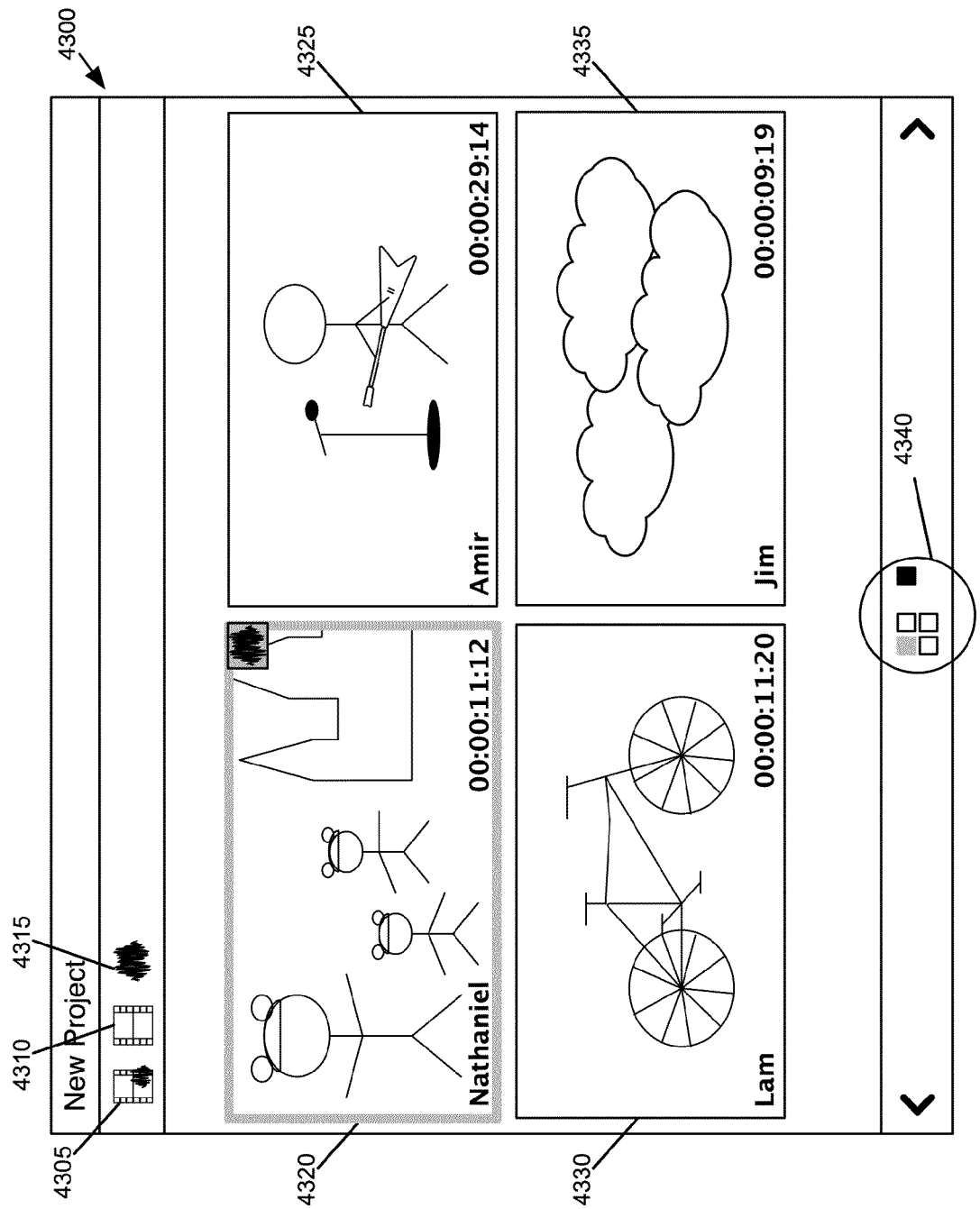
FIG. 43 illustrates an angle viewer of some embodiments, as displayed while a user is editing a media project in a composite display area.
Figure 44A:
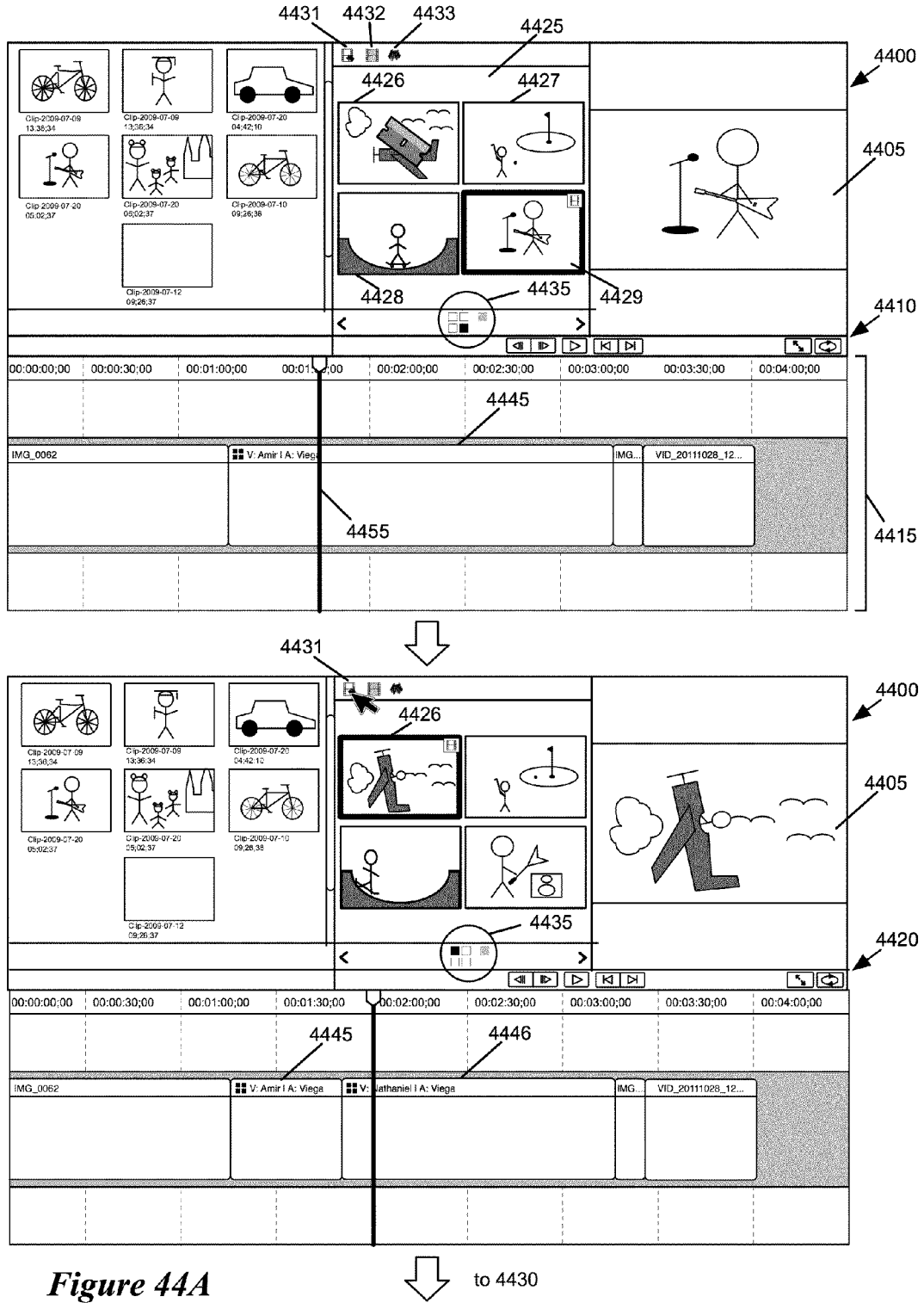
FIG. 44A-D illustrates various examples using the angle viewer to edit a multi-camera clip in a media project.
Figure 44B:
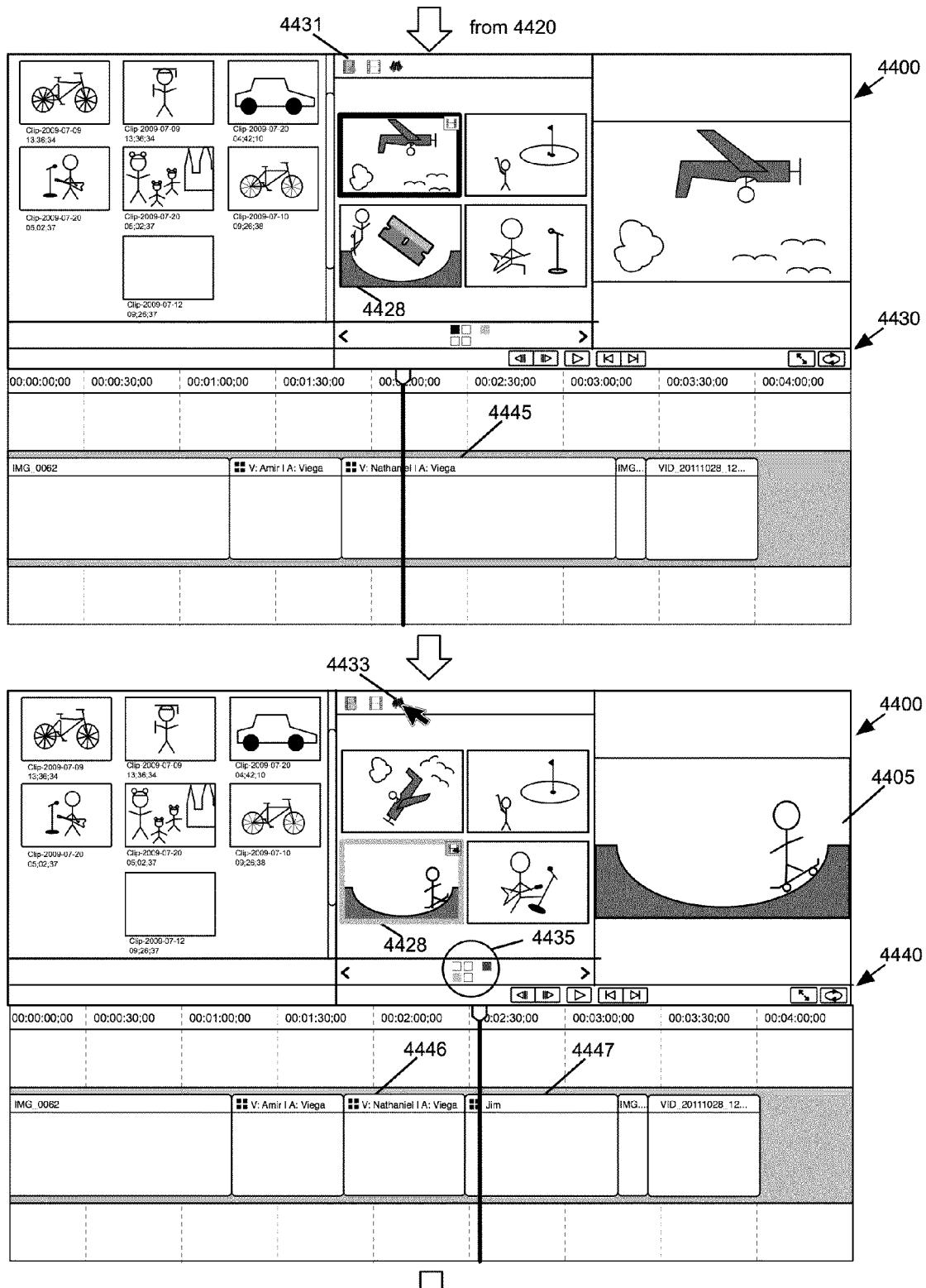
Figure 44C:
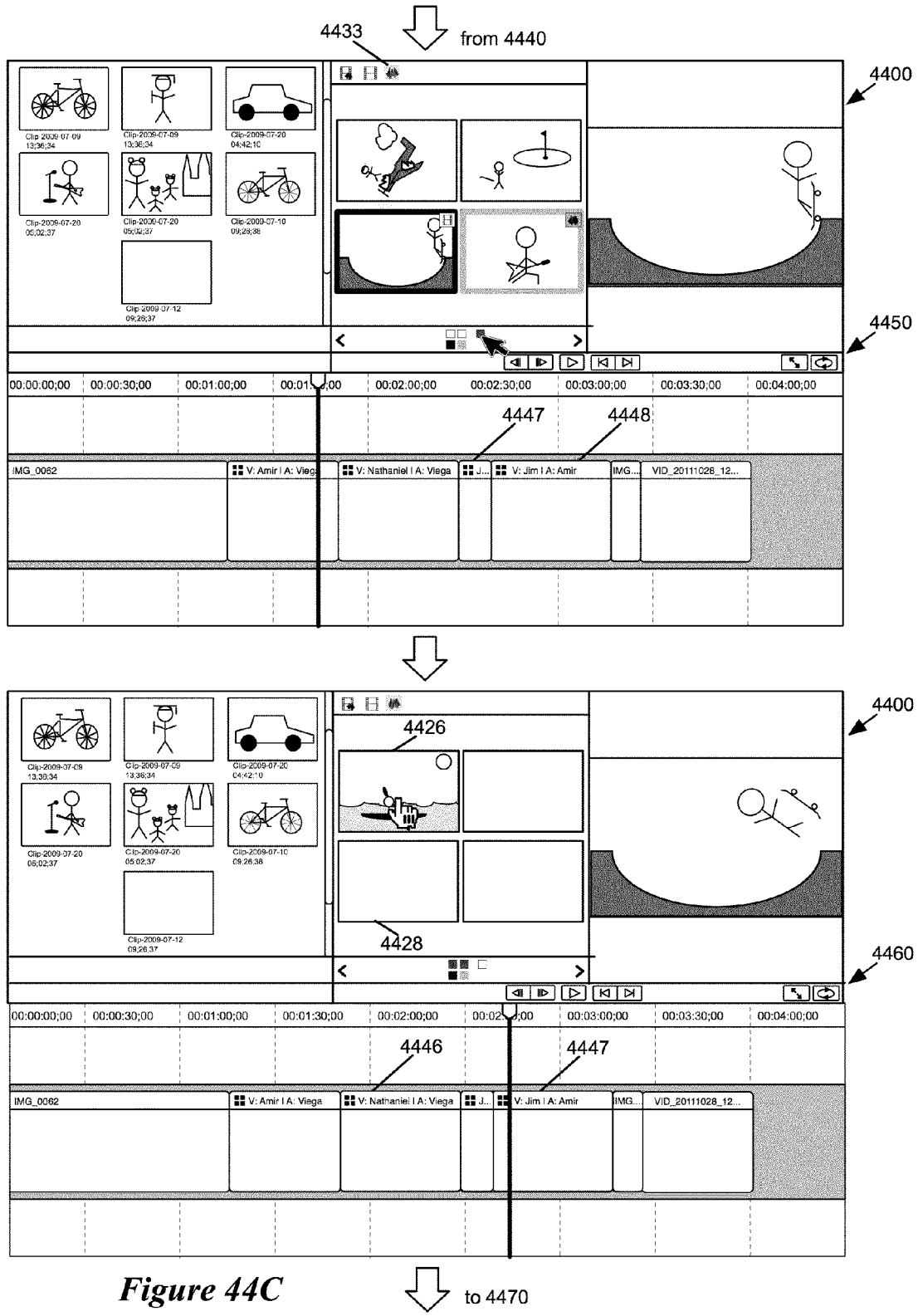
Figure 44D:
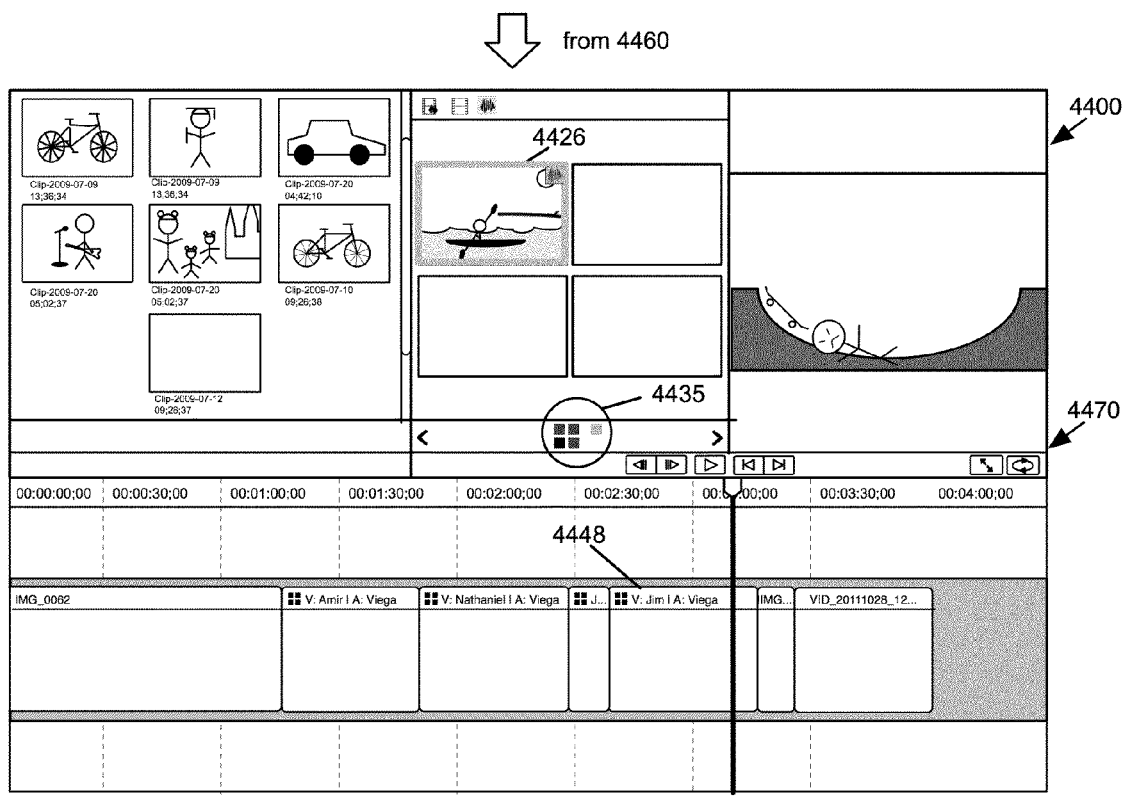

FIG. 43 illustrates an angle viewer 4300 of some embodiments, as displayed while a user edits a media project in a composite display area. The angle viewer 4300 includes selectable items 4305-4315, four preview displays 4320-4335, and angle banks 4340. The selectable items 4305-4315 allow a user to switch the type of content for which the active angle of a clip instance will be modified by selection of the various preview displays. When a user selects one of the displays, the media-editing application either switches the active angle for a current multi-camera clip instance to the angle corresponding to the selected display or splits the current clip instance into two instances with one of the instances having the selected angle.

In this case, the selectable item 4305 is for switching both the audio and video angles to the selected angle, the selectable item 4310 is for switching only the video angle to the selected angle, and the selectable item 4315 is for switching only the audio angle to the selected angle. In FIG. 43, the selectable item 4305 is currently selected. In some embodiments, each of the items has a different particular appearance (e.g., color, pattern, shade of gray, etc.) when selected (e.g., yellow for both audio and video, blue for video only, and green for audio only). This color coding (or other appearance differentiator) may be used in the angle viewer to identify the display associated with the active angles as well as identify the location of the active angle in the banks 4340.

The four preview displays 4320-4335 each display images for one of the angles in the multi-camera media clip. In some embodiments, as a playhead moves over the multi-camera media clip in the composite display area (while playing back a media project or skimming through the media project), the application displays in the angle viewer the images from the different angles that correspond to the time of the playhead. The preview displays also indicate when a particular angle is the active audio or active video angle. At the moment, the active audio angle is "Nathaniel", shown in the top left display 4320. The display 4320 has a green highlighted border and shows the same audio icon used for the selectable item 4315. The active video angle is not one of the angles currently shown in any of the four displays. In some embodiments, as stated, the appearances (e.g., colors, pattern, etc.) of the highlighting for the preview displays match that of the selectable items 4305-4315.

The angle banks 4340 illustrate the total number of angles in the multi-camera clip and how those angles are broken into viewable sets. In this example, the banks 4340 include a first set of four angles and a second set of one angle. These sets are selectable within the banks 4340, in that a user can select one of the banks in order to view the preview displays for the particular angles represented by the selected bank. For instance, the user could select the bank with a single square in order to view a preview display for the fifth angle of the multi-camera clip in the angle viewer 4300. In addition, the banks indicate the location in the sets of angles of the active video angle and the active audio angle. In this figure, the top left square in the first bank is shaded green to indicate the active audio angle ("Nathaniel"), while the single square in the second bank is shaded blue to indicate the active video angle.

As described above, some embodiments use a consistent color-coding between the selectable items 4305-4315, the preview displays 4320-4335, and the banks 4340 to indicate the different types of content for the active angles. In this example, the video angle is blue, the audio content is green, and when the same angle is both the active video and audio angle, that angle is yellow. One of ordinary skill in the art will recognize that any different color or other indicator scheme may be used for the different active angles—e.g., using a different set of colors, using different shades of gray, using different patterns for different types of content, etc.—and that the selection of green, blue, and yellow is merely one specific choice.

In addition to displaying the current state of the different active angles, the angle viewer 4300 allows users to change the active angle of a multi-camera clip instance or split the instance into two separate instances with different active angles. FIG. 44A-D illustrates various examples of the use of the angle viewer to edit a multi-camera clip in a media project through seven stages 4410-4470 of a GUI 4400. The GUI 4400 includes an angle viewer 4425, preview display area 4405, and composite display area 4415, among other display areas.

The angle viewer 4425 is similar to the viewer 4300, with the angles in a different order and individual clip names shown in preview displays 4426-4429 rather than angle names. The angles shown in the viewer at the first stage 4410 are "Nathaniel" in the display 4426, "Lam" in the display 4427, "Jim" in the display 4428, and "Amir" in the display 4429. In addition, the fifth angle "Viega" is not shown in any of the four displays, but is accessible through the banks 4435. The viewer has three selectable items 4431-4433, with the same functions as items 4305-4315.

At stage 4410, the composite display area 4415 displays a media project with several clips, including a multi-camera clip instance 4445, the active angles of which at this stage are "Amir" for the video angle and "Viega" for the audio angle. During the seven stages of FIG. 44, the user plays back the media project shown in the composite display area 4415. As such, a playhead 4455 moves across the composite presentation over the course of these stages 4410-4470.

The angle viewer 4425 shows, at stage 4410, that the selectable item 4432 for modifying the video angle is currently selected. In addition, the display 4429 is highlighted in blue with a video icon in order to indicate that "Amir" is the active video angle. Because this is the active angle, video from this angle also shows up in the primary preview display area 4405.

The user has placed the cursor over the display 4426. In some embodiments, the cursor turns into a razor blade icon in order to indicate that selecting the display will cause the application to blade the clip instance at the time currently indicated by the playhead 4455, while switching the active angle of the newly created clip instance after the playhead. In some embodiments, the cursor appears as a blade and selection of the angle display causes the instance to split in two unless the user provides auxiliary input while making the selection, such as holding down a particular key, providing a different type of touch input, etc.

The second stage 4420 indicates the result of the user selecting the angle display 4426 in the previous stage. As a result, the active video angle is now the "Nathaniel" angle, shown in the display 4426 and the preview display area 4405. In addition, in the banks 4435, the upper left square in the first bank is highlighted blue to indicate the new active video angle. The media-editing application has split the clip instance 4445 into two instances by modifying the trimmed range of the clip 4445 and creating a new clip instance 4446 with a trimmed range starting at the time of the playhead in the previous stage and continuing to the end of the media clip (the previous ending time of the instance 4445). As indicated, the clip instance 4445 remains with the same active angles while the new clip instance 4446 has an active video angle of "Nathaniel" and an active audio angle of "Viega". In addition, the user selects the item 4431 in this stage.

The third stage 4430 illustrates that the selectable item 4431 is now highlighted (in yellow), as a result of the user selection at the previous stage. This item, as indicated above, enables the user to switch both the active audio and video angles to a selected angle. In addition, the user has placed the cursor over the display 4428 for the angle "Jim", with the cursor again displayed as the blade icon.

The fourth stage 4440 illustrates the result of the selection of the angle display 4428 in the previous stage. The active audio and video angle is now the "Jim" angle, shown in the display 4428 and the preview display area 4405. In addition, the banks 4435 no longer show either a blue or a green square, but instead display the bottom left square as yellow. The media-editing application has split the clip instance 4446 into two instances by modifying the trimmed range of the clip 4446 and creating a new clip instance 4447 with a trimmed range starting where the clip instance 4446's range leaves off. The clip instance 4446 remains with the same active angles while the new clip instance 4447 has active video and audio angles of "Jim". In addition, the user selects item 4433 at this stage.

The fifth stage 4450 illustrates that the selectable item 4433 is now highlighted (in green), as a result of the user selection at the previous stage. In addition, the user has selected the display 4429 to blade the clip instance 4447 and create a new clip instance 4448 with an active video angle of "Jim" and an active audio angle of "Amir". As a result, the previously yellow highlighted display 4428 is now highlighted blue to indicate the active video angle, while the display 4429 is highlighted green to indicate the active audio angle.

The user has also placed the cursor over the single square in the banks 4435 at this stage in order to select this item. In some embodiments, each of the banks is a separate selectable item, the selection of which causes the angle viewer to display the angle displays associated with the angles represented in the selected bank.

The sixth stage 4460 illustrates the result of the user selecting the bank with a single angle in the previous stage. The angle viewer now displays images from the angle "Viega" in the display 4426. In addition, the user has placed the cursor over this display, and the application displays this cursor as a hand icon rather than a blade icon. In some embodiments, the user can hold down a particular key, or provide a different selection input in order to swap angles through the viewer rather than create a new clip instance with the blade tool. The application provides different indicators in the GUI to let the user know whether a selection will split a clip instance or switch angles for the clip instance.

The seventh stage 4470 illustrates the result of the user selecting the display 4426 in the previous stage. Rather than creating a new clip, the media-editing application has modified the clip instance 4448 so that the active audio angle is "Viega" rather than "Amir". To do this, the application need only modify the data structure for the clip instance to change the active audio angle variable. Additionally, both the display 4426 and the corresponding square in the banks 4435 are now highlighted in green.

FIG. 44 illustrates the case in which the angle instances are all located in the primary lane of the timeline. In some cases, a user might create a composite presentation with a first angle instance anchored to a second angle instance, such that both angle instances are located at certain times within the composite presentation, in different lanes. Some embodiments display video from the angles of the angle instance located in the higher of the two lanes for those times, unless that instance is disabled. When more than two instances share a time, the application displays the angles from the instance with the highest lane number in the angle viewer. Some embodiments display a second angle viewer (either automatically or by user request) for such situations, enabling the user to view and edit either of the instances. When a compositing mode (e.g., a blend) is defined between the two or more clip instances, the primary preview display area of some embodiments displays the output image that is the result of the blend.

Figure 45:
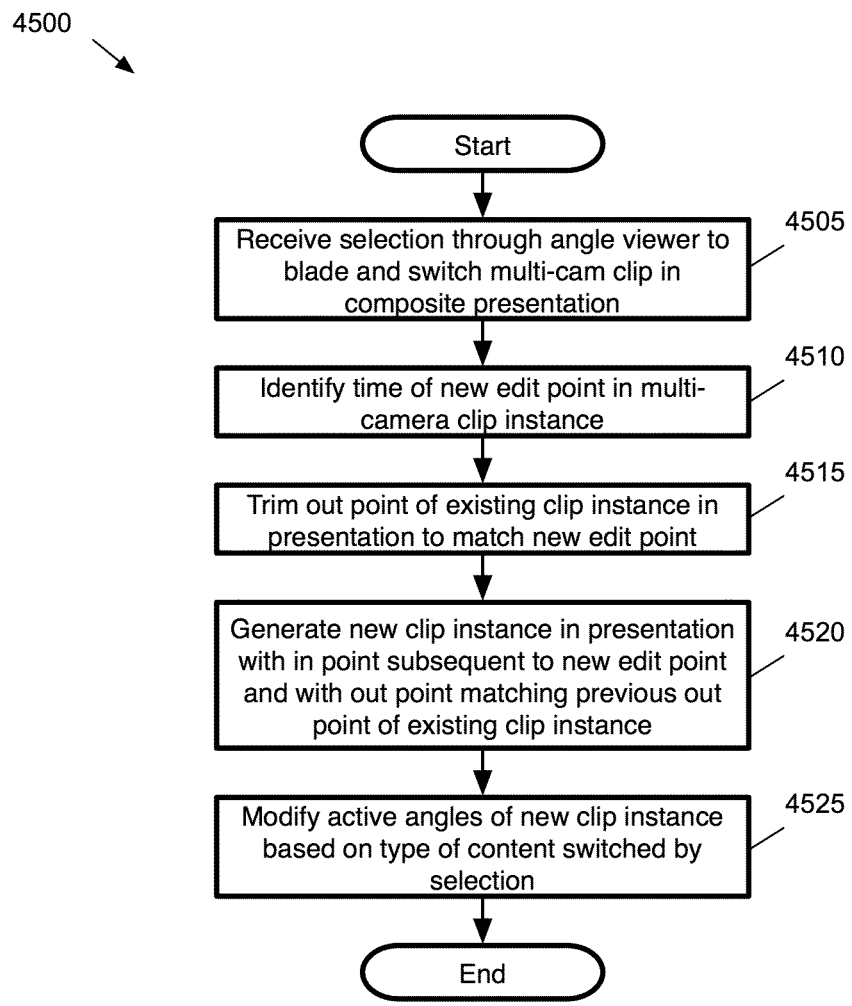
FIG. 45 conceptually illustrates a process of some embodiments for modifying the data structures for a media project when a user blades a clip instance using the angle viewer.

FIG. 45 conceptually illustrates a process 4500 of some embodiments for modifying the data structures for a media project when a user blades a clip instance using the angle viewer. As shown, the process 4500 begins by receiving (at 4505) a selection through the angle viewer to blade and switch a multi-camera clip instance in a composite presentation. FIG. 44 illustrates examples of such a selection; for instance, when the user selects the display 4426 in stage 4410.

The process identifies (at 4510) the time of a new edit point in the multi-camera clip instance being trimmed. In some embodiments, this edit point is the location of a playhead over a multi-camera clip instance in the composite display area. Some embodiments include both an editing playhead, which a user can lock in at a particular time or set to playback the composite presentation at a real time rate, as well as a skimming playhead that moves with a cursor when the cursor moves over clips in the composite display area. In some embodiments, the application uses the position of the editing playhead to determine the time in the multi-camera clip instance to set as the new edit point. While the example of FIG. 44 shows the user editing the clip instances as the playhead moves at a constant rate through the timeline, users may also select a time within the timeline to fix the playhead at that point, then select an angle in the angle viewer.

The process then trims (at 4515) the out point of the existing multi-camera clip instance in the composite presentation to match the identified edit point. In some embodiments, this involves modifying the trimmed range of the angle instance data structure such that the start time of the trimmed range does not change but the end time of the trimmed range matches the new edit point.

The process also generates (at 4520) a new clip instance in the presentation with an in point immediately subsequent to the new edit point and an out point matching the previous out point of the existing clip instance. That is, the trimmed range of the new clip instance starts one frame after the new out point of the already existing clip instance, and ends at the same time that the existing clip instance ended at prior to receiving the blade and switch input. In some embodiments, this new clip instance is created in the data structure for the composite presentation directly after the previously existing clip instance that was broken in two. If the instances are in the primary compositing lane of the composite display area (as in FIG. 44), then these clip instances will be defined as subsequent elements in the array of the primary collection for the composite presentation.

After modifying the clips, the process modifies (at 4525) the active angles of the new clip instance based on the type of content switched by the selection. That is, the new clip instance is a duplicate of the previously existing clip instance with the exception of the trimmed range and at least one of the active angles, as the new clip existence refers to the same multi-camera reference clip, has the same total range, etc. When the currently active selection tool is only for modifying the audio, then the media-editing application changes the active audio angle of the new clip instance to the selected angle, with the active video angle staying the same as the previous clip instance. Similarly, when the selection tool is only for modifying the video, then the application changes the active video angle of the new clip instance to the selected angle, with the active audio angle staying the same as the previous clip instance. When the selection tool modifies both audio and video, the application changes both active angles to the selected angle.

In some embodiments, edits to a multi-camera clip instance created by such a blading process are treated differently than other edits by the media-editing application. As will be described below in the following section, because these through edits essentially split a continuous multi-camera clip based on angle switches, some embodiments enable a user to quickly remove the edit and merge the two clip instances. In addition, the application uses a different default trim edit when editing such a through edit as compared to other edit points.

Figure 46:
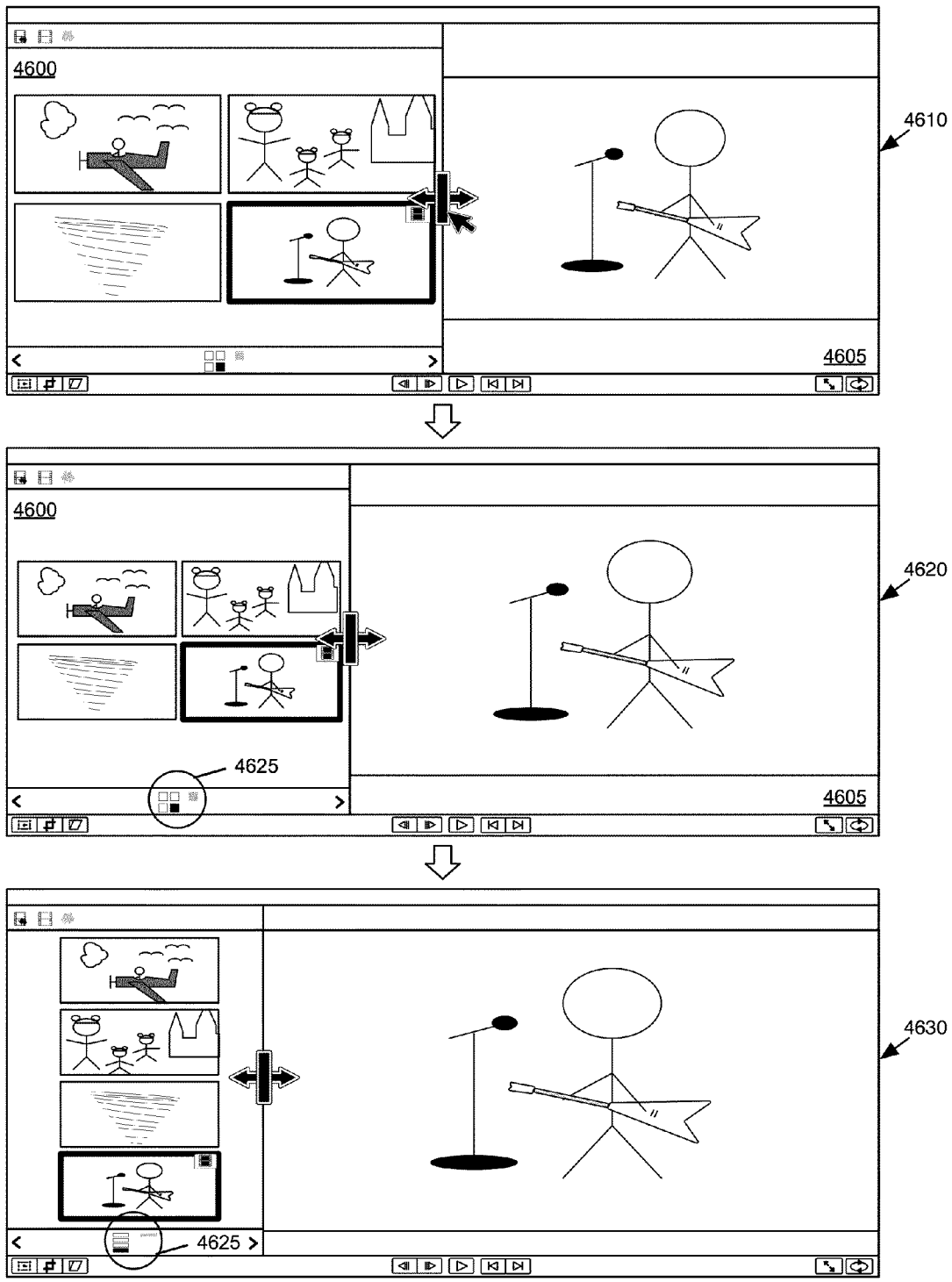
FIG. 46 illustrates the effect of changing the size of an angle viewer when the viewer is displaying four angle preview displays.

Before describing editing with multi-camera clips within the timeline, a display feature of the angle viewer will be described. As mentioned in the sections above, many of the display areas in the media-editing application GUI may be modified in size. FIG. 46 illustrates the effect of changing the size of an angle viewer 4600 when the viewer is displaying four angle preview displays, over three stages 4610-4630.

The first stage 4610 illustrates the angle viewer 4600, with four display areas, and a preview display area 4605 that borders the angle viewer. The user has placed a cursor over the boundary, or seam, between the two display areas, which causes the GUI to display the cursor as a bar with arrows indicating the directions in which the seam can be moved. As shown at stage 4620, the user moves the border to the left, thereby increasing the size of the preview display area 4605 and correspondingly decreasing the size of the angle viewer 4600.

At the third stage 4630, the user has continued to move the seam to the left. This causes the angle viewer 4600 to no longer display the display areas in a 2×2 formation, but instead use a 1×4 display to more efficiently make use of the space available in the angle viewer display area 4600. In addition to modifying the formation of the displays, the application correspondingly changes the formation of the banks in the angle viewer 4600. While in the first and second stages 4610 and 4620 the bank 4625 of four angles is shown in a 2×2 square, the third stage 4630 illustrates this bank 4625 as a 1×4 set of rectangles.

In some embodiments, the media-editing application switches the display of the angle viewer once the individual angle display areas will be larger in the new 1×4 formation than in the 2×2 formation. Some embodiments also perform such formation changes for groups of less or fewer angle displays. For instance, a 2-up viewer (with two angle displays) may be displayed in 1×2 or 2×1 formation, and a 16-up viewer (with sixteen angle displays) may be displayed in 4×4 or 2×8 formation, among other options.

3. Editing Multi-Camera Clip Instances in the Timeline

In addition to using the angle viewer and inspector to modify the active angles of multi-camera clip instances, users can perform such actions in the composite display area, as well as perform a variety of other editing actions specific to multi-camera clips. Many such editing operations specific to multi-camera clips are enabled by the editing application's recognition of "through edits" and differentiation of through edits from other edit points. As described above, in some embodiments a through edit is when a first multi-camera clip instance has an out point that is one frame in the multi-camera clip reference prior to the in point of a second multi-camera clip instance that directly follows the first clip instance in the timeline.

Figure 47:
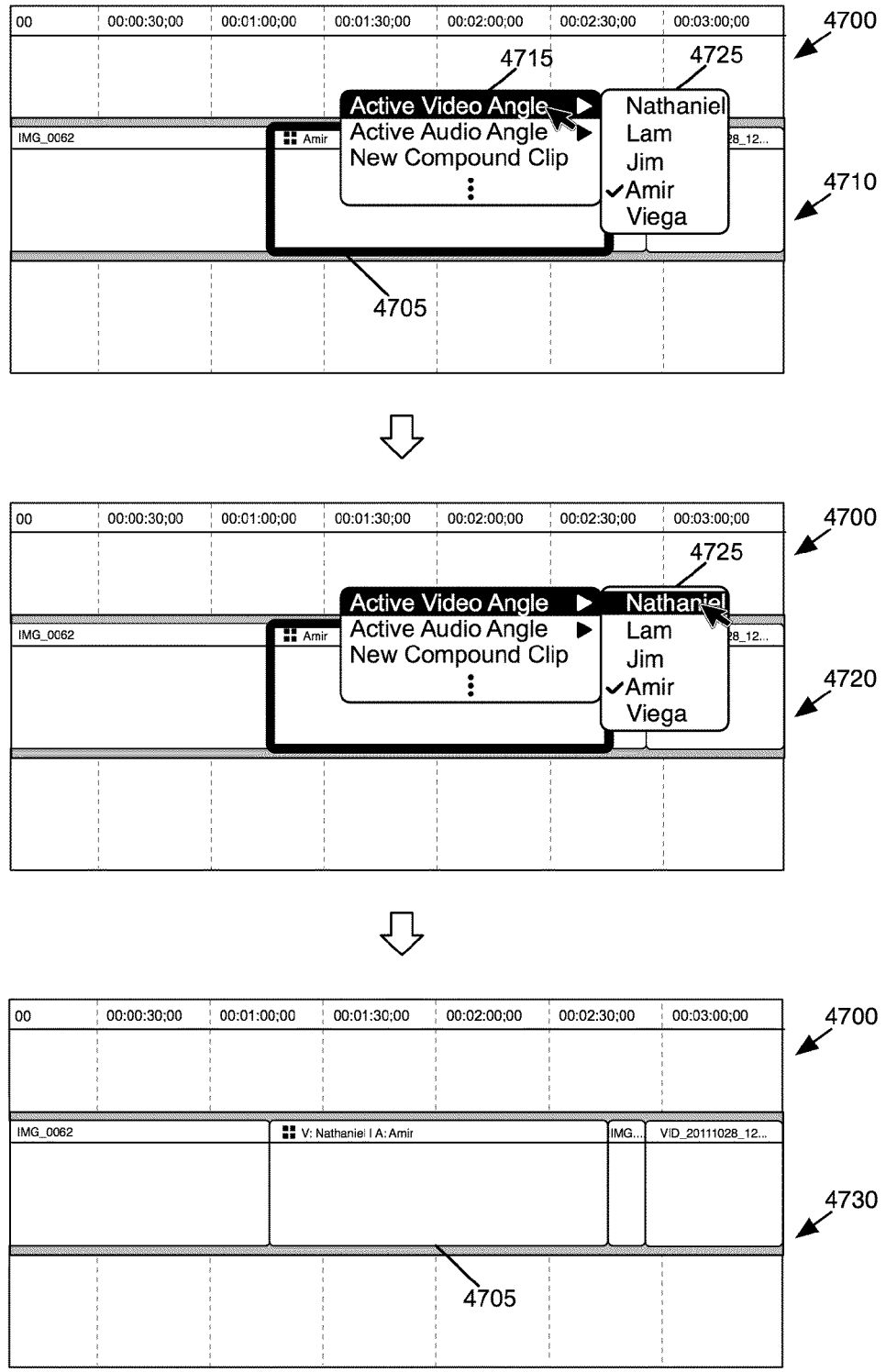
FIG. 47 illustrates the use of a menu to switch the video angle of a selected multi-camera clip instance in a composite display area.

FIG. 47 illustrates the use of a menu in a composite display area 4700 to switch the video angle of a selected multi-camera clip instance 4705 over three stages 4710-4730. In the first stage 4710, the clip instance 4705 is selected and the user has activated a drop-down menu 4715. At this point, as shown by the clip title, the angle "Amir" is the active video and audio angle for the clip instance 4705. Within the menu 4715, the user has selected the option "Active Video Angle", which causes the display of a sub-menu 4725 showing the five possible video angles for the clip instance. Because the currently selected video angle is "Amir", this option is currently checked in the sub-menu.

The second stage 4720 illustrates the selection of the angle "Nathaniel" in the sub-menu 4725, and the third stage 4730 illustrates the result of this action. At this stage, the multi-camera clip instance 4705 now has an active video angle of "Nathaniel" and an active audio angle of "Amir". As with the previously-described actions to switch angles, the media-editing application of some embodiments modifies the active video angle of the angle instance data structure for the clip 4705 in order to effect this switch. Doing so also causes the application to swap in the video effect stack for the selected angle from the effect stack dictionary for the clip for any rendering operations to be performed with the clip.

Figure 48:
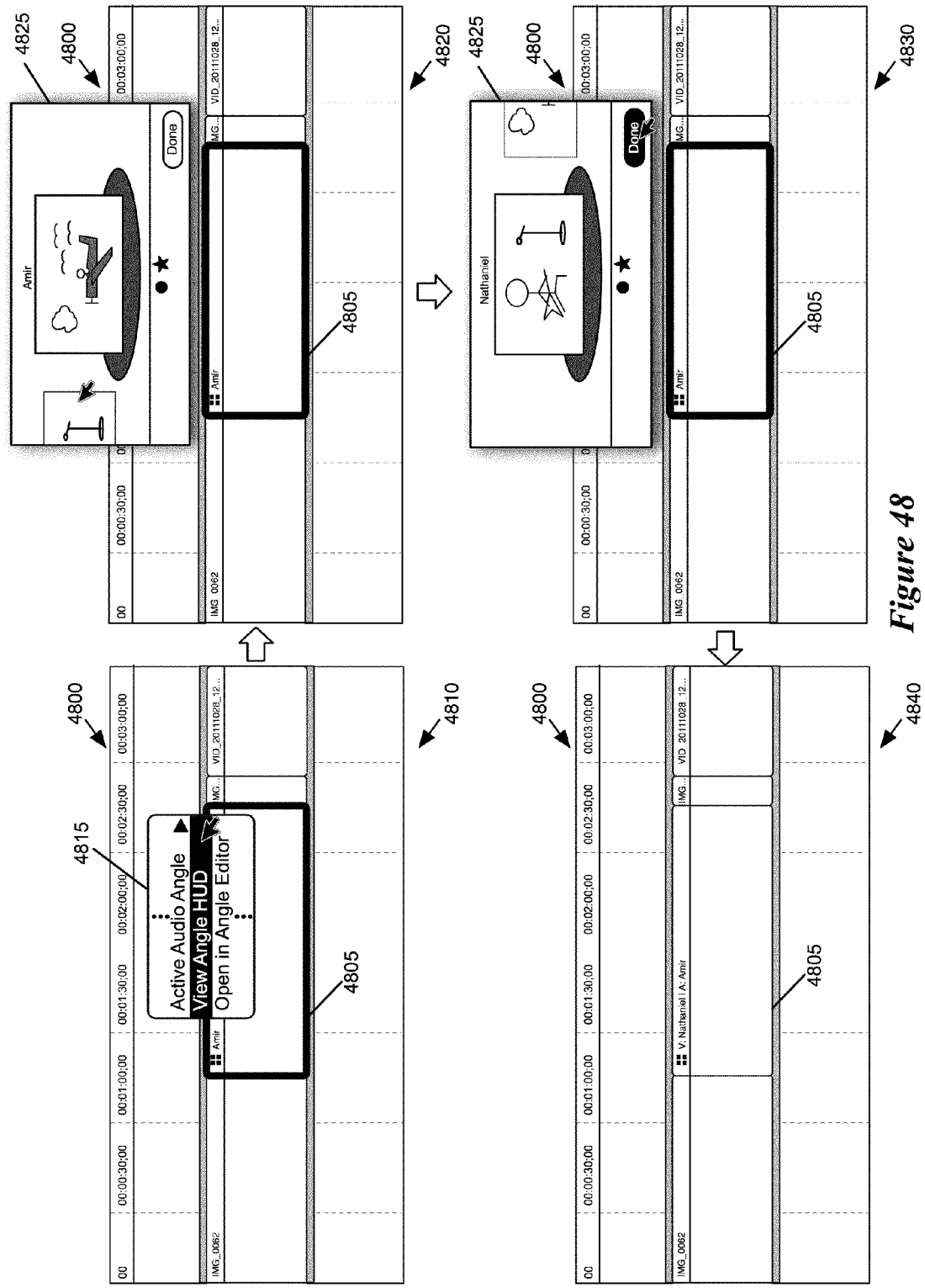
FIG. 48 illustrates a different manner of switching video angles in a composite display area of some embodiments.

FIG. 48 illustrates a different manner of switching video angles in a composite display area 4800 of some embodiments, over four stages 4810-4840. In this case, the media-editing application displays an angle view display area, or heads-up display ("HUD"), in response to user selection input. As shown, at the first stage 4810, a multi-camera media clip instance 4805 with active video and audio angles "Amir" is selected. The user has initiated the activation of a menu 4815 for this selected clip. Within the menu, the user selects the "View Angle HUD" option.

The second stage 4820 illustrates that as a result of this selection, the application now displays an angle viewing HUD 4825 in the GUI, above the selected clip instance. The angle viewing HUD of some embodiments allows the user to rotate through the various video angles available for a multi-camera clip instance. The user can either playback or skim through the video and audio associated with the different angles. As shown, when initiated, the angle viewing HUD 4825 displays the video of the currently selected angle ("Amir") in its center. The other options are shown to the sides of the display area, in order for the user to rotate them into the center through interaction with the user interface (e.g., keys such as the right and left arrows, or selection of items within the HUD). The multi-camera reference clip to which the clip instance 4805 refers has two angles, so only one other image is shown, to the left. At the bottom of the display area are indicators that visually indicate to the user which of the angles is currently selected as the active video angle. As shown by the star indicator, the angle on the right ("Amir") is currently selected. In some embodiments, the user can either select these indicators or select the image to the side of the display in order to rotate through the various angles. In this case, the user is shown selecting the other image on the left side of the HUD 4825.

The third stage 4830 shows that after the user selects this image, the HUD now displays video images for the angle "Nathaniel" at its center. The selection indicators still indicate that the "Amir" angle was selected when the user initiated the viewer 4825, as the right of the two indicators remains a star. At this stage, the user selects the "Done" GUI item in order to select the "Nathaniel" video angle.

The fourth stage 4840 illustrates the result of this selection, as the multi-camera clip instance 4805 now indicates a video angle of "Nathaniel" and an audio angle of "Amir". While this example shows the use of the angle viewing HUD 4825 to select the video angle, some embodiments allow the user to select the audio angle for a clip instance through the HUD as well. Some embodiments include selectable items similar to those shown in the angle viewer 4300 of FIG. 43 that allow the user to choose between audio, video, or both to determine for which type of content the active angle or angles will be modified by selection of a different angle in the viewing HUD.

Figure 49:
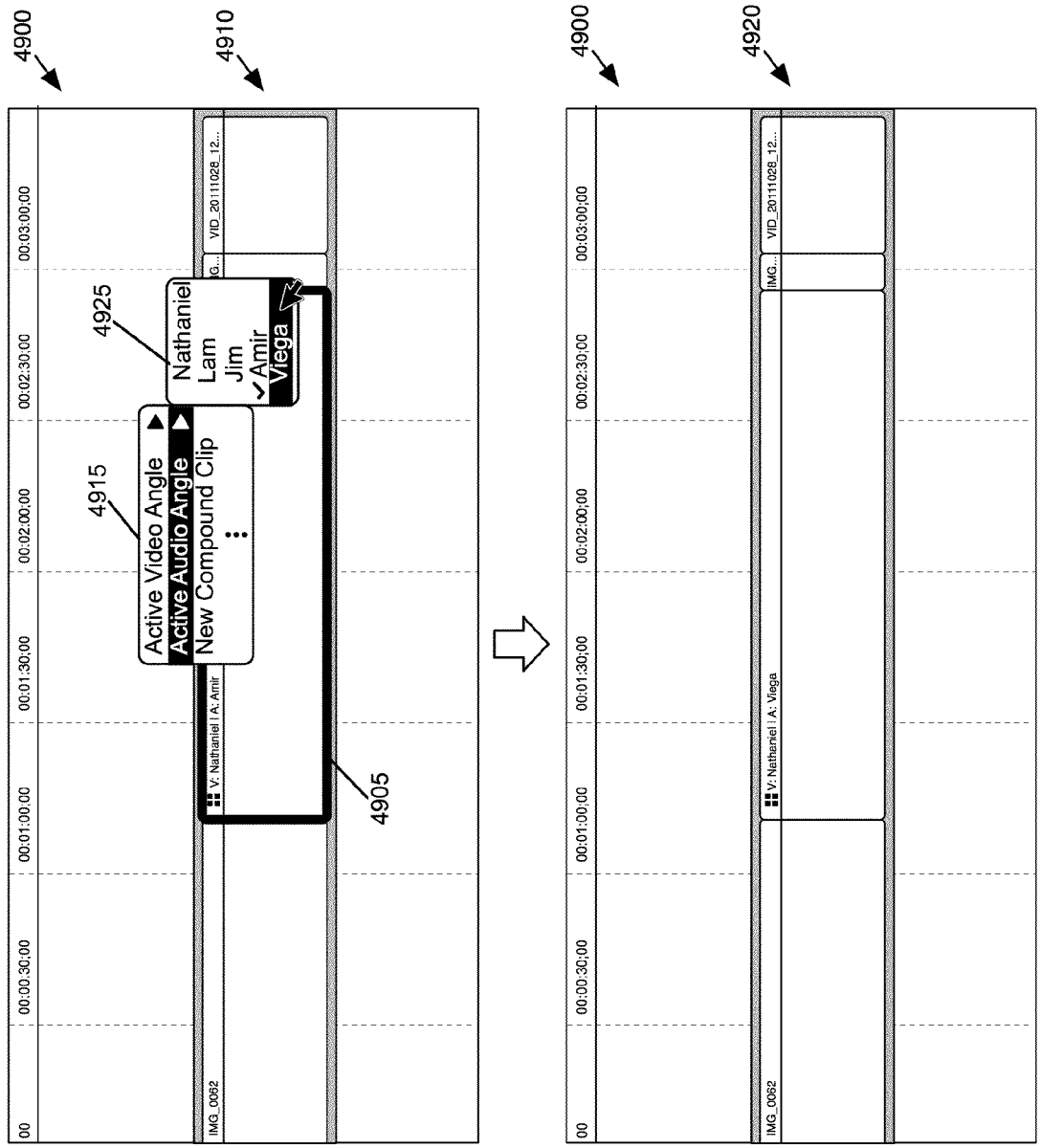
FIG. 49 illustrates the use of a menu to switch the active audio angle of a selected multi-camera clip instance in a composite display area.

While FIG. 47 illustrated switching the active video angle of a multi-camera clip instance in the timeline, FIG. 49 illustrates the use of a similar menu to switch the active audio angle of a selected multi-camera clip instance 4905 in a composite display area 4900 over two stages 4910 and 4920. In the first stage, the clip instance 4905 is selected and the user has activated a drop-down menu 4915. At the moment, as shown by the clip title, the active video angle for the clip instance 4905 is "Nathaniel" and the active audio angle is "Amir". Within the menu 4915, the user has selected the option "Active Audio Angle" to cause the display of a sub-menu 4925 showing the five possible audio angles for this clip instance. Because the currently selected audio angle is "Amir", this option is currently checked in the sub-menu. At this stage, the user selects the angle "Viega" in the sub-menu 4925.

The second stage 4920 illustrates the result of this selection, as the multi-camera clip instance 4905 now has an active audio angle of "Viega". As with the previously-described actions to switch angles, the media-editing application of some embodiments modifies the active audio angle of the angle instance data structure for the clip 4905 in order to effect this switch. Doing so also causes the application to swap in the audio effect stack for the selected angle from the effect stack dictionary for the clip for any rendering operations to be performed with the clip.

In addition to blading clips and changing the active angles of clip instances, the media-editing application of some embodiments provides a variety of editing operations for affecting multi-camera clip instances. For one, many standard editing operations available for application to a standard media clip in a media project are also available for multi-camera clip instances: application of video or audio effects to an active angle (pixel modification effects, transforms, distortions, etc.), trim operations (ripple, roll, slip, slide), and compositing operations using multiple lanes (blending, picture in picture, etc.), among other operations. In addition, some embodiments provide operations specific to multi-camera clip instances or vary how certain operations are applied to multi-camera clip instances.

Many such operations relate to the handling of through edits by the media-editing application. As described above, a through edit occurs in some embodiments when a user blades a multi-camera clip instance and the resulting out point of the first clip is immediately prior to the resulting in point of the second clip (that is, time within the multi-camera reference clip timeline flows smoothly from the first clip to the second clip with no breaks). Thus, playing back a media project across the two clip instances involves a continuous playback through the multi-camera clip, but with a switch in the active video or audio angle (or both). Whereas the edit point between two clips in a media project is normally displayed in the GUI as a solid line, some embodiments display through edits as dashed lines to visually indicate the presence of the through edits to the user.

Figure 50:
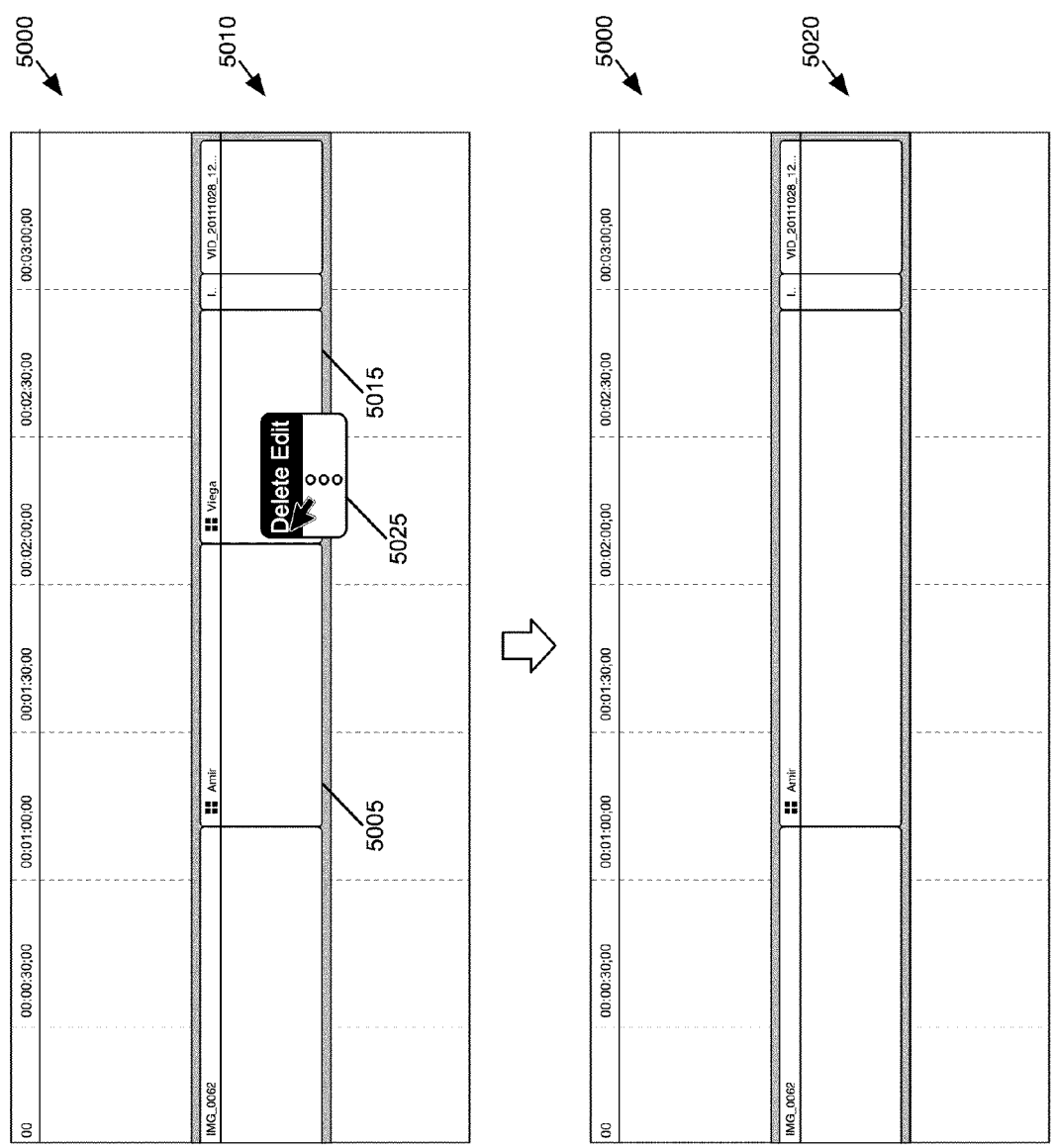
FIG. 50 illustrates the deletion of a through edit in a composite display area in order to combine two multi-camera clip instances into a single instance.

FIG. 50 illustrates the deletion of a through edit in a composite display area 5000 in order to combine two multi-camera clip instances into a single instance over two stages 5010 and 5020. As shown at the first stage, the composite display area 5000 displays a representation of a media project that includes, among other clips, a first multi-camera clip instance 5005 and a second multi-camera clip instance 5015. Both of these clips refer to the same multi-camera reference clip, but the first clip instance 5005 has active video and audio angles of "Amir" while the second clip instance 5015 has active angles of "Viega".

The edit point between the two clip instances 5005 and 5015 is a through edit because, in addition to referring to the same reference clip, the clips refer to subsequent content in the multi-camera reference clip. In the first stage 5010, the user has selected this edit point and activated a menu 5025, which includes the option "Delete Edit". In some embodiments, this menu option is only available when the user selects a through edit, as opposed to a normal edit between two unrelated media clips, or even two clip instances that do not refer to subsequent reference clip material.

The second stage 5020 illustrates the result of this selection, as the media-editing application has deleted the second clip instance 5015, and extended the duration of the clip instance 5005. In some embodiments, the application removes the data structure for the second clip instance from the media project while extending the trimmed range of the first clip instance such that the out point in the reference clip timeline matches that of the now-deleted clip instance. While this example shows the second clip instance (the later clip in the timeline) being deleted, some embodiments automatically delete the earlier instance (and change the in point of the later instance), or allow the user to choose which of the two instances to delete. Furthermore, while this figure shows a menu selection, some embodiments allow the user to delete an edit point through other interactions, such as the delete key or a different set of keystrokes.

In addition to the clip deletion shown in FIG. 50, some embodiments will also automatically delete clip instances in specific editing scenarios. When two clip instances are separated by a through edit, and the user modifies one of the instances to have the same active angles as the other instance, some embodiments automatically recognize this and combine the two clip instances (by deleting one of the instances and modifying the in or out point of the other instance as needed).

Even when two consecutive multi-camera clip instances cannot be combined because one of the active angles (either the video or audio angle) is different between the two, some embodiments will treat the video or audio of the two clips as a single clip for certain actions when the two clip instances share one of the active angles. For instance, certain audio-related actions will be applied to both clip instances when the active audio angles are the same but with different active video angles.

Figure 51:
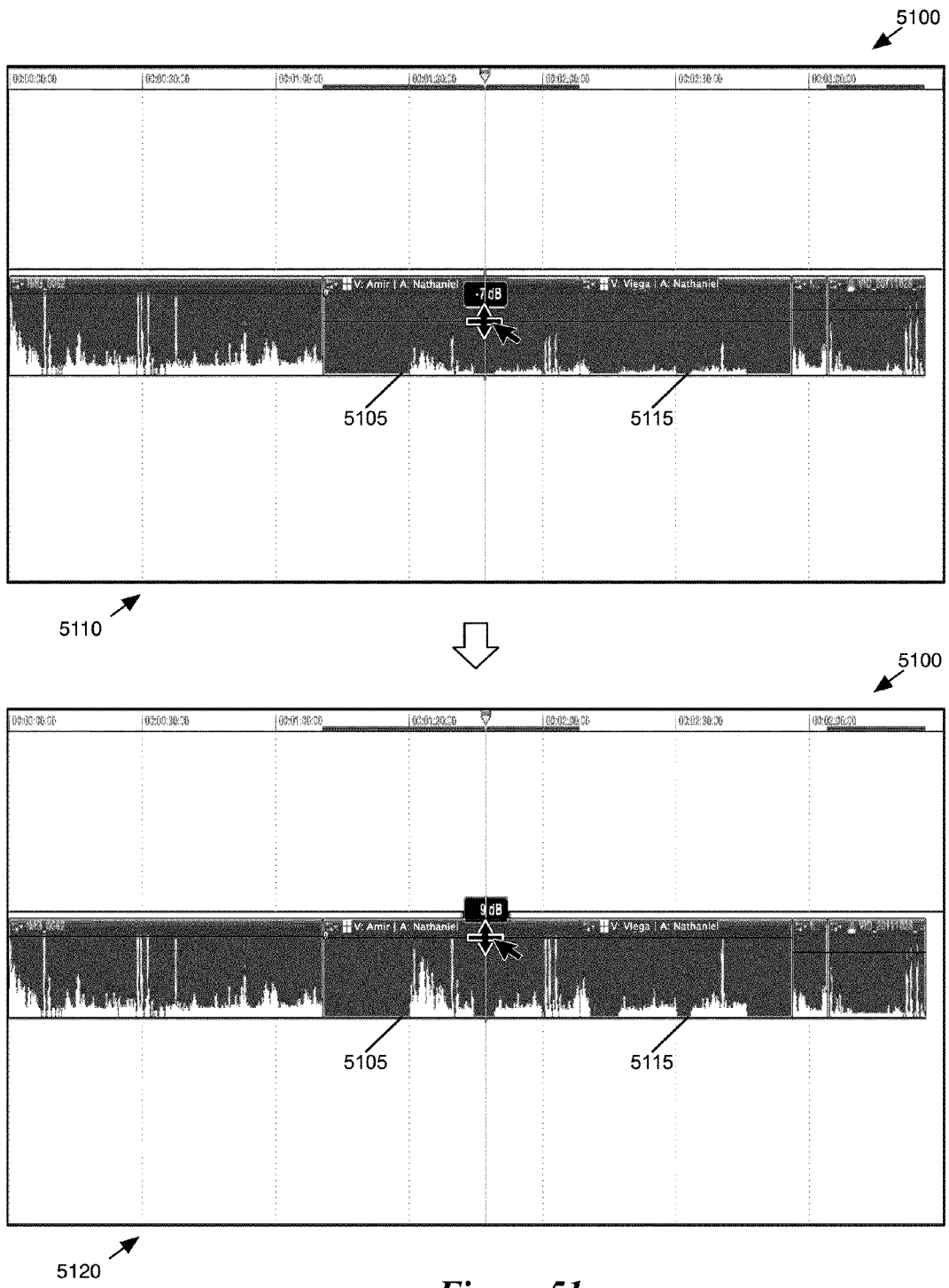
FIG. 51 illustrates a user modifying the volume level of two clip instances that are separated by a through edit.

FIG. 51 illustrates a modification to the volume level of two clip instances 5105 and 5115 that are separated by a through edit, over two stages 5110 and 5120 of a composite display area 5100. The first clip instance 5105 has a video angle of "Amir" and an audio angle of "Nathaniel", while the clip instance 5115 has a video angle of "Viega" and an audio angle of "Nathaniel". In this figure, the user has changed the clip display in the composite display area 5100 to better highlight the audio waveforms rather than the video thumbnails.

As shown in the first stage 5110, the user has placed a cursor over an audio volume line shown at the top of the audio waveform, and selected the volume line. In some embodiments, this audio volume line is a UI tool that enables the user to modify the volume of the audio for a media clip. When the user selects the UI tool, some embodiments provide a display indicating the volume of the particular clip—in this case, −7 decibels. The user can move the UI tool up or down in order to modify the volume of the clip.

The second stage 5120 illustrates the clip instances 5105 and 5115 after the user has dragged the audio volume line upwards in order to change the volume of the clips to +9 decibels. As shown, the user drags the volume line within the first clip instance 5105. However, because the edit point between the two clips is a through edit and the audio angle is the same for the two clips, the application automatically treats the audio as if it were one clip and applies the same effect to both. As such, not only is the volume of the audio for the clip instance 5105 raised to +9 dB, but the volume of the audio for the clip instance 5115 increases as well.

In some embodiments, other audio effects (panning, sound generation effects, etc.) applied to one clip instance will be applied to neighboring clip instances that have the same audio angle and are divided by through edits as well. In some cases, several subsequent clips that are all divided by through edits (i.e., that collectively refer to a continuous timeline in a multi-camera reference clip) and share the same audio angle can be treated collectively for audio effect purposes (such as shown in FIG. 51).

Figure 52:
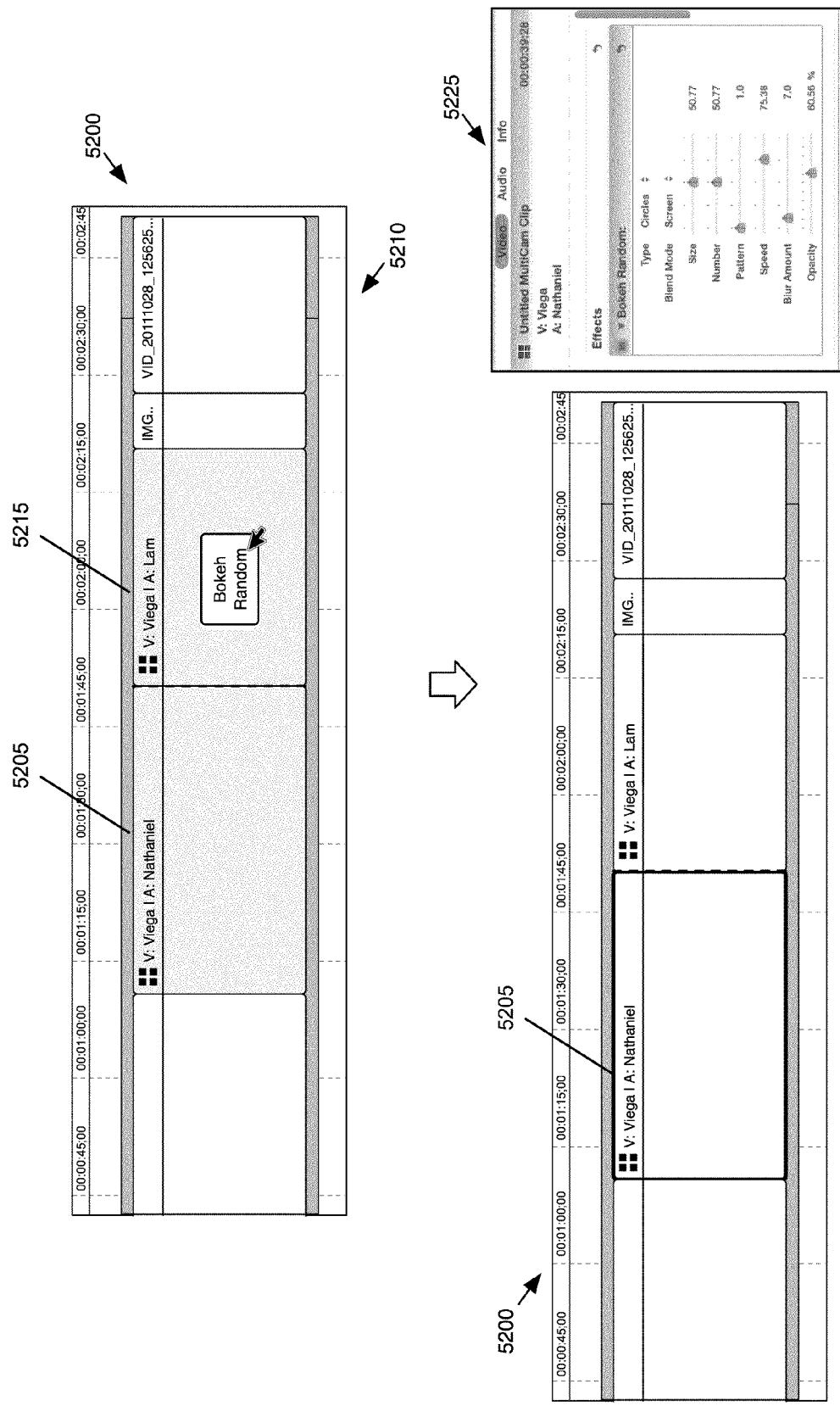
FIG. 52 illustrates a user applying a video effect to a pair of clip instances and in a composite display area.

In addition to applying audio effects across multiple instances, some embodiments apply video effects in a similar manner when the video angles are the same across consecutive clip instances divided by through edits. FIG. 52 illustrates a user applying a video effect to a pair of clip instances 5205 and 5215 in a composite display area 5200 over two stages 5210 and 5220. The first clip instance 5205 has an active video angle of "Viega" and an active audio angle of "Nathaniel", while the second clip instance 5215 has an active video angle of "Viega" and an active audio angle of "Lam".

In some embodiments, a user can drag a video effect from an effects display area (e.g., the display area 330 of FIG. 3) over a clip in order to apply the effect to the clip. In the first stage 5210 of FIG. 52, the user has dragged an effect (the Bokeh Random effect) over the multi-camera clip instance 5215 in order to apply the clip to the active video angle ("Viega") of the clip instance. As shown at this stage, not only does doing so highlight the clip instance 5215, but it also highlights the clip instance 5205. The clip instance 5205 has the same active video angle as the clip instance 5215 and is only separated from the other instance by a through edit. As such, the application applies the Bokeh Random effect to both of the clip instances 5205 and 5215.

The second stage 5220 illustrates the result of the application of the effect in the inspector display area 5225. In the composite display area, the user has selected the multi-camera clip instance 5205, and the inspector display area 5225 displays the video information for this selected clip. As shown, the video information includes the effect Bokeh Random, dropped over the clip instance 5215 in the previous stage. This indicates that the media-editing application has added this effect to the video effect stack for the "Viega" angle in the clip instance 5205 as well as that of clip instance 5215. In some embodiments, when the user modifies the effect parameters for one of the clips, this also affects the effect stack of the other neighboring clip instances.

The previous two examples illustrate the application of various audio and video effects to multiple multi-camera clip instances automatically. In some embodiments, users have the option whether to affect multiple instances separated by through edits or to only affect the clip to which the effects are directly applied. The user may toggle a setting, hold down a particular key or set of keys, etc. in order to determine whether to affect one or multiple clips at the same time.

The media-editing application also uses different defaults in certain circumstances when applying user actions to multi-camera clip instances as compared to standard media clips. For instance, some embodiments apply different default trim edits to clips when the edit boundary being trimmed is a through edit between two clip instances. Trim edits, in some embodiments, are edits that modify the edit points between two clips. Examples of trim edits applied at the edit boundary include the ripple edit (which changes the duration of only one of the clips at the edit boundary) and the roll edit (which increases the duration of one of the clips while correspondingly decreasing the duration of the other clip). Other trim edits include the slide edit (which moves a selected clip in the timeline such that the clip on one side of the selected clip decreases in duration while the clip on the other side of the selected clip increases in duration) and the slip edit (which changes the in and out points of a selected media clip without moving the clip in the timeline).

Figure 53:
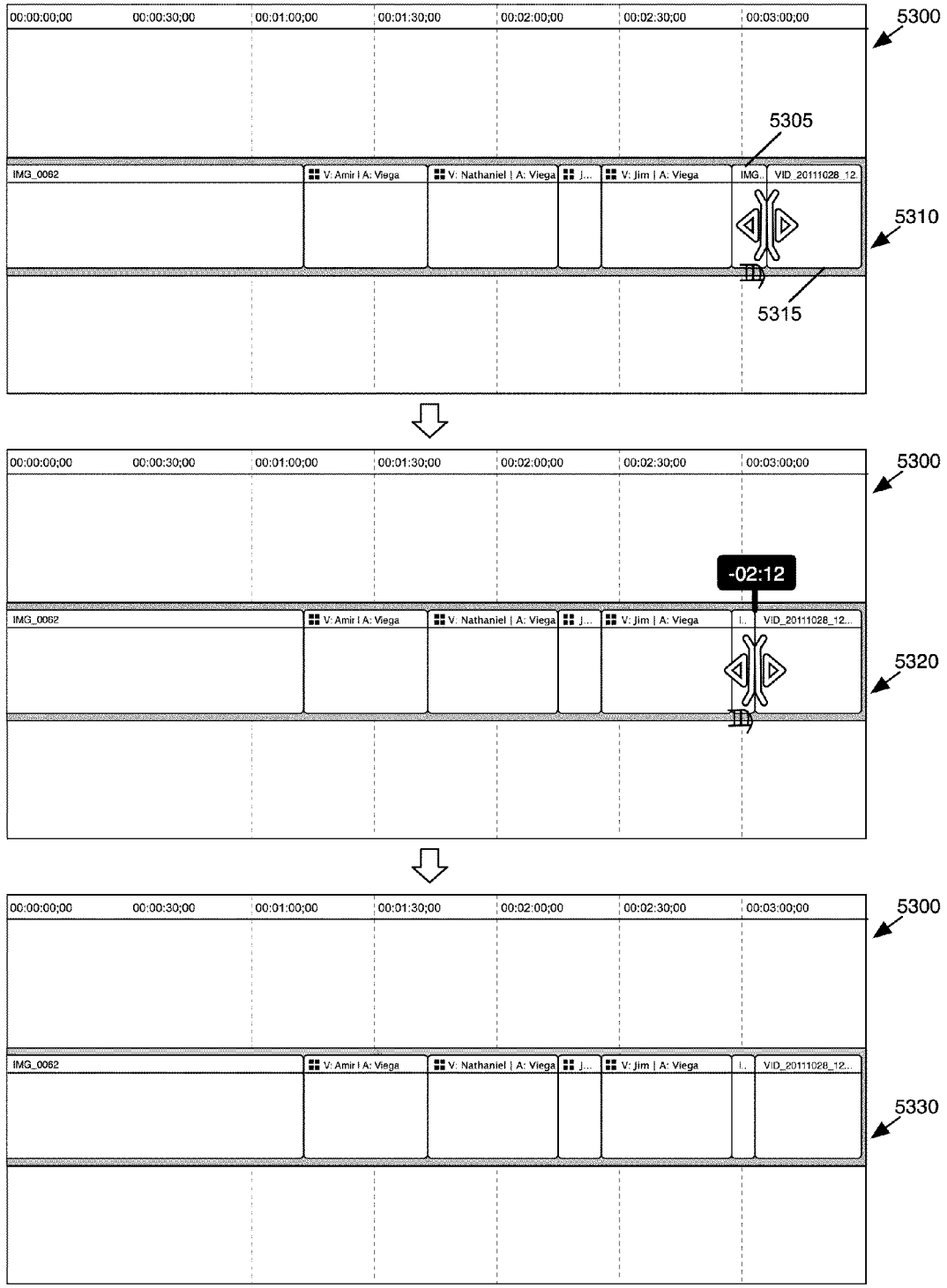
FIGS. 53 and 54 illustrate the difference in default trim edits applied at the edit point between two standard media clips and two multi-camera clip references in which the edit point is a through edit.
Figure 54:
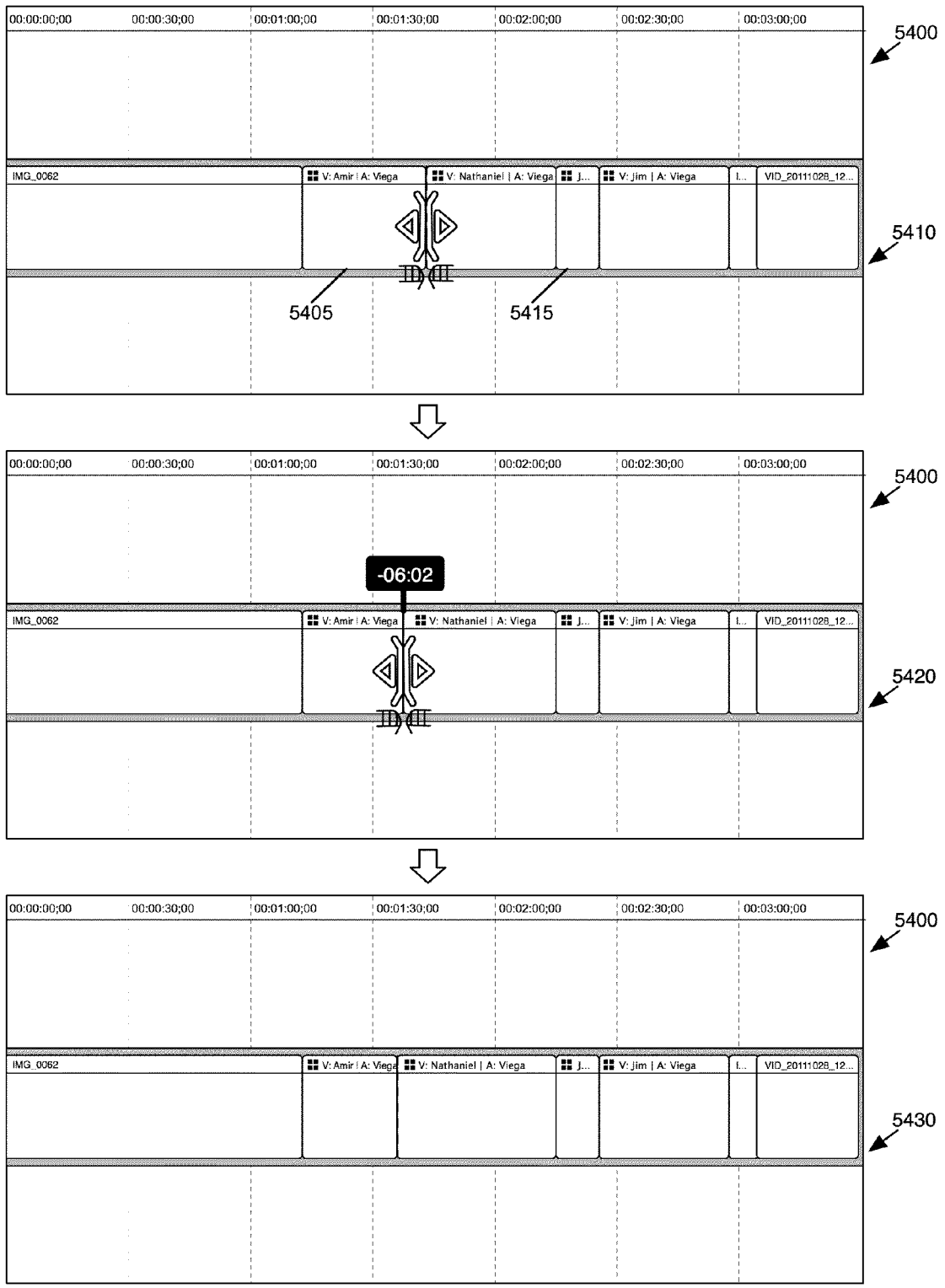

FIGS. 53 and 54 illustrate the difference in default trim edits applied at the edit point between two standard media clips and two multi-camera clip references in which the edit point is a through edit. In some embodiments, when a user places a cursor near an edit point, the media-editing application assumes that the user wishes to perform a trim edit at that boundary (e.g., a ripple edit). In addition, the user can select a trim tool, which provides the ability to access multiple different trim edits (e.g., ripple, roll, slip, slide, as described above) by moving the cursor over different portions of a clip. The following figures indicate the difference in the default trim edit when the trim tool is not selected for some embodiments.

FIG. 53 illustrates a default trim edit as a ripple edit to standard media clips over three stages 5310-5330 of a composite display area 5300, while FIG. 54 illustrates the default trim edit as a roll edit to multi-camera media clip instances over three stages 5410-5430 of a composite display area 5400.

In the first stage 5310 of FIG. 53, the user has selected an edit point between two clips 5305 and 5315. These clips are standard media clips with audio and video components (e.g., clip 805 of FIG. 8). The cursor at the edit point displays a ripple edit indicator, as the user moves the cursor to the left. The second stage 5320 displays the composite display area 5300 as the user has moved the edit point to the left by approximately two seconds, and the third stage 5330 illustrates the composite display area 5300 after the user has released the edit point and finished the trim edit. As the media-editing application defaults to a ripple edit, this decreases the trimmed range of the clip 5305. The data structure for the clip 5315 is not affected, although the clip starts earlier in the timeline as a result of the shortened clip 5305.

In the first stage of FIG. 54, the user selects an edit point between two multi-camera media clip instances 5405 and 5415. These clip instances both refer to the same multi-camera reference clip and are separated by a through edit. As such, when the user selects the edit point between the two clips in stage 5410, the media-editing application defaults to using a roll edit rather than a ripple edit. As the user moves the edit point to the left in stage 5420, the duration of the clip 5405 decreases while the duration of the clip 5415 increases. The third stage 5430 illustrates the composite display area 5400 after the user has released the edit point and finished the trim edit. Because the media-editing application defaults to a roll edit, the change decreases the trimmed range of the clip 5405 (moving the out point earlier in the reference clip) and increases the trimmed range of the clip 5415 (correspondingly moving the in point earlier in the reference clip). Because the range of the second clip 5415 still starts directly after the end of the range of the first clip 5405, the edit point between the two clips remains a through edit. Were the user to apply a ripple edit at this boundary, the edit would no longer be a through edit as the clips would no longer be subsequent in the timeline of the reference clip.

VI. Rendering Clip Instances

The above sections described the editing of a media project using multi-camera clip instances. In order to generate output images for a media project, the application renders an image for each frame in the presentation. The frequency of these frames depends on the frame rate specified for the media project (e.g., as shown in FIG. 4). To render an image for a particular frame in the media project, the application first identifies the media clip or clips to use for that time. When the time in the media project has clips in multiple lanes, or a compound clip with clips in multiple lanes, multiple source images may be needed. To render an image from a standard video clip whose frame rate (typically taken from the source video file referred to by the video clip through an asset) matches the composite presentation, the application identifies a source image from the time in the clip that corresponds to the requested frame, reads and decodes the frame, and applies any effects in the clip's effects stack (e.g., transforms, pixel value modification, etc.). Such rendering operations are described in detail in the U.S. patent application Ser. No. 13/111,895, now issued as U.S. Pat. No. 9,099,161, entitled "Media-Editing Application with Multiple Resolution Modes" and filed May 19, 2011, which is incorporated herein by reference.

When the frame rate of the video clip does not match that of the media project, some embodiments use multiple source images from the video clip in order to perform a rate conform effect, as described in U.S. patent application Ser. No. 13/218,407, now published as U.S. Pat. No. 8,839,110, entitled "Rate Conform Operation for a Media-Editing Application" and filed Aug. 25, 2011, which is incorporated herein by reference. In addition, when the video properties (e.g., the format and/or dimensions) of the video clip do not match that of the media project, some embodiments apply a spatial conform effect to the clips as described in application Ser. No. 13/218,407. These effects are stored in the effect stack of the media clip in some embodiments, and applied after the image or images are retrieved and decoded.

Clip instances, however, do not directly contain component clips or references to assets, but instead refer to reference clips stored in an event (which themselves contain component clips and asset references). The clip instances may store their own effect stacks, and in the case of multi-camera clip instances store different effect stacks for the different angles in the multi-camera reference clip. In addition, the reference clips may have their own effects applied. In the case of multi-camera reference clips or compound reference clips, the clips contained within the reference clips may have their own effect stacks. In addition, the source images may have a first set of video properties, the reference clip a second set of video properties, and the media project that contains the clip instance a third set of video properties. Thus, the media-editing application of some embodiments may need to apply multiple layers of effect stacks, including conform effects, in order to render each output image.

Figure 55:
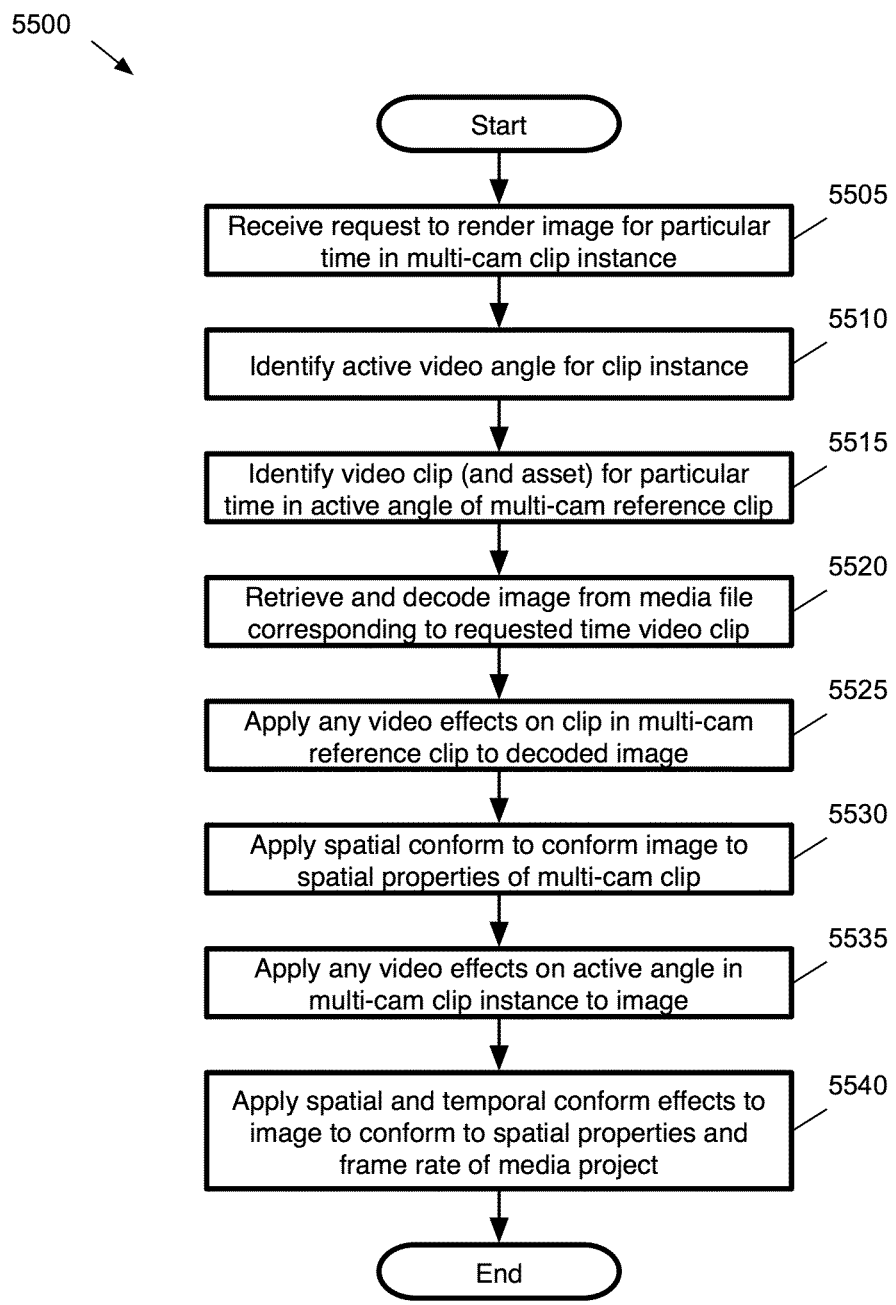
FIG. 55 conceptually illustrates a process of some embodiments for rendering images from a multi-camera clip instance in a media project.
Figure 56:
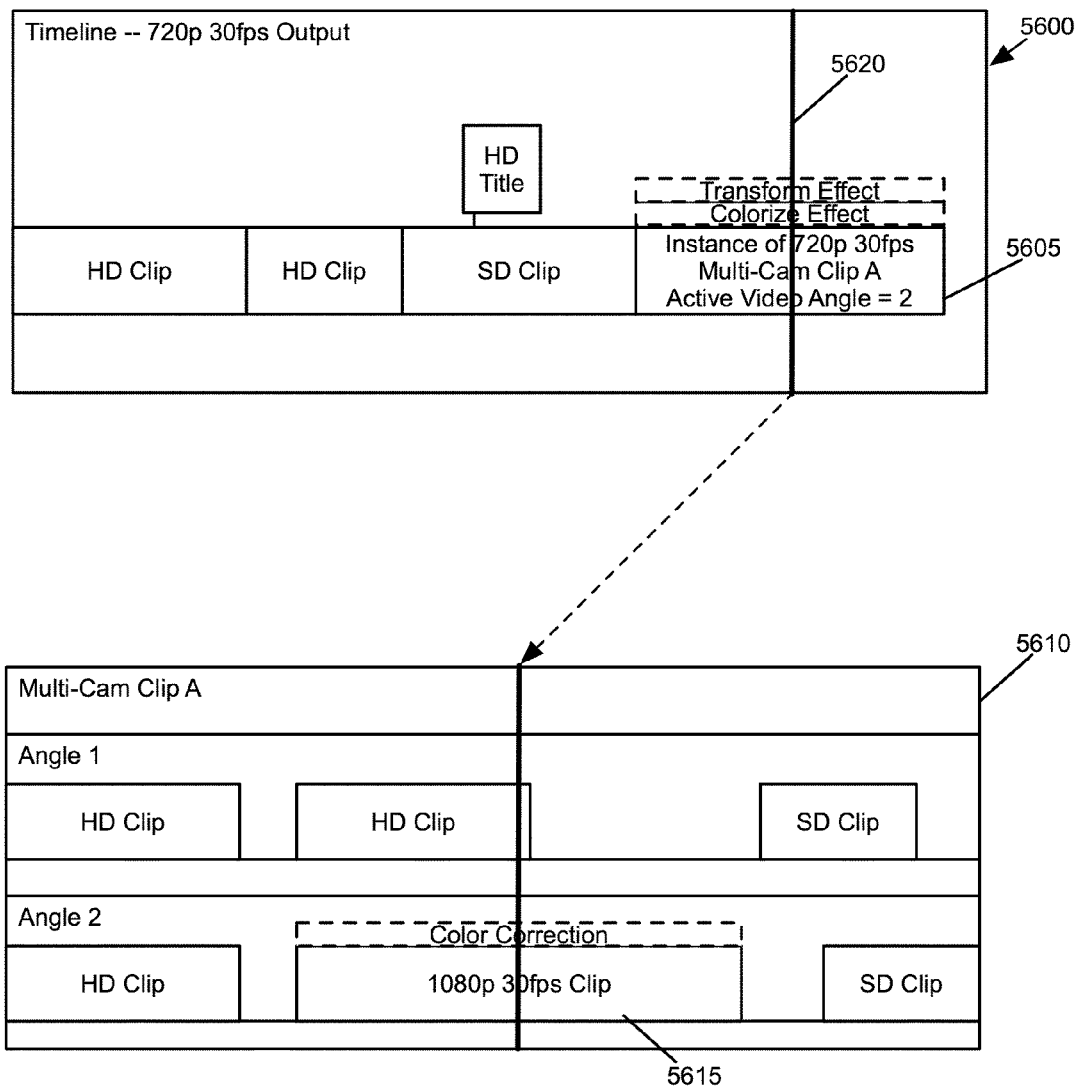
FIG. 56 conceptually illustrates a timeline of a media clip that includes various media clips, including a multi-camera clip instance.
Figure 57:
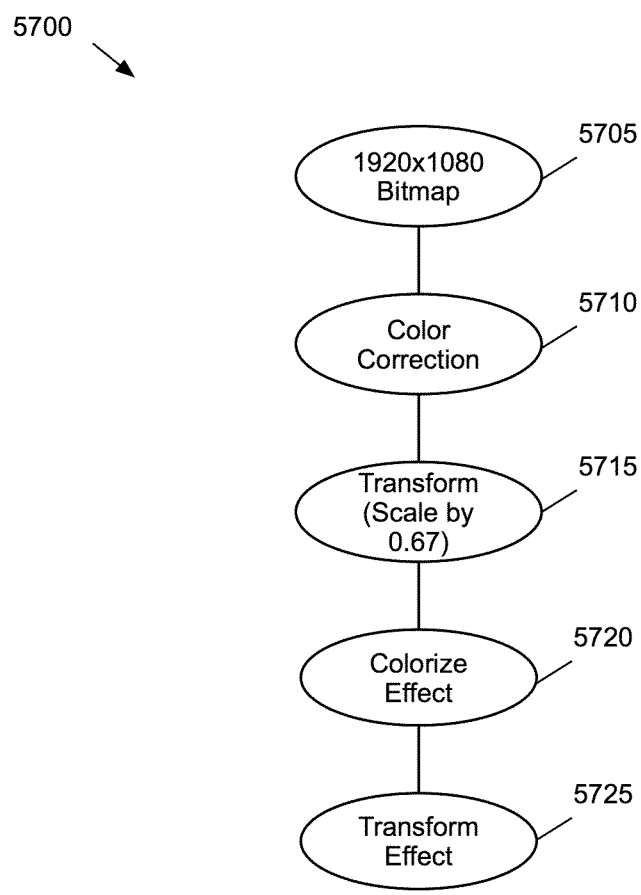
FIG. 57 conceptually illustrates a render graph for a particular image of the media project from FIG. 56.

FIG. 55 conceptually illustrates a process 5500 of some embodiments for rendering images from a multi-camera clip instance in a media project. The process 5500 will be described by reference to FIGS. 56 and 57. FIG. 56 conceptually illustrates a timeline of a media project 5600 that includes various media clips, including a multi-camera clip instance 5605. FIG. 57 conceptually illustrates a render graph 5700 for a particular image of the media project 5600. The multi-camera clip instance 5605 refers to a multi-camera reference clip 5610 and has an active video angle of "Angle 2". The multi-camera reference clip 5610 includes, in the video angle "Angle 2", various media clips including a particular clip 5615.

The process 5500 begins by receiving (at 5505) a request to render an image for a particular time in a multi-camera clip instance. The media-editing application of some embodiments requests rendered images for various reasons. When a user skims through a media project or compound clip in the composite display area or initiates playback of a media project, the application will render an image to output to the appropriate display area. In addition, some embodiments render images in the background when the processing and memory resources are available, in order to have the images available for future use without having to render at that time. The user might also have requested to render the media project for export (e.g., to a storage, for upload to a website, etc.).

FIG. 56 illustrates a playhead 5620 over the media project 5600, which indicates a particular time within the multi-camera clip instance 5605. This clip instance 5605 is an instance of the multi-camera reference clip 5610, which has a 720p video format with a 30 fps frame rate and both a transform effect and a colorize effect applied. The render graph 5700 indicates the operations applied to a source image in order to arrive at the desired output image for this particular time in the clip instance 5605.

The process 5500 then identifies (at 5510) an active video angle for the clip instance. In some embodiments, the application stores the active video angle as a variable in the data structure for the clip instance. In the example shown in FIG. 56, the active video angle of the clip instance 5605 is "Angle 2".

With the active video angle identified, the process then identifies (at 5515) the video clip and asset or assets for the particular time in the active angle of the multi-camera reference clip referred to by the clip instance. The particular time requested in the media project corresponds to a particular time in the multi-camera reference clip. As described above, the multi-camera reference clip of some embodiments has a set of angles that are each an ordered set of clips. As such, each angle has a clip that corresponds to the particular requested time (though this clip may be a gap clip). This clip, in turn, has a video component that refers to a media asset. If the clip is a compound clip, then it may refer to multiple assets by way of the different clips contained within the compound clip. In the example of FIG. 56, the active angle in the multi-camera reference clip 5610 includes clip 5615 at the requested time. As shown, this clip 5615 has a 1080p video format with a 30 fps frame rate, and has a color correction effect applied.

Next, the process 5500 retrieves and decodes (at 5520) an image from the media file corresponding to the requested time in the video clip. The media asset identified at 5515 includes a reference to a media file that stores actual video images. These images are often stored in encoded form, and thus the media-editing application uses a decoder to decode the images and arrive at a set of pixels that represents the image. As shown in FIG. 57, the render graph 5700 begins with a decoded 1920×1080 bitmap image from the media asset referred to by the clip 5615.

With the image retrieved, the process applies (at 5525) any video effects on the clip in the multi-camera reference clip to the decoded image. In some embodiments, the effects on the reference clip (or clips within the reference clip) are applied before any effects on the clip instance. In addition, some embodiments apply the reference clip effects before conforming the retrieved images to the reference clip properties. In FIG. 56, the clip 5615 has a color correction effect, and thus the application applies this color correction effect. As shown in the render graph 5700, the node 5705 for the retrieved bitmap leads into a color correction node 5710 for the application of this effect on the clip 5615. This color correction node includes the parameters of the effect defined by a user (e.g., a mapping of input pixel values to output pixel values).

Next, the process applies (at 5530) any spatial conform effect necessary to conform the image to the spatial properties of the multi-camera clip. If the multi-camera reference clip has the same spatial video properties as the retrieved image, then no spatial conform effect is necessary. When the spatial properties differ, the media-editing application applies a spatial conform effect in order to generate an image of the requested size (in this case, that of the reference clip). When the aspect ratio of the images is different, the application can either fit the entirety of the retrieved image into the output image (with either a pillarbox or letterbox), or fill the entirety of the output image (cutting off part of the retrieved image). A detailed discussion of the spatial conform effect of some embodiments can be found in U.S. application Ser. No. 13/218,407, incorporated by reference above.

In order to preserve time alignments within the multi-camera reference clip, some embodiments do not temporally conform the contained video clip to the frame rate of the reference clip. On the other hand, some embodiments use time-preserving rate conform effects such as frame sampling or blending, but avoid using rate conform effects that speed up or slow down the clip. A detailed discussion of different rate conform techniques can be found in U.S. application Ser. No. 13/218,407.

The clip 5615 has a 1080p video format (1920×1080 images with square pixels), while the reference clip 5610 that contains the clip 5615 has a 720p video format (1280×720 images with square pixels), so the application applies a spatial conform effect to scale the 1920×1080 images to 1280×720. Thus, the next operation in the render graph 5700 is a transform node that scales the input image by a factor of ⅔ (0.67). The output of this node 5715 will be a 1280×720 bitmap.

Returning to FIG. 55, the process 5500 next applies (at 5535) to the image any video effects on the active angle in the multi-camera instance clip. As described above, some embodiments store a video effects stack in the clip instance for each angle of the multi-camera reference clip. The process identifies the effects stack for the active angle and applies any effects in this stack. In FIG. 56, the active angle ("Angle 2") of clip 5605 has a colorize effect and a transform effect applied. The render graph 5700 thus has a node 5720 for the colorize effect and a node 5725 for the transform operation. Some embodiments switch the order of these two operations, and combine the transform 5715 with the transform operation 5725. If the transform effect 5725 enlarges the image, then combining these operations avoids a loss of resolution caused by downscaling the image and then subsequently upscaling the image. However, some embodiments separate effects applied within the reference clip from effects applied to the active angle.

Finally, the process 5500 applies (at 5540) spatial and temporal effects to the image to conform the image to the spatial properties and frame rate of the media project that contains the multi-camera clip instance, then ends. When the spatial properties of the multi-camera reference clip are the same as those of the media project, then no spatial conform effect is needed. Otherwise, the spatial conform effect is applied as described above for operation 5530. When the frame rates of the reference clip and the media project do not match, the application applies a rate conform effect. In some embodiments, the rate conform effect actually requires multiple frames from the source video file, as the output image is a blend of two of the source images. Other rate conform effects only require one image. As indicated above, a detailed description of different rate conform techniques can be found in U.S. application Ser. No. 13/218,407. In the case of FIG. 56, the reference clip properties (720p, 30 fps) match those of the media project, and thus no conform effect is necessary. As such, the output of operation 5725 is the requested image for the media project.

One of ordinary skill in the art will recognize that in some embodiments the media-editing application does not retrieve an image, then determine which effects to apply from the reference clip, then apply these effects, then determine which effects to apply from the clip instance, and then apply these clip instance effects. Instead, the application builds a render graph such as graph 5700, then begins retrieving and decoding images and applying the render graph operations to the decoded images. This allows the application to combine effects when possible, and avoid resampling pixels repeatedly. For instance, if a transform effect and a conform effect are both applied to an image, some embodiments combine these operations. A more detailed discussion of the rendering operations of some embodiments can be found in U.S. application Ser. No. 13/111,895, incorporated by reference above.

FIGS. 55-57 described rendering for multi-camera clip instances that refer to multi-camera clips. One of ordinary skill in the art will recognize that similar principles are applicable to other clips implemented as instances of reference clips as well, whether the reference clips are individual clips, compound clips, etc. Some embodiments render such clips by first applying effects on the reference clip or on clips contained within the reference clip, then subsequently applying effects on the clip instance.

VII. Software Architecture

Figure 58:
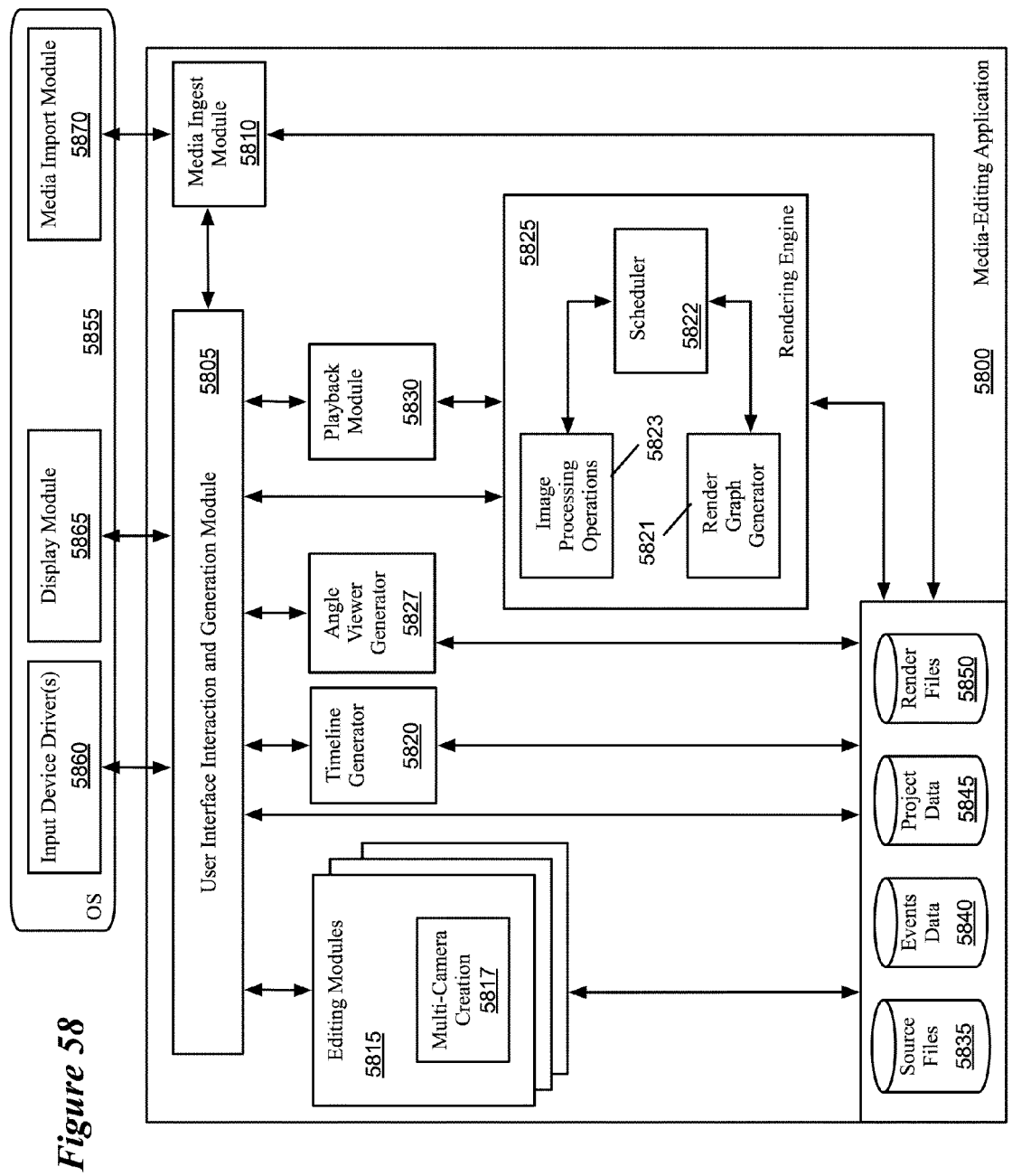
FIG. 58 conceptually illustrates the software architecture of a media-editing application of some embodiments.

In some embodiments, the processes described above are implemented as software running on a particular machine, such as a computer or a handheld device, or stored in a machine-readable medium. FIG. 58 conceptually illustrates the software architecture of a media-editing application 5800 of some embodiments. In some embodiments, the media-editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The media editing application 5800 includes a user interface (UI) interaction and generation module 5805, a media ingest module 5810, editing modules 5815, a timeline generator 5820, an angle viewer generator 5827, a rendering engine 5825, a playback module 5830. The figure also illustrates stored data associated with the media-editing application: source files 5835, events data 5840, project data 5845, and render files 5850.

In some embodiments, the source files 5835 store media files (e.g., video files, audio files, combined video and audio files, etc.) imported into the application. The events data 5840 stores the events information used by some embodiments to populate the clip library and clip browser, which includes multi-camera reference clips. The events data may be a set of clip object data structures stored as one or more SQLite database files (or other format) in some embodiments. The project data 5845 stores the project information used by some embodiments to specify a composite presentation in the timeline. The project data may also be a set of clip object data structures stored as one or more SQLite database files (or other format) in some embodiments. These clip object data structures include multi-camera clip instances that refer to the multi-camera reference clips stored in the event data 5840, as well as other clip objects that refer to asset data structures stored in the event data 5840. The render files 5850 of some embodiments may include thumbnail-sized images for display in the clip browser or timeline, audio waveform displays for media clips, as well as rendered segments of a timeline sequence for use during playback.

In some embodiments, the four sets of data 5835-5850 are stored in one physical storage (e.g., an internal hard drive, external hard drive, etc.). In some embodiments, the data may be split between multiple physical storages. For instance, the source files might be stored on an external hard drive with the events data, project data, and render files on an internal drive. Some embodiments store events data with their associated source files and render files in one set of folders, and the project data with associated render files in a separate set of folders.

FIG. 58 also illustrates an operating system 5855 that includes input device driver(s) 5860, display module 5865, and media import module 5870. In some embodiments, as illustrated, the device drivers 5860, display module 5865, and media import module 5870 are part of the operating system even when the media editing application 5800 is an application separate from the operating system.

The input device drivers 5860 may include drivers for translating signals from a keyboard, mouse, touchpad, tablet, touchscreen, etc. A user interacts with one or more of these input devices, which send signals to their corresponding device driver. The device driver then translates the signals into user input data that is provided to the UI interaction and generation module 5805.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 5865 translates the output of a user interface for a display device. That is, the display module 5865 receives signals (e.g., from the UI interaction and generation module 5805) describing what should be displayed and translates these signals into pixel information that is sent to the display device. The display device may be an LCD, plasma screen, CRT monitor, touchscreen, etc.

The media import module 5870 receives media files (e.g., audio files, video files, etc.) from storage devices (e.g., external drives, recording devices, etc.) through one or more ports (e.g., a USB port, Firewire port, etc.) of the device on which the media-editing application 5800 operates and translates this media data for the media-editing application or stores the data directly onto a storage of the device.

The UI interaction and generation module 5805 of the media editing application 5800 interprets the user input data received from the input device drivers and passes it to various modules, including the media ingest module 5810, the editing modules 5815, the timeline generator 5820, the angle viewer generator 5827, the rendering engine 5825, and the playback module 5830. The UI interaction module also manages the display of the media-editing application GUI, and outputs this display information to the display module 5865. This UI display information may be based on information from the editing modules 5815, the timeline generator 5820, the angle viewer generator 5827, the playback module 5830, the data 5835-5850, etc. In addition, the module 5805 may generate portions of the UI based solely on user input—e.g., when a user moves an item in the UI that only affects the display rather than any of the other modules, such as moving a window from one side of the UI to the other or modifying the relative size of the clip browser and clip library. In some embodiments, the UI interaction and generation module 5805 generates a basic GUI and populates the GUI with information from the other modules and stored data.

The media ingest module 5810 manages the import of source media into the media-editing application 5800. Some embodiments, as shown, receive source media from the media import module 5870 of the operating system 5855. The media ingest module 5810 receives instructions through the UI module 5805 as to which files should be imported, then instructs the media import module 5870 to enable this import (e.g., from an external drive, from a camera, etc.). The media ingest module 5810 of some embodiments stores these source files 5835 in specific file folders associated with the application. In some embodiments, the media ingest module 5810 also manages the creation of event data structures upon import of source files and the creation of the clip and asset data structures contained in the events.

The editing modules 5815 include a variety of modules for editing media in the clip browser as well as in the timeline. The editing modules 5815 handle the creation of projects, addition and subtraction of clips from projects, trimming or other editing processes within the timeline, application of effects and transitions, or other editing processes. In some embodiments, the editing modules 5815 create and modify project and clip data structures in both the event data 1980 and the project data 5845.

The editing modules 5815 of some embodiments include modules for editing clips, media projects, etc. The editing modules create media projects, trim clips within projects, apply effects to the clips, and other operations. In some embodiments, the editing modules modify the events data 5840 and project data 5845. The editing modules 5815 include a multi-camera creation module 5817 that performs automatic multi-camera clip creation (e.g., assigning clips to angles, ordering and sequencing the angles, and aligning the angles). In addition, the editing modules 5815 can be used to manually edit multi-camera reference clips in the angle editor.

The timeline generator 5820 generates a timeline for display in the composite display area, based on a requested media project, compound clip, multi-camera reference clip, etc. For example, when the user requests to view a multi-camera reference clip in the angle editor, the timeline generator 5820 retrieves the reference clip information from the events data 5840 and generates the displays of the tracks for the different angles of the clip. The timeline generator 5820 then passes the generated timeline to the UI interaction and generation module 5805 for incorporation into the UI.

The angle viewer generator 5823 generates the angle viewer for display in GUI, based on a multi-camera reference clip. The angle viewer generator requests the data for a reference clip being edited in the angle editor or to which an instance clip through which a user is skimming refers. Based on the reference clip the angle viewer generator 5823 generates the banks and preview displays, then requests the appropriate output images for the preview displays from the playback module 5830.

The rendering engine 5825 handles the rendering of images for the media-editing application. As shown, the rendering engine 5820 of some embodiments includes a render graph generator 5821, a scheduler 5822, and image processing operations 5823. The rendering engine manages the creation of images for the media-editing application. When an image is requested by a destination within the application (e.g., the playback module 5830, an encoder, analysis engines, etc.), the rendering engine outputs the requested image according to the project or event data. The rendering engine retrieves the project data or event data that identifies how to create the requested image and the render graph generator 5821 generates a render graph that is a series of nodes indicating either images to retrieve from the source files 5835 or operations to perform on the retrieved images. The scheduler 5822 schedules the retrieval of the necessary images through disk read operations and the decoding of those images. The image processing operations 5823 are the various operations performed on the images to generate an output image. In some embodiments, these operations include blend operations, effects (e.g., blur or other pixel value modification operations, transforms, conform effects, etc.), color space conversions, etc. The image processing operations 5823 in some embodiments are actually part of the operating system and are performed by a GPU or CPU of the device on which the application 5800 operates. The output of the rendering engine (a rendered image) may be stored in the render files 5850 or sent to a destination for additional processing or output.

The playback module 5830 handles the playback of images (e.g., in a preview display area of the user interface, or one of the preview displays of the angle viewer). Some embodiments do not include a playback module and the rendering engine directly outputs its images to the UI interaction and generation module 5805 for integration into the GUI, or directly to the display module 5865 for display at a particular portion of the display device.

While many of the features of media-editing application 5800 have been described as being performed by one module (e.g., the UI interaction and generation module 5805, the media ingest module 5810, etc.), one of ordinary skill in the art will recognize that the functions described herein might be split up into multiple modules. Similarly, functions described as being performed by multiple different modules might be performed by a single module in some embodiments (e.g., the playback module 5830, angle viewer generator 5827, and timeline generator 5820 might all be part of the UI interaction and generation module 5805, and a single module might be used to perform the transforms as well as spatial conforms, even when the effects are stored separately).

VIII. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 59:
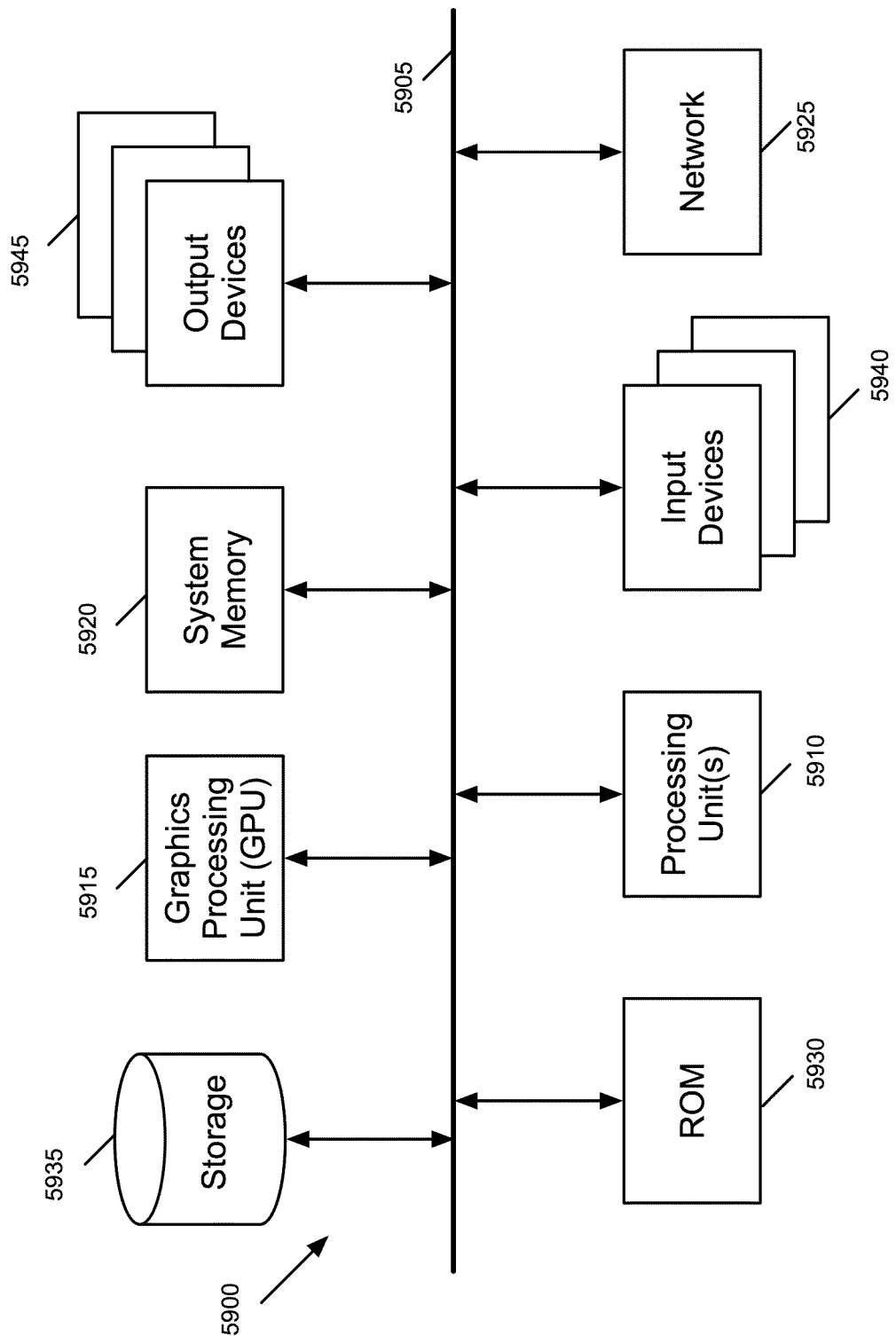
FIG. 59 conceptually illustrates an electronic system with which some embodiments of the invention are implemented.

FIG. 59 conceptually illustrates an electronic system 5900 with which some embodiments of the invention are implemented. The electronic system 5900 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 5900 includes a bus 5905, processing unit(s) 5910, a graphics processing unit (GPU) 5915, a system memory 5920, a network 5925, a read-only memory 5930, a permanent storage device 5935, input devices 5940, and output devices 5945.

The bus 5905 collectively represents all system, peripheral, and chipset buses that communicatively connect the numerous internal devices of the electronic system 5900. For instance, the bus 5905 communicatively connects the processing unit(s) 5910 with the read-only memory 5930, the GPU 5915, the system memory 5920, and the permanent storage device 5935.

From these various memory units, the processing unit(s) 5910 retrieves instructions to execute and data to process in order to execute the processes of the invention. The processing unit(s) may be a single processor or a multi-core processor in different embodiments. Some instructions are passed to and executed by the GPU 5915. The GPU 5915 can offload various computations or complement the image processing provided by the processing unit(s) 5910. In some embodiments, such functionality can be provided using CoreImage's kernel shading language.

The read-only-memory (ROM) 5930 stores static data and instructions that are needed by the processing unit(s) 5910 and other modules of the electronic system. The permanent storage device 5935, on the other hand, is a read-and-write memory device. This device is a non-volatile memory unit that stores instructions and data even when the electronic system 5900 is off. Some embodiments of the invention use a mass-storage device (such as a magnetic or optical disk and its corresponding disk drive) as the permanent storage device 5935.

Other embodiments use a removable storage device (such as a floppy disk, flash memory device, etc., and its corresponding drive) as the permanent storage device. Like the permanent storage device 5935, the system memory 5920 is a read-and-write memory device. However, unlike storage device 5935, the system memory 5920 is a volatile read-and-write memory, such a random access memory. The system memory 5920 stores some of the instructions and data that the processor needs at runtime. In some embodiments, the invention's processes are stored in the system memory 5920, the permanent storage device 5935, and/or the read-only memory 5930. For example, the various memory units include instructions for processing multimedia clips in accordance with some embodiments. From these various memory units, the processing unit(s) 5910 retrieves instructions to execute and data to process in order to execute the processes of some embodiments.

The bus 5905 also connects to the input and output devices 5940 and 5945. The input devices 5940 enable the user to communicate information and select commands to the electronic system. The input devices 5940 include alphanumeric keyboards and pointing devices (also called "cursor control devices"), cameras (e.g., webcams), microphones or similar devices for receiving voice commands, etc. The output devices 5945 display images generated by the electronic system or otherwise output data. The output devices 5945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 59, bus 5905 also couples electronic system 5900 to a network 5925 through a network adapter (not shown). In this manner, the computer can be a part of a network of computers (such as a local area network ("LAN"), a wide area network ("WAN"), or an Intranet, or a network of networks, such as the Internet. Any or all components of electronic system 5900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 10, 12, 14, 16, 18, 26, 45, and 55) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium storing a media-editing application for execution by at least one processing unit, the media-editing application comprising a graphical user interface (GUI), the GUI comprising:

a composite display area for displaying a set of media clips that define a composite presentation, the set of media clips comprising a particular multi-camera media clip which includes a plurality of different groups of ordered clips comprising a plurality of different content types;

a preview display area comprising a plurality of preview display panes for simultaneously displaying a plurality of video images from a plurality of the different groups corresponding to a particular duration in the composite presentation; and a plurality of selectable content type user interface (UI) items for selecting the type of content of each selected group of ordered clips for use in the composite presentation, wherein a first content type of a first group of ordered clips is assigned to the particular duration of the composite presentation by selecting the preview display pane for the first group of ordered clips and the content type UI item for the first content type, wherein a second content type of a second group of ordered clips is assigned to the particular duration of the composite presentation by selecting the preview display pane for the second group of ordered clips and the content type UI item for the second content type.

2. The non-transitory machine readable medium of claim 1, wherein each of the different groups of ordered clips comprises a set of clips captured by a particular camera.

3. The non-transitory machine readable medium of claim 1, wherein the different groups of ordered clips are synchronized within the particular multi-camera media clip.

4. The non-transitory machine readable medium of claim 1, wherein the particular multi-camera media clip is an instance of a reference clip, wherein the different groups of ordered clips are editable within the reference clip.

5. The non-transitory machine readable medium of claim 4, wherein the particular multi-camera media clip automatically reflects modifications to the reference clip.

6. The non-transitory machine readable medium of claim 1, wherein the selection of a particular of preview display pane associated with a particular group of ordered clips causes the particular multi-camera media clip to be divided into two media clips, one of which uses the particular group of ordered clips in the composite presentation.

7. The non-transitory machine readable medium of claim 1, wherein the preview display area is a first preview display area and the GUI further comprises a separate second preview display area for displaying a larger display of the video images from a selected group.

8. The non-transitory machine readable medium of claim 1, wherein the first and second groups of ordered clips are the same group.

9. The non-transitory machine readable medium of claim 1, wherein the plurality of different content types comprise (i) audio, (ii) video, and (iii) both audio and video together.

10. The non-transitory machine readable medium of claim 9, wherein the first and second groups of ordered clips are different groups such that the composite presentation uses audio from the first group at the same time video is used from the second different group.

11. A non-transitory machine readable medium storing a media-editing application for execution by at least one processing unit, the media-editing application comprising a graphical user interface (GUI), the GUI comprising:
- a composite display area for displaying a set of media clips that define a composite presentation, the set of media clips comprising a particular multi-camera media clip which includes a plurality of different groups of ordered clips comprising a plurality of different content types;
- a multi-camera display area comprising a plurality of preview display panes for simultaneously displaying a plurality of video images from a plurality of different groups corresponding to a particular duration in the composite presentation;
- selectable sets of group indicators for switching between sets of groups shown in the preview display panes when a number of groups of ordered clips in the multi-camera media clip is greater than a number of preview display panes; and
- a plurality of selectable content type user interface (UI) items for selecting the type of content of each selected group of ordered clips for use in the composite presentation, wherein a first content type of a first group of ordered clips is assigned to the particular duration of the composite presentation by selecting the preview display pane for the first group of ordered clips and the content type UI item for the first content type,
- wherein a second content type of a second group of ordered clips is assigned to the particular duration of the composite presentation by selecting the preview display pane for the second group of ordered clips and the content type UI item for the second content type.

12. The non-transitory machine readable medium of claim 11, wherein the plurality of type indicators comprises different colors for different content types.

13. The non-transitory machine readable medium of claim 12, wherein a particular one of the GUI items is highlighted in a particular color when the particular GUI item is selected.

14. The non-transitory machine readable medium of claim 13, wherein a particular preview display pane, that displays video images from a group identified as the particular group for use in the composite presentation for the type of content for which the particular GUI item is selected, is highlighted using the same particular color irrespective of whether the particular GUI item is selected.

15. The non-transitory machine readable medium of claim 11, wherein the different content types comprise (i) audio, (ii) video, and (iii) both audio and video together.

16. The non-transitory machine readable medium of claim 11, wherein the multi-camera display area comprises a set of options for modifying the number of preview display panes in the multi-camera display area.

17. The non-transitory machine readable medium of claim 11, wherein a number of the selectable sets of group indicators is based on the number of groups and the number of preview display panes in the multi-camera display area.

18. A method for providing a media-editing application, the method comprising:
- providing a composite display area for displaying a set of media clips that define a composite presentation, the set of media clips comprising a particular multi-camera media clip which includes a plurality of different groups of ordered clips comprising a plurality of different content types;
- providing a multi-camera display area comprising a plurality of preview display panes for simultaneously displaying a plurality of video images from the different groups corresponding to a particular duration in the composite presentation;
- providing a plurality of selectable content type user interface (UI) items for selecting the type of content of each selected group of ordered clips for use in the composite presentation, wherein a first content type of a first group of ordered clips is assigned to the particular duration of the composite presentation by selecting the preview display pane for the first group of ordered clips and the content type UI item for the first content type,
- wherein a second content type of a second group of ordered clips is assigned to the particular duration of the composite presentation by selecting the preview display pane for the second group of ordered clips and the content type UI item for the second content type.

19. The method of claim 18, wherein a plurality of type indicators are used to indicate a selected group for each different type of content in the preview displays, wherein the plurality of type indicators comprises different colors for different content types.

20. The method of claim 18, wherein the different content types comprise (i) audio, (ii) video, and (iii) both audio and video together.

21. The method of claim 18, wherein providing the multi-camera display area comprises providing a set of options for modifying the number of preview display panes in the multi-camera display area.

22. The method of claim 18, wherein the method further comprises providing selectable sets of group indicators for switching between sets of groups shown in the preview displays when a number of groups of ordered clips in the multi-camera media clip is greater than a number of preview displays, wherein a number of the selectable sets of group indicators is based on the number of groups and the number of preview display panes in the multi-camera display area.

* * * * *